US005576945A

United States Patent [19]

McCline et al.

[11] Patent Number: 5,576,945

[45] Date of Patent: Nov. 19, 1996

[54] TRANSACTION MONITOR PROCESS WITH PRE-ARRANGED MODULES FOR A MULTIPROCESSOR SYSTEM

[75] Inventors: Matthew C. McCline, Bellevue, Wash.; James M. Lyon, San Jose, Calif.

[73] Assignee: Tandem Computers Incorporated, Cupertino, Calif.

[21] Appl. No.: 377,573

[22] Filed: Jan. 23, 1995

[51] Int. Cl.[6] .............................. G05B 15/00; G06F 9/00

[52] U.S. Cl. ............................................ 364/131; 395/650

[58] Field of Search .................................... 395/650, 800; 371/39; 364/200

[56] References Cited

U.S. PATENT DOCUMENTS

| | | | |
|---|---|---|---|
| 4,228,496 | 10/1980 | Kaatzman et al. | 364/200 |
| 4,365,295 | 12/1982 | Katzman et al. | 364/200 |
| 4,484,275 | 11/1984 | Katzman et al. | 364/200 |
| 4,590,555 | 5/1986 | Bourrez | 364/200 |
| 4,663,706 | 5/1987 | Allen et al. | 364/200 |
| 4,667,287 | 5/1987 | Allen et al. | 364/200 |
| 4,672,535 | 6/1987 | Katzman et al. | 364/200 |
| 4,817,091 | 3/1989 | Katzman et al. | 371/9 |
| 5,297,281 | 3/1994 | Emma et al. | 395/650 |
| 5,379,428 | 1/1995 | Belo | 395/650 |

OTHER PUBLICATIONS

Pradeep K. Dubey, Arvind Krishna, and Michael J. Flynn. Analytical Modeling of Multithreaded Pipeline Performance Proceedings of the 27th Hawaii International Conference on System Sciences vol. 1: Architecture, pp. 361–367. Jan./1994.

Herbert H. J. Hum, Kevin B. Theobald and Guang R. Gao. Building Multithreaded Architectures with Off–the–Shelf Microprocessors, Proceedings of the Eighth International Parallel Processing Symposium (Cat. No. 94TH0652–8), pp. 288–294. 1994.

*Primary Examiner*—Roy N. Envall, Jr.
*Assistant Examiner*—Yoncha Kundupoglli
*Attorney, Agent, or Firm*—Townsend and Townsend and Crew LLP

[57] ABSTRACT

A multiple processor system includes at least one process pair each including a plurality of modules. The modules perform functions related to multiple independent threads, and are arranged in a predetermined order such that higher modules are dependent upon lower modules, and lower modules are independent from higher modules. Each process pair is initially unaware of the number and order of the modules. The order of the modules is related to dependency and interdependency between the modules so that there is a portion of higher modules and a portion of lower modules. Multiple independent threads process the modules to cause activities in the portions of higher modules to take place before activities in the portions of lower modules.

11 Claims, 3 Drawing Sheets

TRANSACTION MONITOR PROCESS WITH PRE-ARRANGED MODULES FOR A MULTIPROCESSOR SYSTEM

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention is directed to data processing systems, and more particularly to parallel processing which coordinates major system state change activities among multiple modules.

On-line transaction processing ("OLTP") has found a variety of commercial applications in today's industry such as, for example, assisting with financial transactions (e.g., coordinating information from bank ATMs), tracking data for the New York Stock Exchange, tracking billings for telephone companies, and tracking parts for manufacturing (e.g., automobile parts). Many of the commercial applications available for OLTP require elaborate protection of integrity of user data along with continuous availability to the OLTP applications for end users. For example, ATMs for banks must have excellent integrity (i.e., make a minimum of, if any, errors), and ATMs must be available to users for extended periods of time. ATM users would not tolerate mistakes associated with their transactions (e.g., a $500.00 deposit not being credited to a user's account). Moreover, ATMs are often preferably available to users 24 hours a day, seven days a week.

To achieve continuous availability in OLTP applications, users must be able to rely on supporting system software. Parallel processing (processing which utilizes process pairs) assists in allowing OLTP to quickly handle numerous individual transactions or small tasks which are distributed among multiple processors. A process pair involves two processes with the same set of instructions to execute. At any one time, one of the two processes (the primary) is performing all of the useful work, and occasionally sending messages to the other of the two processors (the backup) in order to update that processor's state. The second of the two processors, or backup processor, remains ready to assume the workload if the first of the two processors, or primary processor, fails.

Other parallel processing applications include maintaining and accessing large data bases for record-keeping and decision-making operations, or as media servers that provide an accessible store of information to many users. Parallel processing's particular advantage resides in the ability to handle large amounts of diverse data such as, for example, in decision making operations which may require searches of diverse information that can be scattered among a number of storage devices. Furthermore, a parallel processor media server application could be in an interactive service environment such as "movies-on-demand," that will call upon the parallel processor to provide a vast number of customers with access to a large reservoir of motion pictures kept on retrievable memory (e.g., disk storage devices). This latter application may well require the parallel processor to simultaneously service multiple requests by locating, selecting, and retrieving the requested motion pictures, and then forwarding the selections to the requesting customers.

While parallel processing increases OLTP capabilities, a technique is needed for coordinating major system state changes among multiple modules within process pairs.

SUMMARY OF THE INVENTION

In the preferred embodiment, a Transaction Monitoring Facility (TMF) provides transaction management and protects the integrity of user data. The programmatic construct called a "transaction" is an explicitly delimited operation, or set of related operations, that changes the content of a database from one consistent state to another. The database operations within a transaction are treated as a single unit.

In the preferred embodiment, a multithreaded process is utilized to provide a process in which there are multiple independent loci of control called "threads". Each "thread" has a different task to perform which furthers the larger objective of the process. Furthermore, a multithreaded process pair is a process pair in which each process may be (and usually is) multithreaded. Within TMF, the transaction monitor process (TMP) is a multithreaded process pair. The TMP uses one thread to track each transaction. Threads are also used for other purposes (e.g., one thread could represent each person using an ATM in a full banking system). In addition, approximately 500 to 1000 threads are occurring at one time in a busy system. Multiple modules act upon each "thread" such that desired changes are performed. Each module may contain one or more threads of activity that operate as largely independent subprocesses within the overall process infrastructure.

In the preferred embodiment, the invention provides a means for controlling operations within a multi-threaded process pair which includes multiple modules having varying degrees of interdependence. For example, the present invention ensures that operations (or events) such as (1) subsystem startup and shutdown, (2) process pair take over, (3) give ownership, etc. can be accomplished without deadlock and race conditions, and with a minimum of interaction between the various modules.

Deadlock occurs when two or more threads cannot go forward without something from the other, such that the system cannot run. In a race condition, two threads that should have been synchronized are operated upon at the same time, such that the transaction does not go forward properly. Race conditions often lead to system failure. Thus, both deadlock and race conditions are undesirable in a system which requires excellent integrity and continuous availability.

The system involved has several definite characteristics. First, the full set of potential modules is not initially known by the controlling entity.

Second, the modules affected by a given event must change state at approximately the same time and in a predetermined specific order. In the preferred embodiment, state changes must have a definite beginning, before which no affected module has changed state, and end, after which all affected modules have changed state.

Third, the modules involved have varying degrees of interdependence. In the preferred embodiment, one module depends on the services of another, and state changes must be made in a specific order so that any required dependency is satisfied.

Finally, the present invention is not limited to transaction management. In particular, process pairs and modules can be used in many applications which do not utilize a transaction manager/monitor. For example, a communication manager used for the Internet utilizes the present invention without the assistance of a transaction monitor/manager.

A further understanding of the nature and advantages of the invention will become apparent by reference to the remaining portions of the specification and drawings.

DETAILED DESCRIPTION OF SPECIFIC EMBODIMENTS

Figure 1:
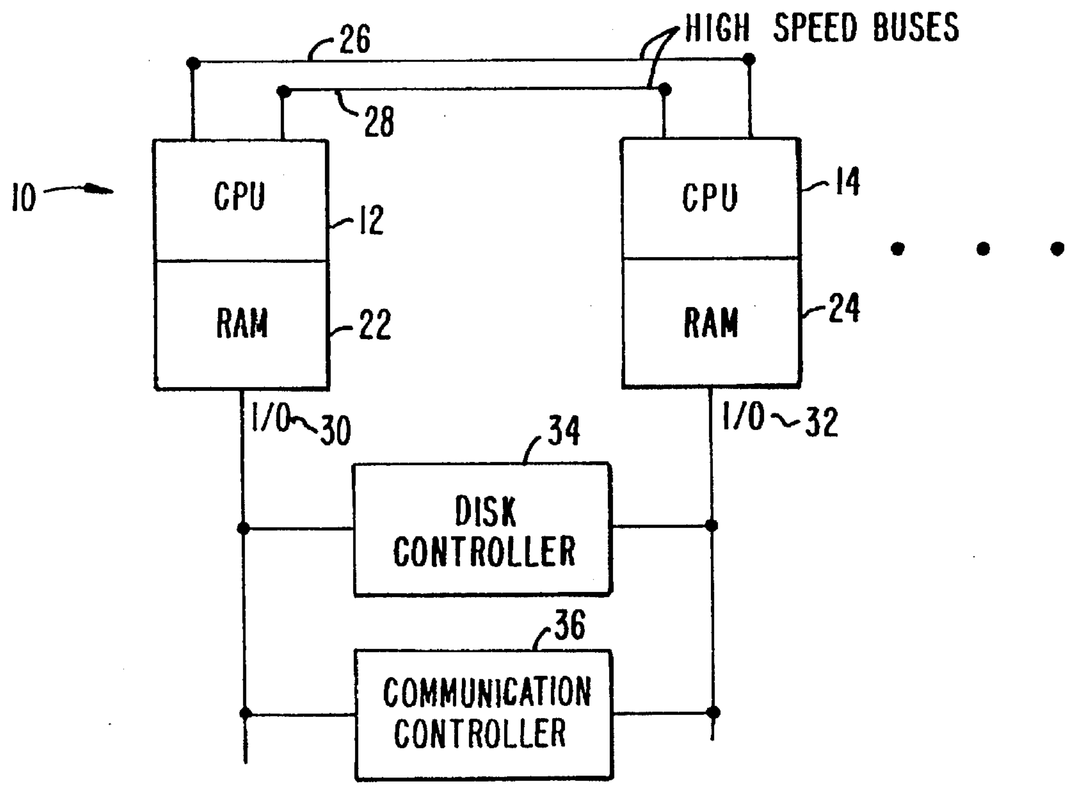
FIG. 1 is a simplified representation of a processor system with 2 to 16 processors.

Turning now to the figures, and for the moment principally FIG. 1, illustrated in simplified form is a processor system with 2 to 16 processors, designated generally with the reference numeral 10. As shown, the processor system 10 comprises a plurality of processors 12, 14, . . . (CPUs). Each CPU 12, 14, . . . contains its own RAM 22, 24, . . . The 2 to 16 CPUs are connected by two high speed buses 26 and 28, and each CPU 12, 14, . . . has its own input/output line 30, 32, . . . (I\O). I\O lines 30, 32, . . . connect CPUs 12, 14, . . . to disk controller 34 and communication controller 36.

Disk Controller 34 translates between protocols from the I/O buses 30, 32, . . . to the actual electrical signals which are needed by the disks. In the preferred embodiment, one disk controller is provided for eight disks. Similarly, communication controller 36 translates between protocols from the I/O buses 30, 32, . . . to external communication lines and executes some of the communication protocol. Different types of communication controllers are used for handling different communication lines.

This processor system arrangement 10 uses a process pair scheme. There are two CPUs in a process pair, one is the primary CPU and the other is a standby CPU which is only utilized if the other primary CPU is inoperable. The standby CPU is continually updated such that if an error occurs and the primary CPU cannot perform a transaction, the standby CPU will have access to any piece of the required information and, thus, will be able to independently complete the transaction.

This processor system 10 has many other features which apply to every transaction. In the preferred embodiment, for example, for each request that takes place in the system, a response must be sent to the transaction manager. In addition, if any mistake or failure takes place, system 10 returns to its prior state as though the transaction never started. Thus, part of a transaction or request may be undone if needed.

Figure 2:
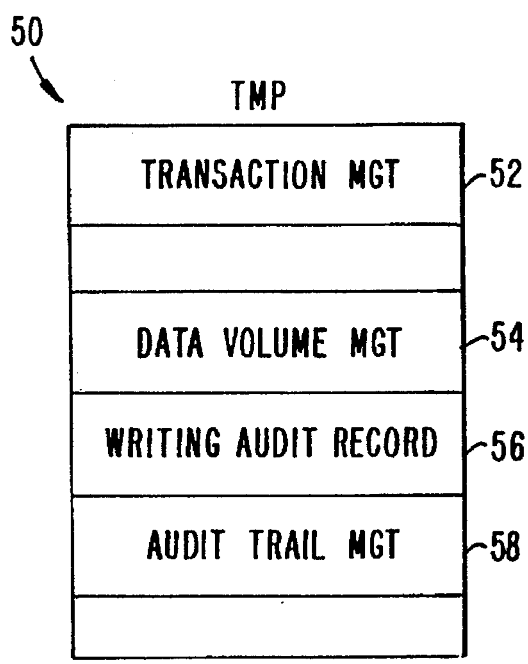
FIG. 2 illustrates an arrangement of modules within the TMP.

Now turning to FIG. 2, In the preferred embodiment, TMP 50 is a TMF monitoring process (or a transaction monitor), and it acts as one of the TMPs in a TMP process pair for the entire system 10. TMP 50 allows for system 10 to have multiple independent activities which are not dependent on the number or order of modules. FIG. 2 illustrates an arrangement of modules within TMP 50. These modules, for example, can be transaction management 52, data volume management 54, writing audit record 56, and audit trail management 58. Additionally these modules can be deleted, can be changed, or new modules can be added.

While many independent activities are occurring in the modules of TMP 50, an audit trail keeps track of all the processes (changes, undos, etc.) as they are completed. This audit trail can be considered as a data journal or log. In the preferred embodiment, each module carries out a separately defined function. For example, transaction management 52 controls the state of the transaction. The state of a certain transaction depends on whether that transaction is, for example, (1) still active, (2) committed, (3) complete, (4) aborted or (5) aborting. Data volume management 54 controls the state of the individual disks. A disk state changes when a disk fails, is removed, is added, etc. Writing audit record 56 writes the records in the audit trail. Audit trail management 58 places the records in the audit trail, tracks the audit trail position and coordinates the layout of the audit trail. If more than one disk volume is needed for the audit trail, audit trail management 58 organizes the disks such that available disk space is used efficiently.

The order of modules 52, 54, 56, and 58, (such that transaction management 52 is on top, data volume management 54 is second from the top, writing audit record 56 is second from the bottom, and audit trail management 58 is on the bottom) is significant because this order facilitates the tracking of the state of activities. This allows system 10 to coordinate activities such that certain activities occur before or after other activities, as needed, automatically. While modules 52, 54, 56, and 58 are set forth in TMP 50, as stated above, these modules can be deleted and/or other modules (such as audit dumping, etc.) can be added as desired. This is particularly useful during development and expansion.

Figure 3:
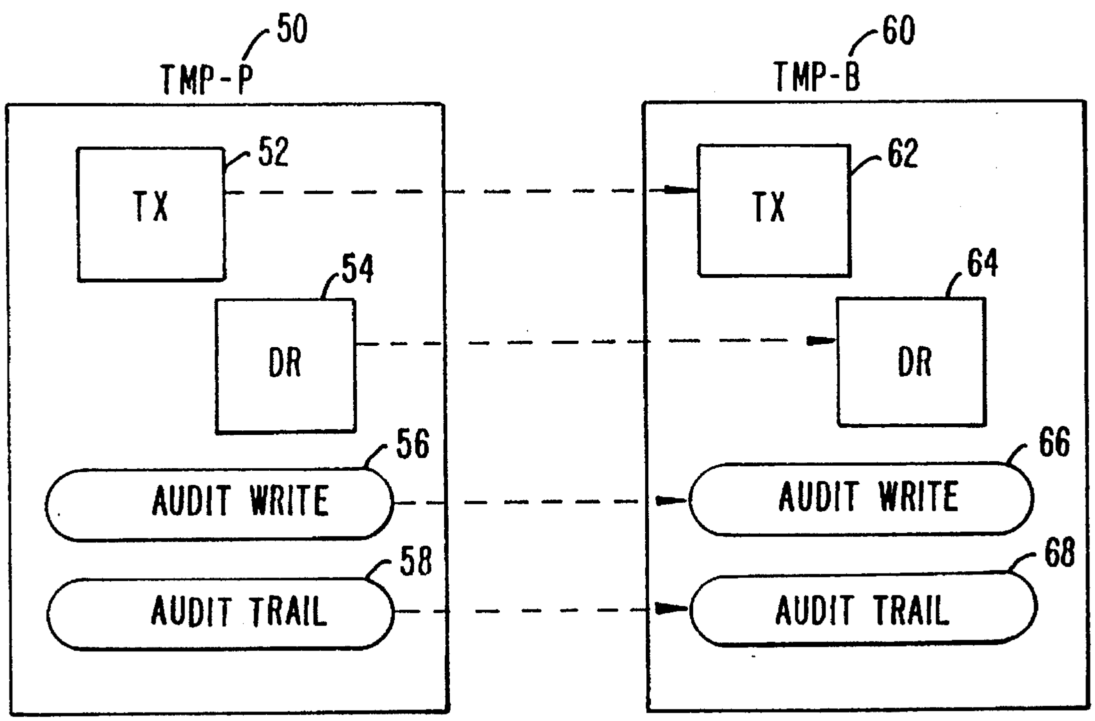
FIG. 3 illustrates the TMP-primary and TMP-backup configurations.

TMP 50 works in a process pair for the entire system 10. As shown in FIG. 3, TMP 50 is a primary TMP and TMP 60 is a backup TMP. In the preferred embodiment, both TMP primary 50 and TMP backup 60 contain the same number and type of modules. For example, these modules could be primary transaction management 52, backup transaction management 62, primary data volume management 54, backup data volume management 64, primary audit write 56, backup audit write 66, primary audit trail 58, and backup audit trail 68. The primary modules 52, 54, 56 and 58 continually update backup modules 62, 64, 66, and 68, respectively. When system 10 is initially started, a particular sequence for the turning on of modules occurs. First, audit trail 58 in TMP primary 50 is started. Second, audit trail 68 in TMP backup 60 is started. Third, audit write 56 is started, and so on, such that transaction management 62 in TMP backup 60 is the last module to be started. This is considered a "bottom up" startup. Similarly, a shutdown is "top down". Thus, in a shutdown, transaction management 62 in TMP backup 60 is the first module to be shut down and audit trail 58 in TMP primary 50 is the last module to be shut down.

If system 10 needs to utilize TMP backup 60 (e.g., a mistake or failure has occurred), then TMP backup 60 begins to act as the primary and TMP primary 50 acts as a backup. In order to accomplish this, both TMP 50 and TMP 60 must be reconfigured. Reconfiguration for TMP primary 50 (from primary to backup) occurs in "top down" fashion and reconfiguration for TMP backup 60 (from backup to primary) occurs in a "bottom up" fashion.

Due to the transition sequencing shown in FIG. 3, if a certain module is "on" then all lower modules are "on" and if a certain module is primary, then all lower modules are primary. For example, if audit write 56 is "on" then audit trail 58 is also "on". In addition, a module depends on all the modules which are lower within its TMP, and each module is independent of the modules which are higher within its TMP. For example, data volume management 54 depends on both writing audit 56 and audit trail management 58, but data volume management 54 is independent of transaction management 52. Because of the "top down" and "bottom up" approach used for starting and stopping modules, one can determine that if a certain modules is, for example, stopped, then all modules above it are also stopped. Conversely, if a certain module is not stopped, then all modules it depends on are started. Similarly, if a module is not a backup, then all modules it depends on are primary.

Figure 4:
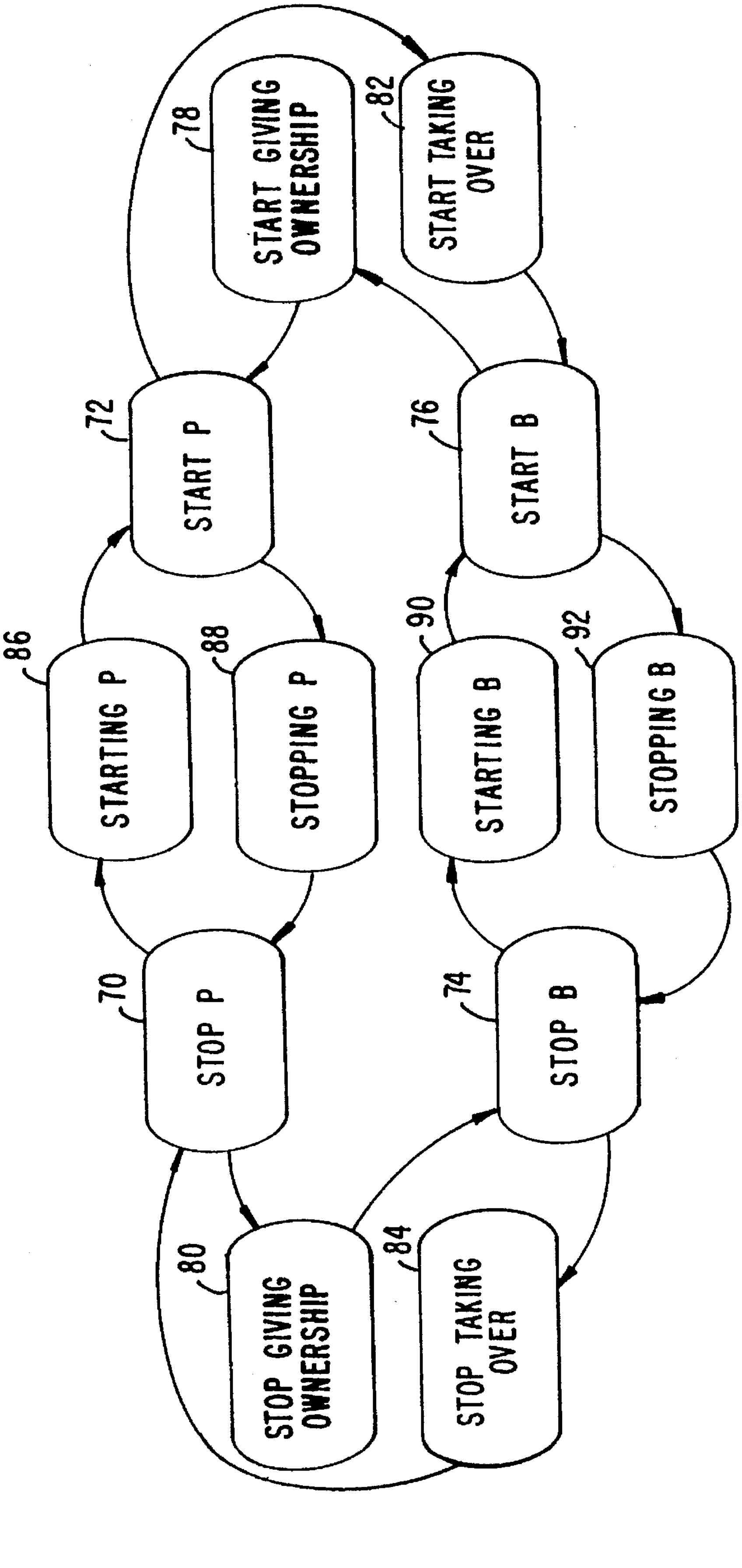
FIG. 4 is a module state transition diagram.

FIG. 4 provides a module state transition diagram. The four states involved are stop primary 70, start Primary 72, stop backup 74, and start Backup 76. During the transition in which modules are changed from primary to backup or vice versa, ownership is given by one TMP while the other TMP takes over, as shown in transition states 78, 80, 82, and 84. Similarly, when one TMP is started or stopped, a transition takes place as shown in transition states 86, 88, 90 and 92.

Many module service requests come from outside the process in the form of messages to the process. Since each module's ownership transition happens at slightly different times, the module to which a request is directed independently makes the decision of whether it can perform the request at the time that it is received. If a module decides that it cannot handle a request because it is not primary, then it calls a centralized procedure to dispose of that request (e.g., "TmpControl^HandleBackupMsg"). This procedure performs the following routine in the preferred embodiment: (1) if no transition is going on in any module in that process pair then a reply is sent to the originator of the message, indicating that the originator must resend the message to the other member of the process pair; and (2) if a transition is in progress, then the request is placed in a holding list, and after the entire process completes the current transition, either the request is sent back to the module that services it (if the process is now primary), or a reply is sent to the message's originator indicating that the request must be re-sent to the other member of the process pair (if the process is now backup). Therefore, during the changeover time, all requests are saved/held and dealt with after the changeover is complete.

As with all transactions, after the held requests are examined, either (1) a reply is sent, or (2) the request is accepted, a transaction is done if needed, and a reply confirming acceptance/action is sent. Thus, the system waits for the transition between primary and backup to fully occur before acting on requests. Additionally, before any module changes from primary to backup, that module would need to deal with all of its "current" threads/requests before making the changeover.

In the preferred embodiment, the following events lead to coordinated state changes among the modules of the TMP process: (1) process pair events (e.g., switch ownership, takeover ownership, reload backup and backup down), and (2) subsystem events (e.g., start and stop). Reload backup occurs when a backup TMP comes back on-line and needs to be updated continually by the primary TMP. Backup down occurs when a backup TMP is down and the primary TMP is told to stop updating the ineffective backup TMP.

In summary, the sequencing of the modules results in the following properties: (1) if any module is started, starting OR stopped, then every module it depends on is started; and (2) if any module is primary, taking over OR giving ownership, then every module it depends on is primary. These properties allow any module, during its own transition(s), to safely depend on the services from other modules in order to complete its own transition.

Figure 5:
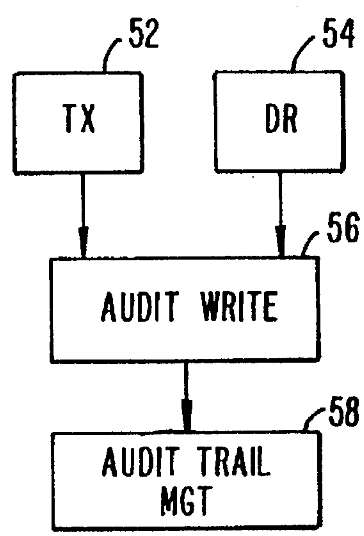
FIG. 5 is a module dependency graph.

FIG. 5 provides a module dependency graph. As illustrated in this graph, both transaction management 52 and data volume management 54 are dependent on audit write 56, and audit write 56 is dependent on audit trail management 58. Thus, no cycle of dependency exist. Dependency is determined between modules by going up or down the sequence of modules as shown in both FIG. 2 and FIG. 3, and described more fully above.

This linear dependency allows for simpler addition and deletion of modules. The code does not need to know which modules are being used and how they depend on each other because the full set and order of modules is not initially known by the controlling entity. During development and expansion, modules can easily be added or deleted by placing them in the sequence of modules within TMP primary 50 and TMP backup 60. For example, audit trail initialization occurs automatically after a startup call is made to TMP control. Such a call may be to start procedure, stop procedure, take over procedure, etc. When a call is made to TMP control, TMP control just knows that it is starting, stopping, etc., and it is unaware of which modules are available and how they are arranged until after the "top down" or "bottom up" procedure through the available modules has taken place.

As stated in the Summary of the Invention, the present invention is not limited to TMF or the TMP. The present disclosure discusses TMF and TMP only as the preferred embodiment of the present invention. Thus, the invention can be applied to any system which utilizes process pairs and modules (as defined above). Moreover, this invention is not limited to the number of process pairs. While this invention utilizes hundreds of process pairs at any one time in the preferred embodiment, one to one thousand-plus process pairs can be used to practice the present invention.

An example of the source code used in the preferred embodiment to implement the above described functionality is included in the attached Appendix.

While a full and complete disclosure of the invention has been provided herein above, it will be obvious to those skilled in the art that various modifications and changes may be made.

14

MODULAR PROCESS CONTROL

APPENDIX

SOURCE CODE LISTING

```
TAL - T9250D20 - (01JUN93)
Copyright Tandem Computers Incorporated 1976, 1978, 1981-83, 1985, 1987-93

                              ? TARGET ANY, INSPECT, SYMBOLS, OPTIMIZE 2, NOFIXUP
  1.   000000 0   0   ?COLUMNS 80
  2.   000000 0   0   !EXPORT SPEC
  4.   000000 0   0   ?IFNOT 9
  5.   000000 0   0   ?IF 9
  6.  *000000 0   0
  7.  *000000 0   0   @@@@@@@@  @@    @@  @@@@@@@
  8.  *000000 0   0   @@@@@@@@  @@@  @@@  @@@@@@@@
  9.  *000000 0   0      @@     @@@@@@@@  @@    @@
 10.  *000000 0   0      @@     @@@@@@@@  @@    @@
 11.  *000000 0   0      @@     @@ @@ @@  @@@@@@@@
 12.  *000000 0   0      @@     @@    @@  @@@@@@@
 13.  *000000 0   0      @@     @@    @@  @@
 14.  *000000 0   0      @@     @@    @@  @@
 15.  *000000 0   0      @@     @@    @@  @@
 16.  *000000 0   0      @@     @@    @@  @@
 17.  *000000 0   0
 18.  *000000 0   0    @@@@@@    @@@@@@   @@    @@  @@@@@@@@  @@@@@@@    @@@@@@   @@
 19.  *000000 0   0   @@@@@@@@  @@@@@@@@  @@@   @@  @@@@@@@@  @@@@@@@@  @@@@@@@@  @@
 20.  *000000 0   0   @@    @@  @@    @@  @@@@  @@     @@     @@    @@  @@    @@  @@
 21.  *000000 0   0   @@        @@    @@  @@@@  @@     @@     @@    @@  @@    @@  @@
 22.  *000000 0   0   @@        @@    @@  @@ @@ @@     @@     @@@@@@@@  @@    @@  @@
 23.  *000000 0   0   @@        @@    @@  @@  @@@@     @@     @@@@@@@   @@    @@  @@
 24.  *000000 0   0   @@        @@    @@  @@  @@@@     @@     @@ @@     @@    @@  @@
 25.  *000000 0   0   @@    @@  @@    @@  @@   @@@     @@     @@  @@@   @@    @@  @@
 26.  *000000 0   0   @@@@@@@@  @@@@@@@@  @@    @@     @@     @@   @@   @@@@@@@@  @@@@@@@@
 27.  *000000 0   0    @@@@@@    @@@@@@   @@    @@     @@     @@    @@   @@@@@@   @@@@@@@@
 28.  *000000 0   0
 29.  *000000 0   0   ?ENDIF 9
 30.   000000 0   0
 31.   000000 0   0   NAME TmpControl^Module;
 32.   000000 0   0
```

```
                                         Manages TMP Control Operations
   34.     000000 0  0   ?SOURCE CopyTal
Source file:  [?]  $TOOLS.TOOLSD30.COPYTAL  1992-02-10  09:44:57
   12.     000000 0  0   ! |-------------------------------------------------------------
   12.1    000000 0  0   ! |
   13.     000000 0  0   ! | Copyright (c) 1992 by Tandem Computers Incorporated.
   14.     000000 0  0   ! | Printed in U.S.A.
   15.     000000 0  0   ! |
   16.     000000 0  0   ! | All rights reserved.  No part of this document may be
   17.     000000 0  0   ! | reproduced in any form, including photocopying or translation
   18.     000000 0  0   ! | to another language, without the prior written consent of
   19.     000000 0  0   ! | Tandem Computers Incorporated.
   20.     000000 0  0   ! |
   39.     000000 0  0   ! | Atalla                           Pathmaker
   40.     000000 0  0   ! | CAPS                             PCFormat
   41.     000000 0  0   ! | CCS                              PPDM
   42.     000000 0  0   ! | CD Read                          PS Mail
   43.     000000 0  0   ! | Challenge/Response               PS Text
   44.     000000 0  0   ! | CLX                              PSX
   45.     000000 0  0   ! | CLX/R                            RDF
   46.     000000 0  0   ! | CLX 2000                         Safeguard
   47.     000000 0  0   ! | Cyclone                          Safe-T-Net
   48.     000000 0  0   ! | Cyclone/R                        SeeView
   49.     000000 0  0   ! | DB-Batch-FE                      SNAX
   50.     000000 0  0   ! | DDNAM                            ST-1000
   51.     000000 0  0   ! | DNS                              SysWay
   52.     000000 0  0   ! | Dynabus                          TACL
   53.     000000 0  0   ! | Dynabus+                         Tandem
   54.     000000 0  0   ! | Enable                           Tandem logo
   55.     000000 0  0   ! | Encompass                        TGAL
   56.     000000 0  0   ! | Enform                           T.I.M.E.
   57.     000000 0  0   ! | Envoy                            TMF
   58.     000000 0  0   ! | Exchange                         Transfer
   59.     000000 0  0   ! | Expand                           TransWay
   60.     000000 0  0   ! | EXT                              TSCE
   61.     000000 0  0   ! | FaxLink                          TSCE-1000
   62.     000000 0  0   ! | FOX                              TSCP
   63.     000000 0  0   ! | Guardian                         TSCP-1000
   64.     000000 0  0   ! | Guardian 90                      TSMS
   65.     000000 0  0   ! | InfoWay                          TSMS-1000
   66.     000000 0  0   ! | Inspect                          TTSI-NET
   67.     000000 0  0   ! | Integrity                        Tunex
   68.     000000 0  0   ! | Integrity S2                     Twinac
   69.     000000 0  0   ! | IXF                              Twincos
   70.     000000 0  0   ! | Laser-LX                         Twinpro
   71.     000000 0  0   ! | Lighthouse                       TXP
   72.     000000 0  0   ! | Lighthouse Keeper                V8
   73.     000000 0  0   ! | LXN                              V80
   74.     000000 0  0   ! | Measure                          V90
   75.     000000 0  0   ! | MHX                              ViewPoint
   76.     000000 0  0   ! | Multilan                         ViewSys
   77.     000000 0  0   ! | NDX                              VLM
   78.     000000 0  0   ! | NetBatch                         VLX
   79.     000000 0  0   ! | NLX                              WPLink
   80.     000000 0  0   ! | NonStop                          XL8
   81.     000000 0  0   ! | NonStop-UX                       XL80
   82.     000000 0  0   ! | NonStop V+
   83.     000000 0  0   ! |
```

```
                                        Manages TMP Control Operations
85.      000000 0  0   !  | are trademarks and service marks of Tandem Computers
86.      000000 0  0   !  | Incorporated, protected through use and/or registration in
87.      000000 0  0   !  | the United States and many foreign countries.  The use of the
88.      000000 0  0   !  | symbol (R) indicates registration in the United States only;
89.      000000 0  0   !  | registrations may not have issued yet in other countries.
89.1     000000 0  0   !  |
223.     000000 0  0   !  | Array with Logo is a trademark of Array Technology
224.     000000 0  0   !  | Corporation.
225.     000000 0  0   !  |
237.     000000 0  0   !  | Access/One, Diskshare, Linkware Contact, MAP/One, MaxTalk,
238.     000000 0  0   !  | NetDetect, NetDirector, Net/One, NIU, Personal Connection,
239.     000000 0  0   !  | Personal NIU, Printshare, Ungermann-Bass, Ungermann-Bass
240.     000000 0  0   !  | with Logo are trademarks of Ungermann-Bass, Inc.
241.     000000 0  0   !  |
249.     000000 0  0   !  |-------------------------------------------------------------------
249.01   000000 0  0   !  |
249.1    000000 0  0   !  | THIRD PARTY TRADEMARKS STATEMENT:
250.     000000 0  0   !  |
252.     000000 0  0   !  | All brand names and product names are trademarks or
253.     000000 0  0   !  | registered trademarks of their respective companies.
253.1    000000 0  0   !  |
261.     000000 0  0   !  | REFERENCE LIST OF THIRD PARTY TRADEMARKS:
262.     000000 0  0   !  |
264.     000000 0  0   !  | 3Com is a registered trademark and Etherlink II is a
265.     000000 0  0   !  | trademark of 3Com Corporation.
266.     000000 0  0   !  |
267.     000000 0  0   !  | Alis is a registered trademark of Applix Incorporated
268.     000000 0  0   !  |
269.     000000 0  0   !  | Ampex is a trademark of Ampex Corporation.
270.     000000 0  0   !  |
271.     000000 0  0   !  | Apple, Laserwriter, Imagewriter, are registered trademarks
272.     000000 0  0   !  | and Switcher is a trademark of Apple Computer, Inc.
273.     000000 0  0   !  |
274.     000000 0  0   !  | Ashton-Tate is a registered trademark of Ashton-Tate
275.     000000 0  0   !  | Corporation.
276.     000000 0  0   !  |
277.     000000 0  0   !  | BASE24, BASE24-atm, BASE24-pos, BASE24-afs, BASE24-pay,
278.     000000 0  0   !  | BASE24-pcs, BASE24-teller, BASE24-videotex, BASE24-cash
279.     000000 0  0   !  | manager, BASE24-span, and ACI are trademarks of Applied
280.     000000 0  0   !  | Communications, Inc.
281.     000000 0  0   !  |
282.     000000 0  0   !  | Betex is a trademark of Vicorp Air Call, (U.K.)
283.     000000 0  0   !  |
284.     000000 0  0   !  | Compuserve is a registered trademark of Compuserve
285.     000000 0  0   !  | Incorporated.
286.     000000 0  0   !  |
287.     000000 0  0   !  | Connex is a trademark of Deluxe Data Systems, Inc.
288.     000000 0  0   !  |
289.     000000 0  0   !  | CREATABASE DocuAnnotator, DocuPrinter, DocuScan, DocuSystem,
290.     000000 0  0   !  | and FASTtext are trademarks of NDX Corporation.
291.     000000 0  0   !  |
292.     000000 0  0   !  | DCA is a trademark of Digital Communications Associates, Inc.
293.     000000 0  0   !  |
294.     000000 0  0   !  | Diebold is a trademark of Diebold Incorporated.
295.     000000 0  0   !  |
296.     000000 0  0   !  | Enhansys is a registered trademark of Enhansys, Inc.
297.     000000 0  0   !  |
```

```
                              Manages TMP Control Operations
000000 0  0  ! | Focus is a trademark of Information Builders, Inc.
000000 0  0  ! |
000000 0  0  ! | Fujitsu is a trademark of Fujitsu Limited.
000000 0  0  ! |
000000 0  0  ! | HP is a trademark of Hewlett-Packard Company.
000000 0  0  ! |
000000 0  0  ! | HYPERchannel is a trademark of Network Systems Corporation.
000000 0  0  ! |
000000 0  0  ! | IBM, IBM PC, IBM PC AT, IBM PS/2 and OS/2 are registered
000000 0  0  ! | trademarks of International Business Machines Corporation.
000000 0  0  ! |
000000 0  0  ! | Infonet is a registered trademark of Computer Sciences
000000 0  0  ! | Corporation.
000000 0  0  ! |
000000 0  0  ! | Informix is a trademark of Informix Software, Inc.
000000 0  0  ! |
000000 0  0  ! | Ingres is a trademark of Relational Technology, Inc.
000000 0  0  ! |
000000 0  0  ! | Intrface, Multfile, Xraylink, and Measlink are trademarks of
000000 0  0  ! | American Research Corporation.
000000 0  0  ! |
000000 0  0  ! | Jazz, is a trademark of Lotus Development Corporation.
000000 0  0  ! |
000000 0  0  ! | Kennedy is a trademark of Kennedy Manufacturing Company.
000000 0  0  ! |
000000 0  0  ! | Lotus and 1-2-3 are registered trademarks of Lotus
000000 0  0  ! | Development Corporation.
000000 0  0  ! |
000000 0  0  ! | Macintosh is a trademark used by Apple Computer, Inc.
000000 0  0  ! |
000000 0  0  ! | Mac Menlo and Max are trademarks of Menlo Business Systems,
000000 0  0  ! | Inc.
000000 0  0  ! |
000000 0  0  ! | Micro Duster and Texpad are registered trademarks of Texwipe
000000 0  0  ! | Company.
000000 0  0  ! |
000000 0  0  ! | Micropolis is a trademark of Micropolis Corporation.
000000 0  0  ! |
000000 0  0  ! | MS, MS-DOS, Microsoft, and Microsoft Word are registered
000000 0  0  ! | trademarks and Windows is a trademark of Microsoft
000000 0  0  ! | Corporation.
000000 0  0  ! |
000000 0  0  ! | MultiMate is a trademark of MultiMate International
000000 0  0  ! | Corporation, an Ashton Tate Company.
000000 0  0  ! |
000000 0  0  ! | Nintendo is a registered trademark of Nintendo of America,
000000 0  0  ! | Inc.
000000 0  0  ! |
000000 0  0  ! | Operating System/2 and OS/2 are trademarks of International
000000 0  0  ! | Business Machines Corporation.
000000 0  0  ! |
000000 0  0  ! | Oracle is a trademark of Oracle Corporation.
000000 0  0  ! |
000000 0  0  ! | Pagemaker is a trademark of Aldus Corporation.
000000 0  0  ! |
000000 0  0  ! | PC/SQL-Link is a registered trademark of Micro Decisionware,
000000 0  0  ! | Inc.
```

```
                                  Manages TMP Control Operations
000000 0  0  ! 
000000 0  0  !  Quotron is a trademark of Quotron Systems Incorporated.
000000 0  0  !
000000 0  0  !  RUSSELLSTOLL is a registered trademark of Amerace Corporation.
000000 0  0  !
000000 0  0  !  SAS is a registered trademark and SAS/PC is a trademark of
000000 0  0  !  SAS Institute, Inc.
000000 0  0  !
000000 0  0  !  Storelink is a trademark of Signorum, Inc.
000000 0  0  !
000000 0  0  !  Sybase is a registered trademark of Sybase, Inc.
000000 0  0  !
000000 0  0  !  Teflon is a trademark of E. I. du Pont de Nemours & Co., Inc.
000000 0  0  !
000000 0  0  !  TIC is a trademark of The Intelligent Console.
000000 0  0  !
000000 0  0  !  Unity, APG, DB/Link, and DB/REP are trademarks of XRT, Inc.
000000 0  0  !
000000 0  0  !  UNIX is a registered trademark of UNIX System Laboratories, Inc.
000000 0  0  !  in the USA and other countries.
000000 0  0  !
000000 0  0  !  Ventura Publisher is a registered trademark of Ventura Software,
000000 0  0  !  Inc.
000000 0  0  !
000000 0  0  !  Votek is a trademark of Votek Systems Limited.
000000 0  0  !
000000 0  0  !  Wang, Wang OIS and Wang VS are registered trademarks of Wang,
000000 0  0  !  Inc.
000000 0  0  !
000000 0  0  !  Xerox is a trademark of Xerox Corporation.
000000 0  0  ! ------------------------------------------------------------
000000 0  0  !  TANDEM COMPUTERS INCORPORATED -- PROPRIETARY AND CONFIDENTIAL
000000 0  0  ! ------------------------------------------------------------
```

```
                                        Manages TMP Control Operations
Source file:  [1]  $TMFTEK.TMD30V16.STMPCTRL  1995-01-06  20:25:34
  36.    000000 0  0
  37.    000000 0  0   ?SOURCE BTmpCtrl
Source file:  [3]  $TMFTEK.TMD30V16.BTMPCTRL  1995-01-06  20:49:51
   1.    000000 0  0  --    51.                              BLOCK     TmpControl^ImplementationDefs  ;
   2.    000000 0  0  --   211.   EXPORT                     BLOCK     TmpControl^Defs                ;
   3.    000000 0  0  --   225.   EXPORT                       LITERAL  Backup^TmpOwnership           = 0;
   4.    000000 0  0  --   226.   EXPORT                       LITERAL  Primary^TmpOwnership          = 1;
   5.    000000 0  0  --   229.   EXPORT                       LITERAL  Nil^TmpState                  = -1;
   6.    000000 0  0  --   231.   EXPORT                       LITERAL  Stopped^TmpState              = 0;
   7.    000000 0  0  --   232.   EXPORT                       LITERAL  Starting^TmpState             = 1;
   8.    000000 0  0  --   233.   EXPORT                       LITERAL  Started^TmpState              = 2;
   9.    000000 0  0  --   234.   EXPORT                       LITERAL  Stopping^TmpState             = 3;
  10.    000000 0  0  --   236.   EXPORT                       LITERAL  Deleting^TmpState             = 4;
  11.    000000 0  0  --   257.   EXPORT FIXED                 VARIABLE TmfConfigurationSeqNum        := 0F;
  12.    000000 0  0  --   267.   EXPORT FIXED                 VARIABLE StartTmfTimeStamp             := 0F;
  13.    000000 0  0  --   278.   EXPORT Int                   VARIABLE TmpBrotherCpuNum              := -1;
  14.    000000 0  0  --   307.   EXPORT                       STRUCT   CtgInfo^Struct                ( * );
  15.    000000 0  0  --   322.   EXPORT                       LITERAL  Nil^CpuState                  = -1;
  16.    000000 0  0  --   324.   EXPORT                       LITERAL  Up^CpuState                   = 1;
  17.    000000 0  0  --   325.   EXPORT                       LITERAL  Down^CpuState                 = 2;
  18.    000000 0  0  --   326.   EXPORT                       LITERAL  FailedDown^CpuState           = 3;
  19.    000000 0  0  --   327.   EXPORT                       LITERAL  Reloading^CpuState            = 4;
  20.    000000 0  0  --   328.   EXPORT                       LITERAL  FailedReload^CpuState         = 5;
  21.    000000 0  0  --   329.   EXPORT                       LITERAL  Downing^CpuState              = 6;
  22.    000000 0  0  --   335.                              BLOCK     PRIVATE                        ;
  23.    000000 0  0  --   356.                                LITERAL  Nil^OwnershipState            = -1;
  24.    000000 0  0  --   358.                                LITERAL  Primary^OwnershipState        = 1;
  25.    000000 0  0  --   359.                                LITERAL  Switching^OwnershipState      = 2;
  26.    000000 0  0  --   360.                                LITERAL  TakingOver^OwnershipState     = 3;
  27.    000000 0  0  --   361.                                LITERAL  VulnerableBackup^OwnershipState= 4;
  28.    000000 0  0  --   362.                                LITERAL  CapableBackup^OwnershipState  = 5;
  29.    000000 0  0  --   371.                                LITERAL  Nil^CpuDownOpState            = -1;
  30.    000000 0  0  --   373.                                LITERAL  None^CpuDownOpState           = 10;
  31.    000000 0  0  --   374.                                LITERAL  Permitted^CpuDownOpState      = 11;
  32.    000000 0  0  --   375.                                LITERAL  Phase1^CpuDownOpState         = 12;
  33.    000000 0  0  --   376.                                LITERAL  Phase2^CpuDownOpState         = 13;
  34.    000000 0  0  --   377.                                LITERAL  Phase3^CpuDownOpState         = 14;
  35.    000000 0  0  --   386.                                LITERAL  Nil^CpuReloadOpState          = -1;
  36.    000000 0  0  --   388.                                LITERAL  None^CpuReloadOpState         = 20;
  37.    000000 0  0  --   389.                                LITERAL  Permitted^CpuReloadOpState    = 21;
  38.    000000 0  0  --   390.                                LITERAL  Phase1^CpuReloadOpState       = 22;
  39.    000000 0  0  --   391.                                LITERAL  Phase2^CpuReloadOpState       = 23;
  40.    000000 0  0  --   400.                                LITERAL  Nil^MaintBackOpState          = -1;
  41.    000000 0  0  --   402.                                LITERAL  ReadyToCreate^MaintBackOpState = 30;
  42.    000000 0  0  --   403.                                LITERAL  CpuDown^MaintBackOpState      = 31;
  43.    000000 0  0  --   404.                                LITERAL  Creating^MaintBackOpState     = 32;
  44.    000000 0  0  --   405.                                LITERAL  DelayCreate^MaintBackOpState  = 33;
  45.    000000 0  0  --   406.                                LITERAL  Reloading^MaintBackOpState    = 34;
  46.    000000 0  0  --   407.                                LITERAL  Up^MaintBackOpState           = 35;
  47.    000000 0  0  --   408.                                LITERAL  StartupMsgErr^MaintBackOpState = 36;
  48.    000000 0  0  --   409.                                LITERAL  ReadyToDown^MaintBackOpState  = 37;
  49.    000000 0  0  --   410.                                LITERAL  Downing^MaintBackOpState      = 38;
  50.    000000 0  0  --   422.                                LITERAL  Nil^StartOpState              = -1;
  51.    000000 0  0  --   424.                                LITERAL  None^StartOpState             = 40;
  52.    000000 0  0  --   425.                                LITERAL  ReadyForLowStart^StartOpState = 41;
  53.    000000 0  0  --   426.                                LITERAL  LowStart^StartOpState         = 42;
```

Manages TMP Control Operations

```
 54.  000000 0  0  --  428.   LITERAL  FirstHighStart^StartOpState           = 43;
 55.  000000 0  0  --  429.   LITERAL  WaitForNetResolve^StartOpState        = FirstHighStart^StartOpState
 56.  000000 0  0  --  430.   LITERAL  RunningBackOut^StartOpState           = 44;
 57.  000000 0  0  --  431.   LITERAL  WaitFor1stDvPass^StartOpState         = 45;
 58.  000000 0  0  --  432.   LITERAL  EndOperation^StartOpState             = 46;
 59.  000000 0  0  --  433.   LITERAL  LastHighStart^StartOpState            = EndOperation^StartOpState;
 60.  000000 0  0  --  445.   LITERAL  Nil^StopOpState                       = -1;
 61.  000000 0  0  --  447.   LITERAL  None^StopOpState                      = 50;
 62.  000000 0  0  --  449.   LITERAL  FirstHighStop^StopOpState             = 51;
 63.  000000 0  0  --  450.   LITERAL  WaitForTransFinish^StopOpState        = FirstHighStop^StopOpState;
 64.  000000 0  0  --  451.   LITERAL  WaitForDvStop^StopOpState             = 52;
 65.  000000 0  0  --  452.   LITERAL  WaitForRdf^StopOpState                = 53;
 66.  000000 0  0  --  453.   LITERAL  LastHighStop^StopOpState              = WaitForRdf^StopOpState;
 67.  000000 0  0  --  455.   LITERAL  ReadyForLowStop^StopOpState           = 54;
 68.  000000 0  0  --  457.   LITERAL  FirstLowStop^StopOpState              = 55;
 69.  000000 0  0  --  458.   LITERAL  LowStop^StopOpState                   = FirstLowStop^StopOpState;
 70.  000000 0  0  --  459.   LITERAL  EndOperation^StopOpState              = 56;
 71.  000000 0  0  --  460.   LITERAL  LastLowStop^StopOpState               = EndOperation^StopOpState;
 72.  000000 0  0  --  469.   LITERAL  Nil^DeleteOpState                     = -1;
 73.  000000 0  0  --  471.   LITERAL  None^DeleteOpState                    = 60;
 74.  000000 0  0  --  473.   LITERAL  Ready^DeleteOpState                   = 61;
 75.  000000 0  0  --  475.   LITERAL  FirstDeleting^DeleteOpState           = 62;
 76.  000000 0  0  --  476.   LITERAL  Deleting^DeleteOpState                = FirstDeleting^DeleteOpState
 77.  000000 0  0  --  477.   LITERAL  EndOperation^DeleteOpState            = 63;
 78.  000000 0  0  --  478.   LITERAL  LastDeleting^DeleteOpState            = EndOperation^DeleteOpState;
 79.  000000 0  0  --  487.   LITERAL  GiveSwitch^Phase                      = 0;
 80.  000000 0  0  --  488.   LITERAL  TakeOver^Phase                        = 1;
 81.  000000 0  0  --  489.   LITERAL  BackupDown^Phase                      = 2;
 82.  000000 0  0  --  490.   LITERAL  ReloadBackup^Phase                    = 3;
 83.  000000 0  0  --  491.   LITERAL  Start^Phase                           = 4;
 84.  000000 0  0  --  492.   LITERAL  Stop^Phase                            = 5;
 85.  000000 0  0  --  493.   LITERAL  CpuDown^Phase                         = 6;
 86.  000000 0  0  --  494.   LITERAL  CpuReload^Phase                       = 7;
 87.  000000 0  0  --  496.   LITERAL  NumOf^Phase                           = 8;
 88.  000000 0  0  --  499.   LITERAL  Max^Step                              = 50;
 89.  000000 0  0  --  501.   STRUCT   PhaseStep^Struct                      ( * );
 90.  000000 0  0  --  506.   LITERAL  TmpStartupReqCtrl^ByteLen             =
 91.  000000 0  0  --  508.   LITERAL  TmpStartupReqCtrl^ByteLenDbl          =
 92.  000000 0  0  --  510.   LITERAL  TmpStartupReqCtrl^WordLen             =
 93.  000000 0  0  --  523.   STRUCT   TmfGlobInfoRecord^Struct              ( * );
 94.  000000 0  0  --  544.   DEFINE   G                                     = TmpControl #;
 95.  000000 0  0  --  687.   DEFINE   GlobInfo^ConfigFileName               = "GLOBINFO"#;
 96.  000000 0  0  --  697.   STRUCT   UserCommandEle^Struct                 ( * );
 97.  000000 0  0  --  713.   STRUCT   SwitchReq^Struct                      ( * );
 98.  000000 0  0  --  727.   LITERAL  GlobInfo^VersionNum                   = 1;
 99.  000000 0  0  --  734.   LITERAL  RetainDepthDefault                    = 3;
100.  000000 0  0  --  737.   STRUCT   ShortCkpt^Struct                      ( * );
101.  000000 0  0  --  742.   STRUCT   NewStateCkpt^Struct                   ( * );
102.  000000 0  0  --  750.   STRUCT   CpuReloadCkpt^Struct                  ( * );
103.  000000 0  0  --  757.   STRUCT   CpuDownCkpt^Struct                    ( * );
104.  000000 0  0  --  764.   STRUCT   ModuleStateCkpt^Struct                ( * );
105.  000000 0  0  --  797.   STRUCT   StartCkpt^Struct                      ( * );
106.  000000 0  0  --  809.   STRUCT   StopCkpt^Struct                       ( * );
107.  000000 0  0  --  817.   STRUCT   DeleteCkpt^Struct                     ( * );
108.  000000 0  0  --  825.   STRUCT   ConfSeqNumCkpt^Struct                 ( * );
109.  000000 0  0  --  832.   STRUCT   EndOperCkpt^Struct                    ( * );
110.  000000 0  0  --  839.   STRUCT   DoStopStepCkpt^Struct                 ( * );
```

Manages TMP Control Operations

```
000000 0  0   --   846.                               STRUCT    OperEventIssuedCkpt^Struct      ( * );
000000 0  0   --   853.                               STRUCT    AlterCtgCkpt^Struct             ( * );
000000 0  0   --   860.                               STRUCT    DeleteCtgCkpt^Struct            ( * );
000000 0  0   --   875.                               LITERAL   YouAreCapable^CkptKind          = 1;
000000 0  0   --   876.                               LITERAL   YouAreNowPrimary^CkptKind       = 2;
000000 0  0   --   877.                               LITERAL   CpuReloadBegin^CkptKind         = 3;
000000 0  0   --   878.                               LITERAL   CpuReloadComplete^CkptKind      = 4;
000000 0  0   --   879.                               LITERAL   CpuReloadFailed^CkptKind        = 5;
000000 0  0   --   880.                               LITERAL   CpuDownBegin^CkptKind           = 6;
000000 0  0   --   881.                               LITERAL   CpuDownComplete^CkptKind        = 7;
000000 0  0   --   882.                               LITERAL   CpuDownFailed^CkptKind          = 8;
000000 0  0   --   883.                               LITERAL   ModuleState^CkptKind            = 9;
000000 0  0   --   884.                               LITERAL   TmfStarting^CkptKind            = 10;
000000 0  0   --   885.                               LITERAL   TmfStopping^CkptKind            = 11;
000000 0  0   --   886.                               LITERAL   TmfDeleting^CkptKind            = 12;
000000 0  0   --   887.                               LITERAL   NewStartOpState^CkptKind        = 13;
000000 0  0   --   888.                               LITERAL   NewStopOpState^CkptKind         = 14;
000000 0  0   --   889.                               LITERAL   NewDeleteOpState^CkptKind       = 15;
000000 0  0   --   890.                               LITERAL   TmfStarted^CkptKind             = 16;
000000 0  0   --   891.                               LITERAL   TmfStopped^CkptKind             = 17;
000000 0  0   --   892.                               LITERAL   TmfDeleted^CkptKind             = 18;
000000 0  0   --   893.                               LITERAL   DoStopStep^CkptKind             = 19;
000000 0  0   --   894.                               LITERAL   OperEventIssued^CkptKind        = 20;
000000 0  0   --   895.                               LITERAL   BeginCoordTakeOver^CkptKind     = 21;
000000 0  0   --   896.                               LITERAL   EndCoordTakeOver^CkptKind       = 22;
000000 0  0   --   897.                               LITERAL   ConfigSeqNum^CkptKind           = 23;
000000 0  0   --   898.                               LITERAL   AlterCtg^CkptKind               = 24;
000000 0  0   --   899.                               LITERAL   DeleteCtg^CkptKind              = 25;
000000 0  0   --  1054.                            PROC         TmpControl^Abend                ;
000000 0  0   --  1074.  EXPORT                    PROC         TmpControl^Checkin              ( GiveSwitchRoutine,
000000 0  0   --  1199.          Boolean           PROC         TmpControl^ExecuteStartStep     ( Step );
000000 0  0   --  1233.                            PROC         TmpControl^ExecuteStep          ( Phase, Step );
000000 0  0   --  1266.                            PROC         TmpControl^ExecuteWordStep      ( Phase, Step, WordParam );
000000 0  0   --  1305.  EXPORT                    PROC         TmpControl^HandleBackupMsg      ( MsgInfo );
000000 0  0   --  1351.  EXPORT  Boolean           PROC         TmpControl^HandleBkpMsgAllowed  ;
000000 0  0   --  1386.  EXPORT                    PROC         TmpControl^GetStartOpInfo       ( OperationType, OperationNum
000000 0  0   --  1418.  EXPORT                    PROC         TmpControl^GetStopOpInfo        ( OperationType, OperationNum
000000 0  0   --  1450.  EXPORT                    PROC         TmpControl^GetDeleteOpInfo      ( OperationType, OperationNum
000000 0  0   --  1472.  EXPORT  Word              PROC         TmpControl^UpCpuMask            ;
000000 0  0   --  1509.  EXPORT  Int               PROC         TmpControl^MainOwnership        ;
000000 0  0   --  1531.                            PROC         TmpControl^KillBackupTmp        ;
000000 0  0   --  1583.                            PROC         TmpControl^StopAbrupt           ;
000000 0  0   --  1602.  EXPORT                    PROC         TmpControl^CrashTmf             ;
000000 0  0   --  1616.                            PROC         TmpControl^ReceiveCheckpoint    ( Data, DataLen );
000000 0  0   --  1878.                            PROC         TmpControl^SendCkpt             ( Data, DataLen );
000000 0  0   --  1898.                            PROC         TmpControl^CheckpointShort      ( Kind );
000000 0  0   --  1919.                            PROC         TmpControl^CheckpointNewState   ( Kind, NewState );
000000 0  0   --  1944.                            PROC         TmpControl^CheckpointCpuReload  ( Kind, ReloadeeCpuNum );
000000 0  0   --  1969.                            PROC         TmpControl^CheckpointCpuDown    ( Kind, FailedCpuNum );
000000 0  0   --  1994.                            PROC         TmpControl^CheckpointConfSeqNum( ConfSeqNum );
000000 0  0   --  2016.                            PROC         TmpControl^CkptModuleState      ;
000000 0  0   --  2054.                            PROC         TmpControl^CheckpointStart      ( OperationNum, OperationCkpt
000000 0  0   --  2091.                            PROC         TmpControl^CheckpointStop       ( OperationNum, OperationCkpt
000000 0  0   --  2117.                            PROC         TmpControl^CheckpointDelete     ( OperationNum, OperationCkpt
000000 0  0   --  2143.                            PROC         TmpControl^CkptOperEventIssued  ( OperationCkptInfo );
000000 0  0   --  2167.                            PROC         TmpControl^CheckpointEndOper    ( Kind, OperationCkptInfo );
000000 0  0   --  2192.                            PROC         TmpControl^CheckpointDoStopStep( CurrentStep );
```

Manages TMP Control Operations

```
168.  000000 0  0  --  2214.                  PROC      TmpControl^CkptAlterCtg        ;
169.  000000 0  0  --  2235.                  PROC      TmpControl^CkptDeleteCtg       (OprStatus);
170.  000000 0  0  --  2259.                  PROC      TmpControl^CloseGlobInfo       ;
171.  000000 0  0  --  2283.                  PROC      TmpControl^OpenGlobInfo        ;
172.  000000 0  0  --  2377.                  PROC      TmpControl^ReadGlobInfo        ;
173.  000000 0  0  --  2461.                  PROC      TmpControl^WriteGlobInfo       ;
174.  000000 0  0  --  2500.         Boolean  PROC      TmpControl^DoStartSteps        ;
175.  000000 0  0  --  2522.                  PROC      TmpControl^DoStopSteps         ;
176.  000000 0  0  --  2544.                  PROC      TmpControl^DoGiveSwitchSteps   ;
177.  000000 0  0  --  2561.                  PROC      TmpControl^DoTakeOverSteps     ( BackupIsUp );
178.  000000 0  0  --  2583.                  PROC      TmpControl^DoBackupDownSteps   ;
179.  000000 0  0  --  2601.                  PROC      TmpControl^DoReloadBackupSteps ;
180.  000000 0  0  --  2619.                  PROC      TmpControl^DoCpuDownSteps      ( FailedCpuNum );
181.  000000 0  0  --  2641.                  PROC      TmpControl^DoCpuReloadSteps    ( ReloadeeCpuNum );
182.  000000 0  0  --  2663.                  PROC      TmpControl^DelayCreateThread   ;
183.  000000 0  0  --  2684.                  PROC      TmpControl^KillTheDelayCreate  ;
184.  000000 0  0  --  2703.                  PROC      TmpControl^DoBackupDown        ;
185.  000000 0  0  --  2727.                  PROC      TmpControl^DoCpuDownPhase1     ;
186.  000000 0  0  --  2791.                  PROC      TmpControl^DoCpuDownPhase2     ;
187.  000000 0  0  --  2807.                  PROC      TmpControl^DoCpuDownPhase3     ;
188.  000000 0  0  --  2823.                  PROC      TmpControl^WatchBackupThread   ;
189.  000000 0  0  --  2882.         Int      PROC      TmpControl^SendStartupToBackup ( BackupPhandle );
190.  000000 0  0  --  2940.                  PROC      TmpControl^DoCreateBackup      ;
191.  000000 0  0  --  2991.                  PROC      TmpControl^DoCpuReloadPhase1   ;
192.  000000 0  0  --  3012.                  PROC      TmpControl^DoCpuReloadPhase2   ;
193.  000000 0  0  --  3053.                  PROC      TmpControl^HighStartThread     ;
194.  000000 0  0  --  3136.                  PROC      TmpControl^DoLowStart          ;
195.  000000 0  0  --  3179.                  PROC      TmpControl^HighStopThread      ;
196.  000000 0  0  --  3245.                  PROC      TmpControl^DoLowStop           ;
197.  000000 0  0  --  3292.                  PROC      TmpControl^DoDelete            ;
198.  000000 0  0  --  3369.                  PROC      TmpControl^DoTakeOver          ( UnplannedTakeOver );
199.  000000 0  0  --  3557.                  PROC      TmpControl^WatchPrimaryThread  ;
200.  000000 0  0  --  3617.                  PROC      TmpControl^DoSwitch            ;
201.  000000 0  0  --  3706.                  PROC      TmpControl^InitiateDelete      ( BeginOperationTime ) VARIAB
202.  000000 0  0  --  3763.                  PROC      TmpControl^DoUserCommand       ( HandleAddr, UserCommandAddr
203.  000000 0  0  --  3913.         Boolean  PROC      TmpControl^StartStopDeferred   ;
204.  000000 0  0  --  3935.                  PROC      TmpControl^DoTmfMon2Req        ( MsgInfo );
205.  000000 0  0  --  3943.         Boolean    SUBPROC CpuReloadFailed                ;
206.  000000 0  0  --  3960.         Boolean    SUBPROC CpuDownFailed                  ;
207.  000000 0  0  --  4260.                  PROC      TmpControl^ControlThread       ;
208.  000000 0  0  --  4389.                  PROC      TmpControl^UserCommandThread   ;
209.  000000 0  0  --  4405.                    SUBPROC GetCommand                     ;
210.  000000 0  0  --  4442.  EXPORT INT      PROC      TmpControl^ZTmfFromTmpState    (TmpState);
211.  000000 0  0  --  4484.  EXPORT Int      PROC      TmpControl^ZTmfFromTmpStarting (TmpState, TmpStartingState);
212.  000000 0  0  --  4534.  EXPORT Int      PROC      TmpControl^ZTmfFromTmpStopping (TmpState, TmpStoppingState);
213.  000000 0  0  --  4577.  EXPORT          PROC      TmpControl^UserCommand         ( HandleAddr, UserCommandAddr
214.  000000 0  0  --  4664.  EXPORT          PROC      TmpControl^GetInitSeqnumMsg    ( MsgInfo );
215.  000000 0  0  --  4709.  EXPORT          PROC      TmpControl^UserCtgCommand      ( HandleAddr, UserCommandAddr
216.  000000 0  0  --  4773.                  PROC      TmpControl^AlterCtgThread      ( HandleAddr, UserCommandAddr
217.  000000 0  0  --  4902.                  PROC      TmpControl^InfoCtg             ( HandleAddr );
218.  000000 0  0  --  4940.                  PROC      TmpControl^DeleteCtgThread     ( HandleAddr );
219.  000000 0  0  --  5062.  EXPORT          PROC      TmpControl^OpenCtgProcess      ;
220.  000000 0  0  --  5107.  EXPORT          PROC      TmpControl^CloseCtgProcess     ;
221.  000000 0  0  --  5125.  EXPORT          PROC      TmpControl^GetCatalogConfig    ( Released, RetainDepth );
222.  000000 0  0  --  5145.  EXPORT          PROC      TmpControl^TmfMon2Msg          ( MsgInfo );
223.  000000 0  0  --  5265.  EXPORT          PROC      TmpControl^StopAbruptMsg       ( MsgInfo );
224.  000000 0  0  --  5316.  EXPORT          PROC      TmpControl^GetTmfState         ( MsgInfo );
```

Manages TMP Control Operations

```
 225.    000000 0  0   --  5373.   EXPORT                    PROC      TmpControl^SwitchMsg             ( MsgInfo );
 226.    000000 0  0   --  5428.   EXPORT                    PROC      TmpControl^GetDevInfo            ( Primary, Started );
 227.    000000 0  0   --  5463.   EXPORT                    PROC      TmpControl^AllModuleInitDone     ;
 228.    000000 0  0   --  5478.   EXPORT                    PROC      TmpControl^ModuleInit            ( ReqCtrlPtr );
 229.    000000 0  0   --  5767.          Boolean            PROC      TmpControl^BrotherIsReallyAlive;
 230.    000000 0  0   --  5795.                             PROC      TmpControl^BackupMsgThread       ;
 231.    000000 0  0   --  5844.   EXPORT                    PROC      TmpControl^UnitTestGetCpuStates( CpuStateArray );
 232.    000000 0  0   --  5861.   EXPORT                    PROC      TmpControl^UnitTestGetTmpState ( TmpState );
Source file:  [1]  $TMFTEK.TMD30V16.STMPCTRL  1995-01-06  20:25:34
  38.    000000 0  0   ! Interface import(s)
  39.    000000 0  0   !
  40.    000000 0  0   ?NOLIST, SOURCE NGeneral( Definitions )
  42.    000000 0  0   ?NOLIST, SOURCE NTmpMsg( Definitions )
  44.    000000 0  0   !END SPEC
  45.    000000 0  0
  46.    000000 0  0   ! Implemention import(s)
  47.    000000 0  0   !
  48.    000000 0  0   ?NOLIST, SOURCE NDialect( Definitions )
  50.    000000 0  0
  51.    000000 0  0   BLOCK TmpControl^ImplementationDefs;
  52.    000000 0  0   ?NOLIST, SOURCE DDSCIOP
  54.    000000 0  0   ?NOLIST, SOURCE STmfLog( Catalog )
  56.    000000 0  0   END BLOCK;
  57.    000000 0  0
  58.    000000 0  0
  59.    000000 0  0   ?NOLIST, SOURCE NError( Definitions )
  61.    000000 0  0   ?NOLIST, SOURCE NFileSys( Definitions )
  63.    000000 0  0   ?NOLIST, SOURCE NExcept( Definitions )
  65.    000000 0  0   ?NOLIST, SOURCE NStr( Definitions )
  67.    000202 0  0   ?NOLIST, SOURCE NLList( Definitions )
  69.    000000 0  0   ?NOLIST, SOURCE NHeap( Definitions )
  71.    000000 0  0   ?NOLIST, SOURCE NFileNam( Definitions )
  73.    000000 0  0   ?NOLIST, SOURCE NThread( Definitions )
  75.    000000 0  0   ?NOLIST, SOURCE NSemaFor( Definitions )
  77.    000000 0  0   ?NOLIST, SOURCE NThrdIo( Definitions )
  79.    000000 0  0   ?NOLIST, SOURCE NProcNam( Definitions )
  81.    000000 0  0   ?NOLIST, SOURCE NPhandle( Definitions )
  83.    000000 0  0   ?NOLIST, SOURCE NProcess( Definitions )
  85.    000000 0  0   ?NOLIST, SOURCE NMsgSys( Definitions )
  87.    000000 0  0   ?NOLIST, SOURCE NCpuMask( Definitions )
  89.    000000 0  0   ?NOLIST, SOURCE NTmfDefs( Definitions )
  91.    000000 0  0   ?NOLIST, SOURCE NTmfPcon( Definitions )
  93.    000000 0  0   ?NOLIST, SOURCE NTmfDsm( Definitions )
  95.    000000 0  0   ?NOLIST, SOURCE NTmfSpi( Definitions )
  97.    000422 0  0   ?NOLIST, SOURCE NLcTmpif( Definitions )
  99.    000000 0  0   ?NOLIST, SOURCE NLcTmpRq( Definitions )
 101.    000000 0  0   ?NOLIST, SOURCE NTmpMem( Definitions )
 103.    000000 0  0   ?NOLIST, SOURCE NLibTmpO( Definitions )
 105.    000000 0  0   ?NOLIST, SOURCE NLibTmpC( Definitions )
 107.    000000 0  0   ?NOLIST, SOURCE NLibTmpM( Definitions )
 109.    000000 0  0   ?NOLIST, SOURCE NMn2Req( Definitions )
 111.    000000 0  0   ?NOLIST, SOURCE NTmpMain( Definitions )
 113.    000000 0  0   ?NOLIST, SOURCE NTmpOpr( Definitions )
 115.    000000 0  0   ?NOLIST, SOURCE NTmpClEm( Definitions )
 117.    000000 0  0   ?NOLIST, SOURCE NTmpChpt( Definitions )
 119.    000000 0  0   ?NOLIST, SOURCE NTmpUTmf( Definitions )
 121.    000000 0  0   ?NOLIST, SOURCE NTmpUCtg( Definitions )
```

Private Documentation and Definitions

```
123.     000000 0   0   ?NOLIST, SOURCE NTmpTCtl( Definitions )
125.     000000 0   0
```

Manages TMP Control Operations

```
 000000 0  0   !EXPORT SPEC
 000000 0  0   ?IFNOT 9
 000000 0  0   ?IF 9
*000000 0  0
*000000 0  0       Module   : 'TmpControl'
*000000 0  0       Contents : Manages TMP Control Operations
*000000 0  0
*000000 0  0           This module manages TMP Control Operations.  TMP Control
*000000 0  0       Operations affect the state of most modules in the TMP.  They also
*000000 0  0       affect the state of the TMF subsystem since the TMP is primarly
*000000 0  0       responsible for controlling it.  TMP Control Operations start and
*000000 0  0       stop TMF, perform NonStop TMP pair functions, and control the
*000000 0  0       TMP's participation in CPU Down and Reload.
*000000 0  0
*000000 0  0       See the "TMF3 TMP Control Operation and Internal Design
*000000 0  0       Specification" for a detailed description of TMP Control
*000000 0  0       Operations and their internal design.
*000000 0  0
*000000 0  0       The following is a brief description of each TMP Control
*000000 0  0       Operations and how they are initiated:
*000000 0  0
*000000 0  0           Start:
*000000 0  0               This operation makes TMF ready for transaction
*000000 0  0               processing.  It is initiated by the TMFSERVE START TMF
*000000 0  0               command.
*000000 0  0
*000000 0  0           Stop:
*000000 0  0               This operation shuts down TMF for transaction
*000000 0  0               processing.  It is initiated by the TMFSERVE STOP TMF
*000000 0  0               command.
*000000 0  0
*000000 0  0           Delete:
*000000 0  0               This operation deletes the TMF configuration.  It is
*000000 0  0               initiated by the TMFSERVE DELETE TMF command.
*000000 0  0
*000000 0  0           MaintainBackup:
*000000 0  0               This operation is always present in the
*000000 0  0               Primary TMP to keep the Backup TMP created and reloaded.
*000000 0  0               It creates the Backup TMP process and checkpoints all
*000000 0  0               information necessary for the Backup to be able to
*000000 0  0               takeover.  When the Backup TMP process fails, it turns off
*000000 0  0               checkpointing.  It tries to recreate the Backup TMP when
*000000 0  0               the Backup TMP's CPU is reloaded, or after a suitable
*000000 0  0               delay if the Backup TMP ABENDed due to internal error.
*000000 0  0
*000000 0  0           Switch:
*000000 0  0               This operation transfers "ownership" by making the
*000000 0  0               current Primary TMP the (new) Backup and the current
*000000 0  0               Backup the (new) Primary.  It is initiated by the PUP
*000000 0  0               PRIMARY command, or equivalent.
*000000 0  0
*000000 0  0           TakeOver:
*000000 0  0               This operation makes the Backup TMP the "Primary"
*000000 0  0               after the Primary TMP process fails due to CPU down or
*000000 0  0               internal error (ABEND).  It is initiated when the Backup
*000000 0  0               TMP notices the Primary TMP has failed.
*000000 0  0
```

```
                                          Manages TMP Control Operations
*000000 0  0              CpuDown:
*000000 0  0                  Marks the CPU down and performs any clean up
*000000 0  0                  necessary in the TMP.  It is initiated by the TMFMON2
*000000 0  0                  Coordinator when it is ready for the TMP to do its CPU
*000000 0  0                  down work.
*000000 0  0
*000000 0  0              CpuReload:
*000000 0  0                  This operation marks the CPU as being up in the TMP
*000000 0  0                  and performs any work necessary in the TMP to add the CPU
*000000 0  0                  back for work, including sending information to the CPU
*000000 0  0                  being reloaded.  It is initiated by the TMFMON2
*000000 0  0                  Coordinator when it is ready for the TMP to do its CPU
*000000 0  0                  reload work.  If the CPU being reloaded is configured to
*000000 0  0                  have a TMP process, CpuReload will have the MaintainBackup
*000000 0  0                  operation create and reload the Backup TMP.
*000000 0  0
*000000 0  0     ?ENDIF 9
```

Manages TMP Control Operations

```
202.    000000 0  0   ?IFNOT 9
203.    000000 0  0   ?IF 9
204.   *000000 0  0
205.   *000000 0  0   ?ENDIF 9
206.    000000 0  0   !END SPEC
207.    000000 0  0
```

Manages TMP Control Operations

```
000000 0  0    ?SECTION DEFINITIONS
000000 0  0
000000 0  0    !EXPORT!  BLOCK TmpControl^Defs;
000000 0  0
000000 0  0    !------------------------------------------------------------------------
000000 0  0    !
000000 0  0    !    LITERALS '*^TmpOwnership'
000000 0  0    !        Specifies the ownership of a module, either "Primary" (active) or
000000 0  0    !    "Backup" (passive).
000000 0  0    !
000000 0  0    !    LITERALS '*^TmpState'
000000 0  0    !        Specifies whether a part of the TMP is started or stopped for
000000 0  0    !    transaction processing.
000000 0  0    !
000000 0  0    !------------------------------------------------------------------------
000000 0  0
000000 0  0    LITERAL  Backup^TmpOwnership              = 0;
000000 0  0    LITERAL  Primary^TmpOwnership             = 1;
000000 0  0
000000 0  0
000000 0  0    LITERAL  Nil^TmpState                     = -1;
000000 0  0
000000 0  0    LITERAL  Stopped^TmpState                 = 0;
000000 0  0    LITERAL  Starting^TmpState                = 1;
000000 0  0    LITERAL  Started^TmpState                 = 2;
000000 0  0    LITERAL  Stopping^TmpState                = 3;
000000 0  0
000000 0  0    LITERAL  Deleting^TmpState                = 4;
000000 0  0
000000 0  0    !------------------------------------------------------------------------
000000 0  0    !
000000 0  0    !    GLOBAL VARIABLE: 'TmfConfigurationSeqNum'
000000 0  0    !        A sequence number (a timestamp) that uniquely identifies the
000000 0  0    !    current TMF configuration.
000000 0  0    !
000000 0  0    !    We establish the sequence number when a new TMF configuration is
000000 0  0    !    created.  We do this when a system with TMF is coldloaded for the
000000 0  0    !    very first time, or after a DELETE TMF command.  We do not change
000000 0  0    !    the sequence number when the configuration is modified, etc.
000000 0  0    !
000000 0  0    !    We use it to distinguish the current configuration from other TMF
000000 0  0    !    configurations in the past or future on the same system, or
000000 0  0    !    configurations on other systems.  For example, we put the sequence
000000 0  0    !    number into audit trail files and data volumes so we can determine
000000 0  0    !    if they belong to the current configuration.
000000 0  0    !
000000 0  0    !------------------------------------------------------------------------
000000 0  0
000000 0  0    FIXED  TmfConfigurationSeqNum := 0F;
000000 0  0
000000 0  0    !------------------------------------------------------------------------
000000 0  0    !
000000 0  0    !    GLOBAL VARIABLE: 'StartTmfTimeStamp'
000000 0  0    !        The timestamp when TMF was started.  It uniquely identifies the
000000 0  0    !    current START TMF.
000000 0  0    !
000000 0  0    !------------------------------------------------------------------------
```

Manages TMP Control Operations

```
000000 0  0
000000 0  0   FIXED  StartTmfTimeStamp := 0F;
000000 0  0
000000 0  0
000000 0  0   !------------------------------------------------------------------------
000000 0  0   !
000000 0  0   !   GLOBAL VARIABLE: 'TmpBrotherCpuNum'
000000 0  0   !       The CPU number of the other (or brother) TMP process.  It will be
000000 0  0   !   -1 if the system only has one CPU.
000000 0  0   !
000000 0  0   !------------------------------------------------------------------------
000000 0  0
000000 0  0   Int  TmpBrotherCpuNum := -1;
000000 0  0
000000 0  0   !------------------------------------------------------------------------
000000 0  0   !
000000 0  0   !   GLOBAL VARIABLE: 'TmfProgramSubVolStr'
000000 0  0   !       The subvolume that contains TMF programs including the TMP.
000000 0  0   !   It is typically the SYSNN subvolume on $SYSTEM.
000000 0  0   !
000000 0  0   !------------------------------------------------------------------------
000000 0  0
000000 0  0   STRUCT  .TmfProgramSubVolStr( Str^Struct );
000004 0  0
000004 0  0   !------------------------------------------------------------------------
000004 0  0   !
000004 0  0   !   GLOBAL VARIABLE: 'TmfConfigurationSubVolStr'
000004 0  0   !       The subvolume that contains TMF configuration files.
000004 0  0   !   It is typically the ZTMFCONF subvolume on $SYSTEM.
000004 0  0   !
000004 0  0   !------------------------------------------------------------------------
000004 0  0
000004 0  0   STRUCT  .TmfConfigurationSubVolStr( Str^Struct );
000010 0  0
000010 0  0
000010 0  0   !-------------------------------------------------------------------
000010 0  0   !
000010 0  0   !  STRUCTURE: 'CtgInfo^Struct'
000010 0  0   !     The definition of the single record of the Catalog configuration.
000010 0  0   !
000010 0  0   !-------------------------------------------------------------------
000010 0  0   STRUCT  CtgInfo^Struct( * );
000010 0  0   BEGIN
000010 0  1       Boolean Released;
000010 0  1
000010 0  1       Int      RetainDepth;
000010 0  1   END;
000010 0  0
000010 0  0   !------------------------------------------------------------------------
000010 0  0   !
000010 0  0   !   LITERALS '*^CpuState'
000010 0  0   !       Specifies the states of one of the CPUs in the system from the TMP's
000010 0  0   !   point of view.
000010 0  0   !
000010 0  0   !------------------------------------------------------------------------
000010 0  0
000010 0  0   LITERAL  Nil^CpuState                    = -1;
```

Manages TMP Control Operations

```
000010 0  0
000010 0  0   LITERAL  Up^CpuState                    = 1;
000010 0  0   LITERAL  Down^CpuState                  = 2;
000010 0  0   LITERAL  FailedDown^CpuState            = 3;
000010 0  0   LITERAL  Reloading^CpuState             = 4;
000010 0  0   LITERAL  FailedReload^CpuState          = 5;
000010 0  0   LITERAL  Downing^CpuState               = 6;
000010 0  0
000010 0  0   END BLOCK;
000010 0  0
```

PRIVATE Documentation and Definitions

```
 000010 0  0
 000010 0  0   BLOCK PRIVATE;
 000000 0  0
 000000 0  0   ?IFNOT 15
 000000 0  0   ?IF 15
*000000 0  0
*000000 0  0       PRIVATE Internal Documentation
*000000 0  0       ------------------------------
*000000 0  0
*000000 0  0       This is the PRIVATE internal documentation for the 'TmpControl'
*000000 0  0       module.
*000000 0  0
*000000 0  0
*000000 0  0   ?ENDIF 15
```

PRIVATE Documentation and Definitions

```
000000 0  0   !-------------------------------------------------------------------------
000000 0  0   !
000000 0  0   !   LITERALS '*^OwnershipState'
000000 0  0   !       Specifies the "ownership" states for the entire IMP process.
000000 0  0   !
000000 0  0   !-------------------------------------------------------------------------
000000 0  0
000000 0  0   LITERAL  Nil^OwnershipState                = -1;
000000 0  0
000000 0  0   LITERAL  Primary^OwnershipState            = 1;
000000 0  0   LITERAL  Switching^OwnershipState          = 2;
000000 0  0   LITERAL  TakingOver^OwnershipState         = 3;
000000 0  0   LITERAL  VulnerableBackup^OwnershipState = 4;
000000 0  0   LITERAL  CapableBackup^OwnershipState      = 5;
000000 0  0
000000 0  0   !-------------------------------------------------------------------------
000000 0  0   !
000000 0  0   !   LITERALS '*^CpuDownOpState'
000000 0  0   !       Specifies the states of a CpuDown operation.
000000 0  0   !
000000 0  0   !-------------------------------------------------------------------------
000000 0  0
000000 0  0   LITERAL  Nil^CpuDownOpState                = -1;
000000 0  0
000000 0  0   LITERAL  None^CpuDownOpState               = 10;
000000 0  0   LITERAL  Permitted^CpuDownOpState          = 11;
000000 0  0   LITERAL  Phase1^CpuDownOpState             = 12;
000000 0  0   LITERAL  Phase2^CpuDownOpState             = 13;
000000 0  0   LITERAL  Phase3^CpuDownOpState             = 14;
000000 0  0
000000 0  0   !-------------------------------------------------------------------------
000000 0  0   !
000000 0  0   !   LITERALS '*^CpuReloadOpState'
000000 0  0   !       Specifies the states of a CpuReload operation.
000000 0  0   !
000000 0  0   !-------------------------------------------------------------------------
000000 0  0
000000 0  0   LITERAL  Nil^CpuReloadOpState              = -1;
000000 0  0
000000 0  0   LITERAL  None^CpuReloadOpState             = 20;
000000 0  0   LITERAL  Permitted^CpuReloadOpState        = 21;
000000 0  0   LITERAL  Phase1^CpuReloadOpState           = 22;
000000 0  0   LITERAL  Phase2^CpuReloadOpState           = 23;
000000 0  0
000000 0  0   !-------------------------------------------------------------------------
000000 0  0   !
000000 0  0   !   LITERALS '*^MaintBackpOpState'
000000 0  0   !       Specifies the states of a MaintainBackup operation.
000000 0  0   !
000000 0  0   !-------------------------------------------------------------------------
000000 0  0
000000 0  0   LITERAL  Nil^MaintBackOpState              = -1;
000000 0  0
000000 0  0   LITERAL  ReadyToCreate^MaintBackOpState  = 30;
000000 0  0   LITERAL  CpuDown^MaintBackOpState          = 31;
000000 0  0   LITERAL  Creating^MaintBackOpState         = 32;
000000 0  0   LITERAL  DelayCreate^MaintBackOpState      = 33;
```

```
000000 0  0   LITERAL  Reloading^MaintBackOpState       = 34;
000000 0  0   LITERAL  Up^MaintBackOpState              = 35;
000000 0  0   LITERAL  StartupMsgErr^MaintBackOpState   = 36;
000000 0  0   LITERAL  ReadyToDown^MaintBackOpState     = 37;
000000 0  0   LITERAL  Downing^MaintBackOpState         = 38;
000000 0  0
000000 0  0   !--------------------------------------------------------------------------
000000 0  0   !
000000 0  0   !   LITERALS '*^StartOpState'
000000 0  0   !       Specifies the states of a Start operation.
000000 0  0   !
000000 0  0   !   The ordering of steps between 'FirstHighStart^*' and 'LastHighStart^*'
000000 0  0   !   is order the steps will be executed.
000000 0  0   !
000000 0  0   !--------------------------------------------------------------------------
000000 0  0
000000 0  0   LITERAL  Nil^StartOpState                 = -1;
000000 0  0
000000 0  0   LITERAL  None^StartOpState                = 40;
000000 0  0   LITERAL  ReadyForLowStart^StartOpState    = 41;
000000 0  0   LITERAL  LowStart^StartOpState            = 42;
000000 0  0
000000 0  0   LITERAL  FirstHighStart^StartOpState      = 43;
000000 0  0   LITERAL  WaitForNetResolve^StartOpState   = FirstHighStart^StartOpState;
000000 0  0   LITERAL  RunningBackOut^StartOpState      = 44;
000000 0  0   LITERAL  WaitFor1stDvPass^StartOpState    = 45;
000000 0  0   LITERAL  EndOperation^StartOpState        = 46;
000000 0  0   LITERAL  LastHighStart^StartOpState       = EndOperation^StartOpState;
000000 0  0
000000 0  0   !--------------------------------------------------------------------------
000000 0  0   !
000000 0  0   !   LITERALS '*^StopOpState'
000000 0  0   !       Specifies the states of a Stop operation.
000000 0  0   !
000000 0  0   !   The ordering of steps between 'FirstHighStop^*' and 'LastHighStop^*'
000000 0  0   !   is order the steps will be executed.
000000 0  0   !
000000 0  0   !--------------------------------------------------------------------------
000000 0  0
000000 0  0   LITERAL  Nil^StopOpState                  = -1;
000000 0  0
000000 0  0   LITERAL  None^StopOpState                 = 50;
000000 0  0
000000 0  0   LITERAL  FirstHighStop^StopOpState        = 51;
000000 0  0   LITERAL  WaitForTransFinish^StopOpState   = FirstHighStop^StopOpState;
000000 0  0   LITERAL  WaitForDvStop^StopOpState        = 52;
000000 0  0   LITERAL  WaitForRdf^StopOpState           = 53;
000000 0  0   LITERAL  LastHighStop^StopOpState         = WaitForRdf^StopOpState;
000000 0  0
000000 0  0   LITERAL  ReadyForLowStop^StopOpState      = 54;
000000 0  0
000000 0  0   LITERAL  FirstLowStop^StopOpState         = 55;
000000 0  0   LITERAL  LowStop^StopOpState              = FirstLowStop^StopOpState;
000000 0  0   LITERAL  EndOperation^StopOpState         = 56;
000000 0  0   LITERAL  LastLowStop^StopOpState          = EndOperation^StopOpState;
000000 0  0
000000 0  0   !--------------------------------------------------------------------------
```

```
000000 0 0  !
000000 0 0  !   LITERALS '*^DeleteOpState'
000000 0 0  !       Specifies the states of a Delete operation.
000000 0 0  !
000000 0 0  !-----------------------------------------------------------------------------
000000 0 0
000000 0 0  LITERAL  Nil^DeleteOpState                = -1;
000000 0 0
000000 0 0  LITERAL  None^DeleteOpState               = 60;
000000 0 0
000000 0 0  LITERAL  Ready^DeleteOpState              = 61;
000000 0 0
000000 0 0  LITERAL  FirstDeleting^DeleteOpState      = 62;
000000 0 0  LITERAL  Deleting^DeleteOpState           = FirstDeleting^DeleteOpState;
000000 0 0  LITERAL  EndOperation^DeleteOpState       = 63;
000000 0 0  LITERAL  LastDeleting^DeleteOpState       = EndOperation^DeleteOpState;
000000 0 0
000000 0 0  !-----------------------------------------------------------------------------
000000 0 0  !
000000 0 0  !   LITERALS '*^Phase'
000000 0 0  !       Specifies one of the Control phases.
000000 0 0  !
000000 0 0  !-----------------------------------------------------------------------------
000000 0 0
000000 0 0  LITERAL  GiveSwitch^Phase                 = 0;
000000 0 0  LITERAL  TakeOver^Phase                   = 1;
000000 0 0  LITERAL  BackupDown^Phase                 = 2;
000000 0 0  LITERAL  ReloadBackup^Phase               = 3;
000000 0 0  LITERAL  Start^Phase                      = 4;
000000 0 0  LITERAL  Stop^Phase                       = 5;
000000 0 0  LITERAL  CpuDown^Phase                    = 6;
000000 0 0  LITERAL  CpuReload^Phase                  = 7;
000000 0 0
000000 0 0  LITERAL  NumOf^Phase                      = 8;
000000 0 0
000000 0 0
000000 0 0  LITERAL Max^Step = 50;
000000 0 0
000000 0 0  STRUCT  PhaseStep^Struct( * );
000000 0 0  BEGIN
000000 0 1      Word  RoutineArray[ 0:NumOf^Phase-1 ];
000000 0 1  END;
000000 0 0
000000 0 0  LITERAL  TmpStartupReqCtrl^ByteLen =
000000 0 0                 Dialect^VariantByteLen( Tmp_Local_Template.TmpStartupMsg );
000000 0 0  LITERAL  TmpStartupReqCtrl^ByteLenDbl =
000000 0 0                         DblInt^FromConst( TmpStartupReqCtrl^ByteLen );
000000 0 0  LITERAL  TmpStartupReqCtrl^WordLen =
000000 0 0                 Dialect^VariantWordLen( Tmp_Local_Template.TmpStartupMsg );
000000 0 0
000000 0 0
000000 0 0
000000 0 0  !-----------------------------------------------------------------------------
000000 0 0  !
000000 0 0  !   STRUCTURE: 'TmfGlobInfoRecord^Struct'
000000 0 0  !       The defintion of the single record inside the unstructured GLOBINFO
000000 0 0  !   file.
```

PRIVATE Documentation and Definitions

```
000000 0  0   !
000000 0  0   !-----------------------------------------------------------------------
000000 0  0
000000 0  0   STRUCT  TmfGlobInfoRecord^Struct( * );
000000 0  0   BEGIN
000000 0  1       Int  VersionNum;
000000 0  1
000000 0  1       FIXED  TmfConfigurationSeqNum;
000000 0  1
000000 0  1       Boolean  DeleteTmfInProgress;
000000 0  1
000000 0  1       STRUCT CtgInfo( CtgInfo^Struct );
000000 0  1
000000 0  1       Word  Reserved[ 0:47 ];
000000 0  1   END;
000000 0  0
000000 0  0   !-----------------------------------------------------------------------
000000 0  0   !
000000 0  0   !   STRUCTURE: 'TmpControl'
000000 0  0   !       The private global variables for this module. Put in a structure
000000 0  0   !   to avoid eating scarse primary globals.
000000 0  0   !
000000 0  0   !-----------------------------------------------------------------------
000000 0  0
000000 0  0   DEFINE G = TmpControl #;
000000 0  0
000000 0  0   STRUCT  .TmpControl;
000000 0  0   BEGIN
000000 0  1       STRUCT  TmfMon2MsgInfo( TmpMsgInfo^Struct );
000000 0  1
000000 0  1       STRUCT  SwitchReqList( LListHeader^Struct );
000000 0  1
000000 0  1       STRUCT  UserCommandQueue( LListHeader^Struct );
000000 0  1
000000 0  1       Addr         ControlThreadAddr;
000000 0  1       Word  .EXT   ControlThread = ControlThreadAddr;
000000 0  1
000000 0  1       Addr         UserCommandThreadAddr;
000000 0  1       Word  .EXT   UserCommandThread = UserCommandThreadAddr;
000000 0  1
000000 0  1       Addr         BackupMsgThreadAddr;
000000 0  1       Word .EXT    BackupMsgThread = BackupMsgThreadAddr;
000000 0  1
000000 0  1       Semaphore    CheckpointSem;
000000 0  1
000000 0  1       Int OwnershipState;
000000 0  1
000000 0  1       Boolean  CoordTakeOverInProgress;
000000 0  1
000000 0  1       Boolean  Checkpointing;
000000 0  1
000000 0  1       DblWord  BrotherProcessTag;
000000 0  1
000000 0  1       STRUCT  TransitionHoldMsgList( LListHeader^Struct );
000000 0  1
000000 0  1       Int CpuStateArray[ 0:Max^Cpus - 1 ];
000000 0  1
```

PRIVATE Documentation and Definitions

```
000000 0 1        STRUCT  CpuDownOp;
000000 0 1        BEGIN
000000 0 2            Int  State;
000000 0 2
000000 0 2            Int  FailedCpuNum;
000000 0 2        END;
000000 0 1
000000 0 1        STRUCT  CpuReloadOp;
000000 0 1        BEGIN
000000 0 2            Int  State;
000000 0 2
000000 0 2            Int  ReloadeeCpuNum;
000000 0 2        END;
000000 0 1
000000 0 1        STRUCT  MaintBackupOp;
000000 0 1        BEGIN
000000 0 2            Int  State;
000000 0 2
000000 0 2            FIXED  StartTime;
000000 0 2
000000 0 2            Addr        DelayCreateThreadAddr;
000000 0 2            Word  .EXT  DelayCreateThread = DelayCreateThreadAddr;
000000 0 2            Boolean     DelayCreateQuit;
000000 0 2            DblWord     DelayCreateTag;
000000 0 2
000000 0 2            Addr       WatchThreadAddr;
000000 0 2            Word .EXT  WatchThread = WatchThreadAddr;
000000 0 2            Boolean    WatchQuit;
000000 0 2        END;
000000 0 1
000000 0 1        Int TmpState;
000000 0 1
000000 0 1        Int  OperationNum;
000000 0 1
000000 0 1        STRUCT  StartOp;
000000 0 1        BEGIN
000000 0 2            Int  State;
000000 0 2
000000 0 2            STRUCT  Command( TmpUserTmfStartCommand^Struct );
000000 0 2
000000 0 2            Addr        HighThreadAddr;
000000 0 2            Word  .EXT  HighThread = HighThreadAddr;
000000 0 2            Boolean     HighQuit;
000000 0 2        END;
000000 0 1
000000 0 1        STRUCT  StopOp;
000000 0 1        BEGIN
000000 0 2            Int  State;
000000 0 2
000000 0 2            Addr        HighThreadAddr;
000000 0 2            Word  .EXT  HighThread = HighThreadAddr;
000000 0 2            Boolean     HighQuit;
000000 0 2        END;
000000 0 1
000000 0 1        STRUCT  DeleteOp;
000000 0 1        BEGIN
000000 0 2            Int  State;
```

PRIVATE Documentation and Definitions

```
000000 0  2        END;
000000 0  1
000000 0  1        STRUCT  Backup;
000000 0  1        BEGIN
000000 0  2            Addr        WatchPrimaryThreadAddr;
000000 0  2            Word  .EXT WatchPrimaryThread = WatchPrimaryThreadAddr;
000000 0  2
000000 0  2            Boolean  QuitForTakeSwitch;
000000 0  2        END;
000000 0  1
000000 0  1        Word  TmpStartupReqCtrlWords[ 0:TmpStartupReqCtrl^WordLen-1 ];
000000 0  1
000000 0  1        Word  .EXT PhaseStepArray( PhaseStep^Struct );
000000 0  1
000000 0  1        Int  FirstStep;
000000 0  1
000000 0  1        Int  LastStep;
000000 0  1
000000 0  1        Boolean  Tracing;
000000 0  1
000000 0  1        STRING  TmfProgramSubVolBytes[ 0:MaxFileName^StrLen-1 ];
000000 0  1
000000 0  1        STRING  TmfConfigurationSubVolBytes[ 0:MaxFileName^StrLen-1 ];
000000 0  1
000000 0  1        STRING  GlobInfoFileNameBytes[ 0:MaxFileName^StrLen-1 ];
000000 0  1
000000 0  1        STRUCT  GlobInfoFileNameStr( Str^Struct );
000000 0  1
000000 0  1        Int     GlobInfoFileNum;
000000 0  1
000000 0  1        STRUCT  GlobInfoRecord( TmfGlobInfoRecord^Struct );
000000 0  1
000000 0  1        STRUCT  GlobInfoRecordStr( Str^Struct );
000000 0  1
000000 0  1        Int     CtgProcessFileNum;
000000 0  1
000000 0  1        STRUCT  CtgProcessNameStr( Str^Struct );
000000 0  1
000000 0  1        STRUCT  CR( Dump^Log^Request^Def );
000000 0  1
000000 0  1        STRUCT  CRStr( Str^Struct );
000000 0  1
000000 0  1        Boolean DeleteCatalog;
000000 0  1
000000 0  1    END;
000570 0  0
000570 0  0    !-----------------------------------------------------------------------------
000570 0  0    !
000570 0  0    !   LITERALS: 'GlobInfo^ConfigFileName'
000570 0  0    !       The simple name of the GLOBINFO file.
000570 0  0    !
000570 0  0    !-----------------------------------------------------------------------------
000570 0  0
000570 0  0    DEFINE   GlobInfo^ConfigFileName = "GLOBINFO"#;
000570 0  0
000570 0  0    !-----------------------------------------------------------------------------
000570 0  0    !
```

PRIVATE Documentation and Definitions

```
000570 0  0   !   STRUCTURE: 'UserCommandEle^Struct'
000570 0  0   !       This is a template for holding a TMFSERVE command for the UserCommand
000570 0  0   !   thread.
000570 0  0   !
000570 0  0   !---------------------------------------------------------------------------
000570 0  0
000570 0  0   STRUCT  UserCommandEle^Struct( * );
000570 0  0   BEGIN
000570 0  1       STRUCT  Links( LListElement^Struct );
000570 0  1
000570 0  1       Addr  HandleAddr;
000570 0  1
000570 0  1       Addr  UserCommandAddr;
000570 0  1   END;
000570 0  0
000570 0  0   !---------------------------------------------------------------------------
000570 0  0   !
000570 0  0   !   STRUCTURE: 'SwitchReq^Struct'
000570 0  0   !       This is a template for holding a Switch message from PUP or equiv.
000570 0  0   !
000570 0  0   !---------------------------------------------------------------------------
000570 0  0
000570 0  0   STRUCT  SwitchReq^Struct( * );
000570 0  0   BEGIN
000570 0  1       STRUCT  Links( LListElement^Struct );
000570 0  1
000570 0  1       STRUCT  MsgInfo( TmpMsgInfo^Struct );
000570 0  1   END;
000570 0  0
000570 0  0   !---------------------------------------------------------------------------
000570 0  0   !
000570 0  0   !   LITERALS 'GlobInfo^VersionNum'
000570 0  0   !       Version number of the GLOBINFO file.
000570 0  0   !
000570 0  0   !---------------------------------------------------------------------------
000570 0  0
000570 0  0   LITERAL  GlobInfo^VersionNum           = 1;
000570 0  0
000570 0  0   !---------------------------------------------------------------------------
000570 0  0   !   LITERAL 'RetainDepthDefault'
000570 0  0   !     Retain depth of the GlobInfo file.
000570 0  0   !---------------------------------------------------------------------------
000570 0  0
000570 0  0   LITERAL  RetainDepthDefault           = 3;
000570 0  0
000570 0  0
000570 0  0   STRUCT  ShortCkpt^Struct( * );
000570 0  0   BEGIN
000570 0  1       Int  Kind;
000570 0  1   END;
000570 0  0
000570 0  0   STRUCT  NewStateCkpt^Struct( * );
000570 0  0   BEGIN
000570 0  1       Int  Kind;
000570 0  1
000570 0  1       Int  NewState;
000570 0  1   END;
```

```
000570 0  0
000570 0  0
000570 0  0   STR.CT  CpuReloadCkpt^Struct( * );
000570 0  0   BEGIN
000570 0  1       Int  Kind;
000570 0  1
000570 0  1       Int  ReloadeeCpuNum;
000570 0  1   END;
000570 0  0
000570 0  0   STRUCT  CpuDownCkpt^Struct( * );
000570 0  0   BEGIN
000570 0  1       Int  Kind;
000570 0  1
000570 0  1       Int  FailedCpuNum;
000570 0  1   END;
000570 0  0
000570 0  0   STRUCT  ModuleStateCkpt^Struct( * );
000570 0  0   BEGIN
000570 0  1       Int Kind;
000570 0  1
000570 0  1       Int  CpuStateArray[ 0:Max^Cpus - 1 ];
000570 0  1
000570 0  1       Int  TmpState;
000570 0  1
000570 0  1       Int     OperationNum;
000570 0  1       STRUCT  OperationCkptInfo( TmpOperationCkptInfo^Struct );
000570 0  1
000570 0  1       STRUCT  StartOp;
000570 0  1       BEGIN
000570 0  2           Int  State;
000570 0  2
000570 0  2           STRUCT  Command( TmpUserTmfStartCommand^Struct );
000570 0  2
000570 0  2           FIXED  TimeStamp;
000570 0  2       END;
000570 0  1
000570 0  1       STRUCT  StopOp;
000570 0  1       BEGIN
000570 0  2           Int  State;
000570 0  2       END;
000570 0  1
000570 0  1       STRUCT  DeleteOp;
000570 0  1       BEGIN
000570 0  2           Int  State;
000570 0  2       END;
000570 0  1
000570 0  1       STRUCT  GlobInfoRecord( TmfGlobInfoRecord^Struct );
000570 0  1   END;
000570 0  0
000570 0  0   STRUCT  StartCkpt^Struct( * );
000570 0  0   BEGIN
000570 0  1       Int  Kind;
000570 0  1
000570 0  1       Int     OperationNum;
000570 0  1       STRUCT  OperationCkptInfo( TmpOperationCkptInfo^Struct );
000570 0  1
000570 0  1       STRUCT  Command( TmpUserTmfStartCommand^Struct );
```

```
000570 0   1
000570 0   1         FIXED   TimeStamp;
000570 0   1     END;
000570 0   0
000570 0   0     STRUCT   StopCkpt^Struct( * );
000570 0   0     BEGIN
000570 0   1         Int  Kind;
000570 0   1
000570 0   1         Int      OperationNum;
000570 0   1         STRUCT   OperationCkptInfo( TmpOperationCkptInfo^Struct );
000570 0   1     END;
000570 0   0
000570 0   0     STRUCT   DeleteCkpt^Struct( * );
000570 0   0     BEGIN
000570 0   1         Int  Kind;
000570 0   1
000570 0   1         Int      OperationNum;
000570 0   1         STRUCT   OperationCkptInfo( TmpOperationCkptInfo^Struct );
000570 0   1     END;
000570 0   0
000570 0   0     STRUCT   ConfSeqNumCkpt^Struct( * );
000570 0   0     BEGIN
000570 0   1         Int  Kind;
000570 0   1
000570 0   1         Fixed ConfSeqNum;
000570 0   1     END;
000570 0   0
000570 0   0     STRUCT   EndOperCkpt^Struct( * );
000570 0   0     BEGIN
000570 0   1         Int  Kind;
000570 0   1
000570 0   1         STRUCT   OperationCkptInfo( TmpOperationCkptInfo^Struct );
000570 0   1     END;
000570 0   0
000570 0   0     STRUCT   DoStopStepCkpt^Struct( * );
000570 0   0     BEGIN
000570 0   1         Int  Kind;
000570 0   1
000570 0   1         Int  CurrentStep;
000570 0   1     END;
000570 0   0
000570 0   0     STRUCT   OperEventIssuedCkpt^Struct( * );
000570 0   0     BEGIN
000570 0   1         Int  Kind;
000570 0   1
000570 0   1         STRUCT   OperationCkptInfo( TmpOperationCkptInfo^Struct );
000570 0   1     END;
000570 0   0
000570 0   0     STRUCT   AlterCtgCkpt^Struct( * );
000570 0   0     BEGIN
000570 0   1         Int      Kind;
000570 0   1
000570 0   1         STRUCT   AlterCtgCkptInfo( CtgInfo^Struct );
000570 0   1     END;
000570 0   0
000570 0   0     STRUCT DeleteCtgCkpt^Struct( * );
000570 0   0     BEGIN
```

PRIVATE Documentation and Definitions

```
000570 0  1        Int       Kind;
000570 0  1        Boolean   Status^Operation;    ! True if operation started
000570 0  1                                       ! False if operation completed
000570 0  1    End;
000570 0  0
000570 0  0
000570 0  0    !------------------------------------------------------------------------------
000570 0  0    !
000570 0  0    !    LITERALS '*^CkptKind'
000570 0  0    !        Specifies the kind of checkpoint.
000570 0  0    !
000570 0  0    !------------------------------------------------------------------------------
000570 0  0
000570 0  0    LITERAL   YouAreCapable^CkptKind          = 1;
000570 0  0    LITERAL   YouAreNowPrimary^CkptKind       = 2;
000570 0  0    LITERAL   CpuReloadBegin^CkptKind         = 3;
000570 0  0    LITERAL   CpuReloadComplete^CkptKind      = 4;
000570 0  0    LITERAL   CpuReloadFailed^CkptKind        = 5;
000570 0  0    LITERAL   CpuDownBegin^CkptKind           = 6;
000570 0  0    LITERAL   CpuDownComplete^CkptKind        = 7;
000570 0  0    LITERAL   CpuDownFailed^CkptKind          = 8;
000570 0  0    LITERAL   ModuleState^CkptKind            = 9;
000570 0  0    LITERAL   TmfStarting^CkptKind            = 10;
000570 0  0    LITERAL   TmfStopping^CkptKind            = 11;
000570 0  0    LITERAL   TmfDeleting^CkptKind            = 12;
000570 0  0    LITERAL   NewStartOpState^CkptKind        = 13;
000570 0  0    LITERAL   NewStopOpState^CkptKind         = 14;
000570 0  0    LITERAL   NewDeleteOpState^CkptKind       = 15;
000570 0  0    LITERAL   TmfStarted^CkptKind             = 16;
000570 0  0    LITERAL   TmfStopped^CkptKind             = 17;
000570 0  0    LITERAL   TmfDeleted^CkptKind             = 18;
000570 0  0    LITERAL   DoStopStep^CkptKind             = 19;
000570 0  0    LITERAL   OperEventIssued^CkptKind        = 20;
000570 0  0    LITERAL   BeginCoordTakeOver^CkptKind     = 21;
000570 0  0    LITERAL   EndCoordTakeOver^CkptKind       = 22;
000570 0  0    LITERAL   ConfigSeqNum^CkptKind           = 23;
000570 0  0    LITERAL   AlterCtg^CkptKind               = 24;
000570 0  0    LITERAL   DeleteCtg^CkptKind              = 25;
000570 0  0
000570 0  0    END BLOCK;
```

Manages TMP Control Operations

```
903.    000570 0  0   ?SECTION ENDDEFINITIONS
904.    000570 0  0
905.    000570 0  0   ! Interface import(s)
906.    000570 0  0   !
907.    000570 0  0   ?NOLIST, SOURCE NGeneral( Procedures )
909.    000000 0  0   ?NOLIST, SOURCE NTmpMsg( Procedures )
911.    000000 0  0
912.    000000 0  0   ! Implementation import(s)
913.    000000 0  0   !
914.    000000 0  0   ?NOLIST, SOURCE NDialect( Procedures )
916.    000000 0  0   ?NOLIST, SOURCE NError( Procedures )
918.    000000 0  0   ?NOLIST, SOURCE NFileSys( Procedures )
920.    000000 0  0   ?NOLIST, SOURCE NExcept( Procedures )
922.    000000 0  0   ?NOLIST, SOURCE NStr( Procedures )
924.    000000 0  0   ?NOLIST, SOURCE NLList( Procedures )
926.    000000 0  0   ?NOLIST, SOURCE NHeap( Procedures )
928.    000000 0  0   ?NOLIST, SOURCE NFileNam( Procedures )
930.    000000 0  0   ?NOLIST, SOURCE NThread( Procedures )
932.    000000 0  0   ?NOLIST, SOURCE NSemaFor( Procedures )
934.    000000 0  0   ?NOLIST, SOURCE NThrdIo( Procedures )
936.    000000 0  0   ?NOLIST, SOURCE NProcNam( Procedures )
938.    000000 0  0   ?NOLIST, SOURCE NPhandle( Procedures )
940.    000000 0  0   ?NOLIST, SOURCE NProcess( Procedures )
942.    000000 0  0   ?NOLIST, SOURCE NMsgSys( Procedures )
944.    000000 0  0   ?NOLIST, SOURCE NCpuMask( Procedures )
946.    000000 0  0   ?NOLIST, SOURCE NTmfDefs( Procedures )
948.    000000 0  0   ?NOLIST, SOURCE NTmfDsm( Procedures )
950.    000000 0  0   ?NOLIST, SOURCE NTmfSpi( Procedures )
952.    000000 0  0   ?NOLIST, SOURCE NLcTmpIf( Procedures )
954.    000000 0  0   ?NOLIST, SOURCE NLcTmpRq( Procedures )
956.    000000 0  0   ?NOLIST, SOURCE NTmpMem( Procedures )
958.    000000 0  0   ?NOLIST, SOURCE NLibTmpO( Procedures )
960.    000000 0  0   ?NOLIST, SOURCE NLibTmpC( Procedures )
962.    000000 0  0   ?NOLIST, SOURCE NLibTmpM( Procedures )
964.    000000 0  0   ?NOLIST, SOURCE NMn2Req( Procedures )
966.    000000 0  0   ?NOLIST, SOURCE NTmpMain( Procedures )
968.    000000 0  0   ?NOLIST, SOURCE NTmpOpr( Procedures )
970.    000000 0  0   ?NOLIST, SOURCE NTmpClEm( Procedures )
972.    000000 0  0   ?NOLIST, SOURCE NTmpChpt( Procedures )
974.    000000 0  0   ?NOLIST, SOURCE NTmpUTmf( Procedures )
976.    000000 0  0   ?NOLIST, SOURCE NTmpUCtg( Procedures )
978.    000000 0  0   ?NOLIST, SOURCE NTmpTCtl( Procedures )
980.    000000 0  0
981.    000000 0  0   ?NOLIST, SOURCE ExtDecs( ABEND )
983.    000000 0  0   ?NOLIST, SOURCE ExtDecs( FILE_CREATE_, FILE_GETINFOBYNAME_, FILE_PURGE_,
987.    000000 0  0   ?NOLIST, SOURCE PTIME( TIME^SINCE^COLDLOAD , THREEWORDTIMESTAMP )
989.    000000 0  0   ?NOLIST, SOURCE PPCB( PCB_MYCPU_ )
991.    000000 0  0   ?NOLIST, SOURCE PPHANDL( PHANDLE_NULLIT_ )
993.    000000 0  0
994.    000000 0  0   ?NOLIST, SOURCE FTmpCtrl
996.    000000 0  0
997.    000000 0  0   ?SECTION PROCEDURES
998.    000000 0  0
999.    000000 0  0   !! PROC TmpTEvent^NetResolve( Quit );
1000.   000000 1  0   Boolean  .EXT Quit;
1001.   000000 1  0   EXTERNAL;
```

```
                                        TmpTCtrl^UserCommand  --  Execute a User Command
QUIT                           Variable       INT             EXT Pointer    L-004

       000000 0  0
       000000 0  0    !! PROC TmpDataVol^RunOneVrAndWait( Quit );
       000000 1  0    Boolean  .EXT Quit;
       000000 1  0    EXTERNAL;

QUIT                           Variable       INT             EXT Pointer    L-004

       000000 0  0
       000000 0  0    !! PROC TmpTEvent^RunBackout( Quit );
       000000 1  0    Boolean  .EXT Quit;
       000000 1  0    EXTERNAL;

QUIT                           Variable       INT             EXT Pointer    L-004

       000000 0  0
       000000 0  0    !! PROC TmpDataVol^AllowVolRecov;
       000000 1  0    EXTERNAL;
       000000 0  0
       000000 0  0    !! PROC TmpTCtrl^DisableNewTransForStop;
       000000 1  0    EXTERNAL;
       000000 0  0
       000000 0  0    !! PROC TmpDataVol^BeginStoppingTmf( OperationNum,
       000000 1  0                                         OperationKind,
       000000 1  0                                         Quit );
       000000 1  0    Int  OperationNum;
       000000 1  0    Int  OperationKind;
       000000 1  0    Boolean  .EXT Quit;
       000000 1  0    EXTERNAL;

OPERATIONKIND                  Variable       INT             Direct         L-005
OPERATIONNUM                   Variable       INT             Direct         L-006
QUIT                           Variable       INT             EXT Pointer    L-004

       000000 0  0
       000000 0  0    !! PROC TmpTEvent^HighStop( Quit );
       000000 1  0    Boolean  .EXT Quit;
       000000 1  0    EXTERNAL;

QUIT                           Variable       INT             EXT Pointer    L-004

       000000 0  0
       000000 0  0    !! PROC TmpTEvent^CpuDownEpochs( FailedCpuNum );
       000000 1  0    Int  FailedCpuNum;
       000000 1  0    EXTERNAL;

FAILEDCPUNUM                   Variable       INT             Direct         L-003

       000000 0  0
       000000 0  0    !! PROC TmpTEvent^CpuDownAborts( FailedCpuNum );
       000000 1  0    Int  FailedCpuNum;
       000000 1  0    EXTERNAL;

FAILEDCPUNUM                   Variable       INT             Direct         L-003

       000000 0  0
```

```
                                        TmpTCtrl^UserCommand  --  Execute a User Command
000000 0  0   !! PROC TmpTEvent^CpuReloadReDrive( ReloadeeCpuNum );
000000 1  0   Int  ReloadeeCpuNum;
000000 1  0   EXTERNAL;

RELOADEECPUNUM                 Variable      INT           Direct        L-003

000000 0  0
000000 0  0   !! Int PROC TmpAtUtility^NumAuditTrails;
000000 1  0   EXTERNAL;
000000 0  0
000000 0  0   !! Boolean PROC TmpAtUtility^AddAllowed;
000000 1  0   EXTERNAL;
000000 0  0
000000 0  0   !! PROC TmpAtUtility^DeleteTmf;
000000 1  0   EXTERNAL;
000000 0  0
000000 0  0   !! PROC TmpProcess^DeleteTmf;
000000 1  0   EXTERNAL;
000000 0  0
```

TmpControl^Abend

```
000000 0  0   PROC TmpControl^Abend;
000000 1  0
000000 1  0   !------------------------------------------------------------------------
000000 1  0   !
000000 1  0   !       This procedure will cause this TMP to die horribly.  The caller
000000 1  0   !       should previously have issued an EMS event describing why.
000000 1  0   !
000000 1  0   !------------------------------------------------------------------------
000000 1  0
000000 1  0   BEGIN
000000 1  1
000000 1  1       !--------------------
000000 1  1       ! Beginning of code...
000000 1  1       !--------------------
000000 1  1
000000 1  1       CALL TmfLibTmpOwn^AbruptDisconnect;
000001 1  1       CALL Abend;
000006 1  1
000006 1  1   END;

000000  027000 002012 100000 100766 024711 027000 125003
```

```
                                  TmpControl^Checkin

000000 0  0   !EXPORT! PROC TmpControl^Checkin( GiveSwitchRoutine,
000000 1  0                                     TakeOverRoutine,
000000 1  0                                     BackupDownRoutine,
000000 1  0                                     ReloadBackupRoutine,
000000 1  0                                     StartRoutine,
000000 1  0                                     StopRoutine,
000000 1  0                                     CpuDownRoutine,
000000 1  0                                     CpuReloadRoutine ) VARIABLE;
000000 1  0
000000 1  0   !-------------------------------------------------------------------------
000000 1  0   !
000000 1  0   !   The 'TmpControl^Checkin' routine is called by each TMP module that wants
000000 1  0   !   to participate in TMP Control operations.  Their "phase" routines are
000000 1  0   !   specified as parameters.  The TMP Module's '*^ModuleInit' routines call
000000 1  0   !   this routine during process initialization.
000000 1  0   !
000000 1  0   !   All the routines are optional.  The ordering of the parameters
000000 1  0   !   puts the most frequently specified ones first.
000000 1  0   !
000000 1  0   !-------------------------------------------------------------------------
000000 1  0
000000 1  0   PROC GiveSwitchRoutine;
000000 1  0                       ! IN (optional): This routine takes the module from
000000 1  0                       !   active "Primary" to passive "Backup" state.
000000 1  0                       !
000000 1  0                       !   Form:
000000 1  0                       !       PROC *^GiveSwitch;
000000 1  0
000000 1  0   PROC TakeOverRoutine;
000000 1  0                       ! IN (optional): This routine takes the module
000000 1  0                       !   from passive "Backup" to active "Primary"
000000 1  0                       !   state.
000000 1  0                       !
000000 1  0                       !   Form:
000000 1  0                       !       PROC *^TakeOver( Boolean  BackupIsUp );
000000 1  0                       !
000000 1  0                       !   Where 'BackupIsUp' is the value for the module's
000000 1  0                       !   private 'Checkpointing' flag.
000000 1  0
000000 1  0   PROC BackupDownRoutine;
000000 1  0                       ! IN (optional): This routine sets the
000000 1  0                       !   module's private 'Checkpointing' flag to
000000 1  0                       !   'False'.
000000 1  0                       !
000000 1  0                       !   Form:
000000 1  0                       !       PROC *^BackupDown;
000000 1  0
000000 1  0   PROC ReloadBackupRoutine;
000000 1  0                       ! IN (optional): This routine sets the module's private
000000 1  0                       !   'Checkpointing' flag to 'True' and reloads the
000000 1  0                       !   cooresponding module in the Backup TMP.
000000 1  0                       !
000000 1  0                       !   Form:
000000 1  0                       !       PROC *^ReloadBackup;
000000 1  0
000000 1  0   Boolean PROC StartRoutine;
000000 1  0                       ! IN (optional): This routine that starts services
```

TmpControl^Checkin

```
000000 1  0                               !   in the module.
000000 1  0                               !
000000 1  0                               !   Form:
000000 1  0                               !       Boolean PROC *^Start;
000000 1  0
000000 1  0    PROC StopRoutine;
000000 1  0                               ! IN (optional): This routine stops services in
000000 1  0                               !   the module.
000000 1  0                               !
000000 1  0                               !   Form:
000000 1  0                               !       PROC *^Stop;
000000 1  0
000000 1  0    PROC CpuDownRoutine;
000000 1  0                               ! IN (optional): This routine marks the CPU down and
000000 1  0                               !   performs any clean up necessary in the module.
000000 1  0                               !
000000 1  0                               !   Form:
000000 1  0                               !       PROC *^CpuDown( Int  CpuNum );
000000 1  0                               !
000000 1  0                               !   Where 'CpuNum' is the number of the CPU that failed.
000000 1  0
000000 1  0    PROC CpuReloadRoutine;
000000 1  0                               ! IN (optional): This routine makes the CPU as being up
000000 1  0                               !    in the module and performs any work necessary in the
000000 1  0                               !    module to add the CPU back for work, including
000000 1  0                               !    sending informatino to the CPU being reloaded.
000000 1  0                               !
000000 1  0                               !   Form:
000000 1  0                               !       PROC *^CpuReload( Int  CpuNum );
000000 1  0                               !
000000 1  0                               !   Where 'CpuNum' is the number of the CPU being
000000 1  0                               !   reloaded.
000000 1  0
000000 1  0    BEGIN
000000 1  1        Word  .EXT PhaseStep( PhaseStep^Struct );
000000 1  1
000000 1  1        ! Beginning of code...
000000 1  1
000000 1  1        G.LastStep := G.LastStep + 1;
000004 1  1        PermAssertTruth( G.LastStep < Max^Step );
000014 1  1
000014 1  1        @PhaseStep := @G.PhaseStepArray[ G.LastStep ];
000025 1  1
000025 1  1        IF $PARAM( GiveSwitchRoutine ) THEN
000030 1  1            PhaseStep.RoutineArray[ GiveSwitch^Phase ] := @GiveSwitchRoutine;
000033 1  1
000033 1  1        IF $PARAM( TakeOverRoutine ) THEN
000036 1  1            PhaseStep.RoutineArray[ TakeOver^Phase ] := @TakeOverRoutine;
000041 1  1
000041 1  1        IF $PARAM( BackupDownRoutine ) THEN
000044 1  1            PhaseStep.RoutineArray[ BackupDown^Phase ] := @BackupDownRoutine;
000047 1  1
000047 1  1        IF $PARAM( ReloadBackupRoutine ) THEN
000052 1  1            PhaseStep.RoutineArray[ ReloadBackup^Phase ] := @ReloadBackupRoutine;
000055 1  1
000055 1  1        IF $PARAM( StartRoutine ) THEN
000060 1  1            PhaseStep.RoutineArray[ Start^Phase ] := @StartRoutine;
```

TmpControl^Checkin

```
000063 1   1
000063 1   1        IF $PARAM( StopRoutine ) THEN
000066 1   1           PhaseStep.RoutineArray[ Stop^Phase ] := @StopRoutine;
000071 1   1
000071 1   1        IF $PARAM( CpuDownRoutine ) THEN
000074 1   1           PhaseStep.RoutineArray[ CpuDown^Phase ] := @CpuDownRoutine;
000077 1   1
000077 1   1        IF $PARAM( CpuReloadRoutine ) THEN
000102 1   1           PhaseStep.RoutineArray[ CpuReload^Phase ] := @CpuReloadRoutine;
000105 1   1    END;

BACKUPDOWNROUTINE          Proc                                           L-011
CPUDOWNROUTINE             Proc                                           L-005
CPURELOADROUTINE           Proc                                           L-004
GIVESWITCHROUTINE          Proc                                           L-013
PHASESTEP                  Variable,20     STRUCT-I         EXT Pointer   L+001
RELOADBACKUPROUTINE        Proc                                           L-010
STARTROUTINE               Proc            INT                            L-007
STOPROUTINE                Proc                                           L-006
TAKEOVERROUTINE            Proc                                           L-012

000000  002002 103232 100001 177000 143000 001062 014005 100001    000010  000002 100002 024733 027000 103227 173000 000362 102232
000020  142000 000327 130004 000220 064401 040703 006200 014403    000030  040713 100000 026501 040703 006100 014403 040712 100001
000040  026501 040703 006040 014403 040711 100002 026501 040703    000050  006020 014403 040710 100003 026501 040703 006010 014403
000060  040707 100004 026501 040703 006004 014403 040706 100005    000070  026501 040703 006002 014403 040705 100006 026501 040703
000100  006001 014403 040704 100007 026501 125014
```

TmpControl^ExecuteStartStep

```
000000 0  0   Boolean PROC TmpControl^ExecuteStartStep( Step );
000000 1  0
000000 1  0   !------------------------------------------------------------------------
000000 1  0   !
000000 1  0   !   Executes one step of a phase by invoking the step's module Start phase
000000 1  0   !   routines.
000000 1  0   !
000000 1  0   !------------------------------------------------------------------------
000000 1  0
000000 1  0   Int  Step;
000000 1  0                         ! IN: The step number that specifies the module.
000000 1  0
000000 1  0   BEGIN
000000 1  1       Word  ProcAddr;
000000 1  1
000000 1  1       Boolean  Successful;
000000 1  1
000000 1  1       ! Beginning of code...
000000 1  1
000000 1  1       AssertTruth( Step >= G.FirstStep AND
000000 1  1                    Step <= G.LastStep );
000001 1  1
000001 1  1       ProcAddr := G.PhaseStepArray[ Step ].RoutineArray[ Start^Phase ];
000015 1  1       IF ProcAddr = 0 THEN
000017 1  1           RETURN True;       ! No routine was specified.
000021 1  1
000021 1  1       STACK ProcAddr;
000022 1  1       CODE( DPCL );            ! Dynamic procedure call.
000023 1  1       CODE( STRP 0 );          ! Indicate something is left stacked.
000024 1  1       STORE Successful;        ! Save the 'Boolean' function return.
000025 1  1
000025 1  1       RETURN Successful;
000027 1  1   END;

PROCADDR              Variable     INT        Direct      L+001
STEP                  Variable     INT        Direct      L-003
SUCCESSFUL            Variable     INT        Direct      L+002

000000  002002 103227 173000 000362 040703 000327 130004 000220     000010  100000 100010 000220 000410 034401 001000 015002 100777
000020  125004 040401 000032 000100 034402 004000 125004
```

ImpControl^ExecuteStep

```
000000 0  0   PROC ImpControl^ExecuteStep( Phase, Step );
000000 1  0
000000 1  0   !------------------------------------------------------------------------
000000 1  0   !
000000 1  0   !   Executes one step of a phase by invoking the step's module phase routine.
000000 1  0   !
000000 1  0   !------------------------------------------------------------------------
000000 1  0
000000 1  0   Int  Phase;
000000 1  0                           ! IN: The phase being performed. One of the '*^Phase'
000000 1  0                           !   literals.
000000 1  0
000000 1  0   Int  Step;
000000 1  0                           ! IN: The step number that specifies the module.
000000 1  0
000000 1  0   BEGIN
000000 1  1       Word  ProcAddr;
000000 1  1
000000 1  1       ! Beginning of code...
000000 1  1
000000 1  1       AssertTruth( Phase >= 0 AND Phase < NumOf^Phase );
000001 1  1       AssertTruth( Step >= G.FirstStep AND
000001 1  1                    Step <= G.LastStep );
000001 1  1
000001 1  1       ProcAddr := G.PhaseStepArray[ Step ].RoutineArray[ Phase ];
000016 1  1       IF ProcAddr = 0 THEN
000020 1  1           RETURN;       ! No routine was specified.
000021 1  1
000021 1  1       STACK ProcAddr;
000022 1  1       CODE( DPCL );           ! Dynamic procedure call.
000023 1  1       CODE( STRP 7 );         ! Indicate nothing is left stacked.
000024 1  1   END;

PHASE                  Variable      INT           Direct        L-004
PROCADDR               Variable      INT           Direct        L+001
STEP                   Variable      INT           Direct        L-003

000000  002001 103227 173000 000362 040703 000327 130004 000220    000010  040704 000327 130001 000220 000410 034401 001000 015001
000020  125005 040401 000032 000107 125005
```

TmpControl^ExecuteWordStep

```
000000 0  0   PROC TmpControl^ExecuteWordStep( Phase, Step, WordParam );
000000 1  0
000000 1  0   !-----------------------------------------------------------------------------
000000 1  0   !
000000 1  0   !   Executes one step of a phase by invoking the step's module phase routine.
000000 1  0   !   The phase routine has a single 'Word' parameter.
000000 1  0   !
000000 1  0   !-----------------------------------------------------------------------------
000000 1  0
000000 1  0   Int  Phase;
000000 1  0                           ! IN: The phase being performed. One of the '*^Phase'
000000 1  0                           !   literals.
000000 1  0
000000 1  0   Int  Step;
000000 1  0                           ! IN: The step number that specifies the module.
000000 1  0
000000 1  0   Word  WordParam;        ! IN: A single 'Word' parameter value for the "phase"
000000 1  0                           !   routine.
000000 1  0
000000 1  0   BEGIN
000000 1  1       Word  ProcAddr;
000000 1  1
000000 1  1       ! Beginning of code...
000000 1  1
000000 1  1       AssertTruth( Phase >= 0 AND Phase < NumOf^Phase );
000001 1  1       AssertTruth( Step >= G.FirstStep AND
000001 1  1                    Step <= G.LastStep );
000001 1  1
000001 1  1       ProcAddr := G.PhaseStepArray[ Step ].RoutineArray[ Phase ];
000016 1  1       IF ProcAddr = 0 THEN
000020 1  1           RETURN;       ! No routine was specified.
000021 1  1
000021 1  1       STACK  WordParam;
000022 1  1       CODE( PUSH %700 );       ! Push the 1 word on the stack.
000023 1  1       STACK ProcAddr;
000024 1  1       CODE( DPCL );            ! Dynamic procedure call.
000025 1  1       CODE( STRP 7 );          ! Indicate nothing is left stacked.
000026 1  1   END;

PHASE                   Variable     INT          Direct       L-005
PROCADDR                Variable     INT          Direct       L+001
STEP                    Variable     INT          Direct       L-004
WORDPARAM               Variable     INT          Direct       L-003

000000  002001 103227 173000 000362 040704 000327 130004 000220    000010  040705 000327 130001 000220 000410 034401 001000 015001
000020  125006 040703 024700 040401 000032 000107 125006
```

TmpControl^HandleBackupMsg

```
000000 0  0   !EXPORT! PROC TmpControl^HandleBackupMsg( MsgInfo );
000000 1  0
000000 1  0   !---------------------------------------------------------------------------
000000 1  0   !
000000 1  0   !   A module in "Backup" state hands over a message it received with
000000 1  0   !   this routine.
000000 1  0   !
000000 1  0   !   If we are the Backup TMP, we reply to the message with
000000 1  0   !   'FEOWNERSHIP'.  If a Switch or TakeOver operation is in progress,
000000 1  0   !   we queue the message.  For a Switch we reply to the message with
000000 1  0   !   'FEOWNERSHIP' after the "baton" has been passed.  For a TakeOver
000000 1  0   !   we will process the messages at the end of the operation.
000000 1  0   !
000000 1  0   !---------------------------------------------------------------------------
000000 1  0
000000 1  0   Word  .EXT MsgInfo;
000000 1  0                         ! IN OUT: The Message Info for "Backup" Msg.
000000 1  0                         !   The type of this parameter is 'TmpMsgInfo^Struct'.  A
000000 1  0                         !   blind  pointer is used so other users of this module do
000000 1  0                         !   not have to have that definition.
000000 1  0
000000 1  0   BEGIN
000000 1  1       ! Beginning of code...
000000 1  1
000000 1  1       CASE G.OwnershipState OF
000003 1  1       BEGIN
000003 1  2       Primary^OwnershipState ->
000003 1  2           !-----------------------------------------------------
000003 1  2           ! No TMP Module should think it is in "Backup" state.
000003 1  2           !-----------------------------------------------------
000003 1  2           UndefinedCaseError;
000010 1  2
000010 1  2       VulnerableBackup^OwnershipState,
000011 1  2       CapableBackup^OwnershipState ->
000011 1  2           CALL TmpMsg^AddToList( G.TransitionHoldMsgList, MsgInfo );
000020 1  2           CALL Thread^Schedule( G.BackupMsgThread, Defer^ScheduleOption );
000026 1  2
000026 1  2       Switching^OwnershipState,
000027 1  2       TakingOver^OwnershipState ->
000027 1  2           CALL TmpMsg^AddToList( G.TransitionHoldMsgList, MsgInfo );
000036 1  2
000036 1  2       OTHERWISE ->
000037 1  2           UndefinedCaseError;
000044 1  2       END;
000064 1  1   END;

MSGINFO                    Variable        INT              EXT Pointer     L-004

000000  103040 143000 010442 100001 000002 100002 024733 027000     000010  010453 100000 170000 130001 003112 060704 024733 027000
000020  103016 163000 100777 100003 024733 027000 010435 100000     000030  170000 130001 003112 060704 024733 027000 010425 100001
000040  000002 100002 024733 027000 010417 003777 100004 000205     000050  000100 016002 000107 100005 000030 177726 177751 177750
000060  177731 177730 177755 000000 125005
```

TmpControl^HandleBkpMsgAllowed

```
000000 0  0   !EXPORT! Boolean PROC TmpControl^HandleBkpMsgAllowed;
000000 1  0
000000 1  0   !------------------------------------------------------------------------
000000 1  0   !
000000 1  0   !   This procedure returns 'TRUE' if one can legally call ~HandleBackupMsg
000000 1  0   !   at this time.
000000 1  0   !
000000 1  0   !   If we are in the Backup TMP, or if a PUP PRIMARY or Takeover is going
000000 1  0   !   on, this procedure will return TRUE.  If we are in the primary TMP, and
000000 1  0   !   no switch or takeover activity is going on, we will return FALSE.
000000 1  0   !
000000 1  0   !------------------------------------------------------------------------
000000 1  0
000000 1  0   BEGIN
000000 1  1       ! Beginning of code...
000000 1  1
000000 1  1       CASE G.OwnershipState OF
000003 1  1       BEGIN
000003 1  2
000003 1  2       Primary^OwnershipState ->
000003 1  2           RETURN False;
000005 1  2
000005 1  2       VulnerableBackup^OwnershipState,
000005 1  2       CapableBackup^OwnershipState,
000005 1  2       Switching^OwnershipState,
000005 1  2       TakingOver^OwnershipState ->
000005 1  2           RETURN True;
000007 1  2
000007 1  2       OTHERWISE ->
000007 1  2           UndefinedCaseError;
000014 1  2
000014 1  2       END;
000034 1  1
000034 1  1   END;

000000  103040 143000 010412 100000 125003 100777 125003 100001    000010  000002 100002 024733 027000 010417 003777 100004 000205
000020  000100 016002 000107 100005 000030 177756 177757 177756    000030  177755 177754 177755 000000 100000 125003
```

TmpControl^GetStartOpInfo

```
000000 0  0   !EXPORT! PROC TmpControl^GetStartOpInfo( OperationType, OperationNum );
000000 1  0
000000 1  0   !------------------------------------------------------------------------
000000 1  0   !
000000 1  0   !   This routine returns the Start operation information so the client
000000 1  0   !   can issue an EMS event on its behalf.  Returns NIL operation type
000000 1  0   !   and OperationNum = -1 if a Start operation is not in progress.
000000 1  0   !
000000 1  0   !------------------------------------------------------------------------
000000 1  0
000000 1  0   Int   .EXT OperationType;
000000 1  0                       ! OUT
000000 1  0
000000 1  0   Int   .EXT OperationNum;
000000 1  0                       ! OUT
000000 1  0
000000 1  0   BEGIN
000000 1  1       ! Beginning of code...
000000 1  1
000000 1  1       IF G.StartOp.State <> None^StartOpState THEN
000004 1  1           BEGIN
000004 1  2           OperationType := ZTMF^VAL^StartTmf;
000007 1  2           OperationNum := G.OperationNum;
000013 1  2           END
000013 1  1       ELSE
000014 1  1           BEGIN
000014 1  2           OperationType := ZTMF^VAL^Oper^Nil;
000017 1  2           OperationNum := -1;
000022 1  2           END;
000022 1  1
000022 1  1   END;

OPERATIONNUM                    Variable      INT          EXT Pointer    L-004
OPERATIONTYPE                   Variable      INT          EXT Pointer    L-006

000000  103114 143000 001050 012010 100162 060706 000411 102113    000010  142000 060704 000411 125007 100777 060706 000411 100777
000020  060704 000411 125007
```

TmpControl^GetStopOpInfo

```
000000 0  0   !EXPORT! PROC TmpControl^GetStopOpInfo( OperationType, OperationNum );
000000 1  0
000000 1  0   !--------------------------------------------------------------------------
000000 1  0   !
000000 1  0   !   This routine returns the Stop operation information so the client
000000 1  0   !   can issue an EMS event on its behalf.  Returns NIL operation type
000000 1  0   !   and OperationNum = -1 if a Stop operation is not in progress.
000000 1  0   !
000000 1  0   !--------------------------------------------------------------------------
000000 1  0
000000 1  0   Int  .EXT OperationType;
000000 1  0                       ! OUT
000000 1  0
000000 1  0   Int  .EXT OperationNum;
000000 1  0                       ! OUT
000000 1  0
000000 1  0   BEGIN
000000 1  1       ! Beginning of code...
000000 1  1
000000 1  1       IF G.StopOp.State <> None^StopOpState THEN
000004 1  1           BEGIN
000004 1  2           OperationType := ZTMF^VAL^StopTmf;
000007 1  2           OperationNum := G.OperationNum;
000013 1  2           END
000013 1  1       ELSE
000014 1  1           BEGIN
000014 1  2           OperationType := ZTMF^VAL^Oper^Nil;
000017 1  2           OperationNum := -1;
000022 1  2           END;
000022 1  1
000022 1  1   END;

OPERATIONNUM                     Variable     INT          EXT Pointer    L-004
OPERATIONTYPE                    Variable     INT          EXT Pointer    L-006

000000  103123 143000 001062 012010 100163 060706 000411 102113    000010  142000 060704 000411 125007 100777 060706 000411 100777
000020  060704 000411 125007
```

TmpControl^GetDeleteOpInfo

```
000000 0  0   !EXPORT! PROC TmpControl^GetDeleteOpInfo( OperationType, OperationNum );
000000 1  0
000000 1  0   !---------------------------------------------------------------------------------
000000 1  0   !
000000 1  0   !   This routine returns the Delete operation information so the client
000000 1  0   !   can issue an EMS event on its behalf.
000000 1  0   !
000000 1  0   !---------------------------------------------------------------------------------
000000 1  0
000000 1  0   Int   .EXT OperationType;
000000 1  0                             ! OUT
000000 1  0
000000 1  0   Int   .EXT OperationNum;
000000 1  0                             ! OUT
000000 1  0
000000 1  0   BEGIN
000000 1  1       ! Beginning of code...
000000 1  1
000000 1  1       OperationType := ZTMF^VAL^DeleteTmf;
000003 1  1       OperationNum := G.OperationNum;
000007 1  1   END;

OPERATIONNUM                    Variable      INT          EXT Pointer    L-004
OPERATIONTYPE                   Variable      INT          EXT Pointer    L-006

000000  100164 060706 000411 103113 143000 060704 000411 125007     000010
```

TmpControl^UpCpuMask

```
1472.   000000 0  0   !EXPORT! Word PROC TmpControl^UpCpuMask;
1473.   000000 1  0
1474.   000000 1  0   !-------------------------------------------------------------------------
1475.   000000 1  0   !
1476.   000000 1  0   !-------------------------------------------------------------------------
1477.   000000 1  0
1478.   000000 1  0   BEGIN
1479.   000000 1  1       Word  UpCpuMask;
1480.   000000 1  1
1481.   000000 1  1       Int  CpuNum;
1482.   000000 1  1
1483.   000000 1  1       ! Beginning of code...
1484.   000000 1  1
1485.   000000 1  1       PermAssertTruth( G.OwnershipState = Primary^OwnershipState );
1486.   000012 1  1       UpCpuMask := Empty^CpuMask;
1487.   000014 1  1       FOR CpuNum := 0 TO Max^Cpus-1 DO
1488.   000015 1  1           BEGIN
1489.   000015 1  2           CASE G.CpuStateArray[ CpuNum ] OF
1490.   000022 1  2           BEGIN
1491.   000022 1  3           Up^CpuState ->
1492.   000022 1  3               CpuMask^AddCpu( UpCpuMask, CpuNum );
1493.   000030 1  3
1494.   000030 1  3           Down^CpuState ->
1495.   000031 1  3               ;
1496.   000032 1  3
1497.   000032 1  3           OTHERWISE ->
1498.   000032 1  3               !-----------------------------------------------------------
1499.   000032 1  3               ! No CPUs should be in transition during '*^ModuleInit' time.
1500.   000032 1  3               !-----------------------------------------------------------
1501.   000032 1  3               UndefinedCaseError;
1502.   000037 1  3
1503.   000037 1  3           END;
1504.   000054 1  2           END;
1505.   000061 1  1
1506.   000061 1  1       RETURN UpCpuMask;
1507.   000063 1  1   END;

CPUNUM                        Variable      INT          Direct       L+002
UPCPUMASK                     Variable      INT          Direct       L+001

000000  002002 103040 143000 001001 012005 100001 000002 100002    000010  024733 027000 100000 034401 010441 040402 003051 000117
000020  143000 010416 040401 005200 040402 030100 000011 044401    000030  010423 010422 100001 000002 100002 024733 027000 010414
000040  003777 100001 000205 000100 016002 000107 100002 000030    000050  177752 000003 177760 000000 040402 104001 034402 001017
000060  016334 040401 125003
```

TmpControl^MainOwnership

```
000000 0  0   !EXPORT! Int PROC TmpControl^MainOwnership;
000000 1  0
000000 1  0   !------------------------------------------------------------------------------------
000000 1  0   !
000000 1  0   !------------------------------------------------------------------------------------
000000 1  0
000000 1  0   BEGIN
000000 1  1       ! Beginning of code...
000000 1  1
000000 1  1       CASE G.OwnershipState OF
000003 1  1       BEGIN
000003 1  2       Primary^OwnershipState ->
000003 1  2           RETURN Primary^TmpOwnership;
000005 1  2
000005 1  2       VulnerableBackup^OwnershipState ->
000005 1  2           RETURN Backup^TmpOwnership;
000007 1  2
000007 1  2       OTHERWISE  ->
000007 1  2           UndefinedCaseError;
000014 1  2       END;
000033 1  1   END;

000000  103040 143000 010412 100001 125003 100000 125003 100001    000010  000002 100002 024733 027000 010416 003777 100003 000205
000020  000100 016002 000107 100004 000030 177756 177761 177760    000030  177755 177756 000000 100000 125003
```

TmpControl^KillBackupTmp

```
000000 0  0   PROC TmpControl^KillBackupTmp;
000000 1  0
000000 1  0   !-----------------------------------------------------------------------------
000000 1  0   !
000000 1  0   !-----------------------------------------------------------------------------
000000 1  0
000000 1  0   BEGIN
000000 1  1       Word  .EXT ReqCtrl( Tmp_Local_Template );
000000 1  1       Word  .EXT ReplyCtrl( Tmp_Local_Template );
000000 1  1
000000 1  1       STRUCT  .BackupPhandle( Phandle^Struct );
000000 1  1
000000 1  1       Int  ReplyCtrlLen;
000000 1  1
000000 1  1       ! Beginning of code...
000000 1  1
000000 1  1       @ReqCtrl := Heap^New( TmpShortTermHeap,
000004 1  1                            Dialect^VariantByteLenDbl( ReqCtrl.StopAbrupt ) );
000012 1  1
000012 1  1       ReqCtrl.Dialect_Type := Dialect_Tmp_Local;
000015 1  1       ReqCtrl.Request_Type := Tmp_Local_StopAbrupt;
000020 1  1       ReqCtrl.Request_Version := Tmp_Local_Version_Nov91;
000023 1  1       ReqCtrl.StopAbrupt.KillPrimary := False;
000026 1  1
000026 1  1       @ReplyCtrl := Heap^New( TmpShortTermHeap,
000026 1  1                              DblInt^FromConst( Tmp_Local_RepCtrl_MaxSize ) );
000034 1  1
000034 1  1       CALL Process^GetPhandle( G.BrotherProcessTag, BackupPhandle );
000044 1  1
000044 1  1       CALL MsgSys^LinkAndWait( BackupPhandle,
000044 1  1                               ReqCtrl, TmpStartupReqCtrl^ByteLen,
000044 1  1                               ReplyCtrl, Tmp_Local_RepCtrl_MaxSize,
000044 1  1                               , , , ,  ! No Request or Reply Data.
000044 1  1                               ReplyCtrlLen,
000044 1  1                               ,          ! Omit 'ReplyDataLen'.
000044 1  1                               ,          ! Time out -> wait forever.
000044 1  1                               False,     ! Do not automatically retry -->
000044 1  1                                          !   Backup TMP failure would cause msg
000044 1  1                                          !   to be sent to ourselves.
000044 1  1                               True );    ! Lock memory -->
000073 1  1                                          !   TMP extended segment is not resident.
000073 1  1
000073 1  1       ! Ignore the error...
000073 1  1
000073 1  1       CALL Heap^Dispose( TmpShortTermHeap,
000073 1  1                          @ReqCtrl,
000073 1  1                          Dialect^VariantByteLenDbl( ReqCtrl.StopAbrupt ) );
000104 1  1       CALL Heap^Dispose( TmpShortTermHeap,
000104 1  1                          @ReplyCtrl,
000104 1  1                          DblInt^FromConst( Tmp_Local_RepCtrl_MaxSize ) );
000115 1  1   END;

BACKUPPHANDLE              Variable,24    STRUCT      Indirect      L+005
REPLYCTRL                  Variable,10    STRUCT-I    EXT Pointer   L+003
REPLYCTRLLEN               Variable       INT         Direct        L+006
REQCTRL                    Variable,10    STRUCT-I    EXT Pointer   L+001
```

TmpControl^KillBackupTmp

```
000000   002004 070407 024700 002013 060000 100000 100012 024733
000020   100001 100002 026501 100000 100004 026501 060000 100000
000040   170405 130001 024733 027000 100000 170405 130001 060401
000060   024711 002004 100000 100777 024711 002005 100001 005360
000100   100012 100007 024766 027000 060000 100000 070403 130001

000010   027000 064401 100072 100000 026501 100014 100001 026501
000030   100226 024733 027000 064403 103043 173000 000362 100000
000050   100170 060403 100226 024777 002006 100000 070406 130001
000070   004230 024711 027000 060000 100000 070401 130001 100000
000110   100000 100226 100007 024766 027000 125003
```

```
                        TmpControl^StopAbrupt
000000 0  0   PROC TmpControl^StopAbrupt;
000000 1  0
000000 1  0   !--------------------------------------------------------------------------
000000 1  0   !
000000 1  0   !    *** Assumes CheckpointSem is held or Backup does not exist...
000000 1  0   !
000000 1  0   !--------------------------------------------------------------------------
000000 1  0
000000 1  0   BEGIN
000000 1  1       ! Beginning of code...
000000 1  1
000000 1  1       IF G.MaintBackupOp.State = Up^MaintBackOpState OR
000000 1  1          G.MaintBackupOp.State = Reloading^MaintBackOpState THEN
000010 1  1           CALL TmpControl^KillBackupTmp;
000011 1  1
000011 1  1       CALL TmfLibTmpOwn^AbruptDisconnect;
000012 1  1       CALL STOP;
000017 1  1   END;

000000  103075 143000 001043 012004 103075 143000 001042 015001     000010  027000 027000 002012 100000 100766 024711 027000 125003
```

TmpControl^CrashTmf

```
1602.    000000 0  0   !EXPORT! PROC TmpControl^CrashTmf;
1603.    000000 1  0
1604.    000000 1  0   !-----------------------------------------------------------------------------
1605.    000000 1  0   !
1606.    000000 1  0   !   Crash TMF by killing both TMP processes.
1607.    000000 1  0   !
1608.    000000 1  0   !-----------------------------------------------------------------------------
1609.    000000 1  0
1610.    000000 1  0   BEGIN
1611.    000000 1  1       ! Beginning of code...
1612.    000000 1  1
1613.    000000 1  1       CALL TmpControl^StopAbrupt;
1614.    000001 1  1   END;

000000  027000 125003
```

TmpControl^ReceiveCheckpoint

```
000000 0 0   PROC TmpControl^ReceiveCheckpoint( Data, DataLen );
000000 1 0
000000 1 0   !------------------------------------------------------------------------
000000 1 0   !
000000 1 0   !------------------------------------------------------------------------
000000 1 0
000000 1 0   Word  .EXT Data;
000000 1 0                      ! IN
000000 . 0
000000 1 0   Int  DataLen;
000000 1 0                      ! IN
000000 1 0
000000 1 0   BEGIN
000000 1 1       Word  .EXT ShortCkpt( ShortCkpt^Struct ) = Data;
000000 1 1       Word  .EXT NewStateCkpt( NewStateCkpt^Struct ) = Data;
000000 1 1       Word  .EXT CpuReloadCkpt( CpuReloadCkpt^Struct ) = Data;
000000 1 1       Word  .EXT CpuDownCkpt( CpuDownCkpt^Struct ) = Data;
000000 1 1       Word  .EXT ModuleStateCkpt( ModuleStateCkpt^Struct ) = Data;
000000 1 1       Word  .EXT StartCkpt( StartCkpt^Struct ) = Data;
000000 1 1       Word  .EXT StopCkpt( StopCkpt^Struct ) = Data;
000000 1 1       Word  .EXT DeleteCkpt( DeleteCkpt^Struct ) = Data;
000000 1 1       Word  .EXT EndOperCkpt( EndOperCkpt^Struct ) = Data;
000000 1 1       Word  .EXT DoStopStepCkpt( DoStopStepCkpt^Struct ) = Data;
000000 1 1       Word  .EXT OperEventIssuedCkpt( OperEventIssuedCkpt^Struct ) = Data;
000000 1 1       Word  .EXT ConfSeqNumCkpt( ConfSeqNumCkpt^Struct ) = Data;
000000 1 1       Word  .EXT AlterCtyCkpt( AlterCtgCkpt^Struct ) = Data;
000000 1 1       Word  .EXT DeleteCtgCkpt( DeleteCtgCkpt^Struct ) = Data;
000000 1 1
000000 1 1       Int  ReloadeeCpuNum;
000000 1 1
000000 1 1       Int  FailedCpuNum;
000000 1 1
000000 1 1       Int  CpuState;
000000 1 1
000000 1 1       ! Beginning of code...
000000 1 1
000000 1 1       CASE ShortCkpt.Kind OF
000004 1 1       BEGIN
000004 1 2       YouAreCapable^CkptKind ->
000004 1 2           AssertTruth( DataLen = Ele^ByteLen( ShortCkpt ) );
000004 1 2           PermAssertTruth( G.OwnershipState = VulnerableBackup^OwnershipState );
000015 1 2           G.OwnershipState := CapableBackup^OwnershipState;
000020 1 2
000020 1 2       YouAreNowPrimary^CkptKind ->
000021 1 2           AssertTruth( DataLen = Ele^ByteLen( ShortCkpt ) );
000021 1 2           PermAssertTruth( G.OwnershipState = CapableBackup^OwnershipState );
000032 1 2           PermAssertTruth( NOT G.Backup.QuitForTakeSwitch );
000042 1 2           G.Backup.QuitForTakeSwitch := True;
000045 1 2           CALL Thread^Schedule( G.Backup.WatchPrimaryThread,
000045 1 2                                 Normal^ScheduleOption );
000053 1 2
000053 1 2       CpuReloadBegin^CkptKind ->
000054 1 2           AssertTruth( DataLen = Ele^ByteLen( CpuReloadCkpt ) );
000054 1 2           AssertTruth( G.CpuReloadOp.State = Nil^CpuReloadOpState );
000054 1 2           AssertTruth( G.CpuReloadOp.ReloadeeCpuNum = - 1 );
000054 1 2
000054 1 2           ReloadeeCpuNum := CpuReloadCkpt.ReloadeeCpuNum;
```

```
                                  TmpControl^ReceiveCheckpoint
000062 1  2          AssertTruth( G.CpuStateArray[ ReloadeeCpuNum ] = Down^CpuState );
000062 1  2          G.CpuStateArray[ ReloadeeCpuNum ] := Reloading^CpuState;
000067 1  2
000067 1  2      CpuReloadComplete^CkptKind ->
000070 1  2          AssertTruth( DataLen = Ele^ByteLen( CpuReloadCkpt ) );
000070 1  2          AssertTruth( G.CpuReloadOp.State = Nil^CpuReloadOpState );
000070 1  2          AssertTruth( G.CpuReloadOp.ReloadeeCpuNum = - 1 );
000070 1  2
000070 1  2          ReloadeeCpuNum := CpuReloadCkpt.ReloadeeCpuNum;
000076 1  2          AssertTruth( G.CpuStateArray[ ReloadeeCpuNum ] = Reloading^CpuState );
000076 1  2          G.CpuStateArray[ ReloadeeCpuNum ] := Up^CpuState;
000103 1  2
000103 1  2      CpuReloadFailed^CkptKind ->
000104 1  2          AssertTruth( DataLen = Ele^ByteLen( CpuReloadCkpt ) );
000104 1  2          AssertTruth( G.CpuReloadOp.State = Nil^CpuReloadOpState );
000104 1  2          AssertTruth( G.CpuReloadOp.ReloadeeCpuNum = - 1 );
000104 1  2
000104 1  2          ReloadeeCpuNum := CpuReloadCkpt.ReloadeeCpuNum;
000112 1  2          AssertTruth( G.CpuStateArray[ ReloadeeCpuNum ] = Reloading^CpuState );
000112 1  2          G.CpuStateArray[ ReloadeeCpuNum ] := FailedReload^CpuState;
000117 1  2
000117 1  2      CpuDownBegin^CkptKind ->
000120 1  2          AssertTruth( DataLen = Ele^ByteLen( CpuDownCkpt ) );
000120 1  2          AssertTruth( G.CpuDownOp.State = Nil^CpuDownOpState );
000120 1  2          AssertTruth( G.CpuDownOp.FailedCpuNum = - 1 );
000120 1  2
000120 1  2          FailedCpuNum := CpuDownCkpt.FailedCpuNum;
000126 1  2          CpuState := G.CpuStateArray[ FailedCpuNum ];
000132 1  2
000132 1  2          PermAssertTruth( CpuState = Up^CpuState OR
000132 1  2                           CpuState = FailedReload^CpuState OR
000132 1  2                           CpuState = FailedDown^CpuState OR
000132 1  2                           CpuState = Down^CpuState );
000152 1  2
000152 1  2          G.CpuStateArray[ FailedCpuNum ] := Downing^CpuState;
000157 1  2
000157 1  2      CpuDownComplete^CkptKind ->
000160 1  2          AssertTruth( DataLen = Ele^ByteLen( CpuDownCkpt ) );
000160 1  2          AssertTruth( G.CpuDownOp.State = Nil^CpuDownOpState );
000160 1  2          AssertTruth( G.CpuDownOp.FailedCpuNum = - 1 );
000160 1  2
000160 1  2          FailedCpuNum := CpuDownCkpt.FailedCpuNum;
000166 1  2          PermAssertTruth( G.CpuStateArray[ FailedCpuNum ] = Downing^CpuState );
000200 1  2          G.CpuStateArray[ FailedCpuNum ] := Down^CpuState;
000210 1  2
000210 1  2      CpuDownFailed^CkptKind ->
000211 1  2          AssertTruth( DataLen = Ele^ByteLen( CpuDownCkpt ) );
000211 1  2          AssertTruth( G.CpuDownOp.State = Nil^CpuDownOpState );
000211 1  2          AssertTruth( G.CpuDownOp.FailedCpuNum = - 1 );
000211 1  2
000211 1  2          FailedCpuNum := CpuDownCkpt.FailedCpuNum;
000217 1  2          PermAssertTruth( G.CpuStateArray[ FailedCpuNum ] = Downing^CpuState );
000231 1  2          G.CpuStateArray[ FailedCpuNum ] := FailedDown^CpuState;
000236 1  2
000236 1  2      ModuleState^CkptKind ->
000237 1  2          AssertTruth( DataLen = Ele^ByteLen( ModuleStateCkpt ) );
000237 1  2          G.CpuStateArray ':=' ModuleStateCkpt.CpuStateArray FOR Max^Cpus WORDS;
```

TmpControl^ReceiveCheckpoint

```
000251 1  2
000251 1  2       G.TmpState := ModuleStateCkpt.TmpState;
000260 1  2
000260 1  2       G.OperationNum := ModuleStateCkpt.OperationNum;
000267 1  2       IF ModuleStateCkpt.OperationNum <> -1 THEN
000276 1  2           CALL TmpOperation^ReceiveCkptInfo(
000276 1  2                                   ModuleStateCkpt.OperationCkptInfo, True );
000305 1  2
000305 1  2       G.StartOp.State := ModuleStateCkpt.StartOp.State;
000314 1  2
000314 1  2       G.StartOp.Command ':=' ModuleStateCkpt.StartOp.Command FOR 1 ELEMENTS;
000326 1  2
000326 1  2       StartTmfTimeStamp := ModuleStateCkpt.StartOp.TimeStamp;
000335 1  2
000335 1  2       G.StopOp.State := ModuleStateCkpt.StopOp.State;
000344 1  2
000344 1  2       G.DeleteOp.State := ModuleStateCkpt.DeleteOp.State;
000353 1  2
000353 1  2       G.GlobInfoRecord ':=' ModuleStateCkpt.GlobInfoRecord FOR 1 ELEMENTS;
000367 1  2       TmfConfigurationSeqNum := G.GlobInfoRecord.TmfConfigurationSeqNum;
000374 1  2
000374 1  2   TmfStarting^CkptKind ->
000375 1  2       AssertTruth( DataLen = Ele^ByteLen( StartCkpt ) );
000375 1  2       PermAssertTruth( G.TmpState = Stopped^TmpState );
000405 1  2       G.TmpState := Starting^TmpState;
000410 1  2
000410 1  2       PermAssertTruth( G.StartOp.State = None^StartOpState );
000421 1  2       G.StartOp.State := ReadyForLowStart^StartOpState;
000424 1  2
000424 1  2       G.OperationNum := StartCkpt.OperationNum;
000433 1  2       CALL TmpOperation^ReceiveCkptInfo( StartCkpt.OperationCkptInfo,
000433 1  2                                          False );
000442 1  2
000442 1  2       G.StartOp.Command ':=' StartCkpt.Command FOR 1 ELEMENTS;
000454 1  2
000454 1  2       StartTmfTimeStamp := StartCkpt.TimeStamp;
000463 1  2
000463 1  2   TmfStopping^CkptKind ->
000464 1  2       AssertTruth( DataLen = Ele^ByteLen( StopCkpt ) );
000464 1  2       PermAssertTruth( G.TmpState = Started^TmpState );
000475 1  2       G.TmpState := Stopping^TmpState;
000500 1  2
000500 1  2       PermAssertTruth( G.StopOp.State = None^StopOpState );
000511 1  2       G.StopOp.State := FirstHighStop^StopOpState;
000514 1  2
000514 1  2       G.OperationNum := StopCkpt.OperationNum;
000523 1  2       CALL TmpOperation^ReceiveCkptInfo( StopCkpt.OperationCkptInfo, False );
000532 1  2
000532 1  2   TmfDeleting^CkptKind ->
000533 1  2       AssertTruth( DataLen = Ele^ByteLen( DeleteCkpt ) );
000533 1  2       PermAssertTruth( G.TmpState = Stopped^TmpState );
000543 1  2       G.TmpState := Deleting^TmpState;
000546 1  2
000546 1  2       PermAssertTruth( G.DeleteOp.State = None^DeleteOpState );
000557 1  2       G.DeleteOp.State := FirstDeleting^DeleteOpState;
000562 1  2
000562 1  2       G.OperationNum := DeleteCkpt.OperationNum;
```

TmpControl^ReceiveCheckpoint

```
000571 1  2          CALL TmpOperation^ReceiveCkptInfo( DeleteCkpt.OperationCkptInfo,
000571 1  2                                             False );
000600 1  2          G.GlobInfoRecord.DeleteTmfInProgress := True;
000603 1  2
000603 1  2      NewStartOpState^CkptKind ->
000604 1  2          AssertTruth( DataLen = Ele^ByteLen( NewStateCkpt ) );
000604 1  2          G.StartOp.State := NewStateCkpt.NewState;
000613 1  2
000613 1  2      NewStopOpState^CkptKind ->
000614 1  2          AssertTruth( DataLen = Ele^ByteLen( NewStateCkpt ) );
000614 1  2          G.StopOp.State := NewStateCkpt.NewState;
000623 1  2
000623 1  2      NewDeleteOpState^CkptKind ->
00..24 1  2          AssertTruth( DataLen = Ele^ByteLen( NewStateCkpt ) );
000624 1  2          G.DeleteOp.State := NewStateCkpt.NewState;
000633 1  2
000633 1  2      TmfStarted^CkptKind ->
000634 1  2          AssertTruth( DataLen = Ele^ByteLen( EndOperCkpt ) );
000634 1  2          PermAssertTruth( G.TmpState = Starting^TmpState );
000645 1  2          G.TmpState := Started^TmpState;
000650 1  2
000650 1  2          PermAssertTruth( G.StartOp.State = EndOperation^StartOpState );
000663 1  2          G.StartOp.State := None^StartOpState;
000666 1  2
000666 1  2          G.OperationNum := -1;
000671 1  2          CALL TmpOperation^ReceiveCkptInfo( EndOperCkpt.OperationCkptInfo,
000671 1  2                                             F, 'se );
000700 1  2
000700 1  2      TmfStopped^CkptKind ->
000701 1  2          AssertTruth( DataLen = Ele^ByteLen( EndOperCkpt ) );
000701 1  2          PermAssertTruth( G.TmpState = Stopping^TmpState );
000712 1  2          G.TmpState := Stopped^TmpState;
000715 1  2
000715 1  2          StartTmfTimeStamp := 0F;
000721 1  2
000721 1  2          PermAssertTruth( G.StopOp.State = EndOperation^StopOpState );
000732 1  2          G.StopOp.State := None^StopOpState;
000735 1  2
000735 1  2          G.OperationNum := -1;
000740 1  2          CALL TmpOperation^ReceiveCkptInfo( EndOperCkpt.OperationCkptInfo,
000740 1  2                                             False );
000747 1  2
000747 1  2      TmfDeleted^CkptKind ->
000750 1  2          AssertTruth( DataLen = Ele^ByteLen( EndOperCkpt ) );
000750 1  2          PermAssertTruth( G.TmpState = Deleting^TmpState );
000761 1  2          G.TmpState := Stopped^TmpState;
000764 1  2
000764 1  2          PermAssertTruth( G.DeleteOp.State = EndOperation^DeleteOpState );
000775 1  2          G.DeleteOp.State := None^DeleteOpState;
001000 1  2
001000 1  2          G.OperationNum := -1;
001003 1  2          CALL TmpOperation^ReceiveCkptInfo( EndOperCkpt.OperationCkptInfo,
001003 1  2                                             False );
001012 1  2          G.GlobInfoRecord.DeleteTmfInProgress := False;
001015 1  2
001015 1  2      DoStopStep^CkptKind ->
001016 1  2          AssertTruth( DataLen = Ele^ByteLen( DoStopStepCkpt ) );
```

```
                                        TmpControl^ReceiveCheckpoint
1844.   001016 1  2             PermAssertTruth( G.TmpState = Stopping^TmpState );
1845.   001027 1  2             PermAssertTruth( G.StopOp.State = LowStop^StopOpState );
1846.   001040 1  2
1847.   001040 1  2             CALL TmpControl^ExecuteStep( Stop^Phase, DoStopStepCkpt.CurrentStep );
1848.   001050 1  2
1849.   001050 1  2         OperEventIssued^CkptKind ->
1850.   001051 1  2             AssertTruth( DataLen = Ele^ByteLen( OperEventIssuedCkpt ) );
1851.   001051 1  2             CALL TmpOperation^ReceiveCkptInfo(
1852.   001051 1  2                                     OperEventIssuedCkpt.OperationCkptInfo,
1853.   001051 1  2                                     False );
1854.   001060 1  2
1855.   001060 1  2         BeginCoordTakeOver^CkptKind ->
1856.   001061 1  2             G.CoordTakeOverInProgress := True;
1857.   001064 1  2
1858.   001064 1  2         EndCoordTakeOver^CkptKind ->
1859.   001065 1  2             G.CoordTakeOverInProgress := False;
1860.   001070 1  2
1861.   001070 1  2         ConfigSeqNum^CkptKind ->
1862.   001071 1  2             G.GlobInfoRecord.TmfConfigurationSeqNum := ConfSeqNumCkpt.ConfSeqNum;
1863.   001101 1  2             TmfConfigurationSeqNum := ConfSeqNumCkpt.ConfSeqNum;
1864.   001110 1  2
1865.   001110 1  2         AlterCtg^CkptKind ->
1866.   001111 1  2             AssertTruth( DataLen = Ele^ByteLen( AlterCtgCkpt ) );
1867.   001111 1  2             G.GlobInfoRecord.CtgInfo ':='
1868.   001111 1  2                         AlterCtgCkpt.AlterCtgCkptInfo FOR 1 ELEMENTS;
1869.   001125 1  2
1870.   001125 1  2         DeleteCtg^CkptKind ->
1871.   001126 1  2             G.DeleteCatalog := DeleteCtgCkpt.Status^Operation;
1872.   001137 1  2
1873.   001137 1  2         OTHERWISE ->
1874.   001140 1  2             UndefinedCaseError;
1875.   001145 1  2         END;
1876.   001211 1  1     END;

ALTERCTGCKPT                    Variable,6      STRUCT-I        EXT Pointer     L-005
CONFSEQNUMCKPT                  Variable,12     STRUCT-I        EXT Pointer     L-005
CPUDOWNCKPT                     Variable,4      STRUCT-I        EXT Pointer     L-005
CPURELOADCKPT                   Variable,4      STRUCT-I        EXT Pointer     L-005
CPUSTATE                        Variable        INT             Direct          L+003
DATA                            Variable        INT             EXT Pointer     L-005
DATALEN                         Variable        INT             Direct          L-003
DELETECKPT                      Variable,42     STRUCT-I        EXT Pointer     L-005
DELETECTGCKPT                   Variable,4      STRUCT-I        EXT Pointer     L-005
DOSTOPSTEPCKPT                  Variable,4      STRUCT-I        EXT Pointer     L-005
ENDOPERCKPT                     Variable,40     STRUCT-I        EXT Pointer     L-005
FAILEDCPUNUM                    Variable        INT             Direct          L+002
MODULESTATECKPT                 Variable,310    STRUCT-I        EXT Pointer     L-005
NEWSTATECKPT                    Variable,4      STRUCT-I        EXT Pointer     L-005
OPEREVENTISSUEDCKPT             Variable,40     STRUCT-I        EXT Pointer     L-005
RELOADEECPUNUM                  Variable        INT             Direct          L+001
SHORTCKPT                       Variable,2      STRUCT-I        EXT.Pointer     L-005
STARTCKPT                       Variable,60     STRUCT-I        EXT Pointer     L-005
STOPCKPT                        Variable,42     STRUCT-I        EXT Pointer     L-005

000000  002003 060705 000410 110576 103040 143000 001004 012005     000010  100001 000002 100002 024733 027000 100005 103040 147000
000020  110562 103040 143000 001005 012005 100001 000002 100002     000030  024733 027000 103132 143000 014405 100001 000002 100002
```

TmpControl^ReceiveCheckpoint

```
000040  024733 027000 100777 103132 147000 102054 162000 100000
000060  000410 044401 100004 040401 003051 000117 147000 110513
000100  003051 000117 147000 110477 100000 100002 060705 000220
000120  100000 100002 060705 000220 000410 034402 003051 000117
000140  001003 012010 040403 001002 012005 100001 000002 100002
000160  100000 100002 060705 000220 000410 034402 003051 000117
000200  100002 010402 000744 001006 040402 003051 000117 147000
000220  000117 143000 001006 012005 100001 000002 100002 024733
000240  103051 173000 130001 100000 100002 060705 000220 100040
000260  100000 100044 060705 000220 000410 101113 145000 100000
000300  060705 000220 100777 024722 027000 100000 100104 060705
000320  100000 100106 060705 000220 100006 000417 100000 100114
000340  000220 000410 102123 146000 100000 100126 060705 000220
000360  000200 100000 100130 060705 000220 100160 000417 101325
000400  100001 000002 100002 024733 027000 100001 103112 147000
000420  027000 100051 103114 147000 100000 100002 060705 000220
000440  024722 027000 100000 170000 130001 003232 100000 100042
000460  000414 070004 000230 110576 103112 143000 001002 012005
000500  102123 142000 001062 012005 100001 000002 100002 024733
000520  000410 102113 146000 100000 100004 060705 000220 100000
000540  100002 024733 027000 100004 103112 147000 102127 142000
000560  103127 147000 100000 100002 060705 000220 000410 102113
000600  100777 103331 147000 110456 100000 100002 060705 000220
000620  000410 103123 147000 110436 100000 100002 060705 000220
000640  100001 000002 100002 024733 027000 100002 103112 147000
000660  027000 010401 000327 100050 103114 147000 100777 102113
000700  110761 103112 143000 001003 012005 100001 000002 100002
000720  000230 102123 142000 001070 012005 100001 000002 100002
000740  100000 100002 060705 000220 100000 024722 027000 110712
000760  027000 100000 103112 147000 102127 142000 001077 012005
001000  100777 102113 146000 100000 100002 060705 000220 100000
001020  001003 012005 100001 000002 100002 024733 027000 103123
001040  100005 100000 100002 060705 000220 000410 024711 027000
001060  010530 100777 103041 147000 010524 100000 103041 147000
001100  000230 100000 100002 060705 000220 000414 070000 000230
001120  100002 060705 000220 100004 000417 010463 100000 100002
001140  100001 000002 100002 024733 027000 010443 003777 100030
001160  176674 176707 176722 176735 176774 177024 177051 177206
001200  177616 177650 177657 177662 177665 177704 177720 177731
```

```
000050  100003 024733 027000 110527 100000 100002 060705 000220
000070  100000 100002 060705 000220 000410 044401 100001 040401
000110  000410 044401 100005 040401 003051 000117 147000 110463
000130  143000 034403 001001 012016 040403 001005 012013 040403
000150  024733 027000 100006 040402 003051 000117 147000 110423
000170  143000 001006 012005 100001 000002 100002 024733 027000
000210  110772 100000 100002 060705 000220 000410 034402 003051
000230  027000 100003 040402 003051 000117 147000 110744 100000
000250  000417 100000 100042 060705 000220 000410 102112 146000
000270  100044 060705 000220 000410 001777 012007 100000 100046
000310  000220 000410 103114 147000 100000 170000 130001 003232
000330  060705 000220 000414 070004 000230 100000 100124 060705
000350  000410 101127 145000 100000 170000 130001 005001 004250
000370  171000 000234 070000 000230 110606 103112 143000 014405
000410  102114 142000 001050 012005 100001 000002 100002 024733
000430  000410 102113 146000 100000 100004 060705 000220 100000
000450  060705 000220 100006 000417 100000 100050 060705 000220
000470  100001 000002 100002 024733 027000 100003 103112 147000
000510  027000 100063 103123 147000 100000 100002 060705 000220
000530  024722 027000 110527 103112 143000 014405 100001 000002
000550  001074 012005 100001 000002 100002 024733 027000 100076
000570  146000 100000 100004 060705 000220 100000 024722 027000
000610  000410 103114 147000 110446 100000 100002 060705 000220
000630  000410 103127 147000 110426 103112 143000 001001 012005
000650  102114 142000 001056 012007 100001 000002 100002 024733
000670  146000 100000 100002 060705 000220 100000 024722 027000
000710  024733 027000 100000 103112 147000 000002 000002 070004
000730  024733 027000 100062 103123 147000 100777 102113 146000
000750  103112 143000 001004 012005 100001 000002 100002 024733
000770  100001 000002 100002 024733 027000 100074 103127 147000
001010  024722 027000 100000 103331 147000 010573 103112 143000
001030  143000 001067 012005 100001 000002 100002 024733 027000
001050  010540 100000 100002 060705 000220 100000 024722 027000
001070  010520 100000 100002 060705 000220 000414 103325 173000
001110  010500 100000 170000 130001 005001 004264 000200 100000
001130  060705 000220 000410 005001 004167 000117 147000 010451
001150  000205 000100 016002 000107 100031 000030 176626 176642
001170  177274 177342 177412 177421 177430 177437 177503 177551
001210  000000 125006
```

```
                                     TmpControl^SendCkpt
000000 0  0   PROC TmpControl^SendCkpt( Data, DataLen );
000000 1  0
000000 1  0   !--------------------------------------------------------------------------------
000000 1  0   !
000000 1  0   !--------------------------------------------------------------------------------
000000 1  0
000000 1  0   Word  .EXT Data;
000000 1  0                           ! IN
000000 1  0
000000 1  0   Int  DataLen;
000000 1  0                           ! IN
000000 1  0
000000 1  0   BEGIN
000000 1  1       ! Beginning of code...
000000 1  1
000000 1  1       IF G.Checkpointing THEN
000003 1  1           CALL TmpCheckpoint^Send( TmpControl^ReceiveCheckpoint, Data, DataLen,
000003 1  1                                    Hurry^TmpCheckpoint );
000015 1  1   END;

DATA                            Variable       INT              EXT Pointer    L-005
DATALEN                         Variable       INT              Direct         L-003

000000  103042 143000 014412 010401 000000 020376 000454 060705     000010  040703 100777 100017 024755 027000 125006
```

TmpControl^CheckpointShort

```
000000 0  0   PROC TmpControl^CheckpointShort( Kind );
000000 1  0
000000 1  0   !------------------------------------------------------------------------------
000000 1  0   !
000000 1  0   !------------------------------------------------------------------------------
000000 1  0
000000 1  0   Int  Kind;
000000 1  0                      ! IN
000000 1  0
000000 1  0   BEGIN
000000 1  1       STRUCT  .ShortCkpt( ShortCkpt^Struct );
000000 1  1
000000 1  1       ! Beginning of code...
000000 1  1
000000 1  1       Struct^Zero( ShortCkpt );
000017 1  1
000017 1  1       ShortCkpt.Kind := Kind;
000021 1  1
000021 1  1       CALL TmpControl^SendCkpt( ShortCkpt, Ele^ByteLen( ShortCkpt ) );
000027 1  1   END;

KIND                        Variable      INT          Direct       L-003
SHORTCKPT                   Variable,2    STRUCT       Indirect     L+001

000000  070402 024700 002001 000002 170401 130001 000407 000003    000010  100000 170401 130001 000220 000103 100001 000417 040703
000020  144401 100000 170401 130001 100002 024722 027000 125004    000030
```

TmpControl^CheckpointNewState

```
000000 0  0   PROC TmpControl^CheckpointNewState( Kind, NewState );
000000 1  0
000000 1  0   !------------------------------------------------------------------------------
000000 1  0   !
000000 1  0   !------------------------------------------------------------------------------
000000 1  0
000000 1  0   Int  Kind;
000000 1  0                        ! IN
000000 1  0
000000 1  0   Int  NewState;
000000 1  0                        ! IN
000000 1  0
000000 1  0   BEGIN
000000 1  1       STRUCT  .NewStateCkpt( NewStateCkpt^Struct );
000000 1  1
000000 1  1       ! Beginning of code...
000000 1  1
000000 1  1       Struct^Zero( NewStateCkpt );
000017 1  1
000017 1  1       NewStateCkpt.Kind := Kind;
000021 1  1       NewStateCkpt.NewState := NewState;
000024 1  1
000024 1  1       CALL TmpControl^SendCkpt( NewStateCkpt, Ele^ByteLen( NewStateCkpt ) );
000032 1  1   END;

KIND                          Variable      INT           Direct        L-004
NEWSTATE                      Variable      INT           Direct        L-003
NEWSTATECKPT                  Variable,4    STRUCT        Indirect      L+001

000000  070402 024700 002002 000002 170401 130001 000407 000003     000010  100000 170401 130001 000220 000103 100003 000417 040704
000020  144401 040703 103001 147401 100000 170401 130001 100004     000030  024722 027000 125005
```

TmpControl^CheckpointCpuReload

```
000000 0  0   PROC TmpControl^CheckpointCpuReload( Kind, ReloadeeCpuNum );
000000 1  0
000000 1  0   !--------------------------------------------------------------------------
000000 1  0   !
000000 1  0   !--------------------------------------------------------------------------
000000 1  0
000000 1  0   Int  Kind;
000000 1  0                           ! IN
000000 1  0
000000 1  0   Int  ReloadeeCpuNum;
000000 1  0                           ! IN
000000 1  0
000000 1  0   BEGIN
000000 1  1       STRUCT  .CpuReloadCkpt( CpuReloadCkpt^Struct );
000000 1  1
000000 1  1       ! Beginning of code...
000000 1  1
000000 1  1       Struct^Zero( CpuReloadCkpt );
000017 1  1
000017 1  1       CpuReloadCkpt.Kind := Kind;
000021 1  1       CpuReloadCkpt.ReloadeeCpuNum := ReloadeeCpuNum;
000024 1  1
000024 1  1       CALL TmpControl^SendCkpt( CpuReloadCkpt, Ele^ByteLen( CpuReloadCkpt ) );
000032 1  1   END;

CPURELOADCKPT                 Variable,4    STRUCT     Indirect    L+001
KIND                          Variable      INT        Direct      L-004
RELOADEECPUNUM                Variable      INT        Direct      L-003

000000  070402 024700 002002 000002 170401 130001 000407 000003     000010  100000 170401 130001 000220 000103 100003 000417 040704
000020  144401 040703 103001 147401 100000 170401 130001 100004     000030  024722 027000 125005
```

```
                                TmpControl^CheckpointCpuDown
000000 0  0   PROC TmpControl^CheckpointCpuDown( Kind, FailedCpuNum );
000000 1  0
000000 1  0   !---------------------------------------------------------------------------
000000 1  0   !
000000 1  0   !---------------------------------------------------------------------------
000000 1  0
000000 1  0   Int  Kind;
000000 1  0                          ! IN
000000 1  0
000000 1  0   Int  FailedCpuNum;
000000 1  0                          ! IN
000000 1  0
000000 1  0   BEGIN
000000 1  1       STRUCT   .CpuDownCkpt( CpuDownCkpt^Struct );
000000 1  1
000000 1  1       ! Beginning of code...
000000 1  1
000000 1  1       Struct^Zero( CpuDownCkpt );
000017 1  1
000017 1  1       CpuDownCkpt.Kind := Kind;
000021 1  1       CpuDownCkpt.FailedCpuNum := FailedCpuNum;
000024 1  1
000024 1  1       CALL TmpControl^SendCkpt( CpuDownCkpt, Ele^ByteLen( CpuDownCkpt ) );
000032 1  1   END;

CPUDOWNCKPT                     Variable,4    STRUCT        Indirect      L+001
FAILEDCPUNUM                    Variable      INT           Direct        L-003
KIND                            Variable      INT           Direct        L-004

000000  070402 024700 002002 000002 170401 130001 000407 000003     000010  100000 170401 130001 000220 000103 100003 000417 040704
000020  144401 040703 103001 147401 100000 170401 130001 100004     000030  024722 027000 125005
```

TmpControl^CheckpointConfSeqNum

```
000000 0  0   PROC TmpControl^CheckpointConfSeqNum( ConfSeqNum );
000000 1  0
000000 1  0   !-------------------------------------------------------------------------
000000 1  0   !
000000 1  0   !-------------------------------------------------------------------------
000000 1  0
000000 1  0   FIXED       ConfSeqNum;          ! (in)  New value of TMF configuration
000000 1  0                                    !       sequence number.
000000 1  0
000000 1  0   BEGIN
000000 1  1       STRUCT  .ConfSeqNumCkpt( ConfSeqNumCkpt^Struct );
000000 1  1
000000 1  1       ! Beginning of code...
000000 1  1
000000 1  1       Struct^Zero( ConfSeqNumCkpt );
000017 1  1
000017 1  1       ConfSeqNumCkpt.Kind := ConfigSeqNum^CkptKind;
000021 1  1       ConfSeqNumCkpt.ConfSeqNum := ConfSeqNum;
000026 1  1
000026 1  1       CALL TmpControl^SendCkpt( ConfSeqNumCkpt, Ele^ByteLen( ConfSeqNumCkpt ) );
000034 1  1   END;

CONFSEQNUM                  Variable       FIXED (0)      Direct        L-006
CONFSEQNUMCKPT              Variable,12    STRUCT         Indirect      L+001

000000  070402 024700 002005 000002 170401 130001 000407 000003    000010  100000 170401 130001 000220 000103 100011 000417 100027
000020  144401 070706 000234 103001 173401 000230 100000 170401    000030  130001 100012 024722 027000 125007
```

TmpControl^CkptModuleState

```
000000 0  0   PROC TmpControl^CkptModuleState;
000000 1  0
000000 1  0   |------------------------------------------------------------------------
000000 1  0   !
000000 1  0   |------------------------------------------------------------------------
000000 1  0
000000 1  0   BEGIN
000000 1  1       STRUCT  .ModuleStateCkpt( ModuleStateCkpt^Struct );
000000 1  1
000000 1  1       ! Beginning of code...
000000 1  1
000000 1  1       Struct^Zero( ModuleStateCkpt );
000017 1  1
000017 1  1       ModuleStateCkpt.Kind := ModuleState^CkptKind;
000021 1  1
000021 1  1       ModuleStateCkpt.CpuStateArray ':=' G.CpuStateArray FOR Max^Cpus WORDS;
000027 1  1
000027 1  1       ModuleStateCkpt.TmpState := G.TmpState;
000033 1  1
000033 1  1       ModuleStateCkpt.OperationNum := G.OperationNum;
000037 1  1       IF G.OperationNum <> -1 THEN
000043 1  1           CALL TmpOperation^GetCkptInfo( G.OperationNum,
000043 1  1                                          ModuleStateCkpt.OperationCkptInfo );
000052 1  1
000052 1  1       ModuleStateCkpt.StartOp.State := G.StartOp.State;
000056 1  1       ModuleStateCkpt.StartOp.Command ':=' G.StartOp.Command FOR 1 ELEMENTS;
000066 1  1       ModuleStateCkpt.StartOp.TimeStamp := StartTmfTimeStamp;
000073 1  1
000073 1  1       ModuleStateCkpt.StopOp.State := G.StopOp.State;
000077 1  1
000077 1  1       ModuleStateCkpt.DeleteOp.State := G.DeleteOp.State;
000103 1  1
000103 1  1       ModuleStateCkpt.GlobInfoRecord ':=' G.GlobInfoRecord FOR 1 ELEMENTS;
000115 1  1
000115 1  1       CALL TmpControl^SendCkpt( ModuleStateCkpt,
000115 1  1                                 Ele^ByteLen( ModuleStateCkpt ) );
000123 1  1   END;
MODULESTATECKPT                Variable,310   STRUCT        Indirect      L+001

000000  070402 024700 002144 000002 170401 130001 000407 000003     000010  100000 170401 130001 000220 000103 100307 000417 100011
000020  144401 103001 173401 102051 172000 100020 026007 101112     000030  141000 103021 147401 103113 143000 103022 147401 103113
000040  143000 001777 012007 143000 100000 170401 130001 003046     000050  024722 027000 103114 143000 102042 146401 170401 030001
000060  003106 170000 030001 003232 100006 126007 07000, 000234     000070  101046 171401 000230 103123 143000 103052 147401 103127
000100  143000 103053 147401 170401 030001 003130 170000 030001     000110  005001 004250 000200 100160 126007 100000 170401 130001
000120  100310 024722 027000 125003
```

TmpControl^CheckpointStart

```
000000 0  0   PROC TmpControl^CheckpointStart( OperationNum, OperationCkptInfo,
000000 1  0                                    Command, TimeStamp );
000000 1  0
000000 1  0   !-----------------------------------------------------------------------
000000 1  0   !
000000 1  0   !-----------------------------------------------------------------------
000000 1  0
000000 1  0   Int   OperationNum;
000000 1  0                         ! IN
000000 1  0
000000 1  0   STRUCT   .EXT OperationCkptInfo( TmpOperationCkptInfo^Struct );
000000 1  0                         ! IN
000000 1  0
000000 1  0   STRUCT   .EXT Command( TmpUserTmfStartCommand^Struct );
000000 1  0                         ! IN
000000 1  0
000000 1  0   FIXED  TimeStamp;
000000 1  0                         ! IN
000000 1  0
000000 1  0   BEGIN
000000 1  1       STRUCT   .StartCkpt( StartCkpt^Struct );
000000 1  1
000000 1  1       ! Beginning of code...
000000 1  1
000000 1  1       Struct^Zero( StartCkpt );
000017 1  1
000017 1  1       StartCkpt.Kind := TmfStarting^CkptKind;
000021 1  1       StartCkpt.OperationNum := OperationNum;
000024 1  1       StartCkpt.OperationCkptInfo ':=' OperationCkptInfo FOR 1 ELEMENTS;
000033 1  1
000033 1  1       StartCkpt.Command ':=' Command FOR 1 ELEMENTS;
000042 1  1
000042 1  1       StartCkpt.TimeStamp := TimeStamp;
000047 1  1
000047 1  1       CALL TmpControl^SendCkpt( StartCkpt, Ele^ByteLen( StartCkpt ) );
000055 1  1   END;

COMMAND                     Variable,6     STRUCT-I       EXT Pointer    L-010
OPERATIONCKPTINFO           Variable,36    STRUCT-I       EXT Pointer    L-012
OPERATIONNUM                Variable       INT            Direct         L-013
STARTCKPT                   Variable,60    STRUCT         Indirect       L+001
TIMESTAMP                   Variable       FIXED (0)      Direct         L-006

000000  070402 024700 002030 000002 170401 130001 000407 000003     000010  100000 170401 130001 000220 000103 100057 000417 100012
000020  144401 040713 103001 147401 100000 170401 130001 003004     000030  060712 100036 000417 100000 170401 130001 003042 060710
000040  100006 000417 070706 000234 102005 170401 000232 100000     000050  170401 130001 100060 024722 027000 125014
```

TmpControl^CheckpointStop

```
2091.   000000 0  0   PROC TmpControl^CheckpointStop( OperationNum, OperationCkptInfo );
2092.   000000 1  0
2093.   000000 1  0   !--------------------------------------------------------------------------------
2094.   000000 1  0   !
2095.   000000 1  0   !--------------------------------------------------------------------------------
2096.   000000 1  0
2097.   000000 1  0   Int  OperationNum;
2098.   000000 1  0                        ! IN
2099.   000000 1  0
2100.   000000 1  0   STRUCT  .OperationCkptInfo( TmpOperationCkptInfo^Struct );
2101.   000000 1  0                        ! IN
2102.   000000 1  0
2103.   000000 1  0   BEGIN
2104.   000000 1  1       STRUCT  .StopCkpt( StopCkpt^Struct );
2105.   000000 1  1
2106.   000000 1  1       ! Beginning of code...
2107.   000000 1  1
2108.   000000 1  1       Struct^Zero( StopCkpt );
2109.   000017 1  1
2110.   000017 1  1       StopCkpt.Kind := TmfStopping^CkptKind;
2111.   000021 1  1       StopCkpt.OperationNum := OperationNum;
2112.   000024 1  1       StopCkpt.OperationCkptInfo ':=' OperationCkptInfo FOR 1 ELEMENTS;
2113.   000035 1  1
2114.   000035 1  1       CALL TmpControl^SendCkpt( StopCkpt, Ele^ByteLen( StopCkpt ) );
2115.   000043 1  1   END;

OPERATIONCKPTINFO              Variable,36    STRUCT-I      Indirect      L-003
OPERATIONNUM                   Variable       INT           Direct        L-004
STOPCKPT                       Variable,42    STRUCT        Indirect      L+001

000000  070402 024700 002021 000002 170401 130001 000407 000003     000010  100000 170401 130001 000220 000103 100041 000417 100013
000020  144401 040704 103001 147401 100000 170401 130001 003004     000030  100000 170703 130001 100036 000417 100000 170401 130001
000040  100042 024722 027000 125005
```

TmpControl^CheckpointDelete

```
2117.    000000 0  0   PROC TmpControl^CheckpointDelete( OperationNum, OperationCkptInfo );
2118.    000000 1  0
2119.    000000 1  0   !------------------------------------------------------------------------------
2120.    000000 1  0   !
2121.    000000 1  0   !------------------------------------------------------------------------------
2122.    000000 1  0
2123.    000000 1  0   Int  OperationNum;
2124.    000000 1  0                    ! IN
2125.    000000 1  0
2126.    000000 1  0   STRUCT  .OperationCkptInfo( TmpOperationCkptInfo`Struct );
2127.    000000 1  0                    ! IN
2128.    000000 1  0
2129.    000000 1  0   BEGIN
2130.    000000 1  1       STRUCT  .DeleteCkpt( DeleteCkpt^Struct );
2131.    000000 1  1
2132.    000000 1  1       ! Beginning of code...
2133.    000000 1  1
2134.    000000 1  1       Struct^Zero( DeleteCkpt );
2135.    000017 1  1
2136.    000017 1  1       DeleteCkpt.Kind := TmfDeleting^CkptKind;
2137.    000021 1  1       DeleteCkpt.OperationNum := OperationNum;
2138.    000024 1  1       DeleteCkpt.OperationCkptInfo ':=' OperationCkptInfo FOR 1 ELEMENTS;
2139.    000035 1  1
2140.    000035 1  1       CALL TmpControl^SendCkpt( DeleteCkpt, Ele^ByteLen( DeleteCkpt ) );
2141.    000043 1  1   END;

DELETECKPT                      Variable,42     STRUCT          Indirect        L+001
OPERATIONCKPTINFO               Variable,36     STRUCT-I        Indirect        L-003
OPERATIONNUM                    Variable        INT             Direct          L-004

000000  070402 024700 002021 000002 170401 130001 000407 000003     000010  100000 170401 130001 000220 000103 100041 000417 100014
000020  144401 040704 103001 147401 100000 170401 130001 003004     000030  100000 170703 130001 100036 000417 100000 170401 130001
000040  100042 024722 027000 125005
```

```
                                  TmpControl^CkptOperEventIssued
000000 0  0   PROC TmpControl^CkptOperEventIssued( OperationCkptInfo );
000000 1  0
000000 1  0   !------------------------------------------------------------------------
000000 1  0   !
000000 1  0   !------------------------------------------------------------------------
000000 1  0
000000 1  0   STRUCT  .OperationCkptInfo( TmpOperationCkptInfo^Struct );
000000 1  0                         ! IN
000000 1  0
000000 1  0   BEGIN
000000 1  1       STRUCT  .OperEventIssuedCkpt( OperEventIssuedCkpt^Struct );
000000 1  1
000000 1  1       ! Beginning of code...
000000 1  1
000000 1  1       Struct^Zero( OperEventIssuedCkpt );
000017 1  1
000017 1  1       OperEventIssuedCkpt.Kind := OperEventIssued^CkptKind;
000021 1  1       OperEventIssuedCkpt.OperationCkptInfo ':='
000021 1  1                                   OperationCkptInfo FOR 1 ELEMENTS;
000032 1  1
000032 1  1       CALL TmpControl^SendCkpt( OperEventIssuedCkpt,
000032 1  1                                Ele^ByteLen( OperEventIssuedCkpt ) );
000040 1  1   END;

OPERATIONCKPTINFO              Variable,36    STRUCT-1       Indirect      L-003
OPEREVENTISSUEDCKPT            Variable,40    STRUCT         Indirect      L+001

000000  070402 024700 002020 000002 170401 130001 000407 000003    000010  100000 170401 130001 000220 000103 100037 000417 100024
000020  144401 100000 170401 130001 003002 100000 170703 130001    000030  100036 000417 100000 170401 130001 100040 024722 027000
000040  125004
```

TmpControl^CheckpointEndOper

```
000000 0  0   PROC TmpControl^CheckpointEndOper( Kind, OperationCkptInfo );
000000 1  0
000000 1  0   !----------------------------------------------------------------------
000000 1  0   !
000000 1  0   !----------------------------------------------------------------------
000000 1  0
000000 1  0   Int  Kind;
000000 1  0                       ! IN
000000 1  0
000000 1  0   STRUCT  .OperationCkptInfo( TmpOperationCkptInfo^Struct );
000000 1  0                       ! IN
000000 1  0
000000 1  0   BEGIN
000000 1  1       STRUCT  .EndOperCkpt( EndOperCkpt^Struct );
000000 1  1
000000 1  1       ! Beginning of code...
000000 1  1
000000 1  1       Struct^Zero( EndOperCkpt );
000017 1  1
000017 1  1       EndOperCkpt.Kind := Kind;
000021 1  1       EndOperCkpt.OperationCkptInfo ':=' OperationCkptInfo FOR 1 ELEMENTS;
000032 1  1
000032 1  1       CALL TmpControl^SendCkpt( EndOperCkpt, Ele^ByteLen( EndOperCkpt ) );
000040 1  1   END;

ENDOPERCKPT                    Variable,40    STRUCT      Indirect     L+001
KIND                           Variable       INT         Direct       L-004
OPERATIONCKPTINFO              Variable,36    STRUCT-I    Indirect     L-003

000000  070402 024700 002020 000002 170401 130001 000407 000003    000010  100000 170401 130001 000220 000103 100037 000417 040704
000020  144401 100000 170401 130001 003002 100000 170703 130001    000030  100036 000417 100000 170401 130001 100040 024722 027000
000040  125005
```

```
                              TmpControl^CheckpointDoStopStep
000000 0  0   PROC TmpControl^CheckpointDoStopStep( CurrentStep );
000000 1  0
000000 1  0   !----------------------------------------------------------------------------
000000 1  0   !
000000 1  0   !----------------------------------------------------------------------------
000000 1  0
000000 1  0   Int  CurrentStep;
000000 1  0                        ! IN
000000 1  0
000000 1  0   BEGIN
000000 1  1       STRUCT  .DoStopStepCkpt( DoStopStepCkpt^Struct );
000000 1  1
000000 1  1       ! Beginning of code...
000000 1  1
000000 1  1       Struct^Zero( DoStopStepCkpt );
000017 1  1
000017 1  1       DoStopStepCkpt.Kind := DoStopStep^CkptKind;
000021 1  1       DoStopStepCkpt.CurrentStep := CurrentStep;
000024 1  1
000024 1  1       CALL TmpControl^SendCkpt( DoStopStepCkpt, Ele^ByteLen( DoStopStepCkpt ) );
000032 1  1   END;

CURRENTSTEP                    Variable      INT           Direct       L-003
DOSTOPSTEPCKPT                 Variable,4    STRUCT        Indirect     L+001

000000  070402 024700 002002 000002 170401 130001 000407 000003     000010  100000 170401 130001 000220 000103 100003 000417 100023
000020  144401 040703 103001 147401 100000 170401 130001 100004     000030  024722 027000 125004
```

TmpControl^CkptAlterCtg

```
000000 0  0   PROC  TmpControl^CkptAlterCtg;
000000 1  0
000000 1  0   !----------------------------------------------------------------------------
000000 1  0   !
000000 1  0   !----------------------------------------------------------------------------
000000 1  0
000000 1  0   BEGIN
000000 1  1       STRUCT  .AlterCtgCkpt( AlterCtgCkpt^Struct );
000000 1  1
000000 1  1       ! Beginning of code ...
000000 1  1       Struct^Zero( AlterCtgCkpt );
000017 1  1
000017 1  1       AlterCtgCkpt.Kind := AlterCtg^CkptKind;
000021 1  1
000021 1  1       AlterCtgCkpt.AlterCtgCkptInfo ':='
000021 1  1                              G.GlobInfoRecord.CtgInfo For 1 ELEMENTS;
000033 1  1
000033 1  1       CALL TmpControl^SendCkpt( AlterCtgCkpt,
000033 1  1                              Ele^ByteLen( AlterCtgCkpt ));
000041 1  1   END;

ALTERCTGCKPT                 Variable,6     STRUCT          Indirect       L+001

000000  070402 024700 002003 000002 170401 130001 000407 000003     000010  100000 170401 130001 000220 000103 100005 000417 100030
000020  144401 170401 030001 003002 170000 030001 005001 004264     000030  000200 100004 126007 100000 170401 130001 100006 024722
000040  027000 125003
```

TmpControl^CkptDeleteCtg

```
000000 0  0   PROC  TmpControl^CkptDeleteCtg(OprStatus);
000000 1  0
000000 1  0   !-----------------------------------------------------------------------
000000 1  0   !
000000 1  0   !-----------------------------------------------------------------------
000000 1  0
000000 1  0   Boolean OprStatus; !IN: True denotes start of operation.
000000 1  0                      !    False denotes end of operation.
000000 1  0
000000 1  0   BEGIN
000000 1  1        STRUCT  .DeleteCtgCkpt( DeleteCtgCkpt^Struct );
000000 1  1
000000 1  1        ! Beginning of code ...
000000 1  1        Struct^Zero( DeleteCtgCkpt );
000017 1  1
000017 1  1        DeleteCtgCkpt.Kind := DeleteCtg^CkptKind;
000021 1  1
000021 1  1        DeleteCtgCkpt.Status^Operation := OprStatus;
000024 1  1
000024 1  1        CALL TmpControl^SendCkpt( DeleteCtgCkpt,
000024 1  1                                  Ele^ByteLen( DeleteCtgCkpt ));
000032 1  1   END;

DELETECTGCKPT                Variable,4     STRUCT        Indirect      L+001
OPRSTATUS                    Variable       INT           Direct        L-003

000000  070402 024700 002002 000002 170401 130001 000407 000003     000010  100000 170401 130001 000220 000103 100003 000417 100031
000020  144401 040703 103001 147401 100000 170401 130001 100004     000030  024722 027000 125004

000000 0  0
```

TmpControl^CloseGlobInfo

```
000000 0  0   PROC TmpControl^CloseGlobInfo;
000000 1  0
000000 1  0   !-----------------------------------------------------------------------
000000 1  0   !
000000 1  0   !       This procedure will close the GLOBINFO file, and set
000000 1  0   !       G.GlobInfoFileNum to -1.
000000 1  0   !
000000 1  0   !       It must already by open.
000000 1  0   !
000000 1  0   !-----------------------------------------------------------------------
000000 1  0
000000 1  0   BEGIN
000000 1  1
000000 1  1       !--------------------
000000 1  1       ! Beginning of code...
000000 1  1       !--------------------
000000 1  1
000000 1  1       PermAssertTruth (G.GlobInfoFileNum <> -1);
000011 1  1
000011 1  1       CALL ThreadIo^Close (G.GlobInfoFileNum);
000015 1  1       G.GlobInfoFileNum := -1;
000020 1  1
000020 1  1   END;

000000  103323 143000 001777 015005 100001 000002 100002 024733     000010  027000 103323 143000 024700 027000 100777 103323 147000
000020  125003
```

TmpControl^OpenGlobInfo

```
000000 0  0   PROC TmpControl^OpenGlobInfo;
000000 1  0
000000 1  0   !-----------------------------------------------------------------------
000000 1  0   !
000000 1  0   !      This procedure will open the GLOBINFO file, and set
000000 1  0   !      G.GlobInfoFileNum to the open file number.
000000 1  0   !
000000 1  0   !      We will create an empty file if necessary.  We die if we
000000 1  0   !      can't open the file.
000000 1  0   !
000000 1  0   !      It must NOT already be open.
000000 1  0   !
000000 1  0   !-----------------------------------------------------------------------
000000 1  0
000000 1  0   BEGIN
000000 1  1       Int       Error;
000000 1  1       Boolean   Created := False;
000000 1  1       STRUCT    Security( Security^Struct );
000000 1  1
000000 1  1       ! Beginning of code...
000000 1  1
000000 1  1       PermAssertTruth( G.GlobInfoFileNum = -1 );
000015 1  1
000015 1  1       !-------------------------------------------------------
000015 1  1       ! Create the configuration file.  Ignore an FEDUP error.
000015 1  1       !-------------------------------------------------------
000015 1  1       Error := FILE_CREATE_
000015 1  1             ( G.GlobInfoFileNameStr.Bytes:G.GlobInfoFileNameStr.ReservedLen,
000015 1  1               G.GlobInfoFileNameStr.Len,
000015 1  1               133 ! filecode !,
000015 1  1               ! priextsize !,
000015 1  1               ! secextsize !,
000015 1  1               ! maxextents !,
000015 1  1               Unstructured^FileType );
000042 1  1
000042 1  1       IF Error = FeOk THEN
000044 1  1           Created := True
000044 1  1       ELSE IF Error <> FeDup THEN
000052 1  1           BEGIN
000052 1  2           CALL TmpCtrlEms^ConfigFSError( G.GlobInfoFileNameStr,
000052 1  2                                          Create^GlobInfoFileOp, Error );
000064 1  2           CALL TmpControl^Abend;
000065 1  2           END;
000065 1  1
000065 1  1       !-------------------------------
000065 1  1       ! Open the configuration file.
000065 1  1       !-------------------------------
000065 1  1       CALL ThreadIO^OpenStr( G.GlobInfoFileNameStr,
000065 1  1                              G.GlobInfoFileNum,
000065 1  1                              ReadWrite^AccessD00,
000065 1  1                              Shared^Exclusion,
000065 1  1                              ! NowaitDepth 1 !,
000065 1  1                              ! SyncDepth 0 !, !Flags!, !TAG!, !TimeOut!,
000065 1  1                              Error );
000111 1  1
000111 1  1       IF Error <> FeOk THEN
000113 1  1           BEGIN
```

ImpControl^OpenGlobInfo

```
000113 1  2        CALL ImpCtrlEms^ConfigFSError( G.GlobInfoFileNameStr,
000113 1  2                                        Open^GlobInfoFileOp, Error );
000125 1  2        CALL TmpControl^Abend;
000126 1  2        END;
000126 1  1
000126 1  1
000126 1  1    !----------------------------------------------------------
000126 1  1    ! If the file is newly created, set its security to "NO-O".
000126 1  1    !----------------------------------------------------------
000126 1  1
000126 1  1    IF Created THEN
000130 1  1        BEGIN
000130 1  2        Security.Data := 0;
000132 1  2        Security.ReadSecurity := Network^Security;
000136 1  2        Security.WriteSecurity := Owner^Security;
000143 1  2        Security.ExecuteSecurity := Super^Security;
000146 1  2        Security.PurgeSecurity := Owner^Security;
000152 1  2
000152 1  2        CALL ThreadIo^SetMode( G.GlobInfoFileNum,       ! file number
000152 1  2                               Security^SetMode,        ! function
000152 1  2                               Security.Data,           ! Param1
000152 1  2                               ,                        ! Param2
000152 1  2                               ,                        ! LastParams
000152 1  2                               ,                        ! Tag
000152 1  2                               ,                        ! TimeOut
000152 1  2                               Error );                 ! Error
000166 1  2
000166 1  2        IF Error <> FeOk THEN
000170 1  2            BEGIN
000170 1  3            CALL TmpCtrlEms^ConfigFSError( G.GlobInfoFileNameStr,
000170 1  3                                            Write^GlobInfoFileOp, Error );
000202 1  3            CALL TmpControl^Abend;
000203 1  3            END;
000203 1  2        END;
000203 1  1
000203 1  1  END;

CREATED                      Variable      INT        Direct     L+002
ERROR                        Variable      INT        Direct     L+001
SECURITY                     Variable,2    STRUCT     Direct     L+003

000000  002001 100000 024700 002001 103323 143000 001777 012005    000010  100001 000002 100002 024733 027000 103317 173000 000362
000020  102321 142000 100000 101322 171000 130001 100205 024755    000030  002003 100000 024700 002005 005374 004100 100761 024711
000040  027000 034401 001000 015003 100777 044402 010416 040401    000050  001012 012013 100000 170000 130001 005001 004236 000200
000060  100000 040401 024733 027000 027000 100000 170000 130001    000070  005001 004236 000200 100000 103323 173000 130001 000002
000100  024755 002007 100000 070401 130001 005003 004301 024722    000110  027000 040401 014413 100000 170000 130001 005001 004236
000120  000200 100001 040401 024733 027000 027000 040402 014453    000130  100000 044403 005010 005016 070403 000367 100002 100007
000140  130006 070403 000367 100070 070403 000045 100002 100007    000150  070403 000367 103323 143000 100001 040403 024722 002007
000160  100000 070401 130001 100341 024722 027000 040401 014413    000170  100000 170000 130001 005001 004236 000200 100003 040401
000200  024733 027000 027000 125003
```

TmpControl^ReadGlobInfo

```
000000 0  0   PROC TmpControl^ReadGlobInfo;
000000 1  0
000000 1  0   !-----------------------------------------------------------------------------
000000 1  0   !
000000 1  0   !      This procedure will read the record from the GLOBINFO file.
000000 1  0   !      It must already be open.
000000 1  0   !
000000 1  0   !      If no record exists in the file, we will create a default one
000000 1  0   !      and write it.  If a short record exists, we will create defaults
000000 1  0   !      for the unspecified fields and write them.
000000 1  0   !
000000 1  0   !      The record is left in G.GlobInfoRecord.  We also set the global
000000 1  0   !      variable TmfConfigurationSeqNum to the value from the record.
000000 1  0   !
000000 1  0   !      We die if we get an I/O error.
000000 1  0   !
000000 1  0   !      The GLOBINFO file must already be open.
000000 1  0   !
000000 1  0   !-----------------------------------------------------------------------------
000000 1  0
000000 1  0   BEGIN
000000 1  1      Int     Error;
000000 1  1
000000 1  1      !--------------------
000000 1  1      ! Beginning of code...
000000 1  1      !--------------------
000000 1  1
000000 1  1      PermAssertTruth (G.GlobInfoFileNum <> -1);
000012 1  1
000012 1  1      CALL Position (G.GlobInfoFileNum, 0D);
000017 1  1      PermAssertTruth (=);
000025 1  1
000025 1  1      !---------------------------------------------------------------
000025 1  1      ! Build a default record.  Any data that exists in the file
000025 1  1      ! will replace data in this record.  If the file is empty or
000025 1  1      ! short, some of the defaults will survive the read.
000025 1  1      !---------------------------------------------------------------
000025 1  1
000025 1  1      Struct^Zero( G.GlobInfoRecord );
000047 1  1      G.GlobInfoRecord.VersionNum := GlobInfo^VersionNum;
000052 1  1      G.GlobInfoRecord.TmfConfigurationSeqNum := JULIANTIMESTAMP;
000062 1  1      G.GlobInfoRecord.DeleteTmfInProgress := False;
000065 1  1      G.GlobInfoRecord.CtgInfo.Released := False;
000070 1  1      G.GlobInfoRecord.CtgInfo.RetainDepth := RetainDepthDefault;
000073 1  1
000073 1  1      !----------------
000073 1  1      ! Read the record.
000073 1  1      !----------------
000073 1  1
000073 1  1      G.GlobInfoRecordStr.Len := 0;
000100 1  1      CALL ThreadIo^Read( G.GlobInfoFileNum,
000100 1  1                          G.GlobInfoRecordStr,
000100 1  1                          ,        ! Tag.
000100 1  1                          ,        ! TimeOut
000100 1  1                          Error );
000121 1  1
000121 1  1      IF Error <> FeOk  AND Error <> FeEof THEN
```

TmpControl^ReadGlobInfo

```
000126 1  1            BEGIN
000126 1  2            CALL TmpCtrlEms^ConfigFSError( G.GlobInfoFileNameStr,
000126 1  2                                           Read^GlobInfoFileOp, Error );
000140 1  2            CALL TmpControl^Abend;
000141 1  2            END;
000141 1  1
000141 1  1        IF G.GlobInfoRecord.VersionNum <> GlobInfo^VersionNum THEN
000145 1  1            BEGIN
000145 1  2            CALL TmpCtrlEms^WrongGlobInfoVerNum( G.GlobInfoFileNameStr );
000155 1  2            CALL TmpControl^Abend;
000156 1  2            END;
000156 1  1
000156 1  1        !-------------------------------------------------------------
000156 1  1        ! If we either read no record, or read a short record, adjust
000156 1  1        ! the length and write a new one.
000156 1  1        !-------------------------------------------------------------
000156 1  1
000156 1  1        IF G.GlobInfoRecordStr.Len < Ele^ByteLen( G.GlobInfoRecord ) THEN
000164 1  1            BEGIN
000164 1  2            G.GlobInfoRecordStr.Len := Ele^ByteLen( G.GlobInfoRecord );
000166 1  2            CALL TmpControl^WriteGlobInfo;
000167 1  2            END;
000167 1  1
000167 1  1        TmfConfigurationSeqNum := G.GlobInfoRecord.TmfConfigurationSeqNum;
000174 1  1
000174 1  1    END;

ERROR                         Variable      INT            Direct       L+001

000000  002001 103323 143000 001777 015005 100001 000002 100002    000010  024733 027000 103323 143000 000002 024722 027000 012005
000020  100001 000002 100002 024733 027000 000002 170000 130001    000030  005001 004250 000200 000407 000003 100000 170000 130001
000040  005001 004250 000200 000220 000103 100157 000417 100001    000050  103324 147000 002004 100000 100774 024711 027000 103325
000060  173000 000230 100000 102331 146000 100000 101332 145000    000070  100003 103333 147000 100000 005001 004017 000117 147000
000100  103323 143000 100000 170000 130001 005002 004030 000200    000110  024722 002004 100000 070401 130001 100031 024722 027000
000120  000107 040401 014416 040401 001001 012013 100000 170000    000130  130001 005001 004236 000200 100002 040401 024733 027000
000140  027000 103324 143000 001001 012011 100000 170000 130001    000150  005001 004236 000200 024711 027000 027000 005001 004017
000160  000117 143000 001160 013003 100160 147000 027000 103325    000170  173000 000234 070000 000230 125003
```

TmpControl^WriteGlobInfo

```
000000 0  0   PROC TmpControl^WriteGlobInfo;
000000 1  0
000000 1  0   !----------------------------------------------------------------------------
000000 1  0   !
000000 1  0   !       This procedure will write G.GlobInfoRecord to the GlobInfo file.
000000 1  0   !       If an error occurs, we die.
000000 1  0   !
000000 1  0   !       The GlobInfo file must already be open.
000000 1  0   !
000000 1  0   !----------------------------------------------------------------------------
000000 1  0
000000 1  0   BEGIN
000000 1  1
000000 1  1       Int      Error;
000000 1  1
000000 1  1       !---------------------
000000 1  1       ! Beginning of code...
000000 1  1       !---------------------
000000 1  1
000000 1  1       PermAssertTruth (G.GlobInfoFileNum <> -1);
000012 1  1
000012 1  1       CALL Position (G.GlobInfoFileNum, 0D);
000017 1  1       PermAssertTruth (=);
000025 1  1
000025 1  1       CALL ThreadIo^Write( G.GlobInfoFileNum,
000025 1  1                            G.GlobInfoRecordStr,
000025 1  1                            ,        ! Tag.
000025 1  1                            ,        ! TimeOut
000025 1  1                            Error );
000045 1  1
000045 1  1       IF Error <> FeOk THEN
000047 1  1           BEGIN
000047 1  2           CALL TmpCtrlEms^ConfigFSError( G.GlobInfoFileNameStr,
000047 1  2                                          Write^GlobInfoFileOp, Error );
000061 1  2           CALL TmpControl^Abend;
000062 1  2           END;
000062 1  1
000062 1  1   END;

ERROR                      Variable      INT            Direct        L+001

000000  002001 103323 143000 001777 015005 100001 000002 100002     000010  024733 027000 103323 143000 000002 024722 027000 012005
000020  100001 000002 100002 024733 027000 103323 143000 100000     000030  170000 130001 005002 004030 000200 024722 002004 100000
000040  070401 130001 100031 024722 027000 040401 014413 100000     000050  170000 130001 005001 004236 000200 100003 040401 024733
000060  027000 027000 125003
```

ImpControl^DoStartSteps

```
000000 0  0   Boolean PROC ImpControl^DoStartSteps;
000000 1  0
000000 1  0   !------------------------------------------------------------------------
000000 1  0   !
000000 1  0   !   Invokes the module Start phase routines.
000000 1  0   !
000000 1  0   !------------------------------------------------------------------------
000000 1  0
000000 1  0   BEGIN
000000 1  1       Int  Step;
000000 1  1
000000 1  1       ! Beginning of code...
000000 1  1
000000 1  1       FOR Step := G.FirstStep TO G.LastStep DO
000004 1  1           BEGIN
000004 1  2           IF NOT ImpControl^ExecuteStartStep( Step ) THEN
000010 1  2               RETURN False;
000012 1  2           END;
000021 1  1
000021 1  1       RETURN True;
000023 1  1   END;

STEP                          Variable       INT              Direct         L+001

000000  002001 103231 143000 010410 040401 024700 027000 015402     000010  100000 125003 040401 104001 034401 103232 143000 000215
000020  016363 100777 125003
```

TmpControl^DoStopSteps

```
000000 0  0   PROC TmpControl^DoStopSteps;
000000 1  0
000000 1  0   !--------------------------------------------------------------------------
000000 1  0   !
000000 1  0   !    Invokes the module Stop phase routines.
000000 1  0   !
000000 1  0   !--------------------------------------------------------------------------
000000 1  0
000000 1  0   BEGIN
000000 1  1       Int  Step;
000000 1  1
000000 1  1       ! Beginning of code...
000000 1  1
000000 1  1       !*** Execute all stop steps because of ScanTrails...
000000 1  1       FOR Step := G.LastStep DOWNTO G.FirstStep DO
000004 1  1           BEGIN
000004 1  2           CALL TmpControl^ExecuteStep( Stop^Phase, Step );
000010 1  2
000010 1  2           CALL TmpControl^CheckpointDoStopStep( Step );
000013 1  2           END;
000022 1  1   END;

STEP                          Variable      INT             Direct         L+001


000000  002001 103232 143000 010411 100005 040401 024711 027000     000010  040401 024700 027000 040401 104777 034401 103231 143000
000020  000215 013362 125003
```

TmpControl^DoGiveSwitchSteps

```
000000 0  0   PROC TmpControl^DoGiveSwitchSteps;
000000 1  0
000000 1  0   !------------------------------------------------------------------------
000000 1  0   !
000000 1  0   !   Invokes the module GiveSwitch phase routines.
000000 1  0   !
000000 1  0   !------------------------------------------------------------------------
000000 1  0
000000 1  0   BEGIN
000000 1  1       Int  Step;
000000 1  1
000000 1  1       ! Beginning of code...
000000 1  1
000000 1  1       FOR Step := G.LastStep DOWNTO G.FirstStep DO
000004 1  1           CALL TmpControl^ExecuteStep( GiveSwitch^Phase, Step );
000017 1  1   END;

STEP                        Variable       INT              Direct          L+001

000000  002001 103232 143000 010406 100000 040401 024711 027000     000010  040401 104777 034401 103231 143000 000215 013365 125003
```

TmpControl^DoTakeOverSteps

```
000000 0  0   PROC TmpControl^DoTakeOverSteps( BackupIsUp );
000000 1  0
000000 1  0   !--------------------------------------------------------------------------
000000 1  0   !
000000 1  0   !    Invokes the module TakeOver phase routines.
000000 1  0   !
000000 1  0   !--------------------------------------------------------------------------
000000 1  0
000000 1  0   Boolean  BackupIsUp;
000000 1  0                           ! IN
000000 1  0
000000 1  0   BEGIN
000000 1  1       Int  Step;
000000 1  1
000000 1  1       ! Beginning of code...
000000 1  1
000000 1  1       FOR Step := G.FirstStep TO G.LastStep DO
000004 1  1           CALL TmpControl^ExecuteWordStep( TakeOver^Phase,
000004 1  1                                            Step,
000004 1  1                                            BackupIsUp );
000020 1  1   END;

BACKUPISUP                        Variable       INT              Direct         L-003
STEP                              Variable       INT              Direct         L+001

000000  002001 103231 143000 010407 100001 040401 040703 024722     000010  027000 040401 104001 034401 103232 143000 000215 016364
000020  125004
```

TmpControl^DoBackupDownSteps

```
000000 0  0   PROC TmpControl^DoBackupDownSteps;
000000 1  0
000000 1  0   !----------------------------------------------------------------------------
000000 1  0   !
000000 1  0   !   Invokes the module BackupDown phase routines.
000000 1  0   !
000000 1  0   !----------------------------------------------------------------------------
000000 1  0
000000 1  0   BEGIN
000000 1  1       Int  Step;
000000 1  1
000000 1  1       ! Beginning of code...
000000 1  1
000000 1  1       FOR Step := G.FirstStep TO G.LastStep DO
000004 1  1           CALL TmpControl^ExecuteStep( BackupDown^Phase,
000004 1  1                                        r·ep );
000017 1  1   END;

STEP                          Variable       INT              Direct          L+001

000000  002001 103231 143000 010406 100002 040401 024711 027000     000010  040401 104001 034401 103232 143000 000215 016365 125003
```

```
                                TmpControl^DoReloadBackupSteps

000000 0  0   PROC TmpControl^DoReloadBackupSteps;
000000 1  0
000000 1  0   !--------------------------------------------------------------------------
000000 1  0   !
000000 1  0   !   Invokes the module ReloadBackup phase routines.
000000 1  0   !
000000 1  0   !--------------------------------------------------------------------------
000000 1  0
000000 1  0   BEGIN
000000 1  1       Int  Step;
000000 1  1
000000 1  1       ! Beginning of code...
000000 1  1
000000 1  1       FOR Step := G.FirstStep TO G.LastStep DO
000004 1  1           CALL TmpControl^ExecuteStep( ReloadBackup^Phase,
000004 1  1                                        Step );
000017 1  1   END;

STEP                        Variable      INT            Direct         L+001

000000  002001 103231 143000 010406 100003 040401 024711 027000     000010  040401 104001 034401 103232 143000 000215 016365 125003
```

```
                              TmpControl^DoCpuDownSteps

000000 0  0   PROC TmpControl^DoCpuDownSteps( FailedCpuNum );
000000 1  0
000000 1  0   !----------------------------------------------------------------------------
000000 1  0   !
000000 1  0   !    Invokes the module CpuDown phase routines.
000000 1  0   !
000000 1  0   !----------------------------------------------------------------------------
000000 1  0
000000 1  0   Int  FailedCpuNum;
000000 1  0                         ! IN
000000 1  0
000000 1  0   BEGIN
000000 1  1       Int  Step;
000000 1  1
000000 1  1       ! Beginning of code...
000000 1  1
000000 1  1       FOR Step := G.FirstStep TO G.LastStep DO
000004 1  1           CALL TmpControl^ExecuteWordStep( CpuDown^Phase,
000004 1  1                                            Step,
000004 1  1                                            FailedCpuNum );
000020 1  1   END;

FAILEDCPUNUM                  Variable       INT            Direct         L-003
STEP                          Variable       INT            Direct         L+001

000000  002001 103231 143000 010407 100006 040401 040703 024722    000010  027000 040401 104001 034401 103232 143000 000215 016364
000020  125004
```

TmpControl^DoCpuReloadSteps

```
000000 0  0   PROC TmpControl^DoCpuReloadSteps( ReloadeeCpuNum );
000000 1  0
000000 1  0   !------------------------------------------------------------------------
000000 1  0   !
000000 1  0   !   Invokes the module CpuReload phase routines.
000000 1  0   !
000000 1  0   !------------------------------------------------------------------------
000000 1  0
000000 1  0   Int  ReloadeeCpuNum;
000000 1  0                   ! IN
000000 1  0
000000 1  0   BEGIN
000000 1  1       Int  Step;
000000 1  1
000000 1  1       ! Beginning of code...
000000 1  1
000000 1  1       FOR Step := G.FirstStep TO G.LastStep DO
000004 1  1           CALL TmpControl^ExecuteWordStep( CpuReload^Phase,
000004 1  1                                            Step,
000004 1  1                                            ReloadeeCpuNum );
000020 1  1   END;

RELOADEECPUNUM                Variable     INT           Direct       L-003
STEP                          Variable     INT           Direct       L+001

000000  002001 103231 143000 010407 100007 040401 040703 024722    000010  027000 040401 104001 034401 103232 143000 000215 016364
000020  125004
```

TmpControl^DelayCreateThread

```
000000 0  0   PROC TmpControl^DelayCreateThread;
000000 1  0
000000 1  0   BEGIN
000000 1  1       Thread^NewParameterLess( @G.MaintBackupOp.DelayCreateThread );
000000 1  1
000000 1  1       ! Beginning of code...
000000 1  1
000000 1  1       PermAssertTruth( G.MaintBackupOp.State = DelayCreate^MaintBackOpState );
000023 1  1       IF NOT G.MaintBackupOp.DelayCreateQuit THEN
000026 1  1           CALL ThreadIo^Delay( 1000D, G.MaintBackupOp.DelayCreateTag );
000040 1  1
000040 1  1       IF G.MaintBackupOp.DelayCreateQuit THEN
000043 1  1           G.MaintBackupOp.State := Nil^MaintBackOpState
000043 1  1       ELSE
000047 1  1           G.MaintBackupOp.State := ReadyToCreate^MaintBackOpState;
000052 1  1
000052 1  1       CALL Thread^Schedule( G.ControlThread, Normal^ScheduleOption );
000060 1  1
000060 1  1       @G.MaintBackupOp.DelayCreateThread := Nil^Addr;
000064 1  1   END;

^^DUMMY                     Variable     INT          Direct       L+001
^^FIRSTPARAM                Variable     INT          Direct       L-002


000000  070702 100000 103102 173000 130001 000002 100006 024755     000010  027000 024700 103075 143000 001041 012005 100001 000002
000020  100002 024733 027000 103104 143000 015412 100000 005003     000030  004350 100000 102105 172000 130001 100003 024744 027000
000040  103104 143000 014404 100777 102075 146000 010403 100036     000050  103075 147000 103014 163000 100000 100003 024733 027000
000060  100774 100000 103041 167000 125003
```

TmpControl^KillTheDelayCreate

```
000000 0  0   PROC TmpControl^KillTheDelayCreate;
000000 1  0
000000 1  0   BEGIN
000000 1  1       ! Beginning of code...
000000 1  1
000000 1  1       G.MaintBackupOp.DelayCreateQuit := True;
000003 1  1       IF G.MaintBackupOp.DelayCreateTag <> Nil^Addr THEN
000012 1  1           CALL ThreadIo^CancelReq( G.MaintBackupOp.DelayCreateTag );
000020 1  1
000020 1  1       CALL Thread^Schedule( G.MaintBackupOp.DelayCreateThread,
000020 1  1                             Normal^ScheduleOption );
000026 1  1       CALL Thread^WaitForExit( G.MaintBackupOp.DelayCreateThread );
000035 1  1       AssertTruth(
000035 1  1               G.MaintBackupOp.State = ReadyToCreate^MaintBackOpState OR
000035 1  1               G.MaintBackupOp.State = Nil^MaintBackOpState );
000035 1  1       G.MaintBackupOp.DelayCreateQuit := False;
000040 1  1       G.MaintBackupOp.State := Nil^MaintBackOpState;
000043 1  1   END;

000000  100777 103104 147000 102105 172000 000362 100774 100000     000010  000225 012006 172000 000362 100000 100002 024733 027000
000020  103041 163000 100000 100003 024733 027000 103041 163000     000030  000002 100002 024744 027000 000107 100000 103104 147000
000040  100777 102075 146000 125003
```

TmpControl^DoBackupDown

```
000000 0  0   PROC TmpControl^DoBackupDown;
000000 1  0
000000 1  0   !----------------------------------------------------------------------------
000000 1  0   !
000000 1  0   !----------------------------------------------------------------------------
000000 1  0
000000 1  0   BEGIN
000000 1  1       ! Beginning of code...
000000 1  1
000000 1  1       PermAssertTruth( G.MaintBackupOp.State = Downing^MaintBackOpState );
000011 1  1
000011 1  1       CALL TmpControl^DoBackupDownSteps;
000012 1  1
000012 1  1       !-----------------------------------------------------------------------
000012 1  1       ! Flush any checkpoints still in the pipe and turn off checkpointing.
000012 1  1       !-----------------------------------------------------------------------
000012 1  1       CALL Semaphore^Get( G.CheckpointSem );
000022 1  1       G.Checkpointing := False;
000025 1  1
000025 1  1       CALL TmpCheckpoint^Disable;
000026 1  1
000026 1  1       CALL Semaphore^Put( G.CheckpointSem );
000034 1  1   END;

000000  103075 143000 001046 012005 100001 000002 100002 024733     000010  027000 027000 103017 163000 024711 002003 100004 024700
000020  027000 000107 100000 103042 147000 027000 103017 163000     000030  100000 100002 024733 027000 125003
```

TmpControl^DoCpuDownPhase1

```
000000 0  0   PROC TmpControl^DoCpuDownPhase1;
000000 1  0
000000 1  0   !------------------------------------------------------------------------
000000 1  0   !
000000 1  0   !------------------------------------------------------------------------
000000 1  0
000000 1  0   BEGIN
000000 1  1       ! Beginning of code...
000000 1  1
000000 1  1       PermAssertTruth( G.CpuDownOp.State = Phase1^CpuDownOpState );
000011 1  1       PermAssertTruth(
000011 1  1               G.CpuStateArray[ G.CpuDownOp.FailedCpuNum ] = Downing^CpuState );
000025 1  1
000025 1  1       !-------------------------------------------------------------------
000025 1  1       ! Drain the GetWork queue to make sure all packets from the dead CPU
000025 1  1       ! have been processed.
000025 1  1       !-------------------------------------------------------------------
000025 1  1   --  CALL TmpLibTmpOwn^DrainWork;
000025 1  1
000025 1  1       !-----------------------------------
000025 1  1       ! Call the CpuDown "phase" routines.
000025 1  1       !-----------------------------------
000025 1  1       CALL TmpControl^DoCpuDownSteps( G.CpuDownOp.FailedCpuNum );
000031 1  1
000031 1  1       IF G.CpuDownOp.FailedCpuNum = TmpBrotherCpuNum THEN
000036 1  1           BEGIN
000036 1  2           !-------------------------------------------
000036 1  2           ! Shutdown the maintain Backup TMP operation.
000036 1  2           !-------------------------------------------
000036 1  2           IF G.MaintBackupOp.State = Up^MaintBackOpState OR
000036 1  2               G.MaintBackupOp.State = StartupMsgErr^MaintBackOpState THEN
000046 1  2               BEGIN
000046 1  3               !--------------------------------------------------------------
000046 1  3               ! Wait until the CPU down gets noticed by the 'Process' module
000046 1  3               ! and tells the WatchBackup thread the Backup TMP has failed.
000046 1  3               ! We do not want a CpuReload to race in before this occurs.
000046 1  3               !--------------------------------------------------------------
000046 1  3               CALL Thread^WaitForExit( G.MaintBackupOp.WatchThread );
000056 1  3               PermAssertTruth(
000056 1  3                       G.MaintBackupOp.State = DelayCreate^MaintBackOpState OR
000056 1  3                       G.MaintBackupOp.State = ReadyToCreate^MaintBackOpState OR
000056 1  3                       G.MaintBackupOp.State = ReadyToDown^MaintBackOpState );
000075 1  3               END;
000075 1  2
000075 1  2           CASE G.MaintBackupOp.State OF
000100 1  2           BEGIN
000100 1  3           DelayCreate^MaintBackOpState ->
000100 1  3               CALL TmpControl^KillTheDelayCreate;
000101 1  3
000101 1  3           CpuDown^MaintBackOpState,
000102 1  3           ReadyToCreate^MaintBackOpState ->
000102 1  3               ;
000103 1  3
000103 1  3           ReadyToDown^MaintBackOpState ->
000103 1  3               G.MaintBackupOp.State := Downing^MaintBackOpState;
000106 1  3               CALL TmpControl^DoBackupDown;
000107 1  3
```

TmpControl^DoCpuDownPhase1

```
000107 1  3          OTHERWISE ->
000110 1  3             UndefinedCaseError;
000115 1  3          END;
000140 1  2          G.MaintBackupOp.State := CpuDown^MaintBackOpState;
000143 1  2          END;
000143 1  1    END;

000000  103071 143000 001014 012005 100001 000002 100002 024733     000010  027000 103072 143000 003051 000116 142000 001006 012005
000020  100001 000002 100002 024733 027000 103072 143000 024700     000030  027000 103072 143000 040010 000215 015105 103075 143000
000040  001043 012004 103075 143000 001044 015027 103107 173000     000050  000362 000002 100002 024744 027000 000107 103075 143000
000060  001041 012013 143000 001036 012010 143000 001045 012005     000070  100001 000002 100002 024733 027000 103075 143000 010416
000100  027000 010436 010435 100046 103075 147000 027000 010430     000110  100001 000002 100002 024733 027000 010422 003742 100007
000120  000205 000100 015002 000107 100010 000030 000012 000011     000130  177760 177747 177756 177755 177754 177746 177752 000000
000140  100037 103075 147000 125003
```

TmpControl^DoCpuDownPhase2

```
000000 0  0    PROC TmpControl^DoCpuDownPhase2;
000000 1  0
000000 1  0    !---------------------------------------------------------------------------
000000 1  0    !
000000 1  0    !---------------------------------------------------------------------------
000000 1  0
000000 1  0    BEGIN
000000 1  1       ! Beginning of code...
000000 1  1
000000 1  1       PermAssertTruth( G.CpuDownOp.State = Phase2^CpuDownOpState );
000011 1  1       PermAssertTruth(
000011 1  1              G.CpuStateArray[ G.CpuDownOp.FailedCpuNum ] = Downing^CpuState );
000025 1  1
000025 1  1       CALL TmpTEvent^CpuDownEpochs( G.CpuDownOp.FailedCpuNum );
000031 1  1    END;

000000  103071 143000 001015 012005 100001 000002 100002 024733    000010  027000 103072 143000 003051 000116 142000 001006 012005
000020  100001 000002 100002 024733 027000 103072 143000 024700    000030  027000 125003
```

TmpControl^DoCpuDownPhase3

```
000000 0  0   PROC TmpControl^DoCpuDownPhase3;
000000 1  0
000000 1  0   !------------------------------------------------------------------------
000000 1  0   !
000000 1  0   !------------------------------------------------------------------------
000000 1  0
000000 1  0   BEGIN
000000 1  1       ! Beginning of code...
000000 1  1
000000 1  1       PermAssertTruth( G.CpuDownOp.State = Phase3^CpuDownOpState );
000011 1  1       PermAssertTruth(
000011 1  1               G.CpuStateArray[ G.CpuDownOp.FailedCpuNum ] = Downing^CpuState );
000025 1  1
000025 1  1       CALL TmpTEvent^CpuDownAborts( G.CpuDownOp.FailedCpuNum );
000031 1  1   END;

000000  103071 143000 001016 012005 100001 000002 100002 024733    000010  027000 103072 143000 003051 000116 142000 001006 012005
000020  100001 000002 100002 024733 027000 103072 143000 024700    000030  027000 125003
```

TmpControl^WatchBackupThread

```
000000 0  0   PROC TmpControl^WatchBackupThread;
000000 1  0
000000 1  0   !-----------------------------------------------------------------------------
000000 1  0   !
000000 1  0   !-----------------------------------------------------------------------------
000000 1  0
000000 1  0   BEGIN
000000 1  1       Thread^NewParameterLess( G.MaintBackupOp.WatchThreadAddr );
000000 1  1
000000 1  1       STRUCT  ProcessResults( ProcessResults^Struct );
000000 1  1
000000 1  1       ! Beginning of code...
000000 1  1
000000 1  1       PermAssertTruth( G.MaintBackupOp.State = Up^MaintBackOpState OR
000000 1  1                        G.MaintBackupOp.State = StartupMsgErr^MaintBackOpState );
000027 1  1
000027 1  1       CALL Process^WaitForTermination( G.BrotherProcessTag,
000027 1  1                                        G.MaintBackupOp.WatchQuit );
000041 1  1       IF G.MaintBackupOp.WatchQuit THEN
000044 1  1           BEGIN
000044 1  2           !-----------------------------------------------------------------------
000044 1  2           ! Do not call 'Process^Finish' when Switching.  Let the new Backup use
000044 1  2           !   the ProcessTag to monitor the new Primary.
000044 1  2           !-----------------------------------------------------------------------
000044 1  2           G.MaintBackupOp.WatchThreadAddr := Nil^Addr;
000051 1  2           RETURN;
000052 1  2           END;
000052 1  1
000052 1  1       CALL Process^Finish( G.BrotherProcessTag, ProcessResults );
000064 1  1
000064 1  1       !-----------------
000064 1  1       ! Issue EMS event.
000064 1  1       !-----------------
000064 1  1       CALL TmpCtrlEms^BackupTmpFailed( ProcessResults );
000071 1  1
000071 1  1       CASE G.MaintBackupOp.State OF
000074 1  1       BEGIN
000074 1  2       Up^MaintBackOpState ->
000074 1  2           !-------------------------
000074 1  2           ! Queue a BackupDown step.
000074 1  2           !-------------------------
000074 1  2           G.MaintBackupOp.State := ReadyToDown^MaintBackOpState;
000077 1  2
000077 1  2       StartupMsgErr^MaintBackOpState ->
000100 1  2           !-------------------------------------------------
000100 1  2           ! Never got off the ground.  Delay and try again.
000100 1  2           !-------------------------------------------------
000100 1  2           G.MaintBackupOp.State := DelayCreate^MaintBackOpState;
000103 1  2           CALL TmpControl^DelayCreateThread;
000104 1  2
000104 1  2       OTHERWISE ->
000105 1  2           UndefinedCaseError;
000112 1  2       END;
000127 1  1
000127 1  1       CALL Thread^Schedule( G.ControlThread, Normal^ScheduleOption );
000135 1  1
000135 1  1       G.MaintBackupOp.WatchThreadAddr := Nil^Addr;
```

```
                              TmpControl^WatchBackupThread

 2880.    000142 1  1   END;

PROCESSRESULTS                    Variable,150   STRUCT        Direct        L+002
^^DUMMY                           Variable       INT           Direct        L+001
^^FIRSTPARAM                      Variable       INT           Direct        L-002

000000   070702 100000 103107 173000 130001 000002 100006 024755     000010   027000 024700 002064 103075 143000 001043 012010 143000
000020   001044 012005 100001 000002 100002 024733 027000 103043     000030   173000 000362 100000 102111 172000 130001 100003 024744
000040   027000 103111 143000 014406 100774 100000 102107 172000     000050   000363 125003 103043 173000 000362 100000 070402 130001
000060   100003 024744 027000 000107 100000 070402 130001 024711     000070   027000 103075 143000 010417 100045 103075 147000 010427
000100   100041 103075 147000 027000 010422 100001 000002 100002     000110   024733 027000 010414 003735 100001 000205 000100 016002
000120   000107 100002 000030 177751 177754 177760 000000 103014     000130   163000 100000 100003 024733 027000 100774 100000 103107
000140   173000 000363 125003
```

TmpControl^SendStartupToBackup

```
000000 0 0   Int PROC TmpControl^SendStartupToBackup( BackupPhandle );
000000 1 0
000000 1 0   |---------------------------------------------------------------------------
000000 1 0   |
000000 1 0   |---------------------------------------------------------------------------
000000 1 0
000000 1 0   STRUCT  .EXT BackupPhandle( Phandle^Struct );
000000 1 0                       ! IN
000000 1 0
000000 1 0   BEGIN
000000 1 1       Word  .EXT ReqCtrl( Tmp_Local_Template );
000000 1 1       Word  .EXT ReplyCtrl( Tmp_Local_Template );
000000 1 1
000000 1 1       Int  ReplyCtrlLen;
000000 1 1
000000 1 1       Int  Error;
000000 1 1
000000 1 1       STRUCT  .TempPhandle( Phandle^Struct );
000000 1 1
000000 1 1       ! Beginning of code...
000000 1 1
000000 1 1       IF Phandle^IsNull( BackupPhandle ) THEN
000010 1 1           RETURN FECPUFAIL;
000012 1 1
000012 1 1       @ReqCtrl := Heap^New( TmpShortTermHeap, TmpStartupReqCtrl^ByteLenDbl );
000020 1 1
000020 1 1       ReqCtrl ':=' G.TmpStartupReqCtrlWords FOR TmpStartupReqCtrl^WordLen WORDS;
000027 1 1
000027 1 1       ReqCtrl.TmpStartupMsg.BrotherTmpCpuNum := PCB_MYCPU_;
000032 1 1       ReqCtrl.TmpStartupMsg.YouArePrimary := False;
000035 1 1
000035 1 1       @ReplyCtrl := Heap^New( TmpShortTermHeap,
000035 1 1                          DblInt^FromConst( Tmp_Local_RepCtrl_MaxSize ) );
000043 1 1
000043 1 1       TempPhandle ':=' BackupPhandle FOR 1 ELEMENTS;
000051 1 1       CALL MsgSys^LinkAndWait( TempPhandle,
000051 1 1                                ReqCtrl, TmpStartupReqCtrl^ByteLen,
000051 1 1                                ReplyCtrl, Tmp_Local_RepCtrl_MaxSize,
000051 1 1                                , , , ,  ! No Request or Reply Data.
000051 1 1                                ReplyCtrlLen,
000051 1 1                                ,        ! Omit 'ReplyDataLen'.
000051 1 1                                ,        ! Time out -> wait forever.
000051 1 1                                False,   ! Do not automatically retry -->
000051 1 1                                         !   Backup TMP failure would cause msg
000051 1 1                                         !   to be sent to ourselves.
000051 1 1                                True );  ! Lock memory -->
000100 1 1                                         !   TMP extended segment is not resident.
000100 1 1
000100 1 1       Error := ReplyCtrl.ERROR;
000103 1 1
000103 1 1       CALL Heap^Dispose( TmpShortTermHeap,
000103 1 1                          @ReqCtrl, TmpStartupReqCtrl^ByteLenDbl );
000114 1 1       CALL Heap^Dispose( TmpShortTermHeap,
000114 1 1                          @ReplyCtrl,
000114 1 1                          DblInt^FromConst( Tmp_Local_RepCtrl_MaxSize ) );
000125 1 1       RETURN Error;
000127 1 1   END;
```

```
                              TmpControl^SendStartupToBackup

BACKUPPHANDLE                 Variable,24    STRUCT-I    EXT Pointer   L-004
ERROR                         Variable       INT         Direct        L+006
REPLYCTRL                     Variable,10    STRUCT-I    EXT Pointer   L+003
REPLYCTRLLEN                  Variable       INT         Direct        L+005
REQCTRL                       Variable,10    STRUCT-I    EXT Pointer   L+001
TEMPPHANDLE                   Variable,24    STRUCT      Indirect      L+007

000000  002006 070410 024700 002012 060704 024711 027000 014402     000010  100323 125005 060000 100000 100170 024733 027000 000006
000020  064401 100000 103133 173000 130001 100170 000417 027000     000030  100004 026501 100000 100011 026501 060000 100000 100226
000040  024733 027000 064403 100000 170407 130001 060704 100024     000050  000417 100000 170407 130001 060401 100170 060403 100226
000060  024777 002006 100000 070405 130001 024711 002004 100000     000070  100777 024711 002005 100001 005360 004230 024711 027000
000100  100003 026403 044406 060000 100000 070401 130001 100000     000110  100170 100007 024766 027000 060000 100000 070403 130001
000120  100000 100226 100007 024766 027000 040406 125005
```

TmpControl^DoCreateBackup

```
000000 0  0   PROC TmpControl^DoCreateBackup;
000000 1  0
000000 1  0   !-----------------------------------------------------------------
000000 1  0   !
000000 1  0   !-----------------------------------------------------------------
000000 1  0
000000 1  0   BEGIN
000000 1  1       STRUCT  .BackupPhandle( Phandle^Struct );
000000 1  1
000000 1  1       Int  Error;
000000 1  1
000000 1  1       ! Beginning of code...
000000 1  1
000000 1  1       AssertTruth( G.MaintBackupOp.State = Creating^MaintBackOpState );
000003 1  1
000003 1  1       !-------------------------------------------------------------
000003 1  1       ! Create the Backup TMP, but do not check for errors.  Let the WatchBackup
000003 1  1       ! thread handle process errors.
000003 1  1       !-------------------------------------------------------------
000003 1  1       CALL Process^StartBackup( TmpBrotherCpuNum, G.BrotherProcessTag );
000013 1  1       G.MaintBackupOp.StartTime := TIME^SINCE^COLDLOAD;
000017 1  1
000017 1  1       CALL Process^GetPhandle( G.BrotherProcessTag, BackupPhandle );
000027 1  1
000027 1  1       Error := TmpControl^SendStartupToBackup( BackupPhandle );
000035 1  1       IF Error <> FEOK THEN
000037 1  1           G.MaintBackupOp.State := StartupMsgErr^MaintBackOpState
000037 1  1       ELSE
000043 1  1           BEGIN
000043 1  2           G.MaintBackupOp.State := Reloading^MaintBackOpState;
000046 1  2
000046 1  2           CALL TmpCheckpoint^Enable( BackupPhandle );
000053 1  2
000053 1  2           CALL TmpControl^DoReloadBackupSteps;
000054 1  2
000054 1  2           CALL Semaphore^Get( G.CheckpointSem );
000064 1  2           G.Checkpointing := True;
000067 1  2           CALL TmpControl^CkptModuleState;
000070 1  2           CALL TmpControl^CheckpointShort( YouAreCapable^CkptKind );
000073 1  2           CALL Semaphore^Put( G.CheckpointSem );
000101 1  2
000101 1  2           G.MaintBackupOp.State := Up^MaintBackOpState;
000104 1  2           END;
000104 1  1
000104 1  1       !-------------------------------------------------------------
000104 1  1       ! Fire up the WatchBackup thread to get the Process termination results
000104 1  1       ! in both the Up and StartupMsgErr cases.
000104 1  1       !-------------------------------------------------------------
000104 1  1       CALL TmpControl^WatchBackupThread;
000105 1  1   END;

BACKUPPHANDLE                Variable,24    STRUCT      Indirect      L+001
ERROR                        Variable       INT         Direct        L+002

000000  070403 024700 002013 040010 100000 103043 173000 130001     000010  100003 024733 027000 027000 103076 173000 000230 102043
000020  172000 000362 100000 170401 130001 024733 027000 100000     000030  170401 130001 024711 027000 034402 001000 012004 100044
```

TmpControl^DoCreateBackup

```
000040   103075 147000 010441 100042 103075 147000 100000 170401     000050   130001 024711 027000 027000 103017 163000 024711 002003
000060   100004 024700 027000 000107 100777 103042 147000 027000     000070   100001 024700 027000 103017 163000 100000 100002 024733
000100   027000 100043 103075 147000 027000 125003
```

TmpControl^DoCpuReloadPhase1

```
000000 0  0   PROC TmpControl^DoCpuReloadPhase1;
000000 1  0
000000 1  0   !------------------------------------------------------------------------
000000 1  0   !
000000 1  0   !------------------------------------------------------------------------
000000 1  0
000000 1  0   BEGIN
000000 1  1       Int  ReloadeeCpuNum;
000000 1  1
000000 1  1       Boolean  Dummy;
000000 1  1
000000 1  1       ! Beginning of code...
000000 1  1
000000 1  1       ReloadeeCpuNum := G.CpuReloadOp.ReloadeeCpuNum;
000004 1  1
000004 1  1       PermAssertTruth( G.CpuReloadOp.State = Phase1^CpuReloadOpState );
000015 1  1
000015 1  1       CALL TmpControl^DoCpuReloadSteps( ReloadeeCpuNum );
000020 1  1
000020 1  1   END;

DUMMY                        Variable     INT          Direct       L+002
RELOADEECPUNUM               Variable     INT          Direct       L+001

000000  002002 103074 143000 044401 102073 142000 001026 012005    000010  100001 000002 100002 024733 027000 040401 024700 027000
000020  125003
```

TmpControl^DoCpuReloadPhase2

```
000000 0  0   PROC TmpControl^DoCpuReloadPhase2;
000000 1  0
000000 1  0   !-------------------------------------------------------------------------------
000000 1  0   !
000000 1  0   !-------------------------------------------------------------------------------
000000 1  0
000000 1  0   BEGIN
000000 1  1       Int  ReloadeeCpuNum;
000000 1  1
000000 1  1       ! Beginning of code...
000000 1  1
000000 1  1       ReloadeeCpuNum := G.CpuReloadOp.ReloadeeCpuNum;
000004 1  1
000004 1  1       PermAssertTruth( G.CpuReloadOp.State = Phase2^CpuReloadOpState );
000015 1  1
000015 1  1       !-----------------------------------------------------------
000015 1  1       ! Attempt to create the Backup TMP if we are reloading the
000015 1  1       ! Backup TMP's CPU.
000015 1  1       !-----------------------------------------------------------
000015 1  1       IF ReloadeeCpuNum = TmpBrotherCpuNum THEN
000021 1  1           BEGIN
000021 1  2           CASE G.MaintBackupOp.State OF
000024 1  2           BEGIN
000024 1  3           DelayCreate^MaintBackOpState ->
000024 1  3               CALL TmpControl^KillTheDelayCreate;
000025 1  3               G.MaintBackupOp.State := Creating^MaintBackOpState;
000030 1  3
000030 1  3           CpuDown^MaintBackOpState,
000031 1  3           ReadyToCreate^MaintBackOpState ->
000031 1  3               G.MaintBackupOp.State := Creating^MaintBackOpState;
000034 1  3
000034 1  3           OTHERWISE ->
000035 1  3               UndefinedCaseError;
000042 1  3           END;
000061 1  2
000061 1  2           CALL TmpControl^DoCreateBackup;
000062 1  2           END;
000062 1  1
000062 1  1       CALL TmpTEvent^CpuReloadReDrive( G.CpuReloadOp.ReloadeeCpuNum );
000066 1  1   END;
```

```
RELOADEECPUNUM                 Variable      INT           Direct        L+001

000000  002001 103074 143000 044401 102073 142000 001027 012005     000010  100001 000002 100002 024733 027000 040401 040010 000215
000020  015041 103075 143000 010417 027000 100040 103075 147000     000030  010430 100040 103075 147000 010424 100001 000002 100002
000040  024733 027000 010416 003742 100003 000205 000100 016002     000050  000107 100004 000030 177756 177755 177760 177746 177756
000060  000000 027000 103074 143000 024700 027000 125003
```

TmpControl^HighStartThread

```
000000 0  0    PROC TmpControl^HighStartThread;
000000 1  0
000000 1  0    !--------------------------------------------------------------------------------
000000 1  0    !
000000 1  0    !--------------------------------------------------------------------------------
000000 1  0
000000 1  0    BEGIN
000000 1  1        Thread^NewParameterLess( G.StartOp.HighThreadAddr );
000000 1  1
000000 1  1        STRUCT  .OperationCkptInfo( TmpOperationCkptInfo^Struct );
000000 1  1
000000 1  1        ! Beginning of code...
000000 1  1
000000 1  1        PermAssertTruth( G.TmpState = Starting^TmpState );
000025 1  1        PermAssertTruth( G.StartOp.State >= FirstHighStart^StartOpState AND
000025 1  1                         G.StartOp.State <= LastHighStart^StartOpState );
000042 1  1
000042 1  1        LOOP
000042 1  2            CASE G.StartOp.State OF
000045 1  2            BEGIN
000045 1  3            WaitForNetResolve^StartOpState ->
000045 1  3                CALL TmpTEvent^NetResolve( G.StartOp.HighQuit );
000053 1  3
000053 1  3            RunningBackout^StartOpState ->
000054 1  3                CALL TmpTEvent^RunBackOut( G.StartOp.HighQuit );
000062 1  3
000062 1  3            WaitFor1stDvPass^StartOpState ->
000063 1  3                CALL TmpDataVol^RunOneVrAndWait( G.StartOp.HighQuit );
000071 1  3
000071 1  3            EndOperation^StartOpState ->
000072 1  3                CALL Semaphore^Get( G.CheckpointSem, 1,
000072 1  3                                    G.StartOp.HighQuit );
000105 1  3
000105 1  3                IF NOT G.StartOp.HighQuit THEN
000110 1  3                    CALL TmpTCtrl^HighStartEnableTrans;
000111 1  3
000111 1  3                IF NOT G.StartOp.HighQuit THEN
000114 1  3                    CALL TmpDataVol^AllowVolRecov;
000115 1  3
000115 1  3                IF G.StartOp.HighQuit THEN
000120 1  3                    EXITLOOP;
000120 1  3
000120 1  3                CALL TmpCtrlEms^TmfStarted( G.OperationNum );
000124 1  3
000124 1  3                CALL TmpOperation^End( G.OperationNum );
000130 1  3
000130 1  3                CALL TmpOperation^GetCkptInfo( G.OperationNum,
000130 1  3                                               OperationCkptInfo );
000137 1  3                CALL TmpControl^CheckpointEndOper( TmfStarted^CkptKind,
000137 1  3                                                   OperationCkptInfo );
000143 1  3
000143 1  3                CALL TmpOperation^IssueEndEvent( G.OperationNum );
000147 1  3                CALL TmpOperation^GetCkptInfo( G.OperationNum,
000147 1  3                                               OperationCkptInfo );
000156 1  3                CALL TmpControl^CkptOperEventIssued( OperationCkptInfo );
000161 1  3
000161 1  3                G.StartOp.State := None^StartOpState;
```

```
                                   TmpControl^HighStartThread
000164 1  3             G.OperationNum := -1;
000167 1  3
000167 1  3             G.TmpState := Started^TmpState;
000172 1  3
000172 1  3             CALL Semaphore^Put( G.CheckpointSem );
000200 1  3             EXITLOOP;
000201 1  3
000201 1  3         OTHERWISE ->
000201 1  3             UndefinedCaseError;
000206 1  3         END;
000225 1  2
000225 1  2         CALL Semaphore^Get( G.CheckpointSem, 1,
000225 1  2                             G.StartOp.HighQuit );
000240 1  2         IF G.StartOp.HighQuit THEN
000243 1  2             EXITLOOP;
000243 1  2
000243 1  2         G.StartOp.State := G.StartOp.State + 1;
000246 1  2         CALL TmpControl^CheckpointNewState( NewStartOpState^CkptKind,
000246 1  2                                             G.StartOp.State );
000252 1  2
000252 1  2         CALL Semaphore^Put( G.CheckpointSem );
000260 1  2     ENDLOOP;
000261 1  1
000261 1  1     G.StartOp.HighThreadAddr := Nil^Addr;
000265 1  1 END;

OPERATIONCKPTINFO               Variable,36   STRUCT      Indirect    L+002
^^DUMMY                         Variable      INT         Direct      L+001
^^FIRSTPARAM                    Variable      INT         Direct      L-002

000000  070702 100000 103120 173000 130001 000002 100006 024755    000010  027000 070403 024711 002017 103112 143000 001001 012005
000020  100001 000002 100002 024733 027000 103114 143000 001053    000030  014004 103114 143000 001056 016005 100001 000002 100002
000040  024733 027000 103114 143000 010542 100000 103122 173000    000050  130001 024711 027000 010551 100000 103122 173000 130001
000060  024711 027000 010542 100000 103122 173000 130001 024711    000070  027000 010533 103017 163000 100001 100000 102122 172000
000100  130001 100007 024755 027000 000107 103122 143000 015401    000110  027000 103122 143000 015401 027000 103122 143000 015541
000120  103113 143000 024700 027000 103113 143000 024700 027000    000130  103113 143000 100000 170402 130001 024722 027000 100020
000140  170402 024711 027000 103113 143000 024700 027000 103113    000150  143000 100000 170402 130001 024722 027000 170402 024700
000160  027000 100050 103114 147000 100777 102113 146000 100002    000170  101112 145000 103017 163000 100000 100002 024733 027000
000200  010460 100001 000002 100002 024733 027000 010416 003725    000210  100003 000205 000100 016002 000107 100004 000030 177626
000220  177634 177642 177650 177756 000000 103017 163000 100001    000230  100000 102122 172000 130001 100007 024755 027000 000107
000240  103122 143000 015416 103114 100001 177000 100015 143000    000250  024711 027000 103017 163000 100000 100002 024733 027000
000260  110405 100774 100000 103050 167000 125003 177554
```

TmpControl^DoLowStart

```
000000 0  0   PROC TmpControl^DoLowStart;
000000 1  0
000000 1  0   !---------------------------------------------------------------------------
000000 1  0   !
000000 1  0   !---------------------------------------------------------------------------
000000 1  0
000000 1  0   BEGIN
000000 1  1       Boolean  Successful;
000000 1  1
000000 1  1
000000 1  1       ! Beginning of code...
000000 1  1
000000 1  1       PermAssertTruth( G.TmpState = Starting^TmpState );
000012 1  1       PermAssertTruth( G.StartOp.State = LowStart^StartOpState );
000023 1  1
000023 1  1       ! Note Enable^/Disable^ are not 'True' and 'False'
000023 1  1
000023 1  1       IF G.StartOp.Command.TransAllowSpecified THEN
000026 1  1           IF G.StartOp.Command.TransAllowOption THEN
000031 1  1              CALL TmpTCtrl^StartTmfTransOption (Enable^TmpTCtrlOption)
000034 1  1           ELSE
000035 1  1              CALL TmpTCtrl^StartTmfTransOption (Disable^TmpTCtrlOption);
000040 1  1
000040 1  1       Successful := TmpControl^DoStartSteps;
000042 1  1
000042 1  1       IF NOT Successful THEN
000044 1  1           BEGIN
000044 1  2           !-----------------------------------------------------------
000044 1  2           ! One of the Start "phase" routines was unable to start.
000044 1  2           ! It has issued the EMS with the reason.  Do the equivalent
000044 1  2           ! of a STOP ABRUPT to clean up the mess.
000044 1  2           !-----------------------------------------------------------
000044 1  2           CALL TmpCtrlEms^StartTmfFailed( G.OperationNum );
000050 1  2           CALL TmpControl^StopAbrupt;
000051 1  2           END;
000051 1  1
000051 1  1       G.StartOp.State := FirstHighStart^StartOpState;
000054 1  1       CALL TmpControl^CheckpointNewState( NewStartOpState^CkptKind,
000054 1  1                                           G.StartOp.State );
000060 1  1
000060 1  1       CALL TmpControl^HighStartThread;
000061 1  1   END;

SUCCESSFUL                    Variable      INT           Direct        L+001

000000  002001 103112 143000 001001 012005 100001 000002 100002     000010  024733 027000 103114 143000 001052 012005 100001 000002
000020  100002 024733 027000 103116 143000 014412 102117 142000     000030  014404 100000 024700 027000 010403 100001 024700 027000
000040  027000 034401 004000 015405 103113 143000 024700 027000     000050  027000 100053 103114 147000 100015 143000 024711 027000
000060  027000 125003
```

TmpControl^HighStopThread

```
000000 0  0   PROC TmpControl^HighStopThread;
000000 1  0
000000 1  0   !------------------------------------------------------------------
000000 1  0   !
000000 1  0   !-=----------------------------------------------------------------
000000 1  0
000000 1  0   BEGIN
000000 1  1       Thread^NewParameterLess( G.StopOp.HighThreadAddr );
000000 1  1
000000 1  1       ! Beginning of code...
000000 1  1
000000 1  1       PermAssertTruth( G.TmpState = Stopping^TmpState );
000023 1  1       PermAssertTruth( G.StopOp.State >= FirstHighStop^StopOpState AND
000023 1  1                        G.StopOp.State <= LastHighStop^StopOpState );
000040 1  1
000040 1  1       LOOP
000040 1  2           CASE G.StopOp.State OF
000043 1  2           BEGIN
000043 1  3           WaitForTransFinish^StopOpState ->
000043 1  3               CALL TmpTCtrl^HighStopDisableTrans;
000044 1  3               CALL TmpTEvent^HighStop( G.StopOp.HighQuit );
000052 1  3
000052 1  3           WaitForDvStop^StopOpState ->
000053 1  3               CALL TmpDataVol^BeginStoppingTmf( G.OperationNum,
000053 1  3                                                 ZTMF^VAL^StopTmf,
000053 1  3                                                 G.StopOp.HighQuit );
000064 1  3
000064 1  3           WaitForRdf^StopOpState ->
000065 1  3               ;  !*** Do nothing for right now.
000066 1  3               CALL TmpRdf^WaitForRdfShutdown( G.StopOp.HighQuit );
000066 1  3
000066 1  3           OTHERWISE ->
000066 1  3               UndefinedCaseError;
000073 1  3           END;
000111 1  2
000111 1  2           CALL Semaphore^Get( G.CheckpointSem, 1,
000111 1  2                               G.StopOp.HighQuit );
000124 1  2           IF G.StopOp.HighQuit THEN
000127 1  2               EXITLOOP;
000127 1  2
000127 1  2           IF G.StopOp.State = LastHighStop^StopOpState THEN
000133 1  2               BEGIN
000133 1  3               !-------------------------
000133 1  3               ! Finished with High Stop.
000133 1  3               !-------------------------
000133 1  3               G.StopOp.State := ReadyForLowStop^StopOpState;
000135 1  3               CALL TmpControl^CheckpointNewState( NewStopOpState^CkptKind,
000135 1  3                                                   G.StopOp.State );
000141 1  3
000141 1  3               CALL Semaphore^Put( G.CheckpointSem );
000147 1  3
000147 1  3               CALL Thread^Schedule( G.ControlThread,
000147 1  3                                     Normal^ScheduleOption );
000155 1  3               EXITLOOP;
000156 1  3               END;
000156 1  2
000156 1  2           G.StopOp.State := G.StopOp.State + 1;
```

```
                                  TmpControl^HighStopThread

 3236.    000161 1  2          CALL TmpControl^CheckpointNewState( NewStopOpState^CkptKind,
 3237.    000161 1  2                                              G.StopOp.State );
 3238.    000165 1  2
 3239.    000165 1  2          CALL Semaphore^Put( G.CheckpointSem );
 3240.    000173 1  2        ENDLOOP;
 3241.    000174 1  1
 3242.    000174 1  1        G.StopOp.HighThreadAddr := Nil^Addr;
 3243.    000200 1  1     END;

^^DUMMY                           Variable        INT            Direct          L+001
^^FIRSTPARAM                      Variable        INT            Direct          L-002


000000  070702 100000 103124 173000 130001 000002 100006 024755    000010  027000 024700 103112 143000 001003 012005 100001 000002
000020  100002 024733 027000 103123 143000 001063 014004 103123    000030  143000 001065 016005 100001 000002 100002 024733 027000
000040  103123 143000 010431 027000 100000 103126 173000 130001    000050  024711 027000 010436 103113 143000 100163 100000 102126
000060  172000 130001 024733 027000 010424 010423 100001 000002    000070  100002 024733 027000 010415 003715 100002 000205 000100
000100  016002 000107 100003 000030 177737 177746 000003 177757    000110  000000 103017 163000 100001 100000 102126 172000 130001
000120  100007 024755 027000 000107 103126 143000 015445 103123    000130  143000 001065 015023 100066 147000 100016 143000 024711
000140  027000 103017 163000 100000 100002 024733 027000 103014    000150  163000 100000 100003 024733 027000 010416 103123 100001
000160  177000 100016 143000 024711 027000 103017 163000 100000    000170  100002 024733 027000 010644 100774 100000 103052 167000
000200  125003
```

TmpControl^DoLowStop

```
000000 0  0   PROC TmpControl^DoLowStop;
000000 1  0
000000 1  0   !------------------------------------------------------------------------------
000000 1  0   !
000000 1  0   !------------------------------------------------------------------------------
000000 1  0
000000 1  0   BEGIN
000000 1  1       STRUCT  .OperationCkptInfo( TmpOperationCkptInfo^Struct );
000000 1  1
000000 1  1       ! Beginning of code...
000000 1  1
000000 1  1       PermAssertTruth( G.TmpState = Stopping^TmpState );
000014 1  1       PermAssertTruth( G.StopOp.State = LowStop^StopOpState );
000025 1  1
000025 1  1       !-------------------------------------
000025 1  1       ! Perform the Low START TMF "phase".
000025 1  1       !-------------------------------------
000025 1  1       CALL TmpControl^DoStopSteps;
000026 1  1
000026 1  1       !--------------------
000026 1  1       ! End the operation.
000026 1  1       !--------------------
000026 1  1       G.StopOp.State := EndOperation^StopOpState;
000031 1  1       CALL TmpControl^CheckpointNewState( NewStopOpState^CkptKind,
000031 1  1                                           G.StopOp.State);
000035 1  1
000035 1  1       CALL TmpCtrlEms^TmfStopped( G.OperationNum );
000041 1  1
000041 1  1       CALL TmpOperation^End( G.OperationNum );
000045 1  1
000045 1  1       CALL TmpOperation^GetCkptInfo( G.OperationNum,
000045 1  1                                      OperationCkptInfo );
000054 1  1       CALL TmpControl^CheckpointEndOper( TmfStopped^CkptKind,
000054 1  1                                          OperationCkptInfo );
000060 1  1
000060 1  1       CALL TmpOperation^IssueEndEvent( G.OperationNum );
000064 1  1       CALL TmpOperation^GetCkptInfo( G.OperationNum,
000064 1  1                                      OperationCkptInfo );
000073 1  1       CALL TmpControl^CkptOperEventIssued( OperationCkptInfo );
000076 1  1
000076 1  1       G.StopOp.State := None^StopOpState;
000101 1  1       G.OperationNum := -1;
000104 1  1
000104 1  1       StartTmfTimeStamp := 0F;
000110 1  1       G.TmpState := Stopped^TmpState;
000113 1  1   END;
```

```
OPERATIONCKPTINFO             Variable,36     STRUCT          Indirect        L+001

000000  070402 024700 002017 103112 143000 001003 012005 100001
000010  000002 100002 024733 027000 103123 143000 001067 012005
000020  100001 000002 100002 024733 027000 027000 100070 103123
000030  147000 100016 143000 024711 027000 103113 143000 024700
000040  027000 103113 143000 024700 027000 103113 143000 100000
000050  170401 130001 024722 027000 100021 170401 024711 027000
000060  103113 143000 024700 027000 103113 143000 100000 170401
000070  130001 024722 027000 170401 024700 027000 100062 103123
000100  147000 100777 102113 146000 000002 000002 070004 000230
000110  100000 101112 145000 125003
```

TmpControl^DoDelete

```
000000 0  0   PROC TmpControl^DoDelete;
000000 1  0
000000 1  0   !------------------------------------------------------------------------
000000 1  0   !
000000 1  0   !------------------------------------------------------------------------
000000 1  0
000000 1  0   BEGIN
000000 1  1       STRUCT  .OperationCkptInfo( TmpOperationCkptInfo^Struct );
000000 1  1
000000 1  1       Int     Error;
000000 1  1       Struct .MigrationFileNameStr( Str^Struct );
000000 1  1
000000 1  1       ! Beginning of code...
000000 1  1
000000 1  1       PermAssertTruth( G.TmpState = Deleting^TmpState );
000017 1  1       PermAssertTruth( G.DeleteOp.State >= FirstDeleting^DeleteOpState AND
000017 1  1                        G.DeleteOp.State <= LastDeleting^DeleteOpState );
000034 1  1
000034 1  1       LOOP
000034 1  2           CASE G.DeleteOp.State OF
000037 1  2           BEGIN
000037 1  3           Deleting^DeleteOpState ->
000037 1  3               G.GlobInfoRecord.DeleteTmfInProgress := True;
000042 1  3               CALL TmpControl^WriteGlobInfo;
000043 1  3
000043 1  3               CALL TmpAtUtility^DeleteTmf;
000044 1  3
000044 1  3               CALL TmpProcess^DeleteTmf;
000045 1  3
000045 1  3               Str^FromLiteral( MigrationFileNameStr, "$SYSTEM.TMF.MIGRATE" );
000124 1  3               CALL FILE_PURGE_( MigrationFileNameStr.Bytes:
000124 1  3                                 MigrationFileNameStr.Len );
000134 1  3
000134 1  3               G.GlobInfoRecord.TmfConfigurationSeqNum := JULIANTIMESTAMP;
000144 1  3               TmfConfigurationSeqNum := G.GlobInfoRecord.TmfConfigurationSeqNum;
000150 1  3
000150 1  3               CALL TmpControl^CheckpointConfSeqNum( TmfConfigurationSeqNum );
000154 1  3
000154 1  3               ! Delete the Released and Retaindepth info pertaining to the
000154 1  3               ! Catalog
000154 1  3               G.GlobInfoRecord.CtgInfo.Released := False;
000157 1  3               G.GlobInfoRecord.CtgInfo.RetainDepth := RetainDepthDefault;
000162 1  3
000162 1  3               G.GlobInfoRecord.DeleteTmfInProgress := False;
000165 1  3               CALL TmpControl^WriteGlobInfo;
000166 1  3
000166 1  3           EndOperation^DeleteOpState ->
000167 1  3               CALL TmpCtrlEms^TmfDeleted( G.OperationNum );
000173 1  3
000173 1  3               CALL TmpOperation^End( G.OperationNum );
000177 1  3
000177 1  3               CALL TmpOperation^GetCkptInfo( G.OperationNum,
000177 1  3                                              OperationCkptInfo );
000206 1  3               CALL TmpControl^CheckpointEndOper( TmfDeleted^CkptKind,
000206 1  3                                                  OperationCkptInfo );
000212 1  3
000212 1  3               CALL TmpOperation^IssueEndEvent( G.OperationNum );
```

TmpControl^DoDelete

```
3349.   000216 1  3          CALL TmpOperation^GetCkptInfo( G.OperationNum,
3350.   000216 1  3                                         OperationCkptInfo );
3351.   000225 1  3          CALL TmpControl^CkptOperEventIssued( OperationCkptInfo );
3352.   000230 1  3
3353.   000230 1  3          G.DeleteOp.State := None^DeleteOpState;
3354.   000233 1  3          G.OperationNum := -1;
3355.   000240 1  3
3356.   000240 1  3          G.TmpState := Stopped^TmpState;
3357.   000243 1  3          EXITLOOP;
3358.   000244 1  3
3359.   000244 1  3      OTHERWISE ->
3360.   000244 1  3          UndefinedCaseError;
3361.   000251 1  3      END;
3362.   000266 1  2
3363.   000266 1  2      G.DeleteOp.State := G.DeleteOp.State + 1;
3364.   000271 1  2      CALL TmpControl^CheckpointNewState( NewDeleteOpState^CkptKind,
3365.   000271 1  2                                          G.DeleteOp.State);
3366.   000275 1  2    ENDLOOP;
3367.   000276 1  1  END;

ERROR                          Variable       INT        Direct     L+002
MIGRATIONFILENAMESTR           Variable,10    STRUCT     Indirect   L+003
OPERATIONCKPTINFO              Variable,36    STRUCT     Indirect   L+001

000000  070404 024700 002001 070423 024700 002023 103112 143000     000010  001004 012005 100001 000002 100002 024733 027000 103127
000020  143000 001076 014004 103127 143000 001077 016005 100001     000030  000002 100002 024733 027000 103127 143000 110576 100777
000040  103331 147000 027000 027000 027000 170000 030001 003004     000050  000025 100226 004400 000200 030001 100023 126040 134000
000060  004000 170000 030001 003004 000201 103001 147000 100000     000070  170403 130001 100000 073740 130001 143000 100000 100017
000100  024766 027000 070740 103001 143000 003001 030101 000200     000110  000021 100000 170403 130001 100000 170000 130001 003004
000120  103001 143000 024744 027000 160403 103003 143403 005340     000130  100775 024744 027000 000107 002004 100000 100774 024711
000140  027000 103325 173000 000230 173000 000234 070000 000230     000150  070000 000234 024733 027000 100000 103332 147000 100003
000160  102333 146000 100000 101331 145000 027000 010477 103113     000170  143000 024700 027000 103113 143000 024700 027000 103113
000200  143000 100000 170401 130001 024722 027000 100022 170401     000210  024711 027000 103113 143000 024700 027000 103113 143000
000220  100000 170401 130001 024722 027000 170401 024700 027000     000230  100074 103127 147000 100777 010401 000015 102113 146000
000240  100000 101112 145000 125003 100001 000002 100002 024733     000250  027000 010414 003702 100001 000205 000100 016002 000107
000260  100002 000030 177555 177704 177760 000000 103127 100001     000270  177000 100017 143000 024711 027000 110413 125003 022123
000300  054523 052105 046456 052115 043056 046511 043522 040524     000310  042400 177523
```

TmpControl^DoTakeOver

```
000000 0  0   PROC TmpControl^DoTakeOver( UnplannedTakeOver );
000000 1  0
000000 1  0   !------------------------------------------------------------------------------
000000 1  0   !
000000 1  0   !------------------------------------------------------------------------------
000000 1  0
000000 1  0   Boolean  UnplannedTakeOver;
000000 1  0                     ! IN
000000 1  0
000000 1  0   BEGIN
000000 1  1       Int  CpuNum;
000000 1  1
000000 1  1       Int  CpuState;
000000 1  1
000000 1  1       Boolean  BackupIsUp;
000000 1  1
000000 1  1       STRUCT  .BackupPhandle( Phandle^Struct );
000000 1  1
000000 1  1       Boolean  NoneLeft;
000000 1  1
000000 1  1       STRUCT  .MsgInfo( TmpMsgInfo^Struct );
000000 1  1
000000 1  1       Int        Error;
000000 1  1
000000 1  1       ! Beginning of code...
000000 1  1
000000 1  1       PermAssertTruth( G.OwnershipState = CapableBackup^OwnershipState );
000020 1  1       G.OwnershipState := TakingOver^OwnershipState;
000023 1  1
000023 1  1       PermAssertTruth( G.CpuDownOp.State = Nil^CpuDownOpState );
000034 1  1       G.CpuDownOp.State := None^CpuDownOpState;
000037 1  1
000037 1  1       PermAssertTruth( G.CpuReloadOp.State = Nil^CpuReloadOpState );
000050 1  1       G.CpuReloadOp.State := None^CpuReloadOpState;
000053 1  1
000053 1  1       FOR CpuNum := 0 TO Max^Cpus - 1 DO
000055 1  1          BEGIN
000055 1  2          CpuState := G.CpuStateArray[ CpuNum ];
000062 1  2          CASE CpuState OF
000064 1  2          BEGIN
000064 1  3          Up^CpuState,
000064 1  3          Down^CpuState,
000064 1  3          FailedDown^CpuState,
000064 1  3          FailedReload^CpuState ->
000064 1  3              ;
000065 1  3
000065 1  3          Reloading^CpuState ->
000065 1  3              G.CpuStateArray[ CpuNum ] := FailedReload^CpuState;
000072 1  3
000072 1  3          Downing^CpuState ->
000073 1  3              G.CpuStateArray[ CpuNum ] := FailedDown^CpuState;
000100 1  3
000100 1  3          OTHERWISE ->
000101 1  3              UndefinedCaseError;
000106 1  3          END;
000127 1  2          END;
000134 1  1
```

TmpControl^DoTakeOver

```
000134 1 1      PermAssertTruth( LList^IsEmpty( G.SwitchReqList ) );
000151 1 1
000151 1 1      PermAssertTruth( G.MaintBackupOp.State = Nil^MaintBackOpState );
000162 1 1
000162 1 1      IF UnplannedTakeOver THEN
000164 1 1          G.MaintBackupOp.State := ReadyToCreate^MaintBackOpState
000164 1 1      ELSE
000170 1 1          G.MaintBackupOp.State := Up^MaintBackOpState;
000173 1 1
000173 1 1      PermAssertTruth( G.StartOp.State <> Nil^StartOpState );
000204 1 1      IF G.StartOp.State = LowStart^StartOpState THEN
000210 1 1          BEGIN
000210 1 2          !-------------------------------------------------------------
000210 1 2          ! A TakeOver kills a Start operation when if it was calling
000210 1 2          ! the Start "phase" routines.  Do the equivalent of a STOP TMF
000210 1 2          ! ABRUPT to clean up the mess.
000210 1 2          !-------------------------------------------------------------
000210 1 2          PermAssertTruth( UnplannedTakeOver );
000217 1 2          CALL TmpCtrlEms^TakeOverKillsStart( G.OperationNum );
000223 1 2          CALL TmpControl^StopAbrupt;
000224 1 2          END;
000224 1 1
000224 1 1      PermAssertTruth( G.StopOp.State <> Nil^StopOpState );
000235 1 1      IF G.StopOp.State = LowStop^StopOpState THEN
000241 1 1          BEGIN
000241 1 2          !-------------------------------------------------------------
000241 1 2          ! A TakeOver kills a Stop operation when if it was calling
000241 1 2          ! the Stop "phase" routines.  Do the equivalent of a STOP TMF
000241 1 2          ! ABRUPT to clean up the mess.
000241 1 2          !-------------------------------------------------------------
000241 1 2          PermAssertTruth( UnplannedTakeOver );
000250 1 2          CALL TmpCtrlEms^TakeOverKillsStop( G.OperationNum );
000254 1 2          CALL TmpControl^StopAbrupt;
000255 1 2          END;
000255 1 1
000255 1 1      !-----------------------------
000255 1 1      ! Open and write the configuration file.
000255 1 1      !-----------------------------
000255 1 1      CALL TmpControl^OpenGlobInfo;
000256 1 1      CALL TmpControl^WriteGlobInfo;
000257 1 1
000257 1 1      !-------------------------------------------------------
000257 1 1      ! Turn on the stream of Work events from the TMF Library.
000257 1 1      !-------------------------------------------------------
000257 1 1      CALL TmfLibTmpOwn^TakeOver;
000260 1 1
000260 1 1      !-------------------------------------------------------------
000260 1 1      ! Turn on checkpointing and call the TakeOver "Phase" Routines.
000260 1 1      !-------------------------------------------------------------
000260 1 1      BackupIsUp := NOT UnplannedTakeOver;
000266 1 1      IF BackupIsUp THEN
000270 1 1          BEGIN
000270 1 2          CALL Process^GetPhandle( G.BrotherProcessTag, BackupPhandle );
000300 1 2          CALL TmpCheckpoint^Enable( BackupPhandle );
000305 1 2          G.Checkpointing := True;
000310 1 2          END;
000310 1 1
```

TmpControl^DoTakeOver

```
000310 1  1      CALL TmpControl^DoTakeOverSteps( BackupIsUp );
000313 1  1
000313 1  1      !-------------------------------------------------------------------
000313 1  1      ! Now that no TMP modules are "Backup"s, we can change the ownership
000313 1  1      ! to reflect that.
000313 1  1      !-------------------------------------------------------------------
000313 1  1      G.OwnershipState := Primary^OwnershipState;
000316 1  1
000316 1  1      !---------------------------------------
000316 1  1      ! Fire up the threads a Primary TMP has.
000316 1  1      !---------------------------------------
000316 1  1      IF G.MaintBackupOp.State = Up^MaintBackOpState THEN
000322 1  1          CALL TmpControl^WatchBackupThread;
000323 1  1
000323 1  1      IF G.StartOp.State >= FirstHighStart^StartOpState AND
000323 1  1         G.StartOp.State <= LastHighStart^StartOpState THEN
000332 1  1          CALL TmpControl^HighStartThread;
000333 1  1
000333 1  1      IF G.StopOp.State >= FirstHighStop^StopOpState AND
000333 1  1         G.StopOp.State <= LastHighStop^StopOpState THEN
000342 1  1          CALL TmpControl^HighStopThread;
000343 1  1
000343 1  1      CALL TmpControl^ControlThread;
000344 1  1      CALL TmpControl^UserCommandThread;
000345 1  1
000345 1  1
000345 1  1      !---------------------------------------------
000345 1  1      ! Retry a Delete Catalog if one was in progress
000345 1  1      !---------------------------------------------
000345 1  1
000345 1  1      IF G.DeleteCatalog THEN
000352 1  1          BEGIN
000352 1  2          Struct^Zero( G.CR );
000374 1  2
000374 1  2          G.CR.DLR^Code := DLO^Initialize^Catalog;
000401 1  2          CALL THREEWORDTIMESTAMP ( G.GlobInfoRecord.TmfConfigurationSeqNum,
000401 1  2                                    G.CR.DLR^Status.DLR^TimeStamp );
000412 1  2
000412 1  2          CALL TmpControl^OpenCtgProcess;
000413 1  2
000413 1  2          CALL ThreadIo^WriteRead( G.CtgProcessFileNum,
000413 1  2                                   G.CRStr,
000413 1  2                                   , , ,      ! Tag, MaxReadLen and TimeOut
000413 1  2                                   Error );
000436 1  2
000436 1  2          IF Error <> FEOK  THEN
000440 1  2             BEGIN
000440 1  3             CALL TmpCtrlEms^CtgFSError( G.CtgProcessNameStr,
000440 1  3                                         WriteRead^CtgProcessOp, Error );
000452 1  3             CALL TmpControl^Abend;
000453 1  3             END; ! if error <> feok
000453 1  2          CALL TmpControl^CloseCtgProcess;
000454 1  2          G.DeleteCatalog := False;
000461 1  2
000461 1  2          ! Issue the EMS event.
000461 1  2          CALL TmpCtrlEms^DeleteCtg;
000462 1  2          END;
```

TmpControl^DoTakeOver

```
3540.    000462 1  1
3541.    000462 1  1         !------------------------------------------------------------------
3542.    000462 1  1         ! Feed 'TmpMain' all the messages that arrived during the TakeOver
3543.    000462 1  1         ! so it can redistribute them to the TMP Modules again.  This time
3544.    000462 1  1         ! they will accept them because they are in "Primary" state.
3545.    000462 1  1         !------------------------------------------------------------------
3546.    000462 1  1         LOOP
3547.    000462 1  2             CALL TmpMsg^DeleteFromList( G.TransitionHoldMsgList,
3548.    000462 1  2                                         NoneLeft, MsgInfo );
3549.    000476 1  2             IF NoneLeft THEN
3550.    000500 1  2                 EXITLOOP;
3551.    000500 1  2
3552.    000500 1  2             CALL TmpMain^HandleMsg( MsgInfo );
3553.    000505 1  2         ENDLOOP;
3554.    000506 1  1
3555.    000506 1  1     END;

BACKUPISUP                        Variable      INT         Direct      L+003
BACKUPPHANDLE                     Variable,24   STRUCT      Indirect    L+004
CPUNUM                            Variable      INT         Direct      L+001
CPUSTATE                          Variable      INT         Direct      L+002
ERROR                             Variable      INT         Direct      L+007
MSGINFO                           Variable,40   STRUCT      Indirect    L+006
NONELEFT                          Variable      INT         Direct      L+005
UNPLANNEDTAKEOVER                 Variable      INT         Direct      L-003

000000  002003 070410 024700 002001 070422 024700 002033 103040     000010  143000 001005 012005 100001 000002 100002 024733 027000
000020  100003 103040 147000 102071 142000 001777 012005 100001     000030  000002 100002 024733 027000 100012 103071 147000 102073
000040  142000 001777 012005 100001 000002 100002 024733 027000     000050  100024 103073 147000 100000 010454 040401 003051 000117
000060  143000 034402 004000 010423 010442 100005 040401 003051     000070  000117 147000 010434 100003 040401 003051 000117 147000
000100  010426 100001 000002 100002 024733 027000 010420 003777     000110  100005 000205 000100 016002 000107 100006 000030 000010
000120  000007 000006 177743 000004 177747 177754 000000 040401     000130  104001 034401 001017 016321 100000 170000 130001 003040
000140  103010 163000 000225 012005 100001 000002 100002 024733     000150  027000 103075 143000 001777 012005 100001 000002 100002
000160  024733 027000 040703 014404 100036 103075 147000 010403     000170  100043 103075 147000 103114 143000 001777 015005 100001
000200  000002 100002 024733 027000 103114 143000 001052 015014     000210  040703 015405 100001 000002 100002 024733 027000 103113
000220  143000 024700 027000 027000 103123 143000 001777 015005     000230  100001 000002 100002 024733 027000 103123 143000 001067
000240  015014 040703 015405 100001 000002 100002 024733 027000     000250  103113 143000 024700 027000 027000 027000 027000 027000
000260  040703 015402 100777 010401 100000 034403 004000 014420     000270  103043 173000 000362 100000 170404 130001 024733 027000
000300  100000 170404 130001 024711 027000 100777 103042 147000     000310  040403 024700 027000 100001 103040 147000 102075 142000
000320  001043 015001 027000 103114 143000 001053 014004 143000     000330  001056 011001 027000 103123 143000 001063 014004 143000
000340  001065 011001 027000 027000 027000 005001 004167 000117     000350  143000 014510 000002 170000 130001 005002 004052 000200
000360  000407 000003 100000 170000 130001 005002 004052 000200     000370  000220 000103 100273 000417 100025 005001 004025 000117
000400  147000 102325 172000 000234 005001 004062 000115 171000     000410  024744 027000 027000 005001 004020 000117 143000 100000
000420  170000 130001 005002 004346 000200 024722 002005 100000     000430  070407 130001 100061 024722 027000 000107 040407 014413
000440  100000 170000 130001 005002 004042 000200 100004 040407     000450  024733 027000 027000 027000 100000 005001 004167 000117
000460  147000 027000 100000 170000 130001 003112 100000 070405     000470  130001 100000 170406 130001 024755 027000 040405 015406
000500  100000 170406 130001 024711 027000 010754 125004
```

TmpControl^WatchPrimaryThread

```
000000 0  0   PROC TmpControl^WatchPrimaryThread;
000000 1  0
000000 1  0   !------------------------------------------------------------------------
000000 1  0   !
000000 1  0   !------------------------------------------------------------------------
000000 1  0
000000 1  0   BEGIN
000000 1  1       Thread^NewParameterLess( G.Backup.WatchPrimaryThreadAddr );
000000 1  1
000000 1  1       Boolean  UnplannedTakeOver;
000000 1  1
000000 1  1       STRUCT  .ProcessResults( ProcessResults^Struct );
000000 1  1
000000 1  1       ! Beginning of code...
000000 1  1
000000 1  1       PermAssertTruth( G.OwnershipState = VulnerableBackup^OwnershipState OR
000000 1  1                        G.OwnershipState = CapableBackup^OwnershipState );
000032 1  1
000032 1  1       CALL Process^WaitForTermination( G.BrotherProcessTag,
000032 1  1                                        G.Backup.QuitForTakeSwitch );
000044 1  1
000044 1  1       IF G.Backup.QuitForTakeSwitch THEN
000047 1  1           BEGIN
000047 1  2           !-------------------------------------------------------------
000047 1  2           ! Do not call 'Process^Finish' when Switching.  Let the new Primary
000047 1  2           ! use the 'G.BrotherProcessTag' to monitor the new Backup.
000047 1  2           !-------------------------------------------------------------
000047 1  2           G.Backup.QuitForTakeSwitch := False;
000051 1  2           UnplannedTakeOver := False;
000052 1  2           PermAssertTruth( G.OwnershipState = CapableBackup^OwnershipState );
000063 1  2           END
000063 1  1       ELSE
000064 1  1           BEGIN
000064 1  2           !------------------------------
000064 1  2           ! Primary TMP process has failed.
000064 1  2           !------------------------------
000064 1  2           CALL Process^Finish( G.BrotherProcessTag, ProcessResults );
000076 1  2           CALL TmpCtrlEms^PrimaryTmpFailed( ProcessResults );
000103 1  2
000103 1  2           CASE G.OwnershipState OF
000106 1  2           BEGIN
000106 1  3           VulnerableBackup^OwnershipState ->
000106 1  3               CALL TmpCtrlEms^BackupNotCapable;
000107 1  3               CALL TmpControl^StopAbrupt;
000110 1  3
000110 1  3           CapableBackup^OwnershipState ->
000111 1  3               CALL TmpCtrlEms^BackupTakingOver;
000112 1  3
000112 1  3           OTHERWISE ->
000113 1  3               UndefinedCaseError;
000120 1  3           END;
000135 1  2
000135 1  2           UnplannedTakeOver := True;
000137 1  2           END;
000137 1  1
000137 1  1       CALL TmpControl^DoTakeOver( UnplannedTakeOver );
000142 1  1
```

```
                                      TmpControl^WatchPrimaryThread

  3614.    000142 1   1       G.Backup.WatchPrimaryThreadAddr := Nil^Addr;
  3615.    000146 1   1    END;

PROCESSRESULTS                    Variable,150   STRUCT        Indirect      L+003
UNPLANNEDTAKEOVER                 Variable       INT           Direct        L+002
^^DUMMY                           Variable       INT           Direct        L+001
^^FIRSTPARAM                      Variable       INT           Direct        L-002

000000  070702 100000 103130 173000 130001 000002 100006 024755    000010  027000 024700 002001 070404 024700 002064 103040 143000
000020  001004 012010 143000 001005 012005 100001 000002 100002    000030  024733 027000 103043 173000 000362 100000 102132 172000
000040  130001 100003 024744 027000 103132 143000 014415 100000    000050  137000 044402 102040 142000 001005 012061 100001 000002
000060  100002 024733 027000 010453 103043 173000 000362 100000    000070  170403 130001 100003 024744 027000 000107 100000 170403
000100  130001 024711 027000 103040 143000 010413 027000 027000    000110  010424 027000 010422 100001 000002 100002 024733 027000
000120  010414 003774 100001 000205 000100 016002 000107 100002    000130  000030 177755 177757 177760 000000 100777 044402 040402
000140  024700 027000 100774 100000 103054 167000 125003
```

```
000000 0  0   PROC TmpControl^DoSwitch;
000000 1  0
000000 1  0   !------------------------------------------------------------------------
000000 1  0   !
000000 1  0   !------------------------------------------------------------------------
000000 1  0
000000 1  0   BEGIN
000000 1  1       ! Beginning of code...
000000 1  1
000000 1  1       AssertTruth( G.OwnershipState = Switching^OwnershipState );
000000 1  1
000000 1  1       CALL Thread^Schedule( G.UserCommandThread, Normal^ScheduleOption );
000006 1  1       CALL Thread^WaitForExit( G.UserCommandThread );
000015 1  1
000015 1  1       IF @G.MaintBackupOp.WatchThread <> Nil^Addr THEN
000024 1  1           BEGIN
000024 1  2           !------------------------------------------------------------------
000024 1  2           ! If the Watch thread didn't die while waiting for the Control thread
000024 1  2           ! to exit, kill it off.
000024 1  2           !------------------------------------------------------------------
000024 1  2           G.MaintBackupOp.WatchQuit := True;
000027 1  2           CALL Thread^Schedule( G.MaintBackupOp.WatchThread,
000027 1  2                                 Normal^ScheduleOption );
000035 1  2           CALL Thread^WaitForExit( G.MaintBackupOp.WatchThread );
000045 1  2           G.MaintBackupOp.WatchQuit := False;
000050 1  2           END;
000050 1  1
000050 1  1       AssertTruth( G.MaintBackupOp.State = Up^MaintBackOpState OR
000050 1  1                    G.MaintBackupOp.State = ReadyToDown^MaintBackOpState );
000050 1  1
000050 1  1       IF G.StartOp.HighThreadAddr <> Nil^Addr THEN
000056 1  1           BEGIN
000056 1  2           G.StartOp.HighQuit := True;
000061 1  2           CALL Thread^Schedule( G.StartOp.HighThread, Normal^ScheduleOption );
000066 1  2           CALL Thread^WaitForExit( G.StartOp.HighThread );
000075 1  2           G.StartOp.HighQuit := False;
000100 1  2           END;
000100 1  1
000100 1  1       IF G.StopOp.HighThreadAddr <> Nil^Addr THEN
000106 1  1           BEGIN
000106 1  2           G.StopOp.HighQuit := True;
000111 1  2           CALL Thread^Schedule( G.StopOp.HighThread, Normal^ScheduleOption );
000116 1  2           CALL Thread^WaitForExit( G.StopOp.HighThread );
000125 1  2           G.StopOp.HighQuit := False;
000130 1  2           END;
000130 1  1
000130 1  1       CALL TmpControl^DoGiveSwitchSteps;
000131 1  1
000131 1  1       !--------------------------------------------------------------------
000131 1  1       ! Shut off the flow of Work events from the TMF Library, disconnect
000131 1  1       ! TMF Library TCBs from TMP TCBs, etc.  We do this after all TMP
000131 1  1       ! modules have given up their ownership so they will not request
000131 1  1       ! new services from the TMF Library.
000131 1  1       !--------------------------------------------------------------------
000131 1  1       CALL TmfLibTmpOwn^GiveSwitch;
000132 1  1
000132 1  1       CALL TmpControl^CloseGlobInfo;
```

TmpControl^DoSwitch

```
000133 1   1
000133 1   1          PermAssertTruth( Semaphore^IsReady( G.CheckpointSem ) );
000147 1   1
000147 1   1          CALL TmpControl^CheckpointShort( YouAreNowPrimary^CkptKind );
000152 1   1
000152 1   1          !-----------------------------------------------------------
000152 1   1          ! Flush the final checkpoints out and turn off checkpointing.
000152 1   1          !-----------------------------------------------------------
000152 1   1          CALL TmpCheckpoint^Disable;
000153 1   1
000153 1   1          !----------------------------------------------
000153 1   1          ! Officially declare we are the new Backup TMP.
000153 1   1          !----------------------------------------------
000153 1   1          G.OwnershipState := CapableBackup^OwnershipState;
000156 1   1          G.Checkpointing := False;
000161 1   1
000161 1   1          !---------------------
000161 1   1          ! Primary only states.
000161 1   1          !---------------------
000161 1   1          G.CpuDownOp.State := Nil^CpuDownOpState;
000164 1   1          G.CpuReloadOp.State := Nil^CpuReloadOpState;
000167 1   1          G.MaintBackupOp.State := Nil^MaintBackOpState;
000172 1   1
000172 1   1          CALL TmpControl^WatchPrimaryThread;
000173 1   1
000173 1   1          ! *** Assert "Backup-Ness"
000173 1   1
000173 1   1          CALL TmpMsg^ReplyToList( G.TransitionHoldMsgList, FEOWNERSHIP );
000202 1   1
000202 1   1          CALL TmpMsg^ReplyToList( G.SwitchReqList, FEOK );
000211 1   1      END;
```

```
000000  103015 163000 100000 100003 024733 027000 103015 163000     000010  000002 100002 024744 027000 000107 103107 173000 000362
000020  100774 100000 000225 012024 100777 102111 146000 173000     000030  000362 100000 100003 024733 027000 103107 173000 000362
000040  000002 100002 024744 027000 000107 100000 103111 147000     000050  103050 163000 100774 100000 000225 012022 100777 102122
000060  146000 163000 100000 100003 024733 027000 103050 163000     000070  000002 100002 024744 027000 000107 100000 103122 147000
000100  103052 163000 100774 100000 000225 012022 100777 102126     000110  146000 163000 100000 100003 024733 027000 103052 163000
000120  000002 100002 024744 027000 000107 100000 103126 147000     000130  027000 027000 027000 103017 163000 100000 100002 024733
000140  027000 015405 100001 000002 100002 024733 027000 100002     000150  024700 027000 027000 100005 103040 147000 100000 102042
000160  146000 100777 101071 145000 100777 103073 147000 100777     000170  103075 147000 027000 100000 170000 130001 003112 100310
000200  024722 027000 100000 170000 130001 003040 100000 024722     000210  027000 125003
```

TmpControl^InitiateDelete

```
000000 0  0   PROC TmpControl^InitiateDelete( BeginOperationTime ) VARIABLE;
000000 1  0
000000 1  0   !--------------------------------------------------------------------------
000000 1  0   !
000000 1  0   !       This procedure will initiate a DELETE TMF operation.  It is called
000000 1  0   !       in response to a DELETE TMF command, or at TMP initialization time
000000 1  0   !       when the 'DeleteInProgress' flag is set in the GLOBINFO file.
000000 1  0   !
000000 1  0   !--------------------------------------------------------------------------
000000 1  0
000000 1  0   FIXED .EXT      BeginOperationTime;      ! (out,opt) If supplied, we return
000000 1  0                                            ! the time at which the DELETE TMF
000000 1  0                                            ! operation began.
000000 1  0
000000 1  0   BEGIN
000000 1  1
000000 1  1       STRUCT  .OperationCkptInfo( TmpOperationCkptInfo^Struct );
000000 1  1       FIXED    BeginOperationTimeLocal;
000000 1  1
000000 1  1       !--------------------
000000 1  1       ! Beginning of code...
000000 1  1       !--------------------
000000 1  1
000000 1  1       IF NOT $PARAM( BeginOperationTime ) THEN @BeginOperationTime := Nil^Addr;
000010 1  1
000010 1  1       G.TmpState := Deleting^TmpState;
000013 1  1
000013 1  1       !-------------------------------------------------------------
000013 1  1       ! The following sequence is necessary since we want to begin a
000013 1  1       ! new operation in the 'TmpOperation' module and within our
000013 1  1       ! module in the Backup TMP at the same time.  If we had two
000013 1  1       ! separate checkpoints, an orphan operation could result if
000013 1  1       ! there was a takeover.  Therefore, the 'TmpOperation'
000013 1  1       ! module's checkpoint goes in ours.
000013 1  1       !-------------------------------------------------------------
000013 1  1       CALL TmpOperation^Begin( ZTMF^VAL^DeleteTmf, G.OperationNum,
000013 1  1                                BeginOperationTimeLocal );
000026 1  1       CALL TmpOperation^GetCkptInfo( G.OperationNum, OperationCkptInfo );
000035 1  1       CALL TmpControl^CheckpointDelete( G.OperationNum, OperationCkptInfo );
000042 1  1       CALL TmpOperation^IssueBeginEvent( G.OperationNum );
000046 1  1       CALL TmpOperation^GetCkptInfo( G.OperationNum,
000046 1  1                                      OperationCkptInfo );
000055 1  1       CALL TmpControl^CkptOperEventIssued( OperationCkptInfo );
000060 1  1
000060 1  1       !------------------------------------
000060 1  1       ! Issue "Deleting TMF" EMS event.
000060 1  1       !------------------------------------
000060 1  1       CALL TmpCtrlEms^TmfDeleting( G.OperationNum );
000064 1  1
000064 1  1       G.DeleteOp.State := FirstDeleting^DeleteOpState;
000067 1  1       CALL Thread^Schedule( G.ControlThread, Normal^ScheduleOption );
000075 1  1
000075 1  1       IF @BeginOperationTime <> Nil^Addr THEN
000102 1  1           BeginOperationTime := BeginOperationTimeLocal;
000106 1  1
000106 1  1   END;
```

```
                              TmpControl^InitiateDelete

BEGINOPERATIONTIME              Variable      FIXED (0)     EXT Pointer    L-005
BEGINOPERATIONTIMELOCAL         Variable      FIXED (0)     Direct         L+002
OPERATIONCKPTINFO               Variable,36   STRUCT        Indirect       L+001

000000  070406 024700 002023 040703 015403 100774 100000 064705    000010  100004 103112 147000 100164 100000 102113 172000 130001
000020  100000 070402 130001 100007 024755 027000 103113 143000    000030  100000 170401 130001 024722 027000 103113 143000 170401
000040  024711 027000 103113 143000 024700 027000 103113 143000    000050  100000 170401 130001 024722 027000 170401 024700 027000
000060  103113 143000 024700 027000 100076 103127 147000 102014    000070  162000 100000 100003 024733 027000 060705 100774 100000
000100  000225 012004 070402 000234 060705 000415 125006
```

TmpControl^DoUserCommand

```
000000 0  0   PROC TmpControl^DoUserCommand( HandleAddr, UserCommandAddr );
000000 1  0
000000 1  0   !-------------------------------------------------------------------------
000000 1  0   !
000000 1  0   !   This procedure handles TMFSERVE commands events.
000000 1  0   !
000000 1  0   !-------------------------------------------------------------------------
000000 1  0
000000 1  0   Addr  HandleAddr;
000000 1  0   Addr  UserCommandAddr;
000000 1  0
000000 1  0   BEGIN
000000 1  1       Word  .EXT Header( TmpUserTmfCommandHeader^Struct ) = UserCommandAddr;
000000 1  1       Word  .EXT StartCmd( TmpUserTmfStartCommand^Struct ) = Header;
000000 1  1       Word  .EXT StopCmd( TmpUserTmfStopCommand^Struct ) = Header;
000000 1  1
000000 1  1       STRUCT  .OperationCkptInfo( TmpOperationCkptInfo^Struct );
000000 1  1
000000 1  1       FIXED  BeginOperationTime;
000000 1  1
000000 1  1       ! Beginning of code...
000000 1  1
000000 1  1       CASE Header.CommandNum OF
000006 1  1       BEGIN
000006 1  2       Delete^TmpUserTmfCommand ->
000006 1  2           IF G.TmpState <> Stopped^TmpState THEN
000011 1  2               BEGIN
000011 1  3               CALL TmpUserTmf^ReplyWithError( HandleAddr,
000011 1  3                                               ZTMF^ERR^NotStoppedForDelTmf );
000016 1  3               RETURN;
000017 1  3               END;
000017 1  2
000017 1  2           CALL TmpControl^InitiateDelete( BeginOperationTime );
000025 1  2
000025 1  2           !-------------------------------------------------------
000025 1  2           ! Stuff the operation number into the SPI buffer and reply.
000025 1  2           !-------------------------------------------------------
000025 1  2           CALL TmpUserTmf^PutOperationBegun( HandleAddr,
000025 1  2                                              ZTMF^ERR^DeleteOperationBegun,
000025 1  2                                              G.OperationNum,
000025 1  2                                              BeginOperationTime );
000036 1  2           CALL TmpUserTmf^ReplySpi( HandleAddr );
000041 1  2
000041 1  2       Start^TmpUserTmfCommand ->
000042 1  2           IF G.TmpState <> Stopped^TmpState THEN
000045 1  2               BEGIN
000045 1  3               CALL TmpUserTmf^ReplyWithError( HandleAddr,
000045 1  3                                               ZTMF^ERR^NotStoppedForStartTmf );
000052 1  3               RETURN;
000053 1  3               END;
000053 1  2
000053 1  2           G.TmpState := Starting^TmpState;
000056 1  2           G.StartOp.Command ':=' StartCmd FOR 1 ELEMENTS;
000065 1  2
000065 1  2           CALL TmpOperation^Begin( ZTMF^VAL^StartTmf, G.OperationNum,
000065 1  2                                    StartTmfTimeStamp );
000100 1  2           CALL TmpOperation^GetCkptInfo( G.OperationNum, OperationCkptInfo );
```

```
                                        TmpControl^DoUserCommand
000107 1  2        CALL TmpControl^CheckpointStart( G.OperationNum,
                                                    OperationCkptInfo,
000107 1  2                                         G.StartOp.Command,
000107 1  2                                         StartTmfTimeStamp );
000125 1  2        CALL TmpOperation^IssueBeginEvent( G.OperationNum );
000131 1  2        CALL TmpOperation^GetCkptInfo( G.OperationNum,
000131 1  2                                       OperationCkptInfo );
000140 1  2        CALL TmpControl^CkptOperEventIssued( OperationCkptInfo );
000143 1  2
000143 1  2        !---------------------------------------
000143 1  2        ! Issue "TMF Start Parameters" EMS event.
000143 1  2        !---------------------------------------
000143 1  2        CALL TmpCtrlEms^TmfStartParameters( G.OperationNum,
000143 1  2                                            StartCmd.TransAllowSpecified,
000143 1  2                                            StartCmd.TransAllowOption );
000161 1  2
000161 1  2        !---------------------------------
000161 1  2        ! Issue "TMF is Starting" EMS event.
000161 1  2        !---------------------------------
000161 1  2        CALL TmpCtrlEms^TmfStarting( G.OperationNum );
000165 1  2
000165 1  2        !-----------------------------------------------------
000165 1  2        ! Stuff the operation number into the SPI buffer and reply.
000165 1  2        !-----------------------------------------------------
000165 1  2        CALL TmpUserTmf^PutOperationBegun( HandleAddr,
000165 1  2                                           ZTMF^ERR^StartOperationBegun,
000165 1  2                                           G.OperationNum,
000165 1  2                                           StartTmfTimeStamp );
000176 1  2        CALL TmpUserTmf^ReplySpi( HandleAddr );
000201 1  2
000201 1  2        G.StartOp.State := ReadyForLowStart^StartOpState;
000206 1  2        CALL Thread^Schedule( G.ControlThread, Normal^ScheduleOption );
000214 1  2
000214 1  2    Stop^TmpUserTmfCommand ->
000215 1  2        IF StopCmd.Abrupt THEN
000223 1  2            CALL TmpControl^StopAbrupt;
000224 1  2
000224 1  2        CASE G.TmpState OF
000230 1  2        BEGIN
000230 1  3        Stopped^TmpState ->
000230 1  3            CALL TmpUserTmf^ReplyWithError( HandleAddr,
000230 1  3                                            ZTMF^ERR^TmfIsStopped );
000235 1  3
000235 1  3        Starting^TmpState ->
000236 1  3            CALL TmpUserTmf^ReplyWithError( HandleAddr,
000236 1  3                                            ZTMF^ERR^UseAbruptWhenStarting );
000243 1  3
000243 1  3        Started^TmpState ->
000244 1  3            G.TmpState := Stopping^TmpState;
000247 1  3            G.StopOp.State := FirstHighStop^StopOpState;
000252 1  3
000252 1  3            CALL TmpOperation^Begin( ZTMF^VAL^StopTmf, G.OperationNum,
000252 1  3                                     BeginOperationTime );
000265 1  3            CALL TmpOperation^GetCkptInfo( G.OperationNum, OperationCkptInfo );
000274 1  3            CALL TmpControl^CheckpointStop( G.OperationNum,
000274 1  3                                            OperationCkptInfo );
000301 1  3            CALL TmpOperation^IssueBeginEvent( G.OperationNum );
```

```
TmpControl^DoUserCommand

000305 1  3              CALL TmpOperation^GetCkptInfo( G.OperationNum,
000305 1  3                                              OperationCkptInfo );
000314 1  3              CALL TmpControl^CkptOperEventIssued( OperationCkptInfo );
000317 1  3
000317 1  3              !--------------------------------------
000317 1  3              ! Issue "TMF Stop Parameters" EMS event.
000317 1  3              !--------------------------------------
000317 1  3              CALL TmpCtrlEms^TmfStopParameters( G.OperationNum );
000323 1  3
000323 1  3              !----------------------------------
000323 1  3              ! Issue "TMF is Stopping" EMS event.
000323 1  3              !----------------------------------
000323 1  3              CALL TmpCtrlEms^TmfStopping( G.OperationNum );
000327 1  3
000327 1  3              CALL TmpUserTmf^PutOperationBegun( HandleAddr,
000327 1  3                                                 ZTMF^ERR^StopOperationBegun,
000327 1  3                                                 G.OperationNum,
000327 1  3                                                 BeginOperationTime );
000340 1  3
000340 1  3              CALL TmpControl^HighStopThread;
000341 1  3
000341 1  3              CALL TmpUserTmf^ReplySpi( HandleAddr );
000344 1  3
000344 1  3          Stopping^TmpState ->
000345 1  3              CALL TmpUserTmf^ReplyWithError( HandleAddr,
000345 1  3                                              ZTMF^ERR^TmfAlreadyStopping );
000352 1  3
000352 1  3          OTHERWISE ->
000353 1  3              UndefinedCaseError;
000360 1  3          END;
000376 1  2
000376 1  2      OTHERWISE ->
000377 1  2          UndefinedCaseError;
000404 1  2      END;
000424 1  1  END;
```

| | | | | |
|---|---|---|---|---|
| BEGINOPERATIONTIME | Variable | FIXED (0) | Direct | L+002 |
| HANDLEADDR | Variable | INT (32) | Direct | L-006 |
| HEADER | Variable,2 | STRUCT-I | EXT Pointer | L-004 |
| OPERATIONCKPTINFO | Variable,36 | STRUCT | Indirect | L+001 |
| STARTCMD | Variable,6 | STRUCT-I | EXT Pointer | L-004 |
| STOPCMD | Variable,4 | STRUCT-I | EXT Pointer | L-004 |
| USERCOMMANDADDR | Variable | INT (32) | Direct | L-004 |

```
000000  070406 024700 002023 060704 000410 110576 103112 143000    000010  014406 060706 005001 004250 024722 027000 125007 100000
000020  070402 130001 100001 024722 027000 060706 005001 004244    000030  103113 143000 070402 000234 024777 027000 060706 024711
000040  027000 110565 103112 143000 014406 060706 005001 004176    000050  024722 027000 125007 100001 103112 147000 100000 170000
000060  130001 003232 060704 100006 000417 100162 100000 102113    000070  172000 130001 100000 070004 130001 100007 024755 027000
000100  103113 143000 100000 170401 130001 024722 027000 103113    000110  143000 100000 170401 130001 100000 170000 130001 003232
000120  024744 070004 000234 024733 027000 103113 143000 024700    000130  027000 103113 143000 100000 170401 130001 024722 027000
000140  170401 024700 027000 103113 143000 100000 100002 060704    000150  000220 000410 100000 100004 060704 000220 000410 024722
000160  027000 103113 143000 024700 027000 060706 005001 004174    000170  103113 143000 070004 000234 024777 027000 060706 024711
000200  027000 100051 103114 010401 000201 147000 102014 162000    000210  100000 100003 024733 027000 110412 100000 100002 060704
000220  000220 000410 014401 027000 103112 143000 010532 000175    000230  060706 005001 004245 024722 027000 010540 060706 005001
000240  004246 024722 027000 010532 100003 103112 147000 100063    000250  102123 146000 100163 100000 101113 171000 130001 100000
000260  070402 130001 100007 024755 027000 103113 143000 100000    000270  170401 130001 024722 027000 103113 143000 170401 024711
```

TmpControl'DoUserCommand

```
000300  027000 103113 143000 024700 027000 103113 143000 100000    000310  170401 130001 024722 027000 170401 024700 027000 103113
000320  143000 024700 027000 103113 143000 024700 027000 060706    000330  005001 004175 103113 143000 070402 000234 024777 027000
000340  027000 060706 024711 027000 010431 060706 005001 004247    000350  024722 027000 010423 100001 000002 100002 024733 027000
000360  010415 100003 000205 000100 016002 000107 100004 000030    000370  177640 177645 177652 177752 177757 000000 010425 100001
000400  000002 100002 024733 027000 010417 003777 100004 000205    000410  000100 016002 000107 100005 000030 177371 177761 177423
000420  177757 177574 177755 000000 125007
```

TmpControl^StartStopDeferred

```
000000 0  0   Boolean PROC TmpControl^StartStopDeferred;
000000 1  0
000000 1  0   BEGIN
000000 1  1       Int  CpuNum;
000000 1  1
000000 1  1       Int  CpuState;
000000 1  1
000000 1  1       ! Beginning of code...
000000 1  1
000000 1  1       IF G.CoordTakeOverInProgress THEN RETURN True;
000006 1  1
000006 1  1       FOR CpuNum := 0 TO Max^Cpus - 1 DO
000010 1  1           BEGIN
000010 1  2           CpuState := G.CpuStateArray[ CpuNum ];
000015 1  2           IF CpuState <> Up^CpuState AND
000015 1  2              CpuState <> Down^CpuState THEN
000022 1  2               RETURN True;
000024 1  2           END;
000031 1  1
000031 1  1       RETURN False;
000033 1  1   END;

CPUNUM                        Variable      INT          Direct       L+001
CPUSTATE                      Variable      INT          Direct       L+002

000000  002002 103041 143000 014402 100777 125003 100000 010416     000010  040401 003051 000117 143000 034402 001001 012005 040402
000020  001002 012002 100777 125003 040401 104001 034401 001017     000030  016357 100000 125003
```

```
000000 0  0   PROC TmpControl^DoTmfMon2Req( MsgInfo );
000000 1  0
000000 1  0   STRUCT   .EXT MsgInfo( TmpMsgInfo^Struct );
000000 1  0                     ! IN
000000 1  0
000000 1  0   BEGIN
000000 1  1       Word   .EXT TmfMon2ReqCtrl( Tmp_Local_Template );
000000 1  1
000000 1  1       Boolean SUBPROC CpuReloadFailed;
000000 2  1
000000 2  1       BEGIN
000000 2  2           Int   CpuNum;
000000 2  2
000000 2  2           IF G.CpuReloadOp.State = None^CpuReloadOpState THEN
000005 2  2               BEGIN
000005 2  3               CpuNum := TmfMon2ReqCtrl.TmfMon2.CpuUpDownReq.CpuNum;
000010 2  3               PermAssertTruth(
000010 2  3                   G.CpuStateArray[ CpuNum ] = FailedReload^CpuState );
000022 2  3
000022 2  3               RETURN True;
000025 2  3               END
000025 2  2           ELSE
000025 2  2               RETURN False;
000030 2  2       END;

CPUNUM                    Variable       INT              Direct          S-000

000030 1  1
000030 1  1       Boolean SUBPROC CpuDownFailed;
000030 2  1
000030 2  1       BEGIN
000030 2  2           Int   CpuNum;
000030 2  2
000030 2  2           IF G.CpuDownOp.State = None^CpuDownOpState THEN
000035 2  2               BEGIN
000035 2  3               CpuNum := TmfMon2ReqCtrl.TmfMon2.CpuUpDownReq.CpuNum;
000040 2  3               AssertTruth(
000040 2  3                   G.CpuStateArray[ CpuNum ] = FailedDown^CpuState );
000040 2  3
000040 2  3               RETURN True;
000043 2  3               END
000043 2  2           ELSE
000043 2  2               RETURN False;
000046 2  2       END;

CPUNUM                    Variable       INT              Direct          S-000

000046 1  1
000046 1  1       Int  ReloadeeCpuNum;
000046 1  1
000046 1  1       Int  FailedCpuNum;
000046 1  1
000046 1  1       Int  CpuState;
000046 1  1
000046 1  1       ! Beginning of code...
000046 1  1
000046 1  1       @TmfMon2ReqCtrl := @MsgInfo.ReqCtrl;
```

TmpControl^DoTmfMon2Req

```
000055 1  1
000055 1  1      CASE TmfMon2ReqCtrl.TmfMon2.SubType OF
000060 1  1      BEGIN
000060 1  2      AreYouAlive_TmfMon2TmpReq ->
000060 1  2          CALL TmpMsg^ReplyLocalTmp( MsgInfo, FEOK );
000067 1  2
000067 1  2      BeginCoordTake_TmfMon2TmpReq ->
000070 1  2          !---------------------------------------------------------------
000070 1  2          ! Do not assert 'CoordTakeOverInProgress' since this message may be
000070 1  2          ! from another TMFMON2 Coordinator if an earlier one failed during
000070 1  2          ! its takeover, or it may be a retry message if there has been a
000070 1  2          ! TMP takeover.
000070 1  2          !---------------------------------------------------------------
000070 1  2          IF G.CpuDownOp.State <> None^CpuDownOpState THEN
000074 1  2              BEGIN
000074 1  3              AssertTruth( G.CpuReloadOp.State = None^CpuReloadOpState );
000074 1  3
000074 1  3              FailedCpuNum := G.CpuDownOp.FailedCpuNum;
000077 1  3              AssertTruth( G.CpuStateArray[ FailedCpuNum ] = Downing^CpuState );
000077 1  3              CALL TmpControl^CheckpointCpuDown( CpuDownFailed^CkptKind,
000077 1  3                                                 G.CpuDownOp.FailedCpuNum );
000103 1  3
000103 1  3              G.CpuStateArray[ FailedCpuNum ] := FailedDown^CpuState;
000110 1  3              G.CpuDownOp.State := None^CpuDownOpState;
000113 1  3              G.CpuDownOp.FailedCpuNum := -1;    ! Reset this field after sending
000116 1  3                                                 !   the checkpoint.
000116 1  3
000116 1  3              END
000116 1  2          ELSE IF G.CpuReloadOp.State <> None^CpuReloadOpState THEN
000123 1  2              BEGIN
000123 1  3              ReloadeeCpuNum := G.CpuReloadOp.ReloadeeCpuNum;
000126 1  3              AssertTruth(
000126 1  3                  G.CpuStateArray[ ReloadeeCpuNum ] = Reloading^CpuState );
000126 1  3
000126 1  3              CALL TmpControl^CheckpointCpuReload( CpuReloadFailed^CkptKind,
000126 1  3                                                   ReloadeeCpuNum );
000132 1  3
000132 1  3              G.CpuStateArray[ ReloadeeCpuNum ] := FailedReload^CpuState;
000137 1  3              G.CpuReloadOp.State := None^CpuReloadOpState;
000142 1  3              G.CpuReloadOp.ReloadeeCpuNum := -1; ! Reset this field after
000145 1  3                                                  !   sending the checkpoint.
000145 1  3              END;
000145 1  2
000145 1  2          CALL TmpControl^CheckpointShort( BeginCoordTakeOver^CkptKind );
000150 1  2          G.CoordTakeOverInProgress := True;
000153 1  2
000153 1  2          CALL TmpMsg^ReplyLocalTmp( MsgInfo, FEOK );
000162 1  2
000162 1  2      EndCoordTake_TmfMon2TmpReq ->
000163 1  2          !---------------------------------------------------------------
000163 1  2          ! Do not assert 'CoordTakeOverInProgress' since this message may be
000163 1  2          ! a retry if there was a TMP takeover.
000163 1  2          !---------------------------------------------------------------
000163 1  2          CALL TmpControl^CheckpointShort( EndCoordTakeOver^CkptKind );
000166 1  2          G.CoordTakeOverInProgress := False;
000171 1  2
000171 1  2          CALL TmpMsg^ReplyLocalTmp( MsgInfo, FEOK );
```

```
000200 1 2
000200 1 2    ReloadPermission_TmfMon2TmpReq ->
000201 1 2        AssertTruth( G.CpuDownOp.State = None^CpuDownOpState );
000201 1 2        PermAssertTruth( G.CpuReloadOp.State = None^CpuReloadOpState );
000212 1 2        ReloadeeCpuNum := TmfMon2ReqCtrl.TmfMon2.CpuUpDownReq.CpuNum;
000215 1 2
000215 1 2        CASE G.CpuStateArray[ ReloadeeCpuNum ] OF
000221 1 2        BEGIN
000221 1 3        Down^CpuState ->
000221 1 3            G.CpuReloadOp.State := Permitted^CpuReloadOpState;
000224 1 3            G.CpuReloadOp.ReloadeeCpuNum := ReloadeeCpuNum;
000227 1 3            G.CpuStateArray[ ReloadeeCpuNum ] := Reloading^CpuState;
000234 1 3            CALL TmpControl^CheckpointCpuReload( CpuReloadBegin^CkptKind,
000234 1 3                                                 ReloadeeCpuNum );
000240 1 3
000240 1 3            CALL TmpMsg^ReplyLocalTmp( MsgInfo, FEOK );
000247 1 3
000247 1 3        FailedReload^CpuState ->
000252 1 3             !-------------------------------------------------------------
000252 1 3             ! This message is a retry.  TMP TakeOver occured between
000252 1 3             ! checkpointing the reload and replying.
000252 1 3             !-------------------------------------------------------------
000252 1 3             CALL TmpMsg^ReplyLocalTmp( MsgInfo, FEDATALOSS );
000261 1 3
000261 1 3        OTHERWISE ->
000262 1 3            UndefinedCaseError;
000267 1 3        END;
000306 1 2
000306 1 2    ReloadPhase1_TmfMon2TmpReq ->
000307 1 2        IF CpuReloadFailed THEN
000311 1 2            BEGIN
000311 1 3            CALL TmpMsg^ReplyLocalTmp( MsgInfo, FEDATALOSS );
000320 1 3            RETURN;
000321 1 3            END;
000321 1 2
000321 1 2        AssertTruth( G.CpuReloadOp.State = Permitted^CpuReloadOpState );
000321 1 2        G.CpuReloadOp.State := Phase1^CpuReloadOpState;
000324 1 2
000324 1 2        CALL TmpControl^DoCpuReloadPhase1;
000325 1 2
000325 1 2        CALL TmpMsg^ReplyLocalTmp( MsgInfo, FEOK );
000334 1 2
000334 1 2    ReloadPhase2_TmfMon2TmpReq ->
000335 1 2        IF CpuReloadFailed THEN
000337 1 2            BEGIN
000337 1 3            CALL TmpMsg^ReplyLocalTmp( MsgInfo, FEDATALOSS );
000346 1 3            RETURN;
000347 1 3            END;
000347 1 2
000347 1 2        AssertTruth( G.CpuReloadOp.State = Phase1^CpuReloadOpState );
000347 1 2        G.CpuReloadOp.State := Phase2^CpuReloadOpState;
000352 1 2
000352 1 2        CALL TmpControl^DoCpuReloadPhase2;
000353 1 2
000353 1 2        CALL TmpMsg^ReplyLocalTmp( MsgInfo, FEOK );
000362 1 2
000362 1 2    ReloadComplete_TmfMon2TmpReq ->
```

TmpControl^DoTmfMon2Req

```
000363 1  2          ReloadeeCpuNum := TmfMon2ReqCtrl.TmfMon2.CpuUpDownReq.CpuNum;
000366 1  2          CASE G.CpuReloadOp.State OF
000371 1  2          BEGIN
000371 1  3          None^CpuReloadOpState ->
000371 1  3              CASE G.CpuStateArray[ ReloadeeCpuNum ] OF
000376 1  3              BEGIN
000376 1  4              Up^CpuState ->
000376 1  4                  CALL TmpMsg^ReplyLocalTmp( MsgInfo, FEOK );
000405 1  4
000405 1  4              FailedReload^CpuState ->
000406 1  4                  CALL TmpMsg^ReplyLocalTmp( MsgInfo, FEDATALOSS );
000415 1  4
000415 1  4              OTHERWISE ->
000416 1  4                  UndefinedCaseError;
000423 1  4              END;
000443 1  3
000443 1  3          Phase2^CpuReloadOpState ->
000444 1  3              CALL TmpControl^CheckpointCpuReload( CpuReloadComplete^CkptKind,
000444 1  3                                                   ReloadeeCpuNum );
000450 1  3
000450 1  3              G.CpuStateArray[ ReloadeeCpuNum ] := Up^CpuState;
000455 1  3              G.CpuReloadOp.State := None^CpuReloadOpState;
000460 1  3              G.CpuReloadOp.ReloadeeCpuNum := -1;
000463 1  3
000463 1  3              CALL TmpMsg^ReplyLocalTmp( MsgInfo, FEOK );
000472 1  3
000472 1  3          OTHERWISE ->
000474 1  3              UndefinedCaseError;
000501 1  3          END;
000520 1  2
000520 1  2
000520 1  2      FailReload_TmfMon2TmpReq ->
000522 1  2          ReloadeeCpuNum := TmfMon2ReqCtrl.TmfMon2.CpuUpDownReq.CpuNum;
000525 1  2          CASE G.CpuReloadOp.State OF
000530 1  2          BEGIN
000530 1  3          None^CpuReloadOpState ->
000530 1  3              AssertTruth(
000530 1  3                  G.CpuStateArray[ ReloadeeCpuNum ] = FailedReload^CpuState );
000530 1  3
000530 1  3          Permitted^CpuReloadOpState,
000530 1  3          Phase1^CpuReloadOpState,
000530 1  3          Phase2^CpuReloadOpState ->
000530 1  3              AssertTruth( G.CpuReloadOp.ReloadeeCpuNum = ReloadeeCpuNum );
000530 1  3              AssertTruth(
000530 1  3                  G.CpuStateArray[ ReloadeeCpuNum ] = Reloading^CpuState );
000530 1  3              CALL TmpControl^CheckpointCpuReload( CpuReloadFailed^CkptKind,
000530 1  3                                                   ReloadeeCpuNum );
000534 1  3              G.CpuReloadOp.State := None^CpuReloadOpState;
000537 1  3              G.CpuReloadOp.ReloadeeCpuNum := -1;
000542 1  3              G.CpuStateArray[ ReloadeeCpuNum ] := FailedReload^CpuState;
000547 1  3
000547 1  3          OTHERWISE ->
000550 1  3              UndefinedCaseError;
000555 1  3          END;
000574 1  2
000574 1  2          CALL TmpMsg^ReplyLocalTmp( MsgInfo, FEOK );
000603 1  2
```

TmpControl^DoTmfMon2Req

```
000603 1 2      CpuDownPermission_TmfMon2TmpReq ->
000604 1 2          AssertTruth( G.CpuReloadOp.State = None^CpuReloadOpState );
000604 1 2          PermAssertTruth( G.CpuDownOp.State = None^CpuDownOpState );
000615 1 2          FailedCpuNum := TmfMon2ReqCtrl.TmfMon2.CpuUpDownReq.CpuNum;
000620 1 2          CASE G.CpuStateArray[ FailedCpuNum ] OF
000624 1 2          BEGIN
000624 1 3          Down^CpuState,
000624 1 3          Up^CpuState,
000624 1 3          FailedDown^CpuState,
000624 1 3          FailedReload^CpuState ->
000624 1 3              G.CpuDownOp.State := Permitted^CpuDownOpState;
000627 1 3              G.CpuDownOp.FailedCpuNum := FailedCpuNum;
000632 1 3              G.CpuStateArray[ FailedCpuNum ] := Downing^CpuState;
000637 1 3
000637 1 3              CALL TmpControl^CheckpointCpuDown( CpuDownBegin^CkptKind,
000637 1 3                                                 G.CpuDownOp.FailedCpuNum );
000643 1 3
000643 1 3          OTHERWISE ->
000644 1 3              UndefinedCaseError;
000651 1 3          END;
000671 1 2
000671 1 2          CALL TmpMsg^ReplyLocalTmp( MsgInfo, FEOK );
000700 1 2
000700 1 2      CpuDown1_TmfMon2TmpReq ->
000702 1 2          IF CpuDownFailed THEN
000704 1 2              BEGIN
000704 1 3              CALL TmpMsg^ReplyLocalTmp( MsgInfo, FEDATALOSS );
000713 1 3              RETURN;
000714 1 3              END;
000714 1 2
000714 1 2          PermAssertTruth( G.CpuDownOp.State = Permitted^CpuDownOpState );
000725 1 2          G.CpuDownOp.State := Phase1^CpuDownOpState;
000730 1 2
000730 1 2          CALL TmpControl^DoCpuDownPhase1;
000731 1 2
000731 1 2          CALL TmpMsg^ReplyLocalTmp( MsgInfo, FEOK );
000740 1 2
000740 1 2      CpuDown2_TmfMon2TmpReq ->
000741 1 2          IF CpuDownFailed THEN
000743 1 2              BEGIN
000743 1 3              CALL TmpMsg^ReplyLocalTmp( MsgInfo, FEDATALOSS );
000752 1 3              RETURN;
000753 1 3              END;
000753 1 2
000753 1 2          PermAssertTruth( G.CpuDownOp.State = Phase1^CpuDownOpState );
000764 1 2          G.CpuDownOp.State := Phase2^CpuDownOpState;
000767 1 2
000767 1 2          CALL TmpControl^DoCpuDownPhase2;
000770 1 2
000770 1 2          CALL TmpMsg^ReplyLocalTmp( MsgInfo, FEOK );
000777 1 2
000777 1 2      CpuDown3_TmfMon2TmpReq ->
001000 1 2          IF CpuDownFailed THEN
001002 1 2              BEGIN
001002 1 3              CALL TmpMsg^ReplyLocalTmp( MsgInfo, FEDATALOSS );
001011 1 3              RETURN;
001012 1 3              END;
```

```
                                TmpControl^DoTmfMon2Req
001012 1  2
001012 1  2            PermAssertTruth( G.CpuDownOp.State = Phase2^CpuDownOpState );
001023 1  2            G.CpuDownOp.State := Phase3^CpuDownOpState;
001026 1  2
001026 1  2            CALL TmpControl^DoCpuDownPhase3;
001027 1  2
001027 1  2            CALL TmpMsg^ReplyLocalTmp( MsgInfo, FEOK );
001036 1  2
001036 1  2        CpuDownComplete_TmfMon2TmpReq ->
001037 1  2            FailedCpuNum := TmfMon2ReqCtrl.TmfMon2.CpuUpDownReq.CpuNum;
001042 1  2            CASE G.CpuDownOp.State OF
001045 1  2            BEGIN
001045 1  3            None^CpuDownOpState ->
001045 1  3                CASE G.CpuStateArray[ FailedCpuNum ] OF
001052 1  3                BEGIN
001052 1  4                Down^CpuState ->
001052 1  4                    CALL TmpMsg^ReplyLocalTmp( MsgInfo, FEOK );
001061 1  4
001061 1  4                FailedDown^CpuState ->
001063 1  4                    CALL TmpMsg^ReplyLocalTmp( MsgInfo, FEDATALOSS );
001072 1  4
001072 1  4                OTHERWISE ->
001073 1  4                    UndefinedCaseError;
001100 1  4                END;
001115 1  3
001115 1  3            Phase3^CpuDownOpState ->
001116 1  3                AssertTruth( G.CpuStateArray[ FailedCpuNum ] = Downing^CpuState );
001116 1  3
001116 1  3                CALL TmpControl^CheckpointCpuDown( CpuDownComplete^CkptKind,
001116 1  3                                                   FailedCpuNum );
001122 1  3
001122 1  3                G.CpuDownOp.State := None^CpuDownOpState;
001125 1  3                G.CpuDownOp.FailedCpuNum := -1;
001130 1  3                G.CpuStateArray[ FailedCpuNum ] := Down^CpuState;
001135 1  3
001135 1  3                CALL TmpMsg^ReplyLocalTmp( MsgInfo, FEOK );
001144 1  3
001144 1  3            OTHERWISE ->
001145 1  3                UndefinedCaseError;
001152 1  3            END;
001172 1  2
001172 1  2        OTHERWISE ->
001173 1  2            UndefinedCaseError;
001200 1  2        END;
001232 1  1    END;

CPUDOWNFAILED                   Subproc        INT          %000030
CPURELOADFAILED                 Subproc        INT          %000000
CPUSTATE                        Variable       INT          Direct        L+005
FAILEDCPUNUM                    Variable       INT          Direct        L+004
MSGINFO                         Variable,40    STRUCT-I     EXT Pointer   L-004
RELOADEECPUNUM                  Variable       INT          Direct        L+003
TMFMON2REQCTRL                  Variable,10    STRUCT-I     EXT Pointer   L+001

000000  002001 103073 143000 001024 015020 100005 026401 034740     000010  003051 000116 142000 001005 012005 100001 000002 100002
000020  024733 027000 100777 002777 025001 100000 002777 025001     000030  002001 103071 143000 001012 015006 100005 026401 044740
```

TmpControl^DoTmfMon2Req

```
000040   100777 002777 025001 100000 002777 025001 002005 100000
000060   060704 100000 024722 002003 100014 024700 027000 110561
000100   142000 024711 027000 100003 040404 003051 000117 147000
000120   143000 001024 012022 102074 142000 044403 100005 040403
000140   103073 147000 100777 102074 146000 100025 024700 027000
000160   024700 027000 110466 100026 024700 027000 100000 103041
000200   110450 103073 143000 001024 012005 100001 000002 100002
000220   010447 100025 103073 147000 040403 102074 146000 100004
000240   060704 100000 024722 002003 100014 024700 027000 010436
000260   027000 010424 100001 000002 100002 024733 027000 010416
000300   177721 177761 177760 177747 177756 000000 110742 117563
000320   125005 100026 103073 147000 027000 060704 100000 024722
000340   100172 024722 002003 100014 024700 027000 125005 100027
000360   024700 027000 110666 100005 026401 044403 103073 143000
000400   024722 002003 100014 024700 027000 010435 060704 100172
000420   100002 024733 027000 010417 003777 100004 000205 000100
000440   177746 177755 000000 010454 100004 040403 024711 027000
000460   100777 102074 146000 060704 100000 024722 002003 100014
000500   027000 010416 003754 100003 000205 000100 016002 000107
000520   110560 177257 100005 026401 044403 103073 143000 010426
000540   102074 146000 100005 040403 003051 000115 145000 010424
000560   000205 000100 016002 000107 100004 000030 000006 177741
000600   100014 024700 027000 110475 103071 143000 001012 012005
000620   003051 000117 143000 010426 100013 103071 147000 040404
000640   142000 024711 027000 010425 100001 000002 100002 024733
000660   100005 000030 177742 177741 177740 177757 177736 177755
000700   110400 000331 117557 014410 060704 100172 024722 002003
000720   100001 000002 100002 024733 027000 100014 103071 147000
000740   110740 117520 014410 060704 100172 024722 002003 100014
000760   000002 100002 024733 027000 100015 103071 147000 027000
001000   117461 014410 060704 100172 024722 002003 100014 024700
001020   100002 024733 027000 100016 103071 147000 027000 060704
001040   026401 044404 103071 143000 010506 040404 003051 000117
001060   027000 010433 176746 060704 100172 024722 002003 100014
001100   010414 003776 100001 000205 000100 016002 000107 100002
001120   024711 027000 100012 103071 147000 100777 102072 146000
001140   002003 100014 024700 027000 010425 100001 000002 100002
001160   000107 100005 000030 177662 177761 177760 177757 177727
001200   010431 003775 100016 000205 000100 016002 000107 100017
001220   177462 177520 177556 177614 177063 177110 176642 176734
```

```
000050   100022 060704 000220 000412 064401 100004 026401 110570
000070   103071 143000 001012 012023 102072 142000 044404 100010
000110   100012 103071 147000 100777 102072 146000 010426 103073
000130   024711 027000 100005 040403 003051 000117 147000 100024
000150   100777 103041 147000 060704 100000 024722 002003 100014
000170   147000 060704 100000 024722 002003 100014 024700 027000
000210   024733 027000 100005 026401 034403 003051 000117 143000
000230   040403 003051 000115 145000 100003 040403 024711 027000
000250   000731 000761 060704 100172 024722 002003 100014 024700
000270   003776 100003 000205 000100 016002 000107 100004 000030
000310   014410 060704 100172 024722 002003 100014 024700 027000
000330   002003 100014 024700 027000 110714 117563 014410 060704
000350   103073 147000 027000 060704 100000 024722 002003 100014
000370   010511 040403 003051 000117 143000 010426 060704 100000
000410   024722 002003 100014 024700 027000 010425 100001 000002
000430   016002 000107 100005 000030 177742 177761 177760 177757
000450   100001 040403 003051 000117 147000 100024 103073 147000
000470   024700 027000 010425 177305 100001 000002 100002 024733
000510   100004 000030 177657 177761 177760 177727 177756 000000
000530   100005 040403 024711 027000 100024 103073 147000 100777
000550   100001 000002 100002 024733 027000 010416 003754 100003
000570   177740 177737 177756 000000 060704 100000 024722 002003
000610   100001 000002 100002 024733 027000 100005 026401 034404
000630   102072 146000 100006 040404 003051 000115 145000 100006
000650   027000 010417 003777 100004 000205 000100 016002 000107
000670   000000 060704 100000 024722 002003 100014 024700 027000
000710   100014 024700 027000 125005 103071 143000 001013 012005
000730   027000 060704 100000 024722 002003 100014 024700 027000
000750   024700 027000 125005 103071 143000 001014 012005 100001
000770   060704 100000 024722 002003 100014 024700 027000 110701
001010   027000 125005 103071 143000 001015 012005 100001 000002
001030   100000 024722 002003 100014 024700 027000 010573 100005
001050   143000 010427 060704 100000 024722 002003 100014 024700
001070   024700 027000 010422 100001 000002 100002 024733 027000
001110   000030 177741 177751 177760 000000 010454 100007 040404
001130   100002 040404 003051 000115 145000 060704 100000 024722
001150   024733 027000 010417 003766 100004 000205 000100 016002
001170   177755 000000 010437 100001 000002 100002 024733 027000
001210   000030 176770 177761 177150 177306 177756 176642 177365
001230   177743 000000 125005
```

TmpControl^ControlThread

```
000000 0  0   PROC TmpControl^ControlThread;
000000 1  0
000000 1  0   !--------------------------------------------------------------------------------
000000 1  0   !
000000 1  0   !   This procedure implements the Control thread.
000000 1  0   !
000000 1  0   !--------------------------------------------------------------------------------
000000 1  0
000000 1  0   BEGIN
000000 1  1       Thread^NewParameterLess( G.ControlThreadAddr );
000000 1  1
000000 1  1       STRUCT  .TmfMon2MsgInfo( TmpMsgInfo^Struct );
000000 1  1
000000 1  1       ! Beginning of code...
000000 1  1
000000 1  1
000000 1  1       !------------------------------------------------------
000000 1  1       ! If a DELETE TMF was in progress at the time that the
000000 1  1       ! previous TMP failed, re-initiate it.
000000 1  1       !------------------------------------------------------
000000 1  1
000000 1  1       IF G.GlobInfoRecord.DeleteTmfInProgress THEN
000017 1  1           BEGIN
000017 1  2           IF G.DeleteOp.State = None^DeleteOpState THEN
000023 1  2               CALL TmpControl^InitiateDelete;
000027 1  2           END;
000027 1  1
000027 1  1
000027 1  1       !---------------------------
000027 1  1       ! Main loop, runs forever...
000027 1  1       !---------------------------
000027 1  1
000027 1  1       LOOP
000027 1  2           IF NOT TmpMsg^MsgInfoIsNil( G.TmfMon2MsgInfo ) THEN
000035 1  2               BEGIN
000035 1  3               !------------------
000035 1  3               ! TMFMON2 Message.
000035 1  3               !------------------
000035 1  3               TmfMon2MsgInfo ':=' G.TmfMon2MsgInfo FOR 1 ELEMENTS;
000045 1  3               CALL TmpMsg^NilMsgInfo( G.TmfMon2MsgInfo );
000052 1  3
000052 1  3               CALL TmpControl^DoTmfMon2Req( TmfMon2MsgInfo );
000057 1  3               END
000057 1  2           ELSE IF NOT LList^IsEmpty( G.SwitchReqList ) THEN
000070 1  2               BEGIN
000070 1  3               !-------------------
000070 1  3               ! Switch requested.
000070 1  3               !-------------------
000070 1  3               IF G.MaintBackupOp.State <> Up^MaintBackOpState THEN
000074 1  3                   BEGIN
000074 1  4                   !----------------
000074 1  4                   ! No Backup TMP.
000074 1  4                   !----------------
000074 1  4                   CALL TmpMsg^ReplyToList( G.SwitchReqList, FEINVALOP );
000103 1  4                   END
000103 1  3               ELSE
000104 1  3                   BEGIN
```

TmpControl^ControlThread

```
000104 1  4              !-----------------
000104 1  4              ! Perform Switch.
000104 1  4              !-----------------
000104 1  4              G.OwnershipState := Switching^OwnershipState;
000107 1  4              CALL TmpControl^DoSwitch;
000110 1  4              EXITLOOP;
000111 1  4              END;
000111 1  3          END
000111 1  2      ELSE IF G.MaintBackupOp.State = ReadyToDown^MaintBackOpState THEN
000115 1  2          BEGIN
000115 1  3          !-------------------------------------
000115 1  3          ! Invoke BackupDown "phase" routines.
000115 1  3          !-------------------------------------
000115 1  3          G.MaintBackupOp.State := Downing^MaintBackOpState;
000117 1  3          CALL TmpControl^DoBackupDown;
000120 1  3
000120 1  3          G.MaintBackupOp.State := DelayCreate^MaintBackOpState;
000123 1  3          CALL TmpControl^DelayCreateThread;
000124 1  3          END
000124 1  2      ELSE IF G.MaintBackupOp.State = ReadyToCreate^MaintBackOpState THEN
000131 1  2          BEGIN
000131 1  3          !-------------------
000131 1  3          ! Create Backup TMP.
000131 1  3          !-------------------
000131 1  3          G.MaintBackupOp.State := Creating^MaintBackOpState;
000133 1  3          CALL TmpControl^DoCreateBackup;
000134 1  3          END
000134 1  2      ELSE IF G.DeleteOp.State <> None^DeleteOpState THEN
000141 1  2          BEGIN
000141 1  3          !-------------------------------
000141 1  3          ! Delete the TMF Configuration.
000141 1  3          !-------------------------------
000141 1  3          IF G.DeleteOp.State = Ready^DeleteOpState THEN
000144 1  3              BEGIN
000144 1  4              G.DeleteOp.State := FirstDeleting^DeleteOpState;
000146 1  4              CALL TmpControl^CheckpointNewState( NewDeleteOpState^CkptKind,
000146 1  4                                                  G.DeleteOp.State );
000152 1  4              END;
000152 1  3
000152 1  3          CALL TmpControl^DoDelete;
000153 1  3          END
000153 1  2      ELSE IF G.StartOp.State = ReadyForLowStart^StartOpState AND
000154 1  2              (NOT TmpControl^StartStopDeferred) THEN
000162 1  2          BEGIN
000162 1  3          !-----------------------
000162 1  3          ! Low START TMF "phase".
000162 1  3          !-----------------------
000162 1  3          G.StartOp.State := LowStart^StartOpState;
000165 1  3          CALL TmpControl^CheckpointNewState( NewStartOpState^CkptKind,
000165 1  3                                              G.StartOp.State );
000171 1  3
000171 1  3          CALL TmpControl^DoLowStart;
000172 1  3          END
000172 1  2      ELSE I" G.StopOp.State = ReadyForLowStop^StopOpState AND
000173 1  2              (NOT TmpControl^StartStopDeferred) THEN
000201 1  2          BEGIN
000201 1  3          !-----------------------
```

```
                                    TmpControl^ControlThread
  4374.     000201 1   3               ! Low STOP TMF "phase".
  4375.     000201 1   3               !-----------------------
  4376.     000201 1   3               G.StopOp.State := LowStop^StopOpState;
  4377.     000204 1   3               CALL TmpControl^CheckpointNewState( NewStopOpState^CkptKind,
  4378.     000204 1   3                                                   G.StopOp.State);
  4379.     000210 1   3
  4380.     000210 1   3               CALL TmpControl^DoLowStop;
  4381.     000211 1   3               END
  4382.     000211 1   2            ELSE
  4383.     000212 1   2               CALL Thread^Suspend;
  4384.     000213 1   2         ENDLOOP;
  4385.     000214 1   1
  4386.     000214 1   1         G.ControlThreadAddr := Nil^Addr;
  4387.     000220 1   1      END;

TMFMON2MSGINFO                   Variable,40    STRUCT          Indirect      L+002
^^DUMMY                          Variable       INT             Direct        L+001
^^FIRSTPARAM                     Variable       INT             Direct        L-002

000000  070702 100000 103030 173000 130001 000002 100006 024755     000010  027000 070403 024711 002020 103331 143000 014410 102127
000020  142000 001074 015004 000002 100000 024722 027000 100000     000030  170000 130001 024711 027000 015423 100000 170402 130001
000040  100000 170000 130001 100040 000417 100000 170000 130001     000050  024711 027000 100000 170402 130001 024711 027000 010747
000060  100000 170000 130001 003040 103010 163000 000225 012021     000070  102075 142000 001043 012010 100000 170000 130001 003040
000100  100002 024722 027000 010507 100002 103040 147000 027000     000110  010503 103075 143000 001045 015010 100046 147000 027000
000120  100041 103075 147000 027000 010466 103075 143000 001036     000130  015004 100040 147000 027000 010456 103127 143000 001074
000140  012013 143000 001075 015006 100076 147000 100017 143000     000150  024711 027000 027000 010437 103114 143000 001051 015013
000160  027000 015411 100052 103114 147000 100015 143000 024711     000170  027000 027000 010420 103123 143000 001066 015013 027000
000200  015411 100067 103123 147000 100016 143000 024711 027000     000210  027000 010401 027000 010613 100774 100000 103014 167000
000220  125003
```

TmpControl^UserCommandThread

```
000000 0  0   PROC TmpControl^UserCommandThread;
000000 1  0
000000 1  0   !------------------------------------------------------------------------
000000 1  0   !
000000 1  0   !   This procedure implements the Control thread.
000000 1  0   !
000000 1  0   !------------------------------------------------------------------------
000000 1  0
000000 1  0   BEGIN
000000 1  1       Thread^NewParameterLess( G.UserCommandThreadAddr );
000000 1  1
000000 1  1       Word  .EXT UserCommandEle( UserCommandEle^Struct );
000000 1  1
000000 1  1       Addr  HandleAddr;
000000 1  1       Addr  UserCommandAddr;
000000 1  1
000000 1  1       SUBPROC GetCommand;
000000 2  1       BEGIN
000000 2  2           @UserCommandEle := LList^FirstElement( G.UserCommandQueue,
000000 2  2                                                  UserCommandEle, Links );
000005 2  2           CALL LList^RemoveElement( UserCommandEle );
000010 2  2           HandleAddr      := UserCommandEle.HandleAddr;
000016 2  2           UserCommandAddr := UserCommandEle.UserCommandAddr;
000024 2  2           Heap^DisposeStruct( TmpShortTermHeap, UserCommandEle );
000035 2  2       END;
000036 1  1
000036 1  1       ! Beginning of code...
000036 1  1
000036 1  1       LOOP
000051 1  2           IF G.OwnershipState = Switching^OwnershipState THEN
000055 1  2               EXITLOOP
000056 1  2           ELSE IF NOT LList^IsEmpty( G.UserCommandQueue ) THEN
000066 1  2               BEGIN
000066 1  3               CALL GetCommand;
000067 1  3               CALL TmpControl^DoUserCommand( HandleAddr, UserCommandAddr );
000073 1  3               END
000073 1  2           ELSE
000074 1  2               CALL Thread^Suspend;
000075 1  2       ENDLOOP;
000076 1  1
000076 1  1       !-------------------------------------
000076 1  1       ! Empty the command queue for Switch.
000076 1  1       !-------------------------------------
000076 1  1       WHILE NOT LList^IsEmpty( G.UserCommandQueue ) DO
000106 1  1           BEGIN
000106 1  2           CALL GetCommand;
000107 1  2           CALL TmpUserTmf^HandleBackupMsg( HandleAddr );
000112 1  2           END;
000113 1  1
000113 1  1       G.UserCommandThreadAddr := Nil^Addr;
000117 1  1   END;
```

| | | | | | |
|---|---|---|---|---|---|
| GETCOMMAND | Subproc | | %000000 | |
| HANDLEADDR | Variable | INT (32) | Direct | L+004 |
| USERCOMMANDADDR | Variable | INT (32) | Direct | L+006 |
| USERCOMMANDELE | Variable,20 | STRUCT-I | EXT Pointer | L+002 |
| ^^DUMMY | Variable | INT | Direct | L+001 |

```
                                    ImpControl^UserCommandThread
^^FIRSTPARAM                  Variable       INT            Direct        L-002

000000  103012 163000 000002 000221 000006 064402 024711 027000     000010  100000 100010 060402 000220 000412 064404 100000 100014
000020  060402 000220 000412 064406 060000 100000 070402 130001     000030  100000 100020 100007 024766 027000 025001 070702 100000
000040  103032 173000 130001 000002 100006 024755 027000 024700     000050  002006 103040 143000 001002 015001 010420 100000 170000
000060  130001 003050 103012 163000 000225 012006 017711 060404     000070  060406 024733 027000 010755 027000 010753 100000 170000
000100  130001 003050 103012 163000 000225 012005 017671 060404     000110  024711 027000 010763 100774 100000 103015 167000 125003

  4440.    000000 0  0
```

TmpControl^ZTmfFromTmpState

```
000000 0  0   !EXPORT! INT PROC TmpControl^ZTmfFromTmpState (TmpState);
000000 1  0   !-----------------------------------------------------------------------------
000000 1  0   ! This proc will return the ZTMF^VAL^TmfState^... val from the
000000 1  0   ! TmpState.
000000 1  0   !
000000 1  0   ! The proc will return ZTMF^VAL^TMFSTATE^NIL if the state is
000000 1  0   ! unknown.
000000 1  0   !-----------------------------------------------------------------------------
000000 1  0   INT .EXT TmpState;
000000 1  0                           ! IN: The TmpState to be converted to the
000000 1  0                           !      ZTMF^VAL^TMFSTATE^.....
000000 1  0   BEGIN
000000 1  1
000000 1  1       CASE G.TmpState OF
000003 1  1       BEGIN
000003 1  2       Stopped^TmpState ->
000003 1  2           IF TmpAtUtility^NumAuditTrails = 0 THEN
000006 1  2               RETURN ZTMF^VAL^TMFSTATE^EmptyAtCnfg
000006 1  2           ELSE IF TmpAtUtility^AddAllowed THEN
000012 1  2               RETURN ZTMF^VAL^TMFSTATE^ConfigAt
000012 1  2           ELSE
000014 1  2               RETURN ZTMF^VAL^TMFSTATE^Stopped;
000016 1  2
000016 1  2       Starting^TmpState ->
000016 1  2           RETURN ZTMF^VAL^TMFSTATE^Starting;
000020 1  2
000020 1  2       Started^TmpState ->
000020 1  2           RETURN ZTMF^VAL^TMFSTATE^Started;
000022 1  2
000022 1  2       Stopping^TmpState ->
000022 1  2           RETURN ZTMF^VAL^TMFSTATE^Stopping;
000024 1  2
000024 1  2       Deleting^TmpState ->
000024 1  2           RETURN ZTMF^VAL^TMFSTATE^Deleting;
000026 1  2
000026 1  2       OTHERWISE ->
000026 1  2           UndefinedCaseError;
000033 1  2       END;
000052 1  1
000052 1  1   END; !  TmpControl^ZTmfFromTmpState
TMPSTATE                         Variable        INT              EXT Pointer    L-004

000000  103112 143000 010431 027000 001000 015002 100001 125005     000010  027000 014402 100002 125005 100003 125005 100004 125005
000020  100005 125005 100006 125005 100007 125005 100001 000002     000030  100002 024733 027000 010416 100004 000205 000100 016002
000040  000107 100005 000030 177740 177752 177753 177754 177755     000050  177756 000000 100000 125005

000000 0  0
```

TmpControl^ZTmfFromTmpStarting

```
000000 0  0   !EXPORT! Int PROC TmpControl^ZTmfFromTmpStarting (TmpState, TmpStartingState);
000000 1  0   !------------------------------------------------------------------------------
000000 1  0   ! This proc will return the ZTMF^VAL^STARTING... val from the
000000 1  0   ! TmpStartingState.
000000 1  0   !------------------------------------------------------------------------------
000000 1  0   Int .EXT TmpState;
000000 1  0                              ! IN: The Tmp State.   This is checked to be
000000 1  0                              !     equal to starting prior to converting
000000 1  0                              !     TmpStartingState.  If TmpState is not
000000 1  0                              !     starting merely return the nil value.
000000 1  0   Int .EXT TmpStartingState;
000000 1  0                              ! IN: The TmpStartingState to be converted to the
000000 1  0                              !     ZTMF^VAL^STARTING...
000000 1  0   BEGIN
000000 1  1   Int      StartOpState := TmpStartingState;
000000 1  1
000000 1  1       ------------------------------------------------------------------------
000000 1  1       --                   First check if TmpState is Starting.             --
000000 1  1       ------------------------------------------------------------------------
000000 1  1       IF TmpState <> Starting^TmpState THEN
000007 1  1           RETURN ZTMF^VAL^Starting^Nil;
000011 1  1
000011 1  1       ------------------------------------------------------------------------
000011 1  1       --                If at End Operation convert the last state.          --
000011 1  1       ------------------------------------------------------------------------
000011 1  1       IF StartOpState = EndOperation^StartOpState THEN
000014 1  1           StartOpState := EndOperation^StartOpState - 1;
000016 1  1
000016 1  1       CASE StartOpState OF
000020 1  1       BEGIN
000020 1  2       ReadyForLowStart^StartOpState,
000020 1  2       LowStart^StartOpState ->
000020 1  2           RETURN ZTMF^VAL^StartingServices;
000022 1  2
000022 1  2       WaitFor1stDvPass^StartOpState ->
000022 1  2           RETURN ZTMF^VAL^StartingDataVol;
000024 1  2
000024 1  2       WaitForNetResolve^StartOpState ->
000024 1  2           RETURN ZTMF^VAL^StartingNetResolve;
000026 1  2
000026 1  2       RunningBackOut^StartOpState ->
000026 1  2           RETURN ZTMF^VAL^StartingRunBackout;
000030 1  2
000030 1  2       OTHERWISE ->
000030 1  2           UndefinedCaseError;
000035 1  2       END;
000055 1  1
000055 1  1   END; ! of TmpControl^ZTmfFromTmpStarting

STARTOPSTATE                 Variable     INT          Direct        L+001
TMPSTARTINGSTATE             Variable     INT          EXT Pointer   L-004
TMPSTATE                     Variable     INT          EXT Pointer   L-006

000000  060704 000410 024700 060706 000410 001001 012002 100777    000010  125007 040401 001056 015002 100055 044401 040401 010416
000020  100231 125007 100232 125007 100233 125007 100234 125007    000030  100001 000002 100002 024733 027000 010417 003727 100004
000040  000205 000100 016002 000107 100005 000030 177752 177751    000050  177754 177755 177750 177755 000000 100000 125007
```

```
                                   TmpControl^ZTmfFromTmpStarting
4532.     000000 0   0
```

TmpControl^ZTmfFromTmpStopping

```
000000 0  0   !EXPORT! Int PROC TmpControl^ZTmfFromTmpStopping (TmpState, TmpStoppingState);
000000 1  0   !-------------------------------------------------------------------------------
000000 1  0   ! This proc will return the ZTMF^VAL^STOPPING... val from the
000000 1  0   ! TmpStoppingState.
000000 1  0   !-------------------------------------------------------------------------------
000000 1  0   Int .EXT TmpState;
000000 1  0                              ! IN: The Tmp State.   This is checked to be
000000 1  0                              !     equal to stopping prior to converting
000000 1  0                              !     TmpStoppingState.  If TmpState is not
000000 1  0                              !     stopping merely return the nil value.
000000 1  0   Int .Ext TmpStoppingState;
000000 1  0                              ! IN: The TmpStoppingState to be converted to the
000000 1  0                              !     ZTMF^VAL^STOPPING...
000000 1  0   BEGIN
000000 1  1       --------------------------------------------------------------------------
000000 1  1       --                  First check if TmpState is Stopping                  --
000000 1  1       --------------------------------------------------------------------------
000000 1  1       IF TmpState <> Stopping^TmpState THEN
000004 1  1           RETURN ZTMF^VAL^Stopping^Nil;
000006 1  1
000006 1  1       CASE TmpStoppingState OF
000011 1  1       BEGIN
000011 1  2       WaitForTransFinish^StopOpState ->
000011 1  2           RETURN ZTMF^VAL^StoppingTransFinish;
000013 1  2
000013 1  2       WaitForDvStop^StopOpState ->
000013 1  2           RETURN ZTMF^VAL^StoppingDataVol;
000015 1  2
000015 1  2       WaitForRdf^StopOpState ->
000015 1  2           RETURN ZTMF^VAL^StoppingWaitForRdf;
000017 1  2
000017 1  2       ReadyForLowStop^StopOpState,
000017 1  2       LowStop^StopOpState,
000017 1  2       EndOperation^StopOpState ->
000017 1  2           RETURN ZTMF^VAL^StoppingServices;
000021 1  2
000021 1  2       OTHERWISE ->
000021 1  2           UndefinedCaseError;
000026 1  2       END;
000047 1  1
000047 1  1   END; ! of TmpControl^ZTmfFromTmpStopping

TMPSTATE                          Variable      INT            EXT Pointer    L-006
TMPSTOPPINGSTATE                  Variable      INT            EXT Pointer    L-004

000000  060706 000410 001003 012002 100777 125007 060704 000410     000010  010416 100236 125007 100237 125007 100240 125007 100241
000020  125007 100001 000002 100002 024733 027000 010420 003715     000030  100005 000205 000100 016002 000107 100006 000030 177752
000040  177753 177754 177755 177754 177753 177754 000000 100000     000050  125007

         000000 0  0
```

```
000000 0  0   !EXPORT! PROC TmpControl^UserCommand( HandleAddr, UserCommandAddr );
000000 1  0
000000 1  0   !----------------------------------------------------------------------
000000 1  0   !
000000 1  0   !   This procedure handles TMFSERVE commands for START, STOP and other
000000 1  0   !   TMF commands.
000000 1  0   !
000000 1  0   !----------------------------------------------------------------------
000000 1  0
000000 1  0   Addr   .EXT HandleAddr;
000000 1  0                             ! IN: The handle address which is passed to the
000000 1  0                             !    various ^Put and ^Reply procedures in the
000000 1  0                             !    'TmpUserTmf' module.  Neither this value, nor
000000 1  0                             !    what it points to should be interpreted by
000000 1  0                             !    anyone outside of 'TmpUserTmf'.
000000 1  0
000000 1  0   Addr   .EXT UserCommandAddr;
000000 1  0                             ! IN: The address of the unpacked UserCommand
000000 1  0                             !    structure, as defined by 'TmpUserTmf'.  The
000000 1  0                             !    templates for the structure pointed to by this
000000 1  0                             !    address are exported by 'TmpUserTmf'.
000000 1  0
000000 1  0   BEGIN
000000 1  1       Word   .EXT Header( TmpUserTmfCommandHeader^Struct ) := UserCommandAddr;
000000 1  1
000000 1  1       Int   TmfStateValue;
000000 1  1
000000 1  1       Int   TmfStartingValue;
000000 1  1
000000 1  1       Int   TmfStoppingValue;
000000 1  1
000000 1  1       Word   .EXT UserCommandEle( UserCommandEle^Struct );
000000 1  1
000000 1  1       ! Beginning of code...
000000 1  1
000000 1  1       IF G.OwnershipState <> Primary^OwnershipState THEN
000010 1  1           BEGIN
000010 1  2           CALL TmpUserTmf^HandleBackupMsg( HandleAddr );
000014 1  2           RETURN;
000015 1  2           END;
000015 1  1
000015 1  1       CASE Header.CommandNum OF
000020 1  1       BEGIN
000020 1  2       Delete^TmpUserTmfCommand,
000020 1  2       Start^TmpUserTmfCommand,
000020 1  2       Stop^TmpUserTmfCommand ->
000020 1  2           !-------------------------------------------------------------
000020 1  2           ! Fall through and have the '-^UserCommandThread' execute it.
000020 1  2           !-------------------------------------------------------------
000020 1  2           ;
000021 1  2
000021 1  2       Status^TmpUserTmfCommand ->
000021 1  2           TmfStateValue := TmpControl^ZTmfFromTmpState (G.TmpState);
000030 1  2
000030 1  2           TmfStartingValue :=
000030 1  2               TmpControl^ZTmfFromTmpStarting (G.TmpState, G.StartOp.State);
000043 1  2
```

TmpControl^UserCommand

```
4634.   000043 1  2          TmfStoppingValue :=
4635.   000043 1  2              TmpControl^ZTmfFromTmpStopping (G.TmpState, G.StopOp.State);
4636.   000056 1  2
4637.   000056 1  2          CALL TmpUserTmf^PutStatus( HandleAddr,
4638.   000056 1  2                                     TmfStateValue,
4639.   000056 1  2                                     TmfStartingValue,
4640.   000056 1  2                                     TmfStoppingValue,
4641.   000056 1  2                                     TmfLibTmpMeasure^TxRate );
4642.   000067 1  2          CALL TmpUserTmf^ReplySpi( HandleAddr );
4643.   000073 1  2          RETURN;
4644.   000074 1  2
4645.   000074 1  2      OTHERWISE ->
4646.   000074 1  2          UndefinedCaseError;
4647.   000101 1  2      END;
4648.   000121 1  1
4649.   000121 1  1      Heap^NewStruct( TmpShortTermHeap, UserCommandEle );
4650.   000127 1  1
4651.   000127 1  1      Struct^Zero( UserCommandEle );
4652.   000140 1  1      CALL LList^InitElement( UserCommandEle.Links );
4653.   000143 1  1      UserCommandEle.HandleAddr := HandleAddr;
4654.   000152 1  1      UserCommandEle.UserCommandAddr := UserCommandAddr;
4655.   000161 1  1
4656.   000161 1  1      CALL LList^AppendLast( G.UserCommandQueue, UserCommandEle.Links );
4657.   000170 1  1
4658.   000170 1  1      HandleAddr := Nil^Addr;
4659.   000174 1  1      UserCommandAddr := Nil^Addr;
4660.   000200 1  1
4661.   000200 1  1      CALL Thread^Schedule( G.UserCommandThread, Normal^ScheduleOption );
4662.   000206 1  1  END;

HANDLEADDR                 Variable      INT (32)    EXT Pointer   L-006
HEADER                     Variable,2    STRUCT-I    EXT Pointer   L+001
TMFSTARTINGVALUE           Variable      INT         Direct        L+004
TMFSTATEVALUE              Variable      INT         Direct        L+003
TMFSTOPPINGVALUE           Variable      INT         Direct        L+005
USERCOMMANDADDR            Variable      INT (32)    EXT Pointer   L-004
USERCOMMANDELE             Variable,20   STRUCT-I    EXT Pointer   L+006

000000  060704 000412 024711 002005 103040 143000 001001 012005    000010  060706 000412 024711 027000 125007 100000 026401 010462
000020  010500 100000 103112 173000 130001 024711 027000 044403    000030  100000 103112 173000 130001 100000 102114 172000 130001
000040  024733 027000 044404 100000 103112 173000 130001 100000    000050  102123 172000 130001 024733 027000 044405 060706 000412
000060  040403 040404 040405 024744 027000 024711 027000 060706    000070  000412 024711 027000 125007 100001 000002 100002 024733
000100  027000 010417 003777 100004 000205 000100 016002 000107    000110  100005 000030 000007 177761 000005 177704 000003 177755
000120  000000 060000 100000 100020 024733 027000 064406 100000    000130  060406 000407 000003 060406 000220 000103 100017 000417
000140  060406 024711 027000 060706 000412 100000 100010 060406    000150  000220 000413 060704 000412 100000 100014 060406 000220
000160  000413 100000 170000 130001 003050 060406 024733 027000    000170  100774 100000 060706 000413 100774 100000 060704 000413
000200  103015 163000 100000 100003 024733 027000 125007
```

TmpControl^GetInitSeqnumMsg

```
000000 0  0   !EXPORT! PROC TmpControl^GetInitSeqnumMsg( MsgInfo );
000000 1  0
000000 1  0   !-----------------------------------------------------------------------
000000 1  0   !
000000 1  0   !   This procedure handles GetInitSeqnum messages.
000000 1  0   !
000000 1  0   !-----------------------------------------------------------------------
000000 1  0
000000 1  0   Word   .EXT MsgInfo;
000000 1  0                           ! IN OUT: The Message Info for the GetInitSeqnum Msg.
000000 1  0                           !         The type of this parameter 'TmpMsgInfo^Struct'. A
000000 1  0                           !         blind  pointer is used so other users of this module do
000000 1  0                           !         not have to have that definition.
000000 1  0   BEGIN
000000 1  1       Word   .EXT MsgInfoStruct( TmpMsgInfo^Struct ) = MsgInfo;
000000 1  1
000000 1  1       Word   .EXT ReqCtrl( Tmp_Local_Template );
000000 1  1       Int         .ReplyCtrlBuf [0:
000000 1  1                     WordLen^FromByteLen( Tmp_Local_RepCtrl_MaxSize ) - 1];
000000 1  1       Int         .ReplyCtrl ( Tmp_Local_Template ) = ReplyCtrlBuf;
000000 1  1       Int          ReplyCtrlLen;
000000 1  1
000000 1  1       ! Beginning of code...
000000 1  1
000000 1  1       IF G.OwnershipState <> Primary^OwnershipState THEN
000010 1  1           BEGIN
000010 1  2           CALL TmpControl^HandleBackupMsg( MsgInfo );
000013 1  2           RETURN;
000014 1  2           END;
000014 1  1
000014 1  1       @ReqCtrl := MsgInfoStruct.ReqCtrlAddr;
000022 1  1       AssertTruth( ReqCtrl.Request_Type = Tmp_Local_GetInitSeqnum );
000022 1  1
000022 1  1       ReplyCtrlLen := Int^RoundUpToEven(
000022 1  1                           Dialect^VariantByteLen( ReplyCtrl.GetInitSeqnum_Reply ) );
000024 1  1       Struct^FillPart( ReplyCtrl, ReplyCtrlLen, 0 );
000041 1  1       CALL LocalTmpReq^InitReplyCtrl( ReplyCtrl, Tmp_Local_GetInitSeqnum_Reply,
000041 1  1                                       FEOK );
000050 1  1       ! Since we didn't allocate an ATRequest structure, the tag is
000050 1  1       ! meaningless.
000050 1  1       !
000050 1  1       ReplyCtrl.GetInitSeqnum_Reply.TmfInitSeqnum := TmfConfigurationSeqNum;
000055 1  1       CALL TmpMsg^Reply( MsgInfoStruct, ReplyCtrl, ReplyCtrlLen );
000067 1  1   END;

MSGINFO                   Variable       INT          EXT Pointer   L-004
MSGINFOSTRUCT             Variable,40    STRUCT-I     EXT Pointer   L-004
REPLYCTRL                 Variable,10    STRUCT-I     Indirect      L+003
REPLYCTRLBUF              Variable       INT          Indirect      L+003
REPLYCTRLLEN              Variable       INT          Direct        L+004
REQCTRL                   Variable,10    STRUCT-I     EXT Pointer   L+001

000000  002002 070405 024700 002114 103040 143000 001001 012004    000010  060704 024711 027000 125005 100000 100022 060704 000220
000020  000412 064401 100020 044404 [illegible] 170403 130001 000407    000030  000003 100000 170403 130001 000220 000103 040404 104777
000040  000417 100000 170403 130001 100035 100000 024733 027000    000050  070000 000234 103001 170403 000233 060704 100000 170403
000060  130001 040404 024744 002003 100034 024700 027000 125005    000070
```

TmpControl^GetInitSeqnumMsg

TmpControl^UserCtgCommand

```
000000 0  0   !EXPORT! PROC TmpControl^UserCtgCommand( HandleAddr, UserCommandAddr );
000000 1  0
000000 1  0   !-----------------------------------------------------------------------------
000000 1  0   !
000000 1  0   !   This procedure handles TMFSERVE commands for ALTER, INFO and other
000000 1  0   !   CATALOG commands.
000000 1  0   !
000000 1  0   !-----------------------------------------------------------------------------
000000 1  0
000000 1  0   Addr  .EXT HandleAddr;
000000 1  0                          ! IN: The handle address which is passed to the
000000 1  0                          !   various 'Put and ^Reply procedures in the
000000 1  0                          !   'TmpUserTmf' module.  Neither this value, nor
000000 1  0                          !   what it points to should be interpreted by
000000 1  0                          !   anyone outside of 'TmpUserTmf'.
000000 1  0
000000 1  0   Addr       UserCommandAddr;
000000 1  0                          ! IN: The address of the unpacked UserCommand
000000 1  0                          !   structure, as defined by 'TmpUserTmf'.  The
000000 1  0                          !   templates for the structure pointed to by this
000000 1  0                          !   address are exported by 'TmpUserTmf'.
000000 1  0
000000 1  0   BEGIN
000000 1  1
000000 1  1   Int  .EXT UCmd ( TmpUserCtgCommandHeader^Struct ) = UserCommandAddr;
000000 1  1
000000 1  1
000000 1  1   ! Perform the appropriate command procedure based on the command number.
000000 1  1     CASE UCmd.CommandNum OF
000003 1  1       BEGIN
000003 1  2       Alter^TmpUserCtgCommand ->
000003 1  2         BEGIN
000003 1  3         ! Fire off a thread which will carry out the alter operation.
000003 1  3         CALL TmpControl^AlterCtgThread ( HandleAddr, UserCommandAddr );
000010 1  3         END;
000010 1  2
000010 1  2       Delete^TmpUserCtgCommand ->
000011 1  2         BEGIN
000011 1  3         ! Fire off a thread which will carry out the delete operation
000011 1  3         CALL TmpControl^DeleteCtgThread ( HandleAddr );
000015 1  3         END;
000015 1  2
000015 1  2       Info^TmpUserCtgCommand ->
000016 1  2         BEGIN
000016 1  3         ! Call the procedure that handles the command.
000016 1  3         CALL TmpControl^InfoCtg ( HandleAddr );
000022 1  3         END;
000022 1  2
000022 1  2
000022 1  2       OTHERWISE ->
000023 1  2             UndefinedCaseError;
000030 1  2
000030 1  2       END;  ! case usercommand.commandnum of
000046 1  1
000046 1  1     ! The procedures that were called above replied to the request using
000046 1  1     ! TmpUserAt^ReplySpi, which deallocated all the buffers.  So we need
000046 1  1     ! to set the addresse to Nil^Addr.
```

```
                              TmpControl^UserCtgCommand

 4766.     000046 1  1
 4767.     000046 1  1      HandleAddr := Nil^Addr;
 4768.     000052 1  1
 4769.     000052 1  1      RETURN;
 4770.     000053 1  1      END;  !TmpControl^UserCtgCommand

HANDLEADDR                         Variable      INT (32)      EXT Pointer    L-006
UCMD                               Variable,2    STRUCT-1      EXT Pointer    L-004
USERCOMMANDADDR                    Variable      INT (32)      Direct         L-004

000000  060704 000410 010426 060706 000412 060704 024733 027000    000010  010435 060706 000412 024711 027000 010430 060706 000412
000020  024711 027000 010423 100001 000002 100002 024733 027000    000030  010415 003777 100002 000205 000100 016002 000107 100003
000040  000030 177742 177747 177753 177757 000000 100774 100000    000050  060706 000413 125007

 4771.     000000 0  0
```

TmpControl^AlterCtgThread

```
000000 0  0   PROC TmpControl^AlterCtgThread( HandleAddr, UserCommandAddr );
000000 1  0
000000 1  0   !------------------------------------------------------------------
000000 1  0   ! This procedure implements the thread which handles the ALTER CATALOG
000000 1  0   ! command. A thread is required because the CheckpointSem is obtained.
000000 1  0   !
000000 1  0   ! The procedure  verifies whether TMF is stopped before proceeding.
000000 1  0   !
000000 1  0   ! The procedure assumes the option value RetainDepth has been verified.
000000 1  0   !------------------------------------------------------------------
000000 1  0
000000 1  0   Addr            HandleAddr;
000000 1  0                             !IN: The address of the data structure in
000000 1  0                             !    TmpUserTmf which corresponds to command. We use
000000 1  0                             !    it when calling routines to reply to the
000000 1  0                             !    message.
000000 1  0                             !
000000 1  0
000000 1  0                             !    This procedure will call TmpUserCtg^ReplySpi,
000000 1  0                             !    which will deallocate the buffer this address
000000 1  0                             !    points to, and will set this address to Nil^Addr.
000000 1  0                             !    But it will not set the caller's copy of the
000000 1  0                             !    address to Nil^Addr because this is passed by
000000 1  0                             !    value, not reference.  The reason for this is
000000 1  0                             !    because if this procedure creates a thread
000000 1  0                             !    all reference parameters must
000000 1  0                             !    NOT be on any thread's stack.  This  would not
000000 1  0                             !    be the case for this parameter.  The caller
000000 1  0                             !    should set its value for this address to Nil^Addr
000000 1  0                             !    immediately after calling this procedure.
000000 1  0
000000 1  0   Addr            UserCommandAddr;
000000 1  0                             !IN: The address of the command structure.  Has the
000000 1  0                             !    definition TmpUserACCommand^Struct
000000 1  0                             !    as defined by the TmpUserTmf module.
000000 1  0                             !
000000 1  0                             !    This procedure will call TmpUserCtg^ReplySpi,
000000 1  0                             !    which will deallocate the buffer this address
000000 1  0                             !    points to, and will set this address to Nil^Addr.
000000 1  0                             !    But it will not set the caller's copy of the
000000 1  0                             !    address to Nil^Addr because this is passed by
000000 1  0                             !    value, not reference.  The reason for this is
000000 1  0                             !    because if this procedure  creates a thread
000000 1  0                             !    all reference parameters must
000000 1  0                             !    NOT be on any thread's stack.  This would not
000000 1  0                             !    be the case for this parameter.  The caller
000000 1  0                             !    should set its value for this address to Nil^Addr
000000 1  0                             !    immediately after calling this procedure.
000000 1  0
000000 1  0     BEGIN
000000 1  1
000000 1  1     ! We don't save off the thread address.  Once the thread starts, we just
000000 1  1     ! let it complete.  One exception is after we obtain the CheckpointSem.  We
000000 1  1     ! re-verify the module state and ownership after the semaphore is
000000 1  1     ! obtained to make sure a GiveSwitch or Stop was not done while we were
000000 1  1     ! waiting for the semaphore.
000000 1  1
```

TmpControl^AlterCtgThread

```
000000 1  1    THREAD^NEW( HandleAddr );
000000 1  1
000000 1  1    Int .EXT      AlterCmd( TmpUserACCommand^Struct ) = UserCommandAddr;
000000 1  1    Int           Spi^Error := ZTMF^ERR^OK;
000000 1  1    Int           Error;
000000 1  1
000000 1  1
000000 1  1    ! Get the CheckpointSem before doing anything
000000 1  1    CALL Semaphore^Get( G.CheckpointSem, 1 );
000021 1  1
000021 1  1    ! Verify module ownership is Primary
000021 1  1    IF  G.OwnershipState <> Primary^TmpOwnership  THEN
000025 1  1        BEGIN
000025 1  2        CALL Semaphore^Put( G.CheckpointSem, 1 );
000033 1  2        CALL TmpUserCtg^ReplyBackup( HandleAddr );
000036 1  2        RETURN;
000037 1  2        END;  ! if ownershipstate <> primary
000037 1  1
000037 1  1    IF G.TmpState <> Stopped^TmpState THEN
000042 1  1        BEGIN
000042 1  2        Spi^Error := ZTMF^ERR^TMFMustBeStopped;
000044 1  2        GOTO ErrorExit;
000045 1  2        END; ! If TMF is not stopped
000045 1  1
000045 1  1    ! If Released is altered
000045 1  1    IF AlterCmd.Altering.Released THEN
000054 1  1        G.GlobInfoRecord.CtgInfo.Released := AlterCmd.Released;
000063 1  1
000063 1  1    ! If RetainDepth is altered
000063 1  1    IF AlterCmd.Altering.RetainDepth THEN
000072 1  1        G.GlobInfoRecord.CtgInfo.RetainDepth := AlterCmd.RetainDepth;
000101 1  1
000101 1  1    ! Now tell the backup that we are about to update the globinfo file.
000101 1  1    IF G.Checkpointing THEN
000104 1  1        CALL TmpControl^CkptAlterCtg;
000105 1  1
000105 1  1
000105 1  1    ! Write the globinfo file
000105 1  1    CALL TmpControl^WriteGlobInfo;
000106 1  1
000106 1  1
000106 1  1    ! If we get here we have successfully altered the catalog. Issue the
000106 1  1    ! appropriate events.
000106 1  1    IF AlterCmd.Altering.RetainDepth THEN
000115 1  1     CALL TmpCtrlEms^CtgAlterRetainDepth( G.GlobInfoRecord.CtgInfo.RetainDepth );
000121 1  1
000121 1  1    IF AlterCmd.Altering.Released THEN
000130 1  1     CALL TmpCtrlEms^CtgAlterReleased( G.GlobInfoRecord.CtgInfo.Released );
000134 1  1
000134 1  1
000134 1  1    ! Release the semaphore
000134 1  1    CALL Semaphore^Put( G.CheckpointSem, 1 );
000142 1  1
000142 1  1    CALL TmpUserCTG^PutResult( HandleAddr, ZTMF^ERR^OK );
000146 1  1    CALL TmpUserCTG^ReplySpi( HandleAddr );
000151 1  1
000151 1  1    RETURN;
```

TmpControl^AlterCtgThread

```
000152 1   1
000152 1   1   ErrorExit:
000152 1   1
000152 1   1     ! Make sure spi^error <> ok
000152 1   1     PermAssertTruth( Spi^Error <> ZIMF^ERR^OK );
000161 1   1
000161 1   1     ! Release the semaphore
000161 1   1     CALL Semaphore^Put( G.CheckpointSem, 1 );
000167 1   1
000167 1   1     CALL TmpUserCTG^PutResult( HandleAddr, Spi^Error );
000173 1   1     CALL TmpUserCTG^ReplySpi( HandleAddr );
000176 1   1
000176 1   1     RETURN;
000177 1   1   END; !TmpControl^AlterCtgThread

ALTERCMD                     Variable,10   STRUCT-I     EXT Pointer   L-004
ERROR                        Variable      INT          Direct        L+003
ERROREXIT                    Label                      %000152
HANDLEADDR                   Variable      INT (32)     Direct        L-006
SPI^ERROR                    Variable      INT          Direct        L+002
USERCOMMANDADDR              Variable      INT (32)     Direct        L-004
^^DUMMY                      Variable      INT          Direct        L+001
^^FIRSTPARAM                 Variable      INT          Direct        L-006

000000  070706 024700 002004 100004 024700 027000 100000 024711
000020  000107 103040 143000 001001 012012 102017 162000 100001
000040  143000 014403 100327 044402 010505 100000 100002 060704
000060  000410 103332 147000 100000 100002 060704 000220 000410
000100  147000 103042 143000 014401 027000 027000 100000 100002
000120  027000 100000 100002 060704 000220 000410 007100 014404
000140  024733 027000 060706 100000 024722 027000 060706 024711
000160  027000 103017 163000 100001 100003 024733 027000 060706

000010  002001 103017 163000 100001 000002 100006 024755 027000
000030  100003 024733 027000 060706 024711 027000 125007 103112
000050  000220 000410 007100 014407 100000 100006 060704 000220
000070  007200 014407 100000 100004 060704 000220 000410 103333
000110  060704 000220 000410 007200 014404 103333 143000 024700
000130  103332 143000 024700 027000 103017 163000 100001 100003
000150  027000 125007 040402 015405 100001 000002 100002 024733
000170  040402 024722 027000 060706 024711 027000 125007
```

TmpControl^InfoCtg

```
000000 0  0   PROC TmpControl^InfoCtg( HandleAddr );
000000 1  0
000000 1  0   !-------------------------------------------------------------------
000000 1  0   !
000000 1  0   ! This procedure builds a SPI reply containing the attributes of the
000000 1  0   ! Catalog. This procedure does not start a new thread. It does the work
000000 1  0   ! without a thread.
000000 1  0   !
000000 1  0   !-------------------------------------------------------------------
000000 1  0
000000 1  0   Addr            HandleAddr;
000000 1  0                              !IN: The address of the data structure in
000000 1  0                              !    TmpUserTmf which corresponds to command. We use
000000 1  0                              !    it when calling routines to reply to the
000000 1  0                              !    message.
000000 1  0                              !
000000 1  0
000000 1  0   BEGIN
000000 1  1   STRUCT      .InfoCtgRsp( CtgInfo^Struct );
000000 1  1
000000 1  1   ! Verify module ownership is Primary
000000 1  1   IF  G.OwnershipState <> Primary^TmpOwnership  THEN
000007 1  1      BEGIN
000007 1  2      CALL TmpUserCtg^ReplyBackup( HandleAddr );
000012 1  2      RETURN;
000013 1  2      END;  ! if ownershipstate <> primary
000013 1  1
000013 1  1   Struct^Zero( InfoCtgRsp );
000027 1  1
000027 1  1   InfoCtgRsp.RetainDepth := G.GlobInfoRecord.CtgInfo.RetainDepth;
000033 1  1   InfoCtgRsp.Released    := G.GlobInfoRecord.CtgInfo.Released;
000036 1  1
000036 1  1   CALL TmpUserCtg^PutInfoCtg( HandleAddr, InfoCtgRsp );
000044 1  1
000044 1  1   CALL TmpUserCtg^ReplySpi( HandleAddr );
000047 1  1   RETURN;
000050 1  1   END; ! TmpControl^InfoCtg

HANDLEADDR                  Variable       INT (32)       Direct        L-004
INFOCTGRSP                  Variable,4     STRUCT         Indirect      L+001

000000  070402 024700 002002 103040 143000 001001 012004 060704    000010  024711 027000 125005 000002 170401 130001 000407 000003
000020  100000 170401 130001 000220 000103 100003 000417 103333    000030  143000 102001 146401 101332 141000 144401 060704 100000
000040  170401 130001 024733 027000 060704 024711 027000 125005    000050
```

TmpControl^DeleteCtgThread

```
000000 0 0   PROC TmpControl^DeleteCtgThread( HandleAddr );
000000 1 0
000000 1 0   !-------------------------------------------------------------------
000000 1 0   ! This procedure implements the thread which handles the DELETE CATALOG
000000 1 0   ! command. A thread is required because the CheckpointSem is obtained.
000000 1 0   !
000000 1 0   ! The procedure  verifies whether IMF is started before proceeding.
000000 1 0   !
000000 1 0   !-------------------------------------------------------------------
000000 1 0
000000 1 0   Addr            HandleAddr;
000000 1 0                               !IN: The address of the data structure in
000000 1 0                               !    TmpUserTmf which corresponds to command. We use
000000 1 0                               !    it when calling routines to reply to the
000000 1 0                               !    message.
000000 1 0                               !
000000 1 0
000000 1 0                               !    This procedure will call TmpUserCtg^ReplySpi,
000000 1 0                               !    which will deallocate the buffer this address
000000 1 0                               !    points to, and will set this address to Nil^Addr.
000000 1 0                               !    But it will not set the caller's copy of the
000000 1 0                               !    address to Nil^Addr because this is passed by
000000 1 0                               !    value, not reference.  The reason for this is
000000 1 0                               !    because if this procedure creates a thread
000000 1 0                               !    all reference parameters must
000000 1 0                               !    NOT be on any thread's stack.  This  would not
000000 1 0                               !    be the case for this parameter.  The caller
000000 1 0                               !    should set its value for this address to Nil^Addr
000000 1 0                               !    immediately after calling this procedure.
000000 1 0
000000 1 0
000000 1 0   BEGIN
000000 1 1
000000 1 1     ! We don't save off the thread address.  Once the thread starts, we just
000000 1 1     ! let it complete.  One exception is after we obtain the CheckpointSem.  We
000000 1 1     ! re-verify the module state and ownership after the semaphore is
000000 1 1     ! obtained to make sure a GiveSwitch or Stop was not done while we were
000000 1 1     ! waiting for the semaphore.
000000 1 1
000000 1 1     THREAD^NEW( HandleAddr );
000000 1 1     Int          Spi^Error := ZTMF^ERR^OK;
000000 1 1
000000 1 1     Int          Error;
000000 1 1
000000 1 1     ! Get the CheckpointSem before doing anything
000000 1 1     CALL Semaphore^Get( G.CheckpointSem, 1 );
000021 1 1
000021 1 1     ! Verify module ownership is Primary
000021 1 1     IF  G.OwnershipState <> Primary^TmpOwnership  THEN
000025 1 1         BEGIN
000025 1 2         CALL Semaphore^Put( G.CheckpointSem, 1 );
000033 1 2         CALL TmpUserCtg^ReplyBackup( HandleAddr );
000036 1 2         RETURN;
000037 1 2         END;  ! if ownershipstate <> primary
000037 1 1
000037 1 1     IF G.TmpState <> Started^TmpState THEN
000043 1 1         BEGIN
```

TmpControl^DeleteCtgThread

```
000043 1  2        Spi^Error := ZTMF^ERR^TMFNotStarted;
000045 1  2        GOTO ErrorExit;
000046 1  2        END; ! If TMF is not started
000046 1  1
000046 1  1
000046 1  1     ! Initialize the CR struct and fill it with the appropriate stuff
000046 1  1     Struct^Zero( G.CR );
000070 1  1
000070 1  1     G.CR.DLR^Code := DLO^Initialize^Catalog;
000075 1  1     CALL THREEWORDTIMESTAMP ( G.GlobInfoRecord.TmfConfigurationSeqNum,
000075 1  1                               G.CR.DLR^Status.DLR^TimeStamp );
000106 1  1
000106 1  1     ! Now tell the backup that we are about to inform the catalog process
000106 1  1     ! of the delete catalog. This corresponds to starting the operation.
000106 1  1     IF G.Checkpointing THEN
000111 1  1         CALL TmpControl^CkptDeleteCtg( True );
000114 1  1
000114 1  1     ! Actually tell the catalog process of delete catalog.
000114 1  1     CALL TmpControl^OpenCtgProcess;
000115 1  1
000115 1  1     CALL ThreadIo^WriteRead( G.CtgProcessFileNum,
000115 1  1                              G.CRStr,
000115 1  1                              , , ,       ! Tag , MaxReadLen and TimeOut
000115 1  1                              Error );
000140 1  1
000140 1  1     IF  Error <> FEOK  THEN
000142 1  1         BEGIN
000142 1  2         CALL TmpCtrlEms^CtgFSError( G.CtgProcessNameStr,
000142 1  2                                     WriteRead^CtgProcessOp, Error );
000154 1  2         CALL TmpControl^Abend;
000155 1  2         END; ! Error <> FEOK
000155 1  1
000155 1  1     CALL TmpControl^CloseCtgProcess;
000156 1  1
000156 1  1     ! If we get here we have successfully deleted the catalog. Issue the
000156 1  1     ! EMS event.
000156 1  1     CALL TmpCtrlEms^DeleteCtg;
000157 1  1
000157 1  1     ! Now tell the backup that we have informed the catalog process
000157 1  1     ! of the delete catalog. This corresponds to completion of the operation.
000157 1  1     IF G.Checkpointing THEN
000162 1  1         CALL TmpControl^CkptDeleteCtg( False );
000165 1  1
000165 1  1     ! Release the semaphore
000165 1  1     CALL Semaphore^Put( G.CheckpointSem, 1 );
000173 1  1
000173 1  1     CALL TmpUserCTG^PutResult( HandleAddr, ZTMF^ERR^OK );
000177 1  1     CALL TmpUserCTG^ReplySpi( HandleAddr );
000202 1  1
000202 1  1     RETURN;
000203 1  1
000203 1  1   ErrorExit:
000203 1  1
000203 1  1     ! Make sure spi^error <> ok
000203 1  1     PermAssertTruth( Spi^Error <> ZTMF^ERR^OK );
000212 1  1
000212 1  1     ! Release the semaphore
```

```
                                        TmpControl^DeleteCtgThread

  5054.     000212 1   1     CALL Semaphore^Put( G.CheckpointSem, 1 );
  5055.     000220 1   1
  5056.     000220 1   1     CALL TmpUserCTG^PutResult( HandleAddr, Spi^Error );
  5057.     000224 1   1     CALL TmpUserCTG^ReplySpi( HandleAddr );
  5058.     000227 1   1
  5059.     000227 1   1     RETURN;
  5060.     000230 1   1   END; ! TmpControl^DeleteCtgThread

ERROR                            Variable      INT          Direct      L+003
ERROREXIT                        Label                      %000203
HANDLEADDR                       Variable      INT (32)     Direct      L-004
SPI^ERROR                        Variable      INT          Direct      L+002
^^DUMMY                          Variable      INT          Direct      L+001
^^FIRSTPARAM                     Variable      INT          Direct      L-004

000000  070704 024700 002004 100004 024700 027000 100000 024711     000010  002001 103017 163000 100001 000002 100006 024755 027000
000020  000107 103040 143000 001001 012012 102017 162000 100001     000030  100003 024733 027000 060704 024711 027000 125005 103112
000040  143000 001002 012003 100143 044402 010535 000002 170000     000050  130001 005002 004052 000200 000407 000003 100000 170000
000060  130001 005002 004052 000200 000220 000103 100273 000417     000070  100025 005001 004025 000117 147000 102325 172000 000234
000100  005001 004062 000115 171000 024744 027000 103042 143000     000110  014403 100777 024700 027000 027000 005001 004020 000117
000120  143000 100000 170000 130001 005002 004346 000200 024722     000130  002005 100000 070403 130001 100061 024722 027000 000107
000140  040403 014413 100000 170000 130001 005002 004042 000200     000150  100004 040403 024733 027000 027000 027000 027000 103042
000160  143000 014403 100000 024700 027000 103017 163000 100001     000170  100003 024733 027000 060704 100000 024722 027000 060704
000200  024711 027000 125005 040402 015405 100001 000002 100002     000210  024733 027000 103017 163000 100001 100003 024733 027000
000220  060704 040402 024722 027000 060704 024711 027000 125005     000230
```

TmpControl^OpenCtgProcess

```
000000 0  0   !EXPORT! PROC TmpControl^OpenCtgProcess;
000000 1  0
000000 1  0   !------------------------------------------------------------------------
000000 1  0   !
000000 1  0   ! This procedure opens the Catalog Process.
000000 1  0   !
000000 1  0   !------------------------------------------------------------------------
000000 1  0
000000 1  0   BEGIN
000000 1  1       Int      Error;
000000 1  1       Int      CtgProcessNameLen;
000000 1  1       String   .CtgProcessName[ 0:MaxFileNameLen - 1 ];
000000 1  1
000000 1  1       ! Begining of Code ...
000000 1  1
000000 1  1       CtgProcessName ':=' [ MaxFileNameLen * [ " " ] ];
000015 1  1       CtgProcessNameLen := Catalog^TmfProcessNameLen;
000017 1  1       CtgProcessName ':=' Catalog^TmfProcessName;
000027 1  1
000027 1  1       CALL Str^FromBytes( G.CtgProcessNameStr,
000027 1  1                           CtgProcessName,
000027 1  1                           MaxFileNameLen,
000027 1  1                           CtgProcessNameLen );
000044 1  1
000044 1  1
000044 1  1       CALL ThreadIo^OpenStr( G.CtgProcessNameStr,
000044 1  1                              G.CtgProcessFileNum,
000044 1  1                              !Default = ReadWriteAccess!,
000044 1  1                              !Default = Shared^Exclusion!,
000044 1  1                              !Default NoWait Depth = 1!,
000044 1  1                              !Default Synchdepth = 0!,
000044 1  1                              !Flags!,
000044 1  1                              !Tag!,
000044 1  1                              !Timeout!,
000044 1  1                              Error );
000071 1  1
000071 1  1       IF  Error <> FEOK  THEN
000073 1  1          BEGIN
000073 1  2          CALL TmpCtrlEms^CtgFSError( G.CtgProcessNameStr,
000073 1  2                                      Open^CtgProcessOp, Error );
000105 1  2          CALL TmpControl^Abend;
000106 1  2          END;
000106 1  1
000106 1  1   END; ! TmpControl^OpenCtgprocess

CTGPROCESSNAME             Variable     STRING      Indirect     L+003
CTGPROCESSNAMELEN          Variable     INT         Direct       L+002
ERROR                      Variable     INT         Direct       L+001

000000  002002 070404 030001 024700 002100 170403 000025 100100    000010  004400 000200 030001 100200 126047 100005 044402 170403
000020  000025 100166 004400 000200 030001 100006 126047 100000    000030  170000 130001 005002 004042 000200 100000 170403 100200
000040  040402 100017 024766 027000 100000 170000 130001 005002    000050  004042 000200 100000 005001 004020 000117 173000 130001
000060  024733 002011 100000 070401 130001 005003 004001 024722    000070  027000 040401 014413 100000 170000 130001 005002 004042
000100  000200 100005 040401 024733 027000 027000 125003 020040    000110  020040 020040 020040 020040 020040 020040 020040 020040
000120  020040 020040 020040 020040 020040 020040 020040 020040    000130  020040 020040 020040 020040 020040 020040 020040 020040
000140  020040 020040 020040 020040 020040 020040 020040 020040    000150  020040 020040 020040 020040 020040 020040 020040 020040
```

```
                                    ImpControl^OpenCtgProcess

000160  020040 020040 020040 020040 020040 020040 020040 020040     000170  020040 020040 020040 020040 020040 020040 020040 020040
000200  020040 020040 020040 020040 020040 020040 020040 022130     000210  041501 052040
```

```
                    TmpControl^CloseCtgProcess
000000 0  0   !EXPORT! PROC TmpControl^CloseCtgProcess;
000000 1  0
000000 1  0   !---------------------------------------------------------------
000000 1  0   !
000000 1  0   ! This procedure closes the Catalog Process.
000000 1  0   !
000000 1  0   !---------------------------------------------------------------
000000 1  0
000000 1  0   BEGIN
000000 1  1
000000 1  1      ! Begining of Code ...
000000 1  1
000000 1  1      CALL ThreadIo^Close( G.CtgProcessFileNum );
000006 1  1
000006 1  1      G.CtgProcessFileNum := -1;
000013 1  1
000013 1  1   END; ! TmpControl^CloseCtgProcess

000000  005001 004020 000117 143000 024700 027000 100777 005001    000010  004020 000117 147000 125003
```

TmpControl^GetCatalogConfig

```
000000 0  0   !EXPORT! PROC TmpControl^GetCatalogConfig( Released, RetainDepth );
000000 1  0
000000 1  0   !-----------------------------------------------------------------------
000000 1  0   !
000000 1  0   !  This procedure returns the released and retaindepth attribute values
000000 1  0   !  that are stored in the GlobInfo file to the STMPCAT module.
000000 1  0   !
000000 1  0   !-----------------------------------------------------------------------
000000 1  0
000000 1  0   Boolean .EXT Released;     !OUT
000000 1  0   Int     .EXT RetainDepth;  !OUT
000000 1  0
000000 1  0   BEGIN
000000 1  1
000000 1  1     Released := G.GlobInfoRecord.CtgInfo.Released;
000004 1  1
000004 1  1     RetainDepth := G.GlobInfoRecord.CtgInfo.RetainDepth;
000010 1  1
000010 1  1   END;  !TmpControl^GetCatalogConfig

RELEASED                        Variable      INT          EXT Pointer    L-006
RETAINDEPTH                     Variable      INT          EXT Pointer    L-004

000000  103332 143000 060706 000411 102333 142000 060704 000411      000010  125007
```

TmpControl^TmfMon2Msg

```
000000 0  0   !EXPORT! PROC TmpControl^TmfMon2Msg( MsgInfo );
000000 1  0
000000 1  0   !------------------------------------------------------------------------------
000000 1  0   !
000000 1  0   !   This procedure handles TMFMON2 Coordinator messages.
000000 1  0   !
000000 1  0   !------------------------------------------------------------------------------
000000 1  0
000000 1  0   Word  .EXT MsgInfo;
000000 1  0                        ! IN OUT: The Message Info for the TMFMON Coord. Msg.
000000 1  0                        !   The type of this parameter is 'TmpMsgInfo^Struct'.  A
000000 1  0                        !   blind  pointer is used so other users of this module do
000000 1  0                        !   not have to have that definition.
000000 1  0
000000 1  0   BEGIN
000000 1  1       Word  .EXT MsgInfoStruct( TmpMsgInfo^Struct ) = MsgInfo;
000000 1  1
000000 1  1       Word  .EXT TmfMon2ReqCtrl( Tmp_Local_Template );
000000 1  1
000000 1  1       Int  FailedCpuNum;
000000 1  1
000000 1  1       Int  ReloadeeCpuNum;
000000 1  1
000000 1  1       ! Beginning of code...
000000 1  1
000000 1  1       IF G.OwnershipState <> Primary^OwnershipState THEN
000005 1  1           BEGIN
000005 1  2           CALL TmpControl^HandleBackupMsg( MsgInfo );
000010 1  2           RETURN;
000011 1  2           END;
000011 1  1
000011 1  1       IF G.StartOp.State = LowStart^StartOpState OR
000011 1  1          G.StopOp.State = LowStop^StopOpState THEN
000021 1  1           BEGIN
000021 1  2           !---------------------------------------------------------
000021 1  2           ! The Control thread is executing a LowStart or LowStop and
000021 1  2           ! happens to be suspended at the moment.  Crash TMF if a
000021 1  2           ! CpuDown request is received from the TMFMON2 Coordinator.
000021 1  2           !---------------------------------------------------------
000021 1  2
000021 1  2           @TmfMon2ReqCtrl := @MsgInfoStruct.ReqCtrl;
000027 1  2
000027 1  2           CASE TmfMon2ReqCtrl.TmfMon2.SubType OF
000032 1  2           BEGIN
000032 1  3           AreYouAlive_TmfMon2TmpReq ->
000032 1  3               ;
000033 1  3
000033 1  3           CpuDownPermission_TmfMon2TmpReq,
000033 1  3           BeginCoordTake_TmfMon2TmpReq ->
000033 1  3               CASE G.TmpState OF
000036 1  3               BEGIN
000036 1  4               Starting^TmpState ->
000036 1  4                   CALL TmpCtrlEms^CpuDownKillsStart( G.OperationNum );
000042 1  4               Stopping^TmpState ->
000043 1  4                   CALL TmpCtrlEms^CpuDownKillsStop( G.OperationNum );
000047 1  4               OTHERWISE ->
000050 1  4                   UndefinedCaseError;
```

TmpControl^TmfMon2Msg

```
000055 1 4                 END;
000073 1 3                 CALL TmpControl^StopAbrupt;
000074 1 3
000074 1 3         EndCoordTake_TmfMon2TmpReq ->
000075 1 3                 !----------------------------
000075 1 3                 ! Message must be a retry.
000075 1 3                 !----------------------------
000075 1 3                 PermAssertTruth( NOT G.CoordTakeOverInProgress );
000105 1 3                 CALL TmpMsg^ReplyLocalTmp( G.TmfMon2MsgInfo, FEOK );
000116 1 3                 RETURN;
000117 1 3
000117 1 3         ReloadPermission_TmfMon2TmpReq ->
000117 1 3                 ;    ! Allow this one to wait.
000120 1 3
000120 1 3         ReloadComplete_TmfMon2TmpReq ->
000120 1 3                 !----------------------------
000120 1 3                 ! Message must be a retry.
000120 1 3                 !----------------------------
000120 1 3                 PermAssertTruth( G.CpuReloadOp.State = None^CpuReloadOpState );
000131 1 3                 ReloadeeCpuNum := TmfMon2ReqCtrl.TmfMon2.CpuUpDownReq.CpuNum;
000134 1 3                 PermAssertTruth( G.CpuStateArray[ ReloadeeCpuNum ] = Up^CpuState );
000146 1 3                 CALL TmpMsg^ReplyLocalTmp( G.TmfMon2MsgInfo, FEOK );
000157 1 3                 RETURN;
000160 1 3
000160 1 3         CpuDownComplete_TmfMon2TmpReq ->
000160 1 3                 !----------------------------
000160 1 3                 ! Message must be a retry.
000160 1 3                 !----------------------------
000160 1 3                 PermAssertTruth( G.CpuDownOp.State = None^CpuDownOpState );
000171 1 3                 FailedCpuNum := TmfMon2ReqCtrl.TmfMon2.CpuUpDownReq.CpuNum;
000174 1 3                 PermAssertTruth( G.CpuStateArray[ FailedCpuNum ] = Down^CpuState );
000206 1 3                 CALL TmpMsg^ReplyLocalTmp( G.TmfMon2MsgInfo, FEOK );
000223 1 3                 RETURN;
000224 1 3
000224 1 3         ReloadPhase1_TmfMon2TmpReq,
000224 1 3         ReloadPhase2_TmfMon2TmpReq,
000224 1 3         FailReload_TmfMon2TmpReq,
000224 1 3         CpuDown1_TmfMon2TmpReq,
000224 1 3         CpuDown2_TmfMon2TmpReq,
000224 1 3         CpuDown3_TmfMon2TmpReq ->
000224 1 3                 UndefinedCaseError;      ! Cannot be in middle of CpuDown or
000231 1 3                                          ! CpuReload.
000231 1 3
000231 1 3         OTHERWISE ->
000232 1 3                 UndefinedCaseError;
000237 1 3         END;
000271 1 2         END;
000271 1 1
000271 1 1     IF NOT TmpMsg^MsgInfoIsNil( G.TmfMon2MsgInfo ) THEN
000277 1 1         BEGIN
000277 1 2         !----------------------------
000277 1 2         ! Get rid of obsolete message.
000277 1 2         !----------------------------
000277 1 2         CALL TmpMsg^ReplyLocalTmp( G.TmfMon2MsgInfo, FEINVALOP );
000310 1 2         END;
000310 1 1
000310 1 1     G.TmfMon2MsgInfo ':=' MsgInfo FOR Ele^ByteLen( TmpMsgInfo^Struct ) BYTES;
```

```
                              TmpControl^TmfMon2Msg
 5259.    000316 1  1                                 ! Copy for BYTES because input pointer is
 5260.    000316 1  1                                 ! not a structure type.
 5261.    000316 1  1
 5262.    000316 1  1        CALL Thread^Schedule( G.ControlThread, Normal^ScheduleOption );
 5263.    000324 1  1     END;

FAILEDCPUNUM                  Variable      INT         Direct       L+003
MSGINFO                       Variable      INT         EXT Pointer  L-004
MSGINFOSTRUCT                 Variable,40   STRUCT-I    EXT Pointer  L-004
RELOADEECPUNUM                Variable      INT         Direct       L+004
TMFMON2REQCTRL                Variable,10   STRUCT-I    EXT Pointer  L+001

000000  002004 103040 143000 001001 012004 060704 024711 027000     000010  125005 103114 143000 001052 012004 103123 143000 001067
000020  115176 100000 100022 060704 000220 000412 064401 100004     000030  026401 110566 110566 103112 143000 010420 103113 143000
000040  024700 027000 010430 103113 143000 024700 027000 010423     000050  100001 000002 100002 024733 027000 010415 003777 100002
000060  000205 000100 016002 000107 100003 000030 177750 177761     000070  177753 177757 000000 027000 010574 103041 143000 014405
000100  100001 000002 100002 024733 027000 100000 170000 130001     000110  100000 024722 002003 100014 024700 027000 125005 010551
000120  103073 143000 001024 012005 100001 000002 100002 024733     000130  027000 100005 026401 034404 003051 000117 143000 001001
000140  012005 100001 000002 100002 024733 027000 100000 170000     000150  130001 100000 024722 002003 100014 024700 027000 125005
000160  103071 143000 001012 012005 100001 000002 100002 024733     000170  027000 100005 026401 034403 003051 000117 143000 001002
000200  012005 100001 000002 100002 024733 027000 100000 170000     000210  130001 100000 024722 002003 100014 024700 010403 000052
000220  000020 000050 027000 125005 100001 000002 100002 024733     000230  027000 010437 100001 000002 100002 024733 027000 010431
000240  003775 100016 000205 000100 016002 000107 100017 000030     000250  000021 177761 177646 177751 177756 000014 177555 177745
000260  177744 177743 177676 177741 177740 177546 177607 177743     000270  000000 100000 170000 130001 024711 027000 015411 100000
000300  170000 130001 100002 024722 002003 100014 024700 027000     000310  100000 170000 130001 060704 100040 000417 103014 163000
000320  100000 100003 024733 027000 125005
```

TmpControl^StopAbruptMsg

```
000000 0  0   !EXPORT! PROC TmpControl^StopAbruptMsg( MsgInfo );
000000 1  0
000000 1  0   !------------------------------------------------------------------------
000000 1  0   !
000000 1  0   !   This procedure handles a Stop Abrupt message from the Primary TMP, or
000000 1  0   !   a test program.
000000 1  0   !
000000 1  0   !------------------------------------------------------------------------
000000 1  0
000000 1  0   Word  .EXT MsgInfo;
000000 1  0                                  ! IN OUT: The Message Info for the Stop Abrupt Msg.
000000 1  0                                  !   The type of this parameter is 'TmpMsgInfo^Struct'.  A
000000 1  0                                  !   blind  pointer is used so other users of this module do
000000 1  0                                  !   not have to have that definition.
000000 1  0
000000 1  0   BEGIN
000000 1  1       Word  .EXT MsgInfoStruct( MsgSysInfo'Struct ) = MsgInfo;
000000 1  1       Word  .EXT ReqCtrl( Tmp_Local_Template );
000000 1  1
000000 1  1       ! Beginning of code...
000000 1  1
000000 1  1       @ReqCtrl := @MsgInfoStruct.ReqCtrl;
000007 1  1
000007 1  1       CASE G.OwnershipState OF
000012 1  1       BEGIN
000012 1  2       Primary^OwnershipState,
000012 1  2       Switching^OwnershipState,
000012 1  2       TakingOver^OwnershipState ->
000012 1  2           IF NOT ReqCtrl.StopAbrupt.KillPrimary THEN
000015 1  2               BEGIN
000015 1  3               CALL TmpMsg^ReplyLocalTmp( MsgInfo, FEINVALOP );
000024 1  3               RETURN;
000025 1  3               END;
000025 1  2
000025 1  2       VulnerableBackup^OwnershipState,
000025 1  2       CapableBackup^OwnershipState ->
000025 1  2           IF ReqCtrl.StopAbrupt.KillPrimary THEN
000030 1  2               BEGIN
000030 1  3               CALL TmpMsg^ReplyLocalTmp( MsgInfo, FEOWNERSHIP );
000037 1  3               RETURN;
000040 1  3               END;
000040 1  2
000040 1  2       OTHERWISE ->
000040 1  2           UndefinedCaseError;
000045 1  2       END;
000065 1  1
000065 1  1       CALL TmpMsg^ReplyLocalTmp( MsgInfo, FEOK );
000074 1  1       CALL TmfLibTmpOwn^AbruptDisconnect;
000075 1  1       CALL STOP;
000102 1  1   END;

MSGINFO                  Variable      INT          EXT Pointer   L-004
MSGINFOSTRUCT            Variable,40   STRUCT-I     EXT Pointer   L-004
REQCTRL                  Variable,10   STRUCT-I     EXT Pointer   L+001

000000  002002 100000 100022 060704 000220 000412 064401 103040    000010  143000 010434 100004 026401 015450 060704 100002 024722
```

TmpControl^StopAbruptMsg

```
000020  002003 100014 024700 027000 125005 100004 026401 014435    000030  060704 100310 024722 002003 100014 024700 027000 125005
000040  100001 000002 100002 024733 027000 010417 003777 100004    000050  000205 000100 016002 000107 100005 000030 177734 177733
000060  177732 177744 177743 177755 000000 060704 100000 024722    000070  002003 100014 024700 027000 027000 002012 100000 100766
000100  024711 027000 125005
```

TmpControl^GetTmfState

```
000000 0  0   !EXPORT! PROC TmpControl^GetTmfState ( MsgInfo );
000000 1  0   !-------------------------------------------------------------------------
000000 1  0   !  This procedure is responsible for responding to the TmfState message.
000000 1  0   !-------------------------------------------------------------------------
000000 1  0   Word  .EXT MsgInfo;
000000 1  0                     ! IN: This is the TmpMsgInfo^Struct describing the
000000 1  0                     !     message this proc handles.
000000 1  0   BEGIN
000000 1  1       Word .EXT MsgInfo^Struct (TmpMsgInfo^Struct) := @MsgInfo;
000000 1  1       Word .Ext ReqCtrl (Tmp_Local_Template);
000000 1  1
000000 1  1       Int       .ReplyCtrlBuffer
000000 1  1                    [0:WordLen^FromByteLen (Tmp_Local_RepCtrl_Maxsize) -1];
000000 1  1       Int       .ReplyCtrl (Tmp_Local_Template) = ReplyCtrlBuffer;
000000 1  1       Int        ReplyCtrl_ByteLen;
000000 1  1
000000 1  1       ----------------------------------------------------------------------
000000 1  1       --      If we are not the primary forward the msg to HandleBackUpMsg    --
000000 1  1       ----------------------------------------------------------------------
000000 1  1       IF G.OwnershipState <> Primary^OwnershipState THEN
000012 1  1           BEGIN
000012 1  2           CALL TmpControl^HandleBackupMsg (MsgInfo);
000015 1  2           RETURN;
000016 1  2           END;
000016 1  1
000016 1  1       @ReqCtrl := MsgInfo^Struct.ReqCtrlAddr;
000024 1  1
000024 1  1       PermAssertTruth (ReqCtrl.Request_Type = Tmp_Local_TmfState);
000035 1  1
000035 1  1       ----------------------------------------------------------------------
000035 1  1       --                      Intialize the reply values.                     --
000035 1  1       ----------------------------------------------------------------------
000035 1  1       ReplyCtrl_ByteLen := $OFFSET (Tmp_Local_Template.TmfState_Reply) +
000035 1  1                            Ele^ByteLen (Tmp_Local_Template.TmfState_Reply);
000037 1  1       Struct^FillPart (ReplyCtrl, ReplyCtrl_ByteLen, 0);
000054 1  1       CALL LocalTmpReq^InitReplyCtrl (ReplyCtrl,
000054 1  1                                       Tmp_Local_TmfState_reply,
000054 1  1                                       FEOK);
000063 1  1       ----------------------------------------------------------------------
000063 1  1       --                         Process the reply                            --
000063 1  1       ----------------------------------------------------------------------
000063 1  1       ReplyCtrl.TmfState_Reply.TmfState :=
000063 1  1           TmpControl^ZTmfFromTmpState (G.TmpState);
000073 1  1
000073 1  1       ReplyCtrl.TmfState_Reply.TmfStartingState :=
000073 1  1           TmpControl^ZTmfFromTmpStarting (G.TmpState, G.StartOp.State);
000107 1  1
000107 1  1       ReplyCtrl.TmfState_Reply.TmfStoppingState :=
000107 1  1           TmpControl^ZTmfFromTmpStopping (G.TmpState, G.StopOp.State);
000123 1  1
000123 1  1       CALL TmpMsg^Reply (MsgInfo, ReplyCtrl, ReplyCtrl_ByteLen);
000135 1  1       RETURN;
000136 1  1
000136 1  1   END; -- Of PROC TmpControl^GetTmfState

MSGINFO                Variable      INT          EXT Pointer    L-004
```

```
                                      TmpControl^GetTmfState
MSGINFO^STRUCT                   Variable,40    STRUCT-I       EXT Pointer    L+001
REPLYCTRL                        Variable,10    STRUCT-I       Indirect       L+005
REPLYCTRLBUFFER                  Variable       INT            Indirect       L+005
REPLYCTRL_BYTELEN                Variable       INT            Direct         L+006
REQCTRL                          Variable,10    STRUCT-I       EXT Pointer    L+003

000000  060704 024711 002002 070407 024700 002114 103040 143000    000010  001001 012004 060704 024711 027000 125005 100000 100022
000020  060401 000220 000412 064403 100001 026403 001036 012005    000030  100001 000002 100002 024733 027000 100016 044406 000002
000040  170405 130001 00[illegible]7 000003 100000 170405 130001 000220    000050  000103 040406 104777 000417 100000 170405 130001 100037
000060  100000 024733 027000 100000 103112 173000 130001 024711    000070  027000 103004 147405 100000 102112 172000 130001 100000
000100  101114 171000 130001 024733 027000 103005 147405 100000    000110  102112 172000 130001 100000 101123 171000 130001 024733
000120  027000 103006 147405 060704 100000 170405 130001 040406    000130  024744 002003 100034 024700 027000 125005

 5371.     000000 0  0
```

TmpControl^SwitchMsg

```
000000 0  0   !EXPORT! PROC TmpControl^SwitchMsg( MsgInfo );
000000 1  0
000000 1  0   !------------------------------------------------------------------------
000000 1  0   !
000000 1  0   !    This procedure handles Switch messages.
000000 1  0   !
000000 1  0   !------------------------------------------------------------------------
000000 1  0
000000 1  0   Word  .EXT MsgInfo;
000000 1  0                         ! IN OUT: The Message Information for the Switch msg.  The
000000 1  0                         !   type of this parameter is 'TmpMsgInfo^Struct'.  A blind
000000 1  0                         !   pointer is used so other users of this module do
000000 1  0                         !   not have to have that definition.
000000 1  0
000000 1  0   BEGIN
000000 1  1       Word  .EXT MsgInfoStruct( TmpMsgInfo^Struct ) = MsgInfo;
000000 1  1
000000 1  1       Word  .EXT DscIopReqCtrl( DSC_IOP_TEMPLATE );
000000 1  1
000000 1  1       Word  .EXT SwitchReq( SwitchReq^Struct );
000000 1  1
000000 1  1       ! Beginning of code...
000000 1  1
000000 1  1       @DscIopReqCtrl := @MsgInfoStruct.ReqCtrl;
000007 1  1
000007 1  1       AssertTruth( DscIopReqCtrl.REQUEST_TYPE = DSC_IOP_SWITCH );
000007 1  1
000007 1  1       CASE G.OwnershipState OF
000012 1  1       BEGIN
000012 1  2       Primary^OwnershipState,
000012 1  2       Switching^OwnershipState ->
000012 1  2           ;
000013 1  2
000013 1  2       TakingOver^OwnershipState,
000013 1  2       VulnerableBackup^OwnershipState,
000013 1  2       CapableBackup^OwnershipState ->
000013 1  2           CALL TmpControl^HandleBackupMsg( MsgInfo );
000016 1  2           RETURN;
000017 1  2
000017 1  2       OTHERWISE ->
000017 1  2           UndefinedCaseError;
000024 1  2       END;
000044 1  1
000044 1  1       Heap^NewStruct( TmpShortTermHeap, SwitchReq );
000052 1  1
000052 1  1       Struct^Zero( SwitchReq );
000063 1  1       CALL LList^InitElement( SwitchReq.Links );
000066 1  1       SwitchReq.MsgInfo ':=' MsgInfo
000066 1  1                               FOR Ele^ByteLen( TmpMsgInfo^Struct ) BYTES;
000075 1  1
000075 1  1       CALL LList^AppendLast( G.SwitchReqList, SwitchReq.Links );
000104 1  1
000104 1  1       CALL Thread^Schedule( G.ControlThread, Normal^ScheduleOption );
000112 1  1   END;

DSCIOPREQCTRL              Variable,10    STRUCT-I       EXT Pointer    L+001
MSGINFO                    Variable       INT            EXT Pointer    L-004
```

```
                              TmpControl^SwitchMsg

MSGINFOSTRUCT                    Variable,40    STRUCT-I       EXT Pointer    L-004
SWITCHREQ                        Variable,50    STRUCT-I       EXT Pointer    L+003

000000  002004 100000 100022 060704 000220 000412 064401 103040    000010  143000 010413 010431 060704 024711 027000 125005 100001
000020  000002 100002 024733 027000 010417 003777 100004 000205    000030  000100 016002 000107 100005 000030 000007 000006 177754
000040  177753 177752 177755 000000 060000 100000 100050 024733    000050  027000 064403 100000 060403 000407 000003 060403 000220
000060  000103 100047 000417 060403 024711 027000 100000 100010    000070  060403 000220 060704 100040 000417 100000 170000 130001
000100  003040 060403 024733 027000 103014 163000 100000 100003    000110  024733 027000 125005
```

TmpControl^GetDevInfo

```
000000 0  0   !EXPORT! PROC TmpControl^GetDevInfo( Primary, Started );
000000 1  0
000000 1  0   !----------------------------------------------------------------------------
000000 1  0   !
000000 1  0   !    This procedure gets information for the FS_IOPALL_DEVINFO request.
000000 1  0   !
000000 1  0   !----------------------------------------------------------------------------
000000 1  0
000000 1  0   Boolean   .EXT Primary;
000000 1  0                        ! OUT
000000 1  0
000000 1  0   Boolean   .EXT Started;
000000 1  0                        ! OUT
000000 1  0
000000 1  0   BEGIN
000000 1  1       ! Begining of code...
000000 1  1
000000 1  1       CASE G.OwnershipState OF
000003 1  1       BEGIN
000003 1  2       Primary^OwnershipState ->
000003 1  2           Primary := True;
000006 1  2
000006 1  2       VulnerableBackup^OwnershipState,
000007 1  2       CapableBackup^OwnershipState,
000007 1  2       Switching^OwnershipState,
000007 1  2       TakingOver^OwnershipState ->
000007 1  2           Primary := False;
000012 1  2
000012 1  2       OTHERWISE ->
000013 1  2           UndefinedCaseError;
000020 1  2       END;
000040 1  1
000040 1  1       Started := (G.TmpState = Started^TmpState);
000051 1  1   END;

PRIMARY                  Variable      INT          EXT Pointer    L-006
STARTED                  Variable      INT          EXT Pointer    L-004

000000  103040 143000 010416 100777 060706 000411 010431 100000    000010  060706 000411 010425 100001 000002 100002 024733 027000
000020  010417 003777 100004 000205 000100 016002 000107 100005    000030  000030 177752 177755 177754 177753 177752 177755 000000
000040  103112 143000 001002 015002 100777 010401 100000 060704    000050  000411 125007
```

TmpControl^AllModuleInitDone

```
000000 0  0   !EXPORT! PROC TmpControl^AllModuleInitDone;
000000 1  0
000000 1  0   !----------------------------------------------------------------------
000000 1  0   !
000000 1  0   !
000000 1  0   !----------------------------------------------------------------------
000000 1  0
000000 1  0   BEGIN
000000 1  1
000000 1  1       ! Beginning of code...
000000 1  1
000000 1  1       ! Obsolete procedure.
000000 1  1
000000 1  1   END;

000000  125003
```

TmpControl^ModuleInit

```
000000 0  0   !EXPORT! PROC TmpControl^ModuleInit( ReqCtrlPtr );
000000 1  0
000000 1  0   !---------------------------------------------------------------------
000000 1  0   !
000000 1  0   !   Initializes this modules data structures.  Must be called before
000000 1  0   !   calling any other routine in this module.
000000 1  0   !
000000 1  0   !---------------------------------------------------------------------
000000 1  0
000000 1  0   Word  .EXT ReqCtrlPtr;
000000 1  0                       ! IN: A pointer to the TMP Startup Message request control
000000 1  0                       !   that was received.
000000 1  0
000000 1  0   BEGIN
000000 1  1       Word  .EXT ReqCtrl( Tmp_Local_Template ) = ReqCtrlPtr;
000000 1  1
000000 1  1       STRUCT  .TmpProgramFileName( FileName^Struct );
000000 1  1
000000 1  1       Boolean  Primary;
000000 1  1
000000 1  1       Word  UpCpuMask;
000000 1  1
000000 1  1       Int  CpuNum;
000000 1  1
000000 1  1       Int  PhaseStepArrayLen;
000000 1  1
000000 1  1       ! Beginning of code...
000000 1  1
000000 1  1   !*! CALL TmfMon2Req^ModuleInit( TmpLongTermHeap );
000006 1  1
000006 1  1       Struct^Zero( TmpControl );
000023 1  1
000023 1  1       G.CtgProcessFileNum := -1;
000030 1  1       G.DeleteCatalog     := False;
000035 1  1
000035 1  1       CALL Str^FromWords( G.CRStr, G.CR, Ele^Bytelen( G.CR ));
000056 1  1
000056 1  1
000056 1  1       !--------------------------------
000056 1  1       ! Initialize the EXPORTed globals.
000056 1  1       !--------------------------------
000056 1  1       TmfConfigurationSeqNum := 0F;    ! Initialized by '*^ReadGlobInfo'.
000062 1  1
000062 1  1       StartTmfTimeStamp := 0F;
000066 1  1
000066 1  1
000066 1  1       TmpBrotherCpuNum := ReqCtrl.TmpStartupMsg.BrotherTmpCpuNum;
000074 1  1
000074 1  1       CALL Str^FromBytes( TmfProgramSubVolStr,
000074 1  1                           G.TmfProgramSubVolBytes,
000074 1  1                           Array^Dim( G.TmfProgramSubVolBytes ),
000074 1  1                           0 );
000112 1  1
000112 1  1       CALL Str^FromBytes( TmfConfigurationSubVolStr,
000112 1  1                           G.TmfConfigurationSubVolBytes,
000112 1  1                           Array^Dim( G.TmfConfigurationSubVolBytes ),
000112 1  1                           0 );
```

TmpControl^ModuleInit

```
000130 1  1
000130 1  1        CALL PROGRAMFILENAME( TmpProgramFileName );
000133 1  1        CALL DirectoryName^AppendToStr( TmfProgramSubVolStr, TmpProgramFileName );
000143 1  1
000143 1  1        Str^CopyLiteral( TmfConfigurationSubVolStr, "$SYSTEM.ZTMFCONF" );
000177 1  1
000177 1  1        Primary := ReqCtrl.TmpStartupMsg.YouArePrimary;
000205 1  1   --   IF Primary THEN
000205 1  1   --       BEGIN
000205 1  1   --       !-----------------------------------------------
000205 1  1   --       ! Tell the TMF Library that we're the Primary TMP.
000205 1  1   --       !-----------------------------------------------
000205 1  1   --       CALL TmfLibTmpOwn^FirstPrimary;
000205 1  1   --       END;
000205 1  1
000205 1  1        CALL TmpMsg^NilMsgInfo( G.TmfMon2MsgInfo );
000212 1  1        CALL LList^InitHeader( G.UserCommandQueue );
000220 1  1        CALL LList^InitHeader( G.SwitchReqList );
000226 1  1
000226 1  1        !-----------------------------------------------------
000226 1  1        !-----------------------------------------------------
000226 1  1        IF Primary THEN
000230 1  1            BEGIN
000230 1  2            CALL TmpControl^ControlThread;
000231 1  2            CALL TmpControl^UserCommandThread;
000232 1  2            END
000232 1  1        ELSE
000233 1  1            BEGIN
000233 1  2            @G.ControlThread := Nil^Addr;
000237 1  2            @G.UserCommandThread := Nil^Addr;
000243 1  2            END;
000243 1  1
000243 1  1        CALL TmpControl^BackupMsgThread;
000244 1  1
000244 1  1        G.CheckpointSem := Semaphore^New( 1 );
000252 1  1
000252 1  1        G.CoordTakeOverInProgress := False;
000255 1  1
000255 1  1        IF Primary THEN
000257 1  1            G.OwnershipState := Primary^OwnershipState
000257 1  1        ELSE
000263 1  1            G.OwnershipState := VulnerableBackup^OwnershipState;
000266 1  1
000266 1  1        G.Checkpointing := False;
000271 1  1
000271 1  1        IF Primary THEN
000273 1  1            BEGIN
000273 1  2            !-----------------------------------------------------
000273 1  2            ! Let the StateChange thread decide when to create the
000273 1  2            ! Backup TMP and monitor it.
000273 1  2            !-----------------------------------------------------
000273 1  2            G.BrotherProcessTag := Nil^Addr;
000300 1  2            END
000300 1  1        ELSE
000301 1  1            CALL Process^MonitorBrother( G.BrotherProcessTag );
000307 1  1
000307 1  1        CALL LList^InitHeader( G.TransitionHoldMsgList );
```

TmpControl^ModuleInit

```
000315 1  1
000315 1  1    IF Primary THEN
000317 1  1        BEGIN
000317 1  2        !-----------------------------------------------------------------
000317 1  2        ! The IMFMON2 Coordinator gives the TMP the initial state of all CPUs.
000317 1  2        !-----------------------------------------------------------------
000317 1  2        UpCpuMask := ReqCtrl.TmpStartupMsg.Primary.UpCpuMask;
000325 1  2        FOR CpuNum := 0 TO Max^Cpus - 1 DO
000327 1  2            IF CpuMask^ContainsCpu( UpCpuMask, CpuNum ) THEN
000334 1  2                G.CpuStateArray[ CpuNum ] := Up^CpuState
000334 1  2            ELSE
000342 1  2                G.CpuStateArray[ CpuNum ] := Down^CpuState;
000354 1  2        END
000354 1  1    ELSE
000355 1  1        BEGIN
000355 1  2        !-----------------------------------------------------------------
000355 1  2        ! 'CpuState's undefined until checkpoint received from Primary TMP.
000355 1  2        !-----------------------------------------------------------------
000355 1  2        FOR CpuNum := 0 TO Max^Cpus - 1 DO
000357 1  2                G.CpuStateArray[ CpuNum ] := Nil^CpuState;
000371 1  2        END;
000371 1  1
000371 1  1    IF Primary THEN
000373 1  1        G.CpuDownOp.State := None^CpuDownOpState
000373 1  1    ELSE
000377 1  1        BEGIN
000377 1  2        !--------------------
000377 1  2        ! Primary only state.
000377 1  2        !--------------------
000377 1  2        G.CpuDownOp.State := Nil^CpuDownOpState;
000402 1  2        END;
000402 1  1
000402 1  1    G.CpuDownOp.FailedCpuNum := -1;
000405 1  1
000405 1  1    IF Primary THEN
000407 1  1        G.CpuReloadOp.State := None^CpuReloadOpState
000407 1  1    ELSE
000413 1  1        BEGIN
000413 1  2        !------------------------------------------------
000413 1  2        ! Undefined until checkpoint received from Primary TMP.
000413 1  2        !------------------------------------------------
000413 1  2        G.CpuReloadOp.State := Nil^CpuReloadOpState;
000416 1  2        END;
000416 1  1
000416 1  1    G.CpuReloadOp.ReloadeeCpuNum := -1;
000421 1  1
000421 1  1    IF Primary THEN
000423 1  1        BEGIN
000423 1  2        IF TmpBrotherCpuNum = -1 THEN
000426 1  2            G.MaintBackupOp.State := CpuDown^MaintBackOpState
000426 1  2        ELSE
000432 1  2            CASE G.CpuStateArray[ TmpBrotherCpuNum ] OF
000437 1  2            BEGIN
000437 1  3            Up^CpuState ->
000437 1  3                G.MaintBackupOp.State := ReadyToCreate^MaintBackOpState;
000442 1  3            Down^CpuState ->
000443 1  3                G.MaintBackupOp.State := CpuDown^MaintBackOpState;
```

TmpControl^ModuleInit

```
000446 1  3            OTHERWISE ->
000447 1  3                UndefinedCaseError;
000454 1  3            END;
000471 1  2        END
000471 1  1    ELSE
000472 1  1        BEGIN
000472 1  2        !--------------------
000472 1  2        ! Primary only state.
000472 1  2        !--------------------
000472 1  2        G.MaintBackupOp.State := Nil^MaintBackOpState;
000475 1  2        END;
000475 1  1
000475 1  1    G.MaintBackupOp.StartTime := 0F;
000502 1  1
000502 1  1    G.MaintBackupOp.DelayCreateThreadAddr := Nil^Addr;
000506 1  1    G.MaintBackupOp.DelayCreateTag        := Nil^Addr;
000513 1  1    G.MaintBackupOp.DelayCreateQuit       := False;
000516 1  1
000516 1  1    G.MaintBackupOp.WatchThreadAddr := Nil^Addr;
000523 1  1    G.MaintBackupOp.WatchQuit       := False;
000526 1  1
000526 1  1    IF Primary THEN
000530 1  1        G.TmpState := Stopped^TmpState
000530 1  1    ELSE
000534 1  1        BEGIN
000534 1  2        !-----------------------------------------------------
000534 1  2        ! Undefined until checkpoint received from Primary TMP.
000534 1  2        !-----------------------------------------------------
000534 1  2        G.TmpState := Nil^TmpState;
000537 1  2        END;
000537 1  1
000537 1  1    G.OperationNum := -1;
000542 1  1
000542 1  1    IF Primary THEN
000544 1  1        G.StartOp.State := None^StartOpState
000544 1  1    ELSE
000550 1  1        BEGIN
000550 1  2        !-----------------------------------------------------
000550 1  2        ! Undefined until checkpoint received from Primary TMP.
000550 1  2        !-----------------------------------------------------
000550 1  2        G.StartOp.State := Nil^StartOpState;
000553 1  2        END;
000553 1  1
000553 1  1    Struct^Zero( G.StartOp.Command );
000571 1  1
000571 1  1    G.StartOp.HighThreadAddr := Nil^Addr;
000575 1  1    G.StartOp.HighQuit       := False;
000600 1  1
000600 1  1    IF Primary THEN
000602 1  1        G.StopOp.State := None^StopOpState
000602 1  1    ELSE
000606 1  1        BEGIN
000606 1  2        !-----------------------------------------------------
000606 1  2        ! Undefined until checkpoint received from Primary TMP.
000606 1  2        !-----------------------------------------------------
000606 1  2        G.StopOp.State := Nil^StopOpState;
000611 1  2        END;
```

TmpControl^ModuleInit

```
000611 1  1
000611 1  1
000611 1  1      G.StopOp.HighThreadAddr := Nil^Addr;
000615 1  1      G.StopOp.HighQuit       := False;
000620 1  1
000620 1  1      IF Primary THEN
000622 1  1          G.DeleteOp.State := None^DeleteOpState
000622 1  1      ELSE
000626 1  1          BEGIN
000626 1  2          !-------------------------------------------------------
000626 1  2          ! Undefined until checkpoint received from Primary TMP.
000626 1  2          !-------------------------------------------------------
000626 1  2          G.DeleteOp.State := Nil^DeleteOpState;
000631 1  2          END;
000631 1  1
000631 1  1      IF Primary THEN
000633 1  1          G.Backup.WatchPrimaryThreadAddr := Nil^Addr
000633 1  1      ELSE
000640 1  1          CALL TmpControl^WatchPrimaryThread;
000641 1  1      G.Backup.QuitForTakeSwitch := False;
000644 1  1
000644 1  1      !-------------------------------------------------------
000644 1  1      ! Save StartupMsg in global variable so it can be used to
000644 1  1      ! create the Backup TMP in the future.
000644 1  1      !-------------------------------------------------------
000644 1  1      G.TmpStartupReqCtrlWords ':=' ReqCtrl FOR TmpStartupReqCtrl^WordLen WORDS;
000653 1  1
000653 1  1      PhaseStepArrayLen := Max^Step * Ele^ByteLen( PhaseStep^Struct );
000656 1  1      @G.PhaseStepArray :=
000656 1  1                    Heap^New( TmpLongTermHeap,
000656 1  1                              DblInt^FromInt( PhaseStepArrayLen ) );
000666 1  1
000666 1  1      Struct^FillPart( G.PhaseStepArray, PhaseStepArrayLen, 0 );
000704 1  1
000704 1  1      G.FirstStep := 0;
000707 1  1      G.LastStep  := -1;   ! Modified by 'TmpControl^Checkin'.
000712 1  1
000712 1  1      CALL Str^FromBytes( G.GlobInfoFileNameStr,
000712 1  1                          G.GlobInfoFileNameBytes,
000712 1  1                          Array^Dim( G.GlobInfoFileNameBytes ),
000712 1  1                          0 );
000733 1  1
000733 1  1      CALL Str^Append( G.GlobInfoFileNameStr, TmfConfigurationSubVolStr );
000746 1  1      CALL Str^AppendByte( G.GlobInfoFileNameStr, "." );
000757 1  1      Str^AppendLiteral( G.GlobInfoFileNameStr, GlobInfo^ConfigFileName );
001016 1  1
001016 1  1      G.GlobInfoFileNum := -1;
001021 1  1
001021 1  1      CALL Str^FromBytes( G.GlobInfoRecordStr,
001021 1  1                          G.GlobInfoRecord,
001021 1  1                          Ele^ByteLen( G.GlobInfoRecord ),
001021 1  1                          Ele^ByteLen( G.GlobInfoRecord ) );
001042 1  1
001042 1  1      IF Primary THEN
001044 1  1          BEGIN
001044 1  2          CALL TmpControl^OpenGlobInfo;
001045 1  2          CALL TmpControl^ReadGlobInfo;
```

TmpControl^ModuleInit

```
 5763.     001046 1  2           END;
 5764.     001046 1  1
 5765.     001046 1  1     END;

CPUNUM                          Variable      INT          Direct        L+004
PHASESTEPARRAYLEN               Variable      INT          Direct        L+005
PRIMARY                         Variable      INT          Direct        L+002
REQCTRL                         Variable,10   STRUCT-I     EXT Pointer   L-004
REQCTRLPTR                      Variable      INT          EXT Pointer   L-004
TMPPROGRAMFILENAME              Variable,30   STRUCT       Indirect      L+001
UPCPUMASK                       Variable      INT          Direct        L+003

000000  070406 024700 002020 060002 024711 027000 000002 170000   000010  130001 000407 000003 100000 170000 130001 000220 000103
000020  005002 004357 000417 100777 005001 004020 000117 147000   000030  100000 005001 004167 000116 146000 100000 170000 130001
000040  005002 004346 000200 100000 170000 130001 005002 004052   000050  000200 100274 100000 100016 024766 027000 000002 000002
000060  070000 000230 000002 000002 070004 000230 100000 100010   000070  060704 000220 000410 044010 100000 170011 130001 100000
000100  170000 130001 005001 004070 000200 100042 100000 100017   000110  024766 027000 100000 170012 130001 100000 170000 130001
000120  005001 004132 000200 100042 100000 100017 024766 027000   000130  170401 024700 027000 100000 170011 130001 100000 170401
000140  130001 024733 027000 170000 030001 003004 000025 100300   000150  004401 000200 030001 100020 126040 134000 004000 170000
000160  030001 003004 000201 103001 147000 100000 170012 130001   000170  100000 170000 130001 003004 143000 024744 027000 100000
000200  100022 060704 000220 000410 044402 100000 170000 130001   000210  024711 027000 100000 170000 130001 003050 024711 027000
000220  100000 170000 130001 003040 024711 027000 040402 014403   000230  027000 027000 010410 100774 100000 103014 167000 100774
000240  100000 102015 166000 027000 100001 100001 024711 027000   000250  103017 167000 100000 102041 146000 040402 014404 100001
000260  101040 145000 010403 100004 103040 147000 100000 103042   000270  147000 040402 014406 100774 100000 102043 172000 000363
000300  010406 100000 103043 173000 130001 024711 027000 100000   000310  170000 130001 003112 024711 027000 040402 014436 100000
000320  100024 060704 000220 000410 044403 100000 010422 040403   000330  040404 030000 001000 013006 100001 040404 003051 000117
000340  147000 010405 100002 040404 003051 000117 147000 040404   000350  104001 034404 001017 016353 010414 100000 010407 100777
000360  040404 003051 000117 147000 040404 104001 034404 001017   000370  016366 040402 014404 100012 103071 147000 010403 100777
000400  103071 147000 100777 103072 147000 040402 014404 100024   000410  102073 146000 010403 100777 103073 147000 100777 103074
000420  147000 040402 014447 040010 001777 015004 100037 102075   000430  146000 010443 040010 003051 000117 143000 010416 100036
000440  103075 147000 010426 100037 103075 147000 010422 100001   000450  000002 100002 024733 027000 010414 003777 100001 000205
000460  000100 016002 000107 100002 000030 177752 177755 177760   000470  000000 010403 100777 103075 147000 000002 000002 103076
000500  173000 000230 100774 100000 102041 166000 100774 100000   000510  101105 171000 000363 100000 103104 147000 100774 100000
000520  103107 173000 000363 100000 103111 147000 040402 014404   000530  100000 103112 147000 010403 100777 103112 147000 100777
000540  103113 147000 040402 014404 100050 102114 146000 010403   000550  100777 103114 147000 000002 170000 130001 003232 000407
000560  000003 100000 170000 130001 003232 000220 000103 100005   000570  000417 100774 100000 103050 167000 100000 102122 146000
000600  040402 014404 100062 101123 145000 010403 100777 103123   000610  147000 100774 100000 103052 167000 100000 102126 146000
000620  040402 014404 100074 101127 145000 010403 100777 103127   000630  147000 040402 014405 100774 100000 103054 167000 010401
000640  027000 100000 103132 147000 100000 102133 172000 130001   000650  060704 100170 000417 005003 004040 044405 060002 040405
000660  000327 024733 027000 103227 173000 000363 100000 103227   000670  173000 000362 000407 000003 103227 173000 000362 000220
000700  000103 040405 104777 000417 100000 103231 147000 100777   000710  102232 146000 100000 170000 130001 005001 004236 000200
000720  100000 170000 130001 005001 004174 000200 100042 100000   000730  100017 024766 027000 100000 170000 130001 005001 004236
000740  000200 100000 170012 130001 024733 027000 100000 170000   000750  130001 005001 004236 000200 100056 024722 027000 170000
000760  030001 003004 000025 100074 004400 000200 030001 100010   000770  126040 134000 004000 170000 030001 003004 000201 103001
001000  147000 100000 170000 130001 005001 004236 000200 100000   001010  170000 130001 003004 143000 024744 027000 100777 103323
001020  147000 100000 170000 130001 005002 004030 000200 100000   001030  170000 130001 005001 004250 000200 100160 100160 100017
001040  024766 027000 040402 014402 027000 027000 125005 022123   001050  054523 052105 046456 055124 046506 041517 047106 043514
001060  047502 044516 043117
```

TmpControl^BrotherIsReallyAlive

```
000000 0  0   Boolean PROC TmpControl^BrotherIsReallyAlive;
000000 1  0
000000 1  0   !-----------------------------------------------------------------------
000000 1  0   !
000000 1  0   !   This procedure returns TRUE if our brother is really alive, and FALSE
000000 1  0   !   if our brother is really dead.  If we believe our brother is alive,
000000 1  0   !   we will do a Process_GetInfo_ call to find out for sure.
000000 1  0   !
000000 1  0   !-----------------------------------------------------------------------
000000 1  0
000000 1  0   BEGIN
000000 1  1
000000 1  1       STRUCT      .BrotherPHandle( PHandle`Struct );
000000 1  1       Int          Error;
000000 1  1
000000 1  1       ! Beginning of code...
000000 1  1
000000 1  1       IF TmpControl.BrotherProcessTag = Nil^Addr THEN
000012 1  1           RETURN False;
000014 1  1
000014 1  1       CALL Process^GetPHandle( TmpControl.BrotherProcessTag, BrotherPHandle );
000024 1  1
000024 1  1       Error := Process_GetInfo_( BrotherPHandle );
000037 1  1
000037 1  1       RETURN( Error = 0 );
000045 1  1
000045 1  1   END;

BROTHERPHANDLE                 Variable,24    STRUCT         Indirect       L+001
ERROR                          Variable       INT            Direct         L+002

000000  070403 024700 002013 103043 173000 000362 100774 100000     000010  000225 015002 100000 125003 103043 173000 000362 100000
000020  170401 130001 024733 027000 100000 170401 130001 024711     000030  002050 000002 005300 100726 024733 027000 034402 001000
000040  015002 100777 125003 100000 125003
```

TmpControl^BackupMsgThread

```
000000 0  0   PROC TmpControl^BackupMsgThread;
000000 1  0
000000 1  0   !----------------------------------------------------------------------
000000 1  0   !
000000 1  0   !   This thread runs at all times in both TMPs.  It replies FEOWNERSHIP to
000000 1  0   !   incoming requests when the TMP is backup.
000000 1  0   !
000000 1  0   !----------------------------------------------------------------------
000000 1  0
000000 1  0   BEGIN
000000 1  1       Thread^NewParameterless( G.BackupMsgThreadAddr );
000000 1  1
000000 1  1       ! Beginning of code...
000000 1  1
000000 1  1       LOOP
000012 1  2
000012 1  2           CASE G.OwnershipState OF
000015 1  2           BEGIN
000015 1  3           Primary^OwnershipState,
000015 1  3           Switching^OwnershipState,
000015 1  3           TakingOver^OwnershipState ->
000015 1  3               !------------
000015 1  3               ! Do nothing.
000015 1  3               !------------
000015 1  3               ;
000016 1  3
000016 1  3           VulnerableBackup^OwnershipState,
000016 1  3           CapableBackup^OwnershipState ->
000016 1  3               IF TmpControl^BrotherIsReallyAlive THEN
000020 1  3                   CALL TmpMsg^ReplyToList( G.TransitionHoldMsgList,FEOWNERSHIP );
000027 1  3               !--------------------------------------------------------------------
000027 1  3               ! If our brother isn't really alive, we'll be doing a takeover shortly,
000027 1  3               ! and TmpControl^DoTakeOver will redrive the requests on the list.  We
000027 1  3               ! refrain from replying because we don't want to get pounded with
000027 1  3               ! incoming retried requests, because this may drive us to 100% CPU busy
000027 1  3               ! and starve out the system monitor process which may be trying to tell
000027 1  3               ! us that our brother's CPU is dead.
000027 1  3               !--------------------------------------------------------------------
000027 1  3
000027 1  3           OTHERWISE ->
000030 1  3               UndefinedCaseError;
000035 1  3           END;
000055 1  2
000055 1  2           CALL Thread^Suspend;
000056 1  2
000056 1  2       ENDLOOP;
000057 1  1
000057 1  1   END;

^^DUMMY                          Variable       INT             Direct         L+001
^^FIRSTPARAM                     Variable       INT             Direct         L-002

000000  070702 100000 103034 173000 130001 000002 100006 024755    000010  027000 024700 103040 143000 010421 010437 027000 014435
000020  100000 170000 130001 003112 100310 024722 027000 010425    000030  100001 000002 100002 024733 027000 010417 003777 100004
000040  000205 000100 016002 000107 100005 000030 000007 000006    000050  000005 177745 177744 177755 000000 027000 010733 125003
```

TmpControl^UnitTestGetCpuStates

```
5844.    000000 0  0   !EXPORT! PROC TmpControl^UnitTestGetCpuStates( CpuStateArray );
5845.    000000 1  0
5846.    000000 1  0   !------------------------------------------------------------------------
5847.    000000 1  0   !
5848.    000000 1  0   !   Returns the states the 'TmpControl' module thinks the system's CPU are in.
5849.    000000 1  0   !
5850.    000000 1  0   !------------------------------------------------------------------------
5851.    000000 1  0
5852.    000000 1  0   Int  .EXT CpuStateArray;
5853.    000000 1  0                        ! OUT
5854.    000000 1  0
5855.    000000 1  0   BEGIN
5856.    000000 1  1      ! Beginning of code...
5857.    000000 1  1
5858.    000000 1  1      CpuStateArray ':=' G.CpuStateArray FOR Max^Cpus WORDS;
5859.    000007 1  1   END;

CPUSTATEARRAY                    Variable       INT              EXT Pointer    L-004

000000  060704 100000 103051 173000 130001 100040 000417 125005     000010
```

```
                              TmpControl^UnitTestGetTmpState
000000 0  0   !EXPORT! PROC TmpControl^UnitTestGetTmpState( TmpState );
000000 1  0
000000 1  0   !------------------------------------------------------------------------
000000 1  0   !
000000 1  0   !
000000 1  0   !------------------------------------------------------------------------
000000 1  0
000000 1  0   Int   .EXT TmpState;
000000 1  0                         ! OUT
000000 1  0
000000 1  0   BEGIN
000000 1  1      ! Beginning of code...
000000 1  1
000000 1  1      TmpState := G.TmpState;
000004 1  1   END;

TMPSTATE                        Variable        INT              EXT Pointer    L-004

000000  103112 143000 060704 000411 125005
```

What is claimed is:

1. A multiple processor system, comprising:

At least one process pair; and a plurality of modules located within at least one of said process pair, said modules performing functions related to multiple independent threads, said modules arranged in a predetermined order, said predetermined order causing higher modules to be dependent on lower modules and lower modules to be independent from higher modules;

whereby said process pair is initially unaware of the number and order of said modules.

2. The multiple processor system of claim 1, wherein a redundant bus interconnects said process pair.

3. The multiple processor system of claim 1, wherein said plurality of modules include a transaction management module, said transaction management module controlling the state of each transaction.

4. The multiple processor system of claim 1, wherein said plurality of modules include a data volume management module, said data volume management module controlling the state of disks.

5. The multiple processor system of claim 1, wherein said plurality of modules include a writing audit record module, said writing audit record module capable of writing records in an audit trail.

6. The multiple processor system of claim 1, wherein said plurality of modules include an audit trail management module, said audit trail management module capable of placing records in an audit trail, tracking the position of said audit trail, and coordinating the layout of said audit trail.

7. A method of arranging modules in a multiple processor system, comprising the steps of:

placing said modules in a predetermined order, said order related to dependency and interdependency between said modules, said order causing said modules to include a portion of higher modules and a portion of lower modules;

processing multiple independent threads in said modules, said processing causing activities in said portion of higher modules to take place before activities in said portion of lower modules;

starting said modules in a sequence related to said order of said modules; and stopping said modules in a sequence related to said order of said modules.

8. The method of claim 7, wherein said portion of higher modules depend on said portion of lower modules, and said portion of lower modules are independent from said portion of higher modules.

9. The method of claim 7, wherein said system is initially oblivious to the number of said modules and to said order of said modules, and wherein said system is oblivious to when said modules are added and to when said modules are deleted.

10. The method of claim 7, wherein said modules are located within at least two transaction monitors, and wherein said transaction monitors include at least one primary transaction monitor and at least one backup transaction monitor.

11. The method of claim 7, further comprising:

changing the state of said modules in a sequence related to said order of said modules, said changing causing only one of said modules to change state at any one period in time.

* * * * *